US012775223B2

(12) United States Patent
Sasaoka et al.

(10) Patent No.: US 12,775,223 B2
(45) Date of Patent: Oct. 27, 2026

(54) IMAGE FORMING APPARATUS INCLUDING MOVABLE TONER CARTRIDGE AND TONER SHUTTER

(71) Applicant: CANON KABUSHIKI KAISHA, Tokyo (JP)

(72) Inventors: Osamu Sasaoka, Kanagawa (JP); Tomoya Tateishi, Kanagawa (JP); Toshiyuki Watanabe, Kanagawa (JP); Jumpei Nitta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/198,554

(22) Filed: May 5, 2025

(65) Prior Publication Data

US 2025/0348014 A1 Nov. 13, 2025

(30) Foreign Application Priority Data

May 7, 2024 (JP) ................................ 2024-075083
Apr. 9, 2025 (JP) ................................ 2025-064130

(51) Int. Cl.
*G03G 15/01* (2006.01)

(52) U.S. Cl.
CPC ................................ *G03G 15/0173* (2013.01)

(58) Field of Classification Search
CPC . G03G 15/0173; G03G 21/18; G03G 21/1821
See application file for complete search history.

(56) References Cited

U.S. PATENT DOCUMENTS

| | | | |
|---|---|---|---|
| 5,621,507 A | 4/1997 | Nishimura | |
| 2005/0123320 A1 | 6/2005 | Okamoto | |
| 2005/0123322 A1 | 6/2005 | Okamoto | |
| 2008/0080902 A1 | 4/2008 | Saito | |
| 2008/0159781 A1 * | 7/2008 | Noguchi | G03G 21/1623 399/110 |
| 2015/0346636 A1 | 12/2015 | Fukushima | |

(Continued)

FOREIGN PATENT DOCUMENTS

| | | |
|---|---|---|
| JP | H11143190 A | 5/1999 |
| JP | 2000293027 A | 10/2000 |

(Continued)

*Primary Examiner* — Hoang X Ngo
(74) *Attorney, Agent, or Firm* — Canon U.S.A., Inc., IP Division

(57) ABSTRACT

An image forming apparatus includes (i) a developing unit including a storage frame having a receiving opening, (ii) a toner cartridge including a toner frame having a discharge opening, and a toner shutter movable between a closed position to cover the discharge opening and an open position to expose the discharge opening, the toner cartridge being movable relative to the storage frame between a mounting position at which the discharge opening faces the receiving opening and a retreat position at which the toner cartridge is moved from the mounting position, and (iii) a moving device configured to move the toner cartridge from the mounting position toward the retreat position. The moving device includes a contact member configured to contact the toner cartridge, and, while the toner cartridge is moving from the retreat position to the mounting position, the contact member is separated from the toner shutter.

12 Claims, 81 Drawing Sheets

(56) References Cited

U.S. PATENT DOCUMENTS

| | | | | |
|---|---|---|---|---|
| 2022/0276585 | A1 | 9/2022 | Iwase | |
| 2024/0152083 | A1* | 5/2024 | Nitta .................. | G03G 15/0173 |
| 2025/0348012 | A1* | 11/2025 | Hiasa ................. | G03G 21/1647 |

FOREIGN PATENT DOCUMENTS

| | | | |
|---|---|---|---|
| JP | 2004126407 | A | 4/2004 |
| JP | 3651528 | B2 | 5/2005 |
| JP | 2007183305 | A | 7/2007 |
| JP | 2008096852 | A | 4/2008 |
| JP | 2010145498 | A | 7/2010 |
| JP | 2011232399 | A | 11/2011 |
| JP | 2011253121 | A | 12/2011 |
| JP | 2013228682 | A | 11/2013 |
| JP | 2016157139 | A | 9/2016 |

* cited by examiner

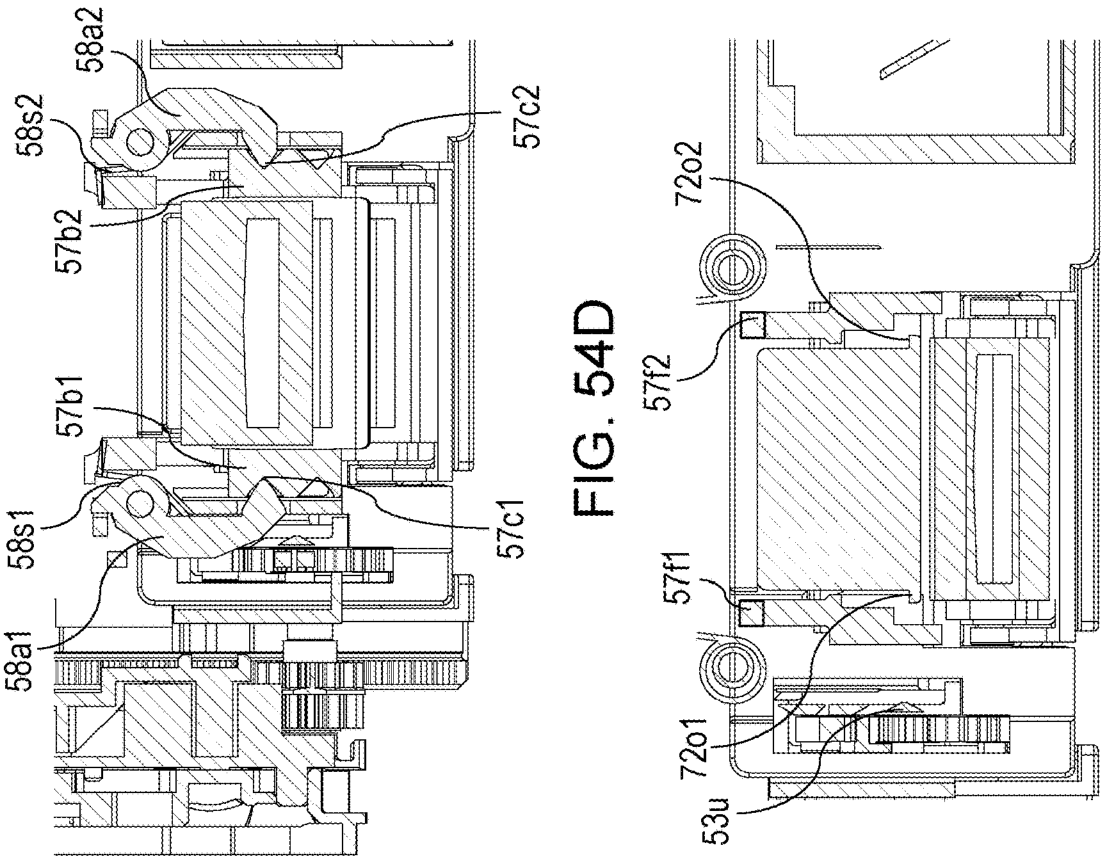
FIG. 54C
FIG. 54D
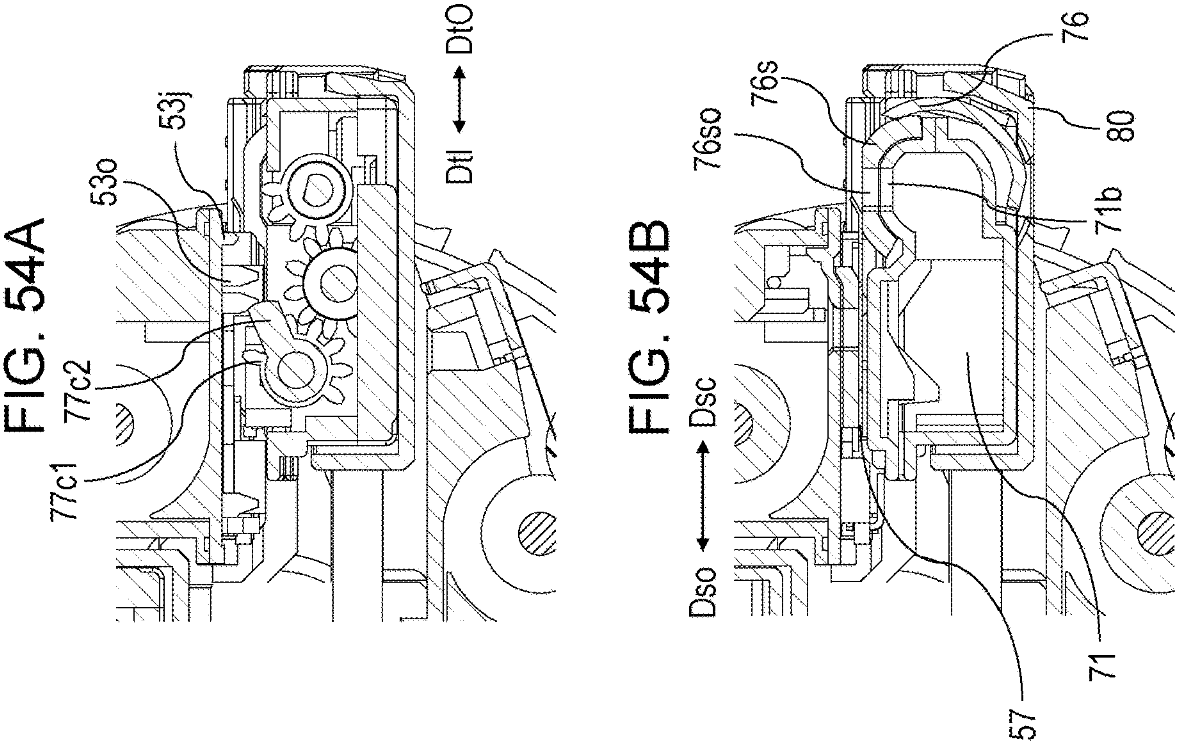
FIG. 54A
FIG. 54B

IMAGE FORMING APPARATUS INCLUDING MOVABLE TONER CARTRIDGE AND TONER SHUTTER

TECHNICAL FIELD

The present invention relates to an image forming apparatus that forms an image on a recording medium.

BACKGROUND

In an electrophotographic image forming apparatus, a rotary developing system is known to form a color image by rotating a rotary assembly including a plurality of developing members. Japanese Patent Laid-Open No. 2007-183305 and Japanese Patent Laid-Open No. 2008-096852 describe image forming apparatuses that include a rotary assembly with a plurality of developing rollers and a plurality of toner cartridges (toner containers) that are detachably attached to the rotary assembly.

SUMMARY OF THE INVENTION

The present invention provides a new image forming apparatus that has advanced the existing technology.

An aspect of the present invention is as follows.

An image forming apparatus includes a developing unit including a developing roller, and a storage frame that includes a receiving opening and a storage chamber configured to contain toner to be supplied to the developing roller; an apparatus body accommodating the developing unit; a toner cartridge detachably attached to the developing unit, the toner cartridge including a toner frame that contains toner to be supplied to the developing unit and that has a discharge opening, and a toner shutter movable between a closed position at which the discharge opening is covered and an open position at which the discharge opening is exposed, wherein the toner cartridge is movable relative to the storage frame between a mounting position at which the discharge opening faces the receiving opening and a retreat position at which the toner cartridge is moved from the mounting position, and at least part of the toner cartridge is positioned outside of the apparatus body when the toner cartridge is at the retreat position; a moving device including a contact member configured to contact the toner cartridge, the moving device being configured to move the toner cartridge from the mounting position toward the retreat position; and a drive device including a drive source configured to drive the contact member, wherein the toner shutter is configured to move from the open position to the closed position as a result of movement of the toner cartridge from the mounting position toward the retreat position, and, while the toner cartridge is moving from the retreat position to the mounting position, the contact member is separated from the toner shutter.

Further features of the present invention will become apparent from the following description of example embodiments with reference to the attached drawings.

BRIEF DESCRIPTION OF THE DRAWINGS

FIGS. 54A to 54D are views that illustrate the developing shutter and the toner shutter in the state where gear teeth have passed through an opener and the toner shutter is positioned at the open position according to the first embodiment.

DESCRIPTION OF THE EMBODIMENTS

Figure 1:
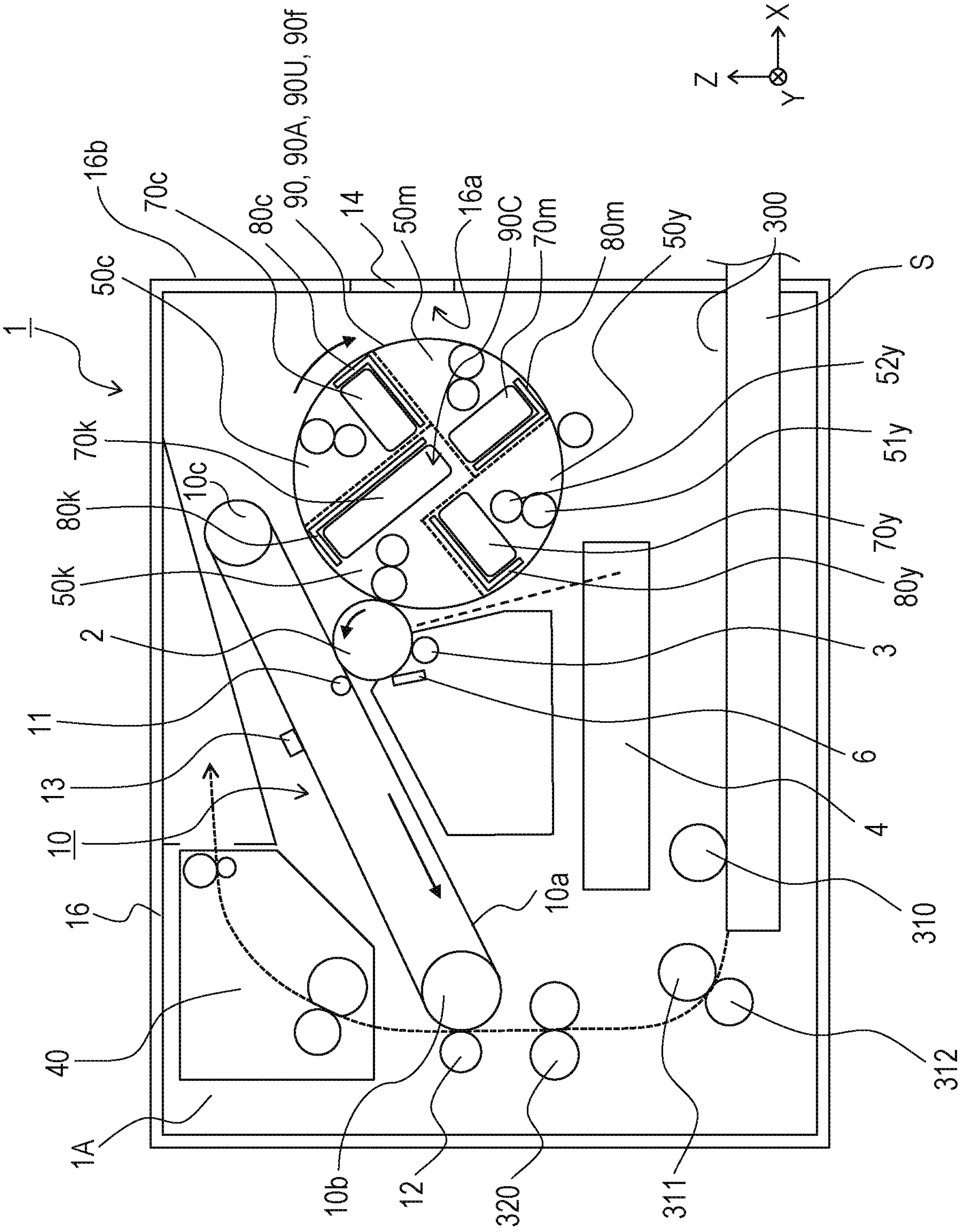
FIG. 1 is a schematic diagram of an image forming apparatus according to a first embodiment.

Hereinafter, embodiments of the present disclosure will be described with reference to the attached drawings.

First Embodiment

An image forming apparatus 1 according to the first embodiment will be described with reference to FIGS. 1 to 12B.

In the following description and drawings, a vertical direction in a case where the image forming apparatus 1 is installed on a horizontal plane is defined as Z direction. A direction that crosses the Z direction and that is a direction of a rotation axis 90C of a rotary body 90 (described later) (a rotation axis direction of a rotary) is defined as Y direction. A direction that crosses both the Z direction and the Y direction is defined as X direction. The X direction and the Y direction can be a horizontal direction. The X direction, the Y direction, and the Z direction can be orthogonal to each other. As needed, the directions of the arrows X, Y, and Z shown in the drawings are referred to as +X side, +Y side, and +Z side, and their opposite sides are referred to as −X side, −Y side, and −Z side.

Overall Configuration of Image Forming Apparatus

Initially, the overall configuration of the image forming apparatus 1 will be described. The image forming apparatus 1 is a laser beam printer that forms an image on a sheet S by using an electrophotographic method. More specifically, the image forming apparatus 1 is a color laser beam printer including four developing units 50_y_, 50_m_, 50_c_, 50_k_. Various sheet materials of different sizes and materials, including paper, such as plain paper and thick paper, plastic film, cloth, sheet materials with surface treatment like coated paper, and special-shaped sheet materials, such as envelopes and index paper, can be used as the sheet S that is a recording material (recording medium).

Figure 2:
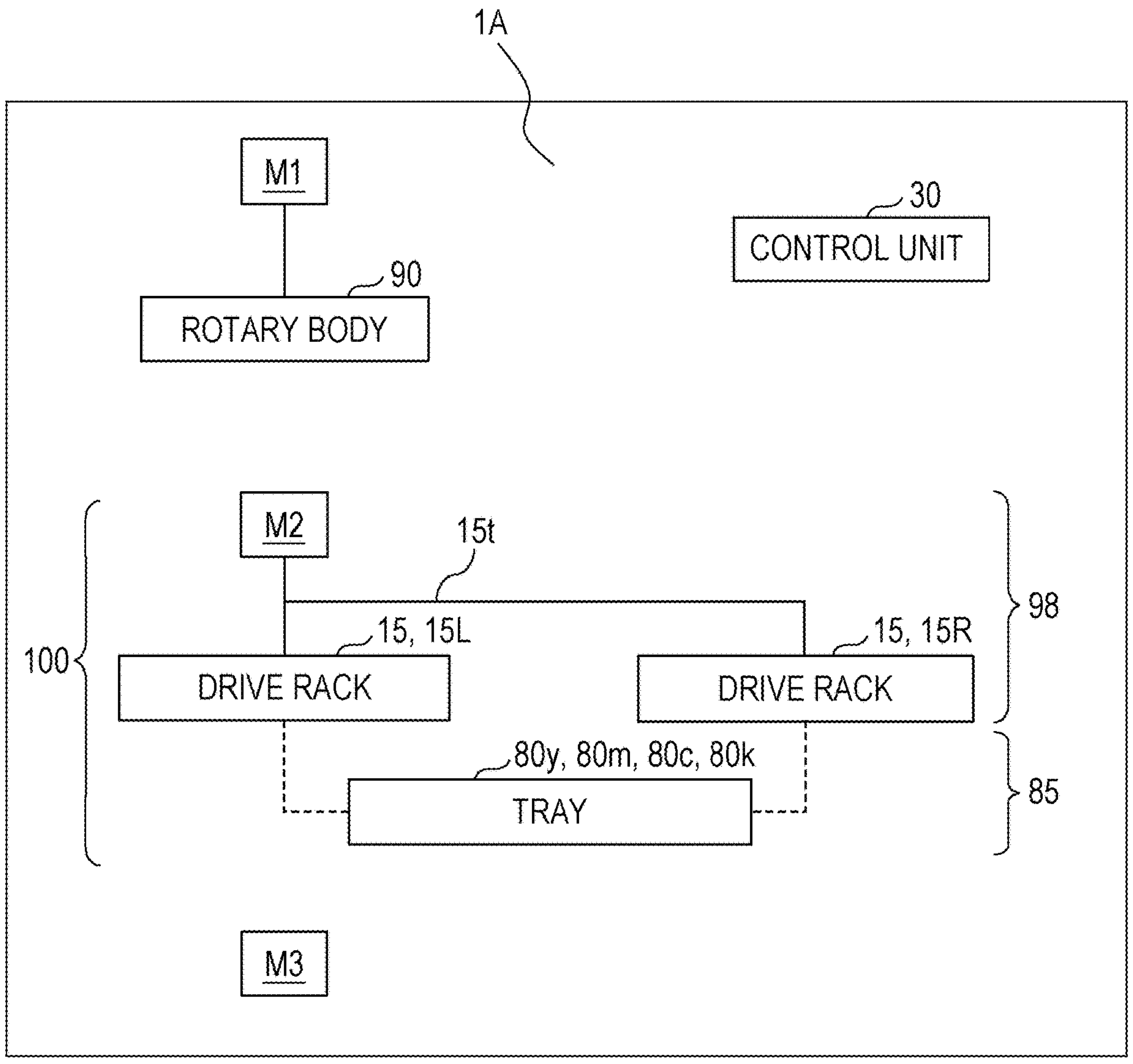
FIG. 2 is a block diagram of the image forming apparatus according to the first embodiment.
Figure 3:
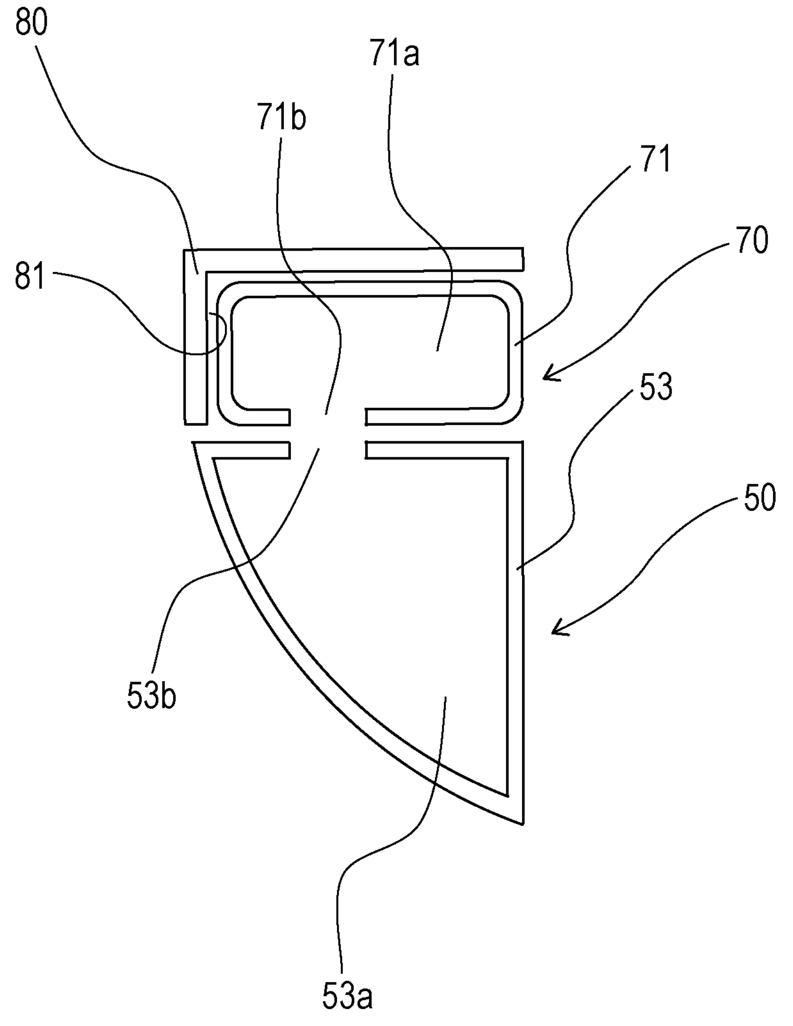
FIG. 3 is a schematic diagram of a developing unit, a toner cartridge, and a tray according to the first embodiment.

The schematic configuration and image forming operation of the image forming apparatus 1 will be described with reference to FIGS. 1, 2, and 3. FIG. 1 is a schematic diagram that shows the sectional configuration of the image forming apparatus 1. FIG. 2 is a block diagram that illustrates a drive source of the image forming apparatus 1. FIG. 3 is a conceptual view that shows a configuration for supplying toner from a toner cartridge 70 to the developing unit 50.

As shown in FIG. 1, the image forming apparatus 1 includes an image forming apparatus body (hereinafter, referred to as apparatus body) 1A, and toner cartridges 70_y_, 70_m_, 70_c_, 70_k_ detachably attached to the apparatus body 1A. The apparatus body 1A of the present embodiment is a portion excluding the toner cartridges 70_y_, 70_m_, 70_c_, 70_k_ from the image forming apparatus 1.

The apparatus body 1A of the image forming apparatus 1 includes an electrophotographic photoconductor (hereinafter, photoconductor drum) 2 having a drum shape (cylindrical shape) as an image carrier that carries an electrostatic latent image. A charge roller 3, a scanner 4 serving as an exposure device, and a cleaning unit 6 are disposed around the photoconductor drum 2.

The charge roller 3 is an example of a charging device or charging unit for uniformly charging the photoconductor drum 2. The scanner 4 is an example of an exposure device or exposure unit that performs exposure by irradiating the photoconductor drum 2 with laser beam according to image information. By irradiating the photoconductor drum 2 with a laser beam, an electrostatic latent image is formed on the surface of the photoconductor drum 2. The cleaning unit 6 is an example of a cleaning device or cleaning portion for removing toner remaining on the surface of the photoconductor drum 2.

The apparatus body 1A includes a sheet storage chamber 300, a pick-up roller 310, a feed roller 311, a separation roller 312, a conveyance roller pair 320, a secondary transfer roller 12, a fuser unit 40, and an intermediate transfer unit 10. The pick-up roller 310 is an example of a sheet feeding device or sheet feeding unit that feeds sheets S. The feed roller 311 and the separation roller 312 are an example of a separation conveying unit that conveys a sheet S while separating the sheet S one by one by friction. The secondary transfer roller 12 is an example of a transfer device or transfer unit that transfers an image from an intermediate transfer belt 10_a_ to the sheet S.

The intermediate transfer unit 10 includes the intermediate transfer belt 10_a_, a belt drive roller 10_b_, a tension roller 10_c_, a cleaning device 13, and a primary transfer roller 11. The intermediate transfer belt 10_a_ is an example of an intermediate transfer member that carries an image transferred (primary transfer) from the photoconductor drum 2 and conveys the image for transferring (secondary transfer) the image to the sheet S. The intermediate transfer belt 10_a_ is stretched between the belt drive roller 10_b_ and the tension roller 10_c_. The belt drive roller 10_b_ is a drive member that conveys the intermediate transfer belt 10_a_ by being rotationally driven by a drive source.

The apparatus body 1A includes the rotary body (a rotary, a rotating member, and a developing device) 90 with the developing units 50_y_, 50_m_, 50_c_, 50_k_. As will be described later, in the present embodiment, trays (support members) 80_y_, 80_m_, 80_c_, 80_k_ are attached to the rotary body 90. The toner cartridges 70_y_, 70_m_, 70_c_, 70_k_ are removably mounted to the trays 80_y_, 80_m_, 80_c_, 80_k_.

In the following description, a plurality of members and the like having similar functions can be distinguished from each other by assigning numerals. For example, one of the toner cartridges 70y, 70m, 70c, 70k can be called a first toner cartridge, one of the remaining three can be called a second toner cartridge, one of the remaining two can be called a third toner cartridge, and the last one can be called a fourth toner cartridge. Similarly, one of the trays 80y, 80m, 80c, 80k can be called a first tray, one of the remaining three can be called a second tray, one of the remaining two can be called a third tray, and the last one can be called a fourth tray. In other words, one of the trays 80y to 80k is an example of a first support member, another one of the trays 80y to 80k is an example of a second support member, yet another one of the trays 80y to 80k is an example of a third support member, and the last one of the trays 80y to 80k is an example of a fourth support member. Numbering is used for the sake of convenience of description and can generally be interchanged as needed.

The developing units (the first to fourth developing units) 50y, 50m, 50c, 50k are examples of a developing device or developing portion that develops an electrostatic latent image formed on the photoconductor drum 2 into a toner image using toner of the corresponding color. Each of the developing units 50y, 50m, 50c, 50k develops the electrostatic latent image formed on the photoconductor drum 2 using yellow toner, magenta toner, cyan toner, or black toner. In other words, the image forming apparatus 1 has a first developer, a second developer, a third developer, and a fourth developer with different colors. The developing units 50y, 50m, 50c, 50k may be arranged in a different order from the order shown in FIG. 1.

The developing unit 50y includes a developing roller 51y, a supply roller 52y, and a developing blade. The developing roller 51y is a developer carrier that rotates while carrying toner as a developer and supplies the toner to the photoconductor drum 2. The supply roller 52y is a supply member that is disposed so as to contact the developing roller 51y and that supplies toner to the developing roller 51y. The developing blade is a regulating member that regulates the thickness of a toner layer carried on the developing roller 51y. The other developing units 50m, 50c, 50k also include similar developing rollers 51m, 51c, 51k, supply rollers 52m, 52c, 52k, and developing blades, respectively.

The toner cartridges 70y, 70m, 70c, 70k corresponding to the developing units 50y, 50m, 50c, 50k are mounted to the rotary body 90. Yellow toner, magenta toner, cyan toner, and black toner are respectively contained in the toner cartridges 70y, 70m, 70c, 70k as toners to be supplied to the developing units 50y, 50m, 50c, 50k. One of the four-color toners is called first toner, one of the remaining three-color toners is called second toner, one of the remaining two-color toners is called third toner, and the last toner is called fourth toner. For example, black toner is an example of the first toner, and magenta toner is an example of the second toner. Numbering is used for the sake of convenience of description and can generally be interchanged as needed.

Here, the rotary body 90 includes a rotary frame 90f that supports the developing units 50y, 50m, 50c, 50k. The developing units 50y, 50m, 50c, 50k are supported by the rotary frame 90f that is a rotatable rotation support member.

The trays 80y, 80m, 80c, 80k are attached to the rotary body 90. A combination of the rotary body 90 and the trays 80y, 80m, 80c, 80k can be referred to as a rotary unit 90U. In other words, the rotary unit 90U includes the rotary body 90 and the trays 80y, 80m, 80c, 80k.

The toner cartridges 70y to 70k are detachably held by the trays 80y to 80k, respectively. As will be described later, the trays 80y to 80k are supported so as to be slidable to the outside of the rotary body 90. A combination of the rotary unit 90U and the toner cartridges 70y, 70m, 70c, 70k can be referred to as a rotary assembly 90A. In other words, the rotary assembly 90A includes the rotary unit 90U and the toner cartridges 70y, 70m, 70c, 70k.

As will be described later, the rotary body 90 is rotatable around the rotation axis (rotation center) 90C. The rotation axis 90C coincides with the rotation axes of the rotary frame 90F, the rotary unit 90U, and the rotary assembly 90A. The rotation axis 90C is substantially parallel to the rotation axis (rotation center) of the photoconductor drum 2.

When the rotary body 90 rotates around the rotation axis 90C, any one of the developing rollers 51y, 51m, 51c, 51k can take a development posture to face the photoconductor drum 2. The posture in which the developing roller 51y faces the photoconductor drum 2 is called a yellow development posture. The posture in which the developing roller 51m faces the photoconductor drum 2 is called a magenta development posture. The posture in which the developing roller 51c faces the photoconductor drum 2 is called a cyan development posture. The posture in which the developing roller 51k faces the photoconductor drum 2 is called a black development posture. In other words, the rotary body 90 can rotate around the rotation axis 90C so that the positions of the developing rollers 51y, 51m, 51c, 51k relative to the photoconductor drum 2 change. The black development posture is an example of a first development posture in which a first developing roller (developing roller 51k) faces the photoconductor drum 2. The other development postures are examples of a second development posture in which a second developing roller (any one of the developing rollers 51y to 51c) faces the photoconductor drum 2. The yellow, magenta, cyan, and black development postures may also be referred to as first to fourth development postures. Numbering is used for the sake of convenience of description and can generally be interchanged as needed.

As shown in FIG. 2, the apparatus body 1A includes motors M1, M2, M3 as drive sources. As will be described later, the motor M1 supplies driving force for rotating the rotary body 90 around the rotation axis 90C. In other words, the motor M1 rotates the rotary assembly 90A and the rotary unit 90U around the rotation axis 90C. The motors M1, M2, M3 are examples of the drive sources that operate upon receiving electric power.

The apparatus body 1A includes a drive device 98 including the motor M2 and a transmission device. The transmission device includes drive racks 15R, 15L serving as drive gears (described later), and a transmitting unit 15t. The driving force of the motor M2 is transmitted to the drive racks 15R, 15L by the transmitting unit 15t. In other words, the motor M2 is configured to drive the drive racks 15R, 15L and moves the trays 80y, 80m, 80c, 80k relative to the rotary body 90 through the drive racks 15R, 15L.

The motor M3 drives members other than the members driven by the motor M1 or the motor M2. For example, the motor M3 drives the photoconductor drum 2, the developing units 50y, 50m, 50c, 50k, the pick-up roller 310, the feed roller 311, the conveyance roller pair 320, the secondary transfer roller 12, the belt drive roller 10b, and the fuser unit 40.

The members driven by the motors M1, M2, M3 can be changed as needed. The roles of any two or three of the motors M1, M2, M3 may be consolidated into a single motor. On the other hand, another drive source other than the motors M1, M2, M3 may be added.

The apparatus body 1A includes a control unit 30 as a controller for controlling the operation of the image forming apparatus 1. The control unit 30 includes a CPU that runs programs, and a storage unit such as a ROM and a RAM. The CPU reads and runs the programs stored in the storage unit to control the operation of actuators, that is, the motors M1, M2, M3, provided in the image forming apparatus 1. The storage unit includes a non-volatile storage medium and a volatile storage medium, serves as a storage location for programs and data, and also serves as a workspace for the CPU to run programs. The functions of the control unit 30 described below may be implemented in a circuit within the control unit 30 as independent hardware, such as an ASIC.

The suffixes y, m, c, and k of the developing units 50*y*, 50*m*, 50*c*, 50*k*, the toner cartridges 70*y*, 70*m*, 70*c*, 70*k*, and the trays 80*y*, 80*m*, 80*c*, 80*k* each indicate the color of toner. The basic configurations and functions of the developing units 50*y*, 50*m*, 50*c*, 50*k* are common. The basic configurations and functions of the toner cartridges 70*y*, 70*m*, 70*c*, 70*k* are common. The basic configurations and functions of the trays 80*y*, 80*m*, 80*c*, 80*k* are common. Therefore, when the units, cartridges, or trays do not need to be distinguished from one another, the suffixes y, m, c, and k are omitted, and the units, cartridges, or trays will be described on the assumption that there is any one of the four units, cartridges, or trays. When the four units, cartridges, or trays are distinguished from one another, they will be described on the assumption that each of them is one of the four units, cartridges, or trays corresponding to the suffix y, m, c, or k.

As shown in FIG. 3, the toner cartridge 70 includes a toner frame 71. The toner frame 71 has a toner storage chamber 71*a* that contains toner, and a discharge opening 71*b* that communicates with the toner storage chamber 71*a*.

The developing unit 50 has a developing frame (storage frame) 53. The developing frame 53 includes a developing-side storage chamber 53*a* and a receiving opening (inlet opening) 53*b* that communicates with the developing-side storage chamber (toner supply chamber) 53*a*. That is, the rotary body 90 includes a developing frame 53*y*, a developing frame 53*m*, a developing frame 53*c*, and a developing frame 53*k*. In other words, the rotary body 90 includes a first developing chamber, a second developing chamber, a third developing chamber, and a fourth developing chamber. As described earlier, the developing unit 50 includes the developing roller 51, the supply roller 52, and the like; however, these components are omitted in FIG. 3.

The developing roller 51*k* of the developing unit 50*k* is an example of the first developing roller. The developing roller 51*m* of the developing unit 50*m* is an example of the second developing roller. The developing frame 53*k* of the developing unit 50*k* (FIG. 4A) with the developing-side storage chamber 53*a* is an example of a first storage frame having a first storage chamber. The developing frame 53*m* of the developing unit 50*m* (FIG. 4A) with the developing-side storage chamber 53*a* is an example of a second storage frame having a second storage chamber. The rotary body 90 is an example of a rotatable rotary including the first developing roller, the second developing roller, the first storage frame having the first storage chamber, and the second storage frame having the second storage chamber. In the present embodiment, the rotary body 90 includes first to fourth developing rollers and first to fourth storage frames.

As will be described later, the toner cartridge 70 is movable relative to the developing frame 53 between a mounting position and a position different from the mounting position. In embodiments, the position different from the mounting position may define a retreat position. Alternatively, the retreat position may be considered a non-mounted/unmounted position, an eject position, or a retrieval position. In embodiments, the toner cartridge is movable from the mounting position to the retreat position and/or from the retreat position to the mounting position. The discharge opening 71*b* faces the receiving opening 53*b* in the state where the toner cartridge 70 is at the mounting position relative to the developing frame 53. In other words, the toner storage chamber 71*a* of the toner cartridge 70 and the developing-side storage chamber 53*a* of the developing unit 50 communicate with each other via the discharge opening 71*b* and the receiving opening 53*b*. When toner is supplied from the toner cartridge 70 to the developing unit 50, at least part of the receiving opening 53*b* is positioned below at least part of the discharge opening 71*b*.

Then, toner contained in the toner storage chamber 71*a* is discharged from the discharge opening 71*b*, and the toner discharged from the discharge opening 71*b* is put into the developing-side storage chamber 53*a* through the receiving opening 53*b*. In other words, a first developer is supplied to the first developing chamber of the rotary body 90, a second developer is supplied to the second developing chamber of the rotary body 90, a third developer is supplied to the third developing chamber of the rotary body 90, and a fourth developer is supplied to the fourth developing chamber of the rotary body 90.

The toner contained in the developing-side storage chamber 53*a* is supplied to the developing roller 51 by the supply roller 52. The toner contained in the toner storage chamber 71*a* is supplied to the developing roller 51 through this route.

The toner cartridge 70 desirably includes a seal member (first seal member) (not shown) that covers the discharge opening 71*b*. The developing unit 50 desirably includes a seal member (second seal member) (not shown) that covers the receiving opening 53*b*.

In the state where the toner cartridge 70 is not mounted to the developing unit 50, the discharge opening 71*b* and the receiving opening 53*b* are desirably covered by the seal members to suppress the outflow of toner from the discharge opening 71*b* and the receiving opening 53*b*.

Image Forming Operation

The image forming operation in the present embodiment will be described. First, the photoconductor drum 2 is rotated in the direction of the arrow in FIG. 1 (counterclockwise) in synchronization with the rotation of the intermediate transfer belt 10*a*. Then, the surface of the photoconductor drum 2 is uniformly charged with the charge roller 3.

When forming a color image on a sheet S, the rotary body 90 rotates in the direction of the arrow in FIG. 1 (clockwise) while supporting the developing units 50*y*, 50*m*, 50*c*, 50*k* as described below. After that, while the developing rollers 51*y*, 51*m*, 51*c*, 51*k* are moved to a developing position one by one, an electrophotographic process is repeatedly performed.

First, the scanner 4 applies laser beam based on image data corresponding to a yellow image to form a static latent image corresponding to the yellow image on the surface of the photoconductor drum 2. In parallel with the formation of the electrostatic latent image, the motor M1 rotates the rotary body 90 to cause the rotary body 90 to take a yellow development posture. When the rotary body 90 is in the yellow development posture, the developing roller 51*y* is at the developing position and develops the electrostatic latent image formed on the photoconductor drum 2 by using yellow toner.

In the present embodiment, each of the developing rollers 51*y*, 51*m*, 51*c*, 51*k* is an elastic roller in which a metal shaft is coated with rubber. At the developing position, each of the developing rollers 51*y*, 51*m*, 51*c*, 51*k* develops an electrostatic latent image in a state of being in contact with the photoconductor drum 2. In other words, the image forming apparatus 1 in the present embodiment adopts a contact developing method. However, at the developing position, each of the developing rollers 51_y_, 51_m_, 51_c_, 51_k_ may develop an electrostatic latent image in a state where there is a gap from the photoconductor drum 2. In other words, the image forming apparatus 1 may adopt a noncontact developing method.

When the yellow toner image is developed, the yellow toner image on the photoconductor drum 2 is primarily transferred to the intermediate transfer belt 10_a_ by the primary transfer roller 11 disposed inside the intermediate transfer belt 10_a_.

After this, the rotary body 90 is rotated to move the developing rollers 51_m_, 51_c_, 51_k_ in sequence to the developing position, and a toner image of the corresponding color is formed. In other words, after the yellow toner image is formed on the intermediate transfer belt 10_a_, the rotary body 90 takes a magenta development posture, and a magenta toner image is formed on the intermediate transfer belt 10_a_. After the magenta toner image is formed on the intermediate transfer belt 10_a_, the rotary body 90 takes a cyan development posture, and a cyan toner image is formed on the intermediate transfer belt 10_a_. After the cyan toner image is formed on the intermediate transfer belt 10_a_, the rotary body 90 takes a black development posture, and a black toner image is formed on the intermediate transfer belt 10_a_. After the black toner image is formed on the intermediate transfer belt 10_a_, the rotary body 90 rotates around the rotation axis 90C in the direction of the arrow shown in FIG. 1 (clockwise) to return to the yellow development posture. The color of an image first formed on the intermediate transfer belt 10_a_ is optional. For example, a black toner image may be formed first.

Then, primary transfer is repeated such that four toner images are overlaid on the intermediate transfer belt 10_a_, with the result that a color image is formed on the intermediate transfer belt 10_a_. The secondary transfer roller 12 and the cleaning device 13 do not contact the intermediate transfer belt 10_a_ until a color image is formed on the intermediate transfer belt 10_a_.

On the other hand, a sheet S is fed by the pick-up roller 310 from the sheet storage chamber 300 provided at the bottom of the apparatus body 1A. The sheets S are separated into individual sheets by the feed roller 311 and the separation roller 312 and sent to the conveyance roller pair 320. The conveyance roller pair 320 sends the fed sheet S to a transfer portion (secondary transfer unit) that is a nip portion between the intermediate transfer belt 10_a_ and the secondary transfer roller 12. The color image on the intermediate transfer belt 10_a_ is transferred to the surface of the conveyed sheet S (secondary transfer).

The sheet S with a color image transferred is sent to the fuser unit 40. In the fuser unit 40, the sheet S is heated and pressed to fix the image onto the sheet S. The sheet S having passed through the fuser unit 40 is discharged to the outside of the image forming apparatus 1 as a product.

On the other hand, when forming a monochrome image on a sheet S, the rotary body 90 takes the black development posture. In this state, after an electrostatic latent image is formed on the surface of the photoconductor drum 2 as a result of charging and exposure of the photoconductor drum 2, the electrostatic latent image is developed using black toner by the developing roller 51_k_ positioned at the developing position. The black toner image is primarily transferred to the intermediate transfer belt 10_a_ and then secondarily transferred to a sheet S. The subsequent processes are similar to those in the case of color images.

Rotary Configuration

The configuration of the rotary body 90 will be described with reference to FIGS. 1, 4A, 4B, and 5.

Figure 4A:
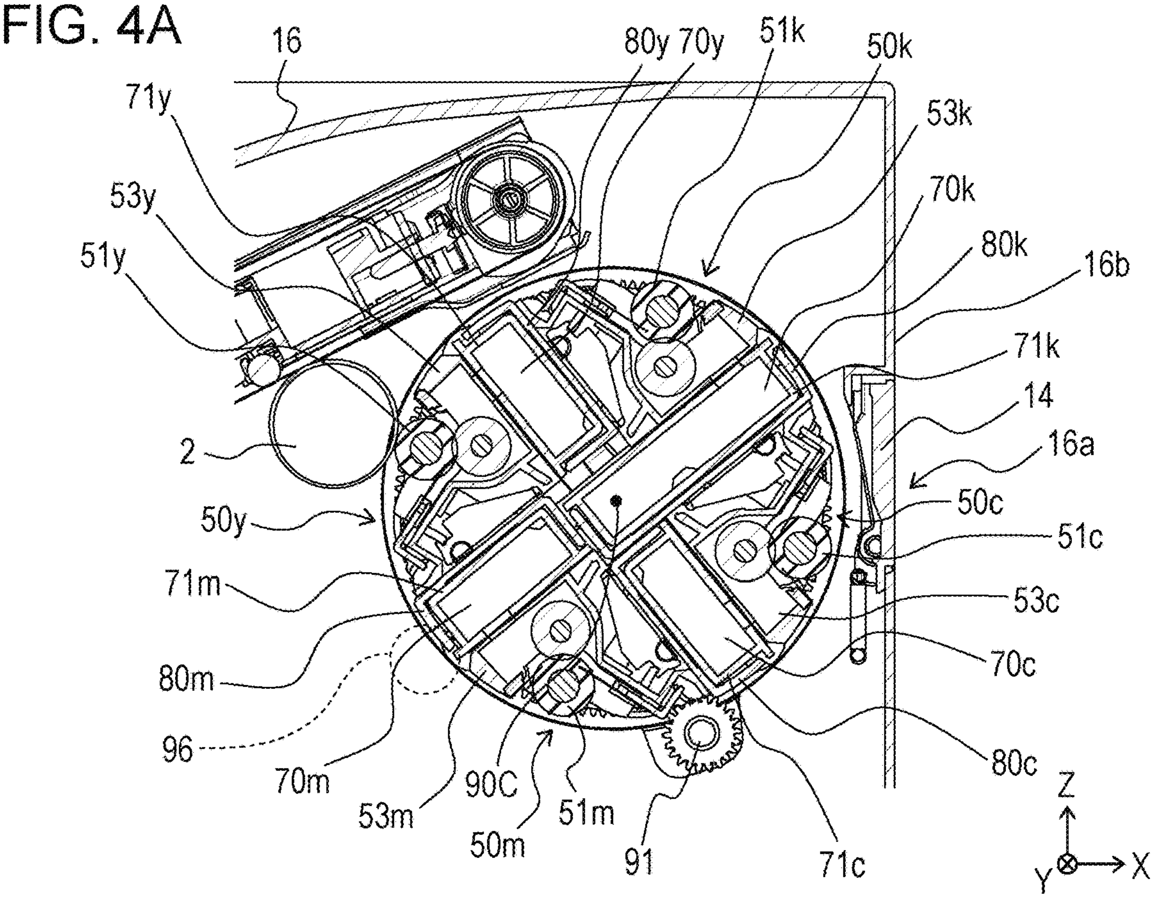
FIGS. 4A and 4B are sectional views of the image forming apparatus according to the first embodiment.
Figure 4B:
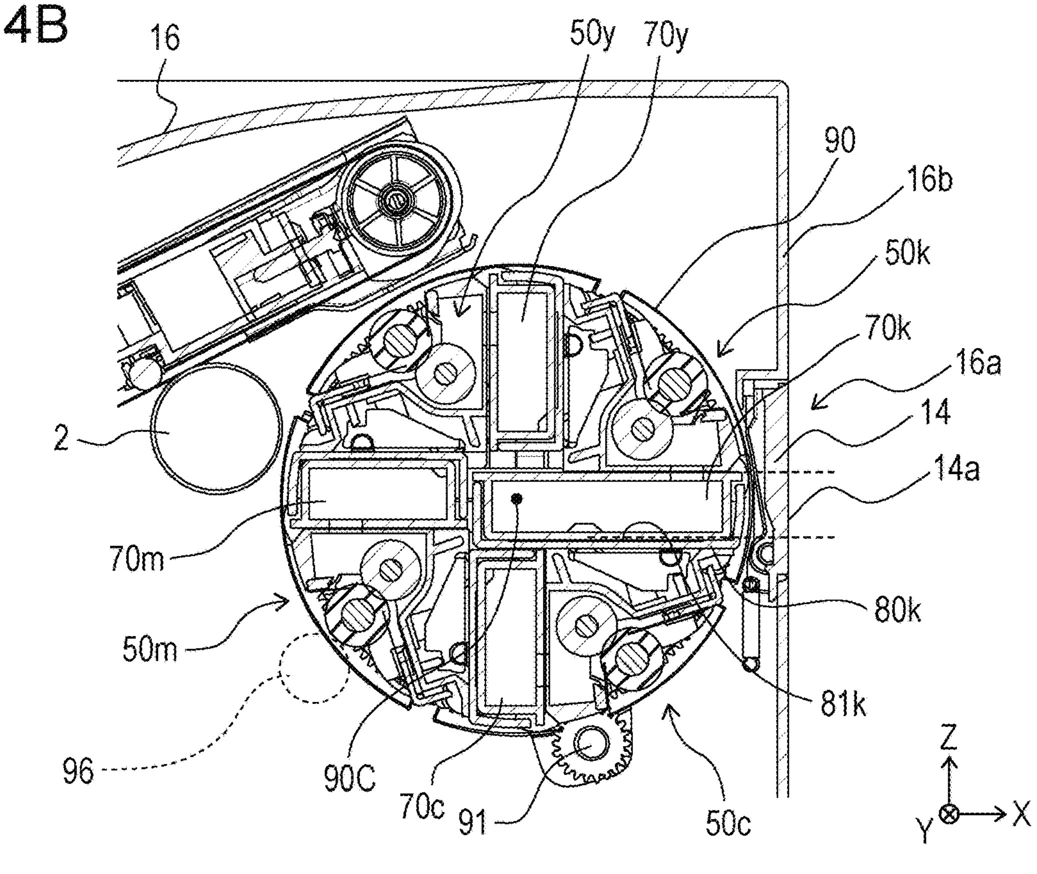
Figure 5:
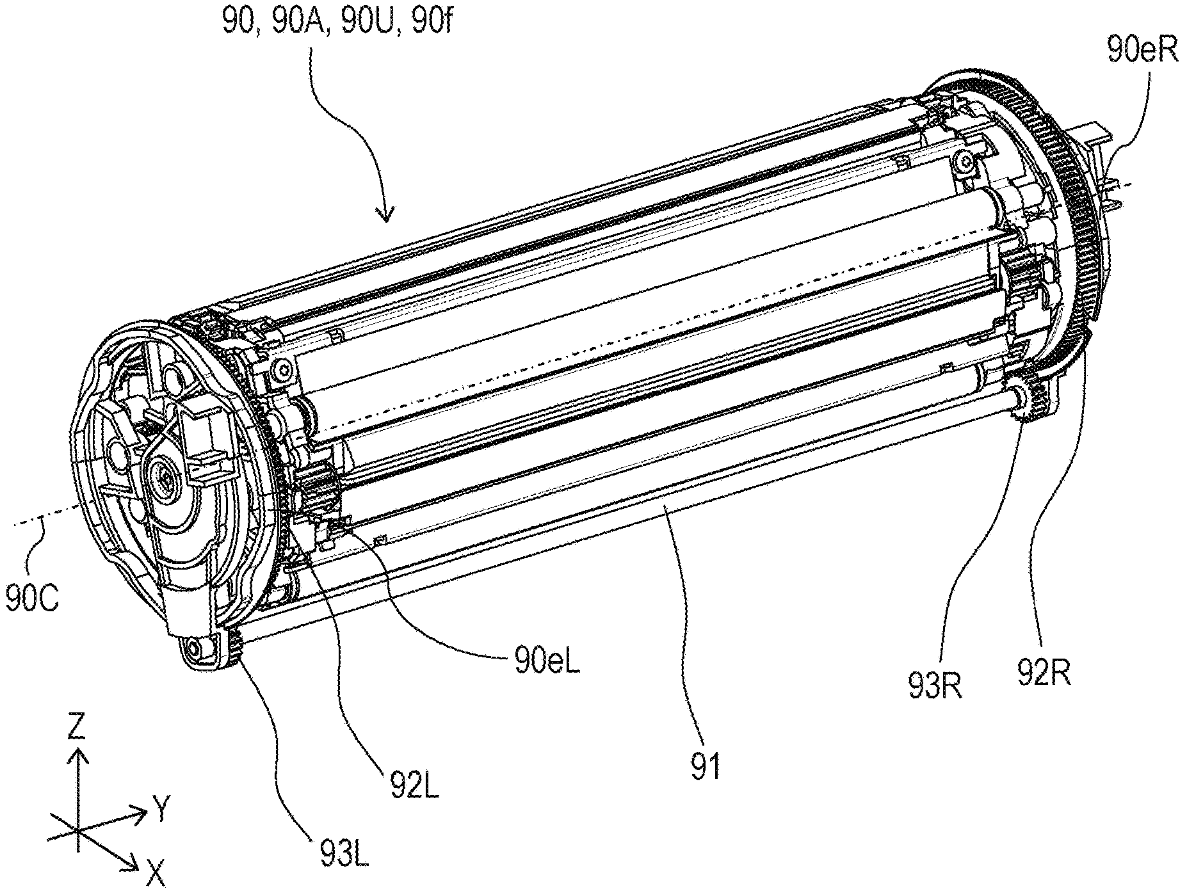
FIG. 5 is a perspective view of a rotary body according to the first embodiment.

FIGS. 4A and 4B are sectional views that show the rotary body 90 of the image forming apparatus 1 and its surroundings. FIGS. 4A and 4B are sectional views of the apparatus, taken along an imaginary plane perpendicular to the rotation axis 90C of the rotary body 90. FIG. 5 is a perspective view of the rotary body 90.

As described earlier, the toner cartridges 70_y_ to 70_k_ are detachably attachable to the rotary body 90. A user is able to supply toner to the image forming apparatus 1 by replacing the toner cartridges 70_y_ to 70_k_ when toner inside the toner cartridges 70_y_ to 70_k_ runs out.

As shown in FIG. 1, the apparatus body 1A includes a frame 16 that accommodates the rotary body 90.

The frame 16 is a main body frame of the image forming apparatus 1 of the present embodiment. The frame 16 is the housing (framework) of the apparatus body 1A made up of a frame and an exterior member. The frame 16 has a substantially rectangular parallelepiped shape in the present embodiment.

The frame 16 has an opening (main body opening, housing opening) 16_a_. More specifically, the frame 16 includes a side surface 16_b_ that expands in a direction that crosses a horizontal direction. The side surface 16_b_ makes up at least part of a plus X-side appearance surface of the apparatus body 1A. The opening 16_a_ is disposed at the side surface 16_b_. The side surface 16_b_ is a side surface disposed downstream of an outlet of the apparatus body 1A in a discharge direction in which a sheet S with a formed image is discharged. A user is able to access the sheet storage chamber 300 from the side surface 16_b_ side of the image forming apparatus 1 to replenish the sheet storage chamber 300 with sheets S or collect a sheet S discharged from the outlet. Therefore, the side surface 16_b_ may be regarded as the front (front face) of the apparatus body 1A.

The toner cartridges 70_y_, 70_m_, 70_c_, 70_k_ can be attached to and detached from the rotary body 90 through the opening 16_a_. In other words, the toner cartridge 70_k_ may be regarded as an example of a first toner cartridge that contains toner supplied to the first developing roller (developing roller 51_k_) and that can be attached to and detached from the rotary (rotary body 90) through the opening 16_a_ of the frame 16 of the apparatus body 1A. The toner cartridge 70_m_ may be regarded as an example of a second toner cartridge that contains toner supplied to the second developing roller (developing roller 51_m_) and that can be attached to and detached from the rotary (rotary body 90) through the opening 16_a_ of the frame 16 of the apparatus body 1A.

In the present embodiment, the toner cartridges 70_y_, 70_m_, 70_c_, 70_k_ are attached to and detached from the rotary body 90 through the opening 16_a_ in a state of being supported by the trays 80_y_ to 80_k_.

In other words, a user is able to attach and detach the toner cartridges 70_y_ to 70_k_ to and from the rotary body 90 via the trays 80_y_ to 80_k_.

The opening 16_a_ is disposed at the side surface 16_b_ of the frame 16. In the present embodiment, the side surface 16_b_ is a surface that is substantially parallel to the rotation axis 90C of the rotary body 90. Therefore, when the toner cartridge 70 is replaced, the toner cartridge 70 passes through the opening 16_a_ in a direction that crosses (which can be a direction orthogonal to) the rotation axis 90C.

The image forming apparatus 1 includes a door 14 that covers the opening 16*a* of the frame 16. The door 14 is an opening and closing member movable between a closed position at which the opening 16*a* is covered (see FIG. 6A) and an open position at which the opening 16*a* is exposed (see FIGS. 6B and 6C).

As described above, in the present embodiment, the toner cartridge 70 is configured to be detachably attached to the rotary body 90 via the tray 80. Therefore, the toner cartridge 70 can be stably attached to and detached from the rotary body 90.

More specifically, a user is able to replace the toner cartridge 70 by performing operation to attach and detach the toner cartridge 70 to and from the tray 80 configured to be movable relative to the rotary body 90 (that is, relative to the apparatus body 1A). When the user directly replaces the toner cartridge by directly removing the toner cartridge from the apparatus body and inserting a toner cartridge to the apparatus body, the user is asked to insert the toner cartridge into the predetermined mounting position inside the apparatus body. In the present embodiment, the tray 80 is movable in the state of supporting the toner cartridge 70 so that the toner cartridge 70 moves to the mounting position. Therefore, a user is able to replace the toner cartridge 70 through easy operation, that is, by putting the toner cartridge 70 on the tray 80, so the operability improves.

The toner cartridge 70 has an elongated shape extending in a longitudinal direction set to the Y direction parallel to the rotation axis 90C of the rotary body 90. In other words, the dimension of the toner cartridge 70 in the longitudinal direction is larger than the height and width in a cross section orthogonal to the longitudinal direction. When the toner cartridge 70 with such an elongated shape is handled, the toner cartridge 70 can be passed through the opening 16*a* with a short moving distance by disposing the opening 16*a* at the side surface 16*b* of the frame 16 that is substantially parallel to the longitudinal direction (Y direction) of the toner cartridge 70. For example, replacing the toner cartridges 70 is easier compared to removing and inserting the toner cartridge 70 through an opening provided at one-side (+Y-side or −Y-side) side surface of the frame 16 in the longitudinal direction of the toner cartridge 70.

The rotary body 90 can rotate around the rotation axis 90C to take a replacement posture in which removal of any one of the toner cartridges 70*y* to 70*k* from the rotary body 90 is allowed. The posture in which removal of the toner cartridge 70*y* is allowed is referred to as yellow replacement posture. The posture in which removal of the toner cartridge 70*m* is allowed is referred to as magenta replacement posture. The posture in which removal of the toner cartridge 70*c* is allowed is referred to as cyan replacement posture.

The posture in which removal of the toner cartridge 70*k* is allowed is referred to as black replacement posture.

The black replacement posture is an example of a first replacement posture in which removal of the first toner cartridge from the rotary body 90 is allowed. The yellow, magenta, and cyan replacement postures are examples of a second replacement posture in which removal of the second toner cartridge from the rotary body 90 is allowed. The yellow, magenta, cyan, and black replacement postures can also be referred to as first to fourth replacement postures. Numbering is used for the sake of convenience of description and can generally be interchanged as needed.

The rotary body 90 can sequentially take the yellow, magenta, cyan, and black replacement postures by rotating clockwise in FIG. 1 around the rotation axis 90C. In the present embodiment, the rotary body 90 can alternately switch between the development posture and the replacement posture by rotating clockwise in FIG. 1 around the rotation axis 90C. For example, in FIG. 1, the rotary body 90 is in the black development posture. From this state, when the rotary body 90 rotates clockwise, the posture of the rotary body 90 is switched in order of cyan replacement posture, yellow development posture, black replacement posture, magenta development posture, yellow replacement posture, cyan development posture, and magenta replacement posture. When the rotary body 90 rotates clockwise from the magenta replacement posture, the rotary body 90 returns to the black development posture. In other words, the rotary body 90 can rotate more than one full rotation (360°) clockwise.

FIG. 4A shows the cross section of the rotary body 90 in a development posture (specifically, in the yellow development posture). FIG. 4B shows the cross section of the rotary body 90 in a replacement posture (specifically, the black replacement posture).

As shown in FIGS. 4A and 4B, four trays 80*y* to 80*k* are attached to the rotary body 90. The trays 80*y* to 80*k* respectively hold the toner cartridges 70*y* to 70*k*. In FIGS. 4A and 4B, the trays 80*y* to 80*k* are accommodated inside the rotary body 90, and this state may be regarded as the state where the toner cartridges 70*y* to 70*k* are mounted to the developing units 50*y*, 50*m*, 50*c*, 50*k*.

As described above, the toner cartridge 70 is movable relative to the developing frame 53 of the developing unit 50 between the mounting position and the retreat position moved from the mounting position. In other words, the first toner cartridge (toner cartridge 70*k*) is movable relative to the first storage frame (developing frame 53*k*) between a first mounting position and a first retreat position. The second toner cartridge (toner cartridge 70*m*) is movable relative to the second storage frame (developing frame 53*m*) between a second mounting position and a second retreat position.

The discharge opening 71*b* and the receiving opening 53*b* face each other, as shown in FIG. 3, in the state where the toner cartridge 70 is at the mounting position relative to the developing frame 53. In this state, the toner cartridge 70 is configured to supply toner to the developing-side storage chamber 53*a* through the receiving opening 53*b* (the opening of the storage frame).

The apparatus body 1A includes a moving device 85 configured to move the toner cartridge 70 from the mounting position to the retreat position relative to the rotary body 90 (more specifically, relative to the developing frame 53 of the developing unit 50). The moving device 85 will be described later with reference to FIG. 8 and the like. In the present embodiment, a plurality of moving devices 85*y* to 85*k* corresponding to the plurality of toner cartridges 70*y* to 70*k* is disposed in the rotary body 90. The trays 80*y* to 80*k* may be regarded as parts of the moving devices 85*y* to 85*k*.

In the present embodiment, the toner cartridge 70*k* containing black toner has a larger size and can contain a larger amount of toner than the toner cartridges 70*y* to 70*c* respectively containing yellow toner, magenta toner, and cyan toner. In other words, the first toner cartridge can contain a first amount of toner, and the second toner cartridge can contain a second amount of toner, so the first amount is regarded as being greater than the second amount.

Specifically, the length of the black toner cartridge 70*k* in a first radial direction relative to the rotation axis 90C of the rotary body 90 is longer than the length of the magenta toner cartridge 70*m* in a second radial direction. Here, the first radial direction refers to the radial direction of the rotary body 90 (the radial direction of an imaginary circle centered on the rotation axis 90C) and is a direction in which the toner cartridge 70*k* extends relative to the rotation axis 90C when viewed in the direction of the rotation axis 90C. The second radial direction is the radial direction of the rotary body 90 and is a direction in which the toner cartridge 70*m* extends relative to the rotation axis 90C when viewed in the direction of the rotation axis 90C. Similarly, the length of the black toner cartridge 70*k* in the first radial direction is longer than the length of the toner cartridges 70*y*, 70*c* in the radial directions corresponding to the other toner cartridges 70*y*, 70*c*.

Therefore, the tray 80*k* that holds the black toner cartridge 70*k* is larger in size than the trays 80*y* to 80*c* that hold the other toner cartridges 70*y*, 70*m*, 70*c*. In other words, the four toner cartridges 70*y* to 70*k* and trays 80*y* to 80*k* with different sizes are disposed inside the rotary body 90. In other words, the toner cartridge 70*k* that is an example of the first toner cartridge, and the toner cartridge 70*y* that is an example of the second toner cartridge smaller in size than the first toner cartridge are attachable to and detachable from the rotary body 90. In accordance with this, the rotary body 90 includes the tray 80*k* that is an example of the first support member supporting the first toner cartridge and the tray 80*y* that is an example of the second support member smaller in size than the first support member. The toner cartridges 70*m*, 70*c* that are examples of the third toner cartridge and the fourth toner cartridge smaller in size than the first toner cartridge are attachable to and detachable from the rotary body 90. In accordance with this, the rotary body 90 includes the trays 80*m*, 80*c* that are examples of the third support member and the fourth support member smaller in size than the first support member.

Here, the rotational drive of the rotary body 90 will be described with reference to FIG. 5. As shown in FIG. 5, disk gears 92R, 92L are respectively provided at both ends of the rotary body 90. Rotary drive gears 93R, 93L are respectively drivably connected to both ends of a pivot shaft 91. Here, the driving force of the motor M1 is transmitted to the rotary drive gear 93R by a drive transmission mechanism. Subsequently, the rotary body 90 is rotationally driven by the driving force transmitted to the disk gears 92R, 92L by the rotary drive gears 93R, 93L. The rotary body 90 rotates around the rotation axis 90C clockwise in FIG. 1.

The rotary body 90 is supported so as to be pivotable about the pivot shaft 91. The rotary body 90 is urged by an urging member in a counterclockwise direction in FIGS. 4A and 4B about the pivot shaft 91. This direction may be regarded as the direction in which each of the developing rollers 51*y* to 51*k* approaches the photoconductor drum 2. As a result, in the state where the rotary body 90 is in the development posture, each of the developing rollers 51*y* to 51*k* contacts the photoconductor drum 2.

On the other hand, as shown in FIG. 5, rotary cams 90*e*R, 90*e*L are provided at both ends of the rotary body 90. When the rotary body 90 rotates clockwise in FIGS. 4A and 4B about the rotation axis 90C, the rotary cams 90*e*R, 90*e*L contact a roller 96 supported by the frame 16. Then, the rotary body 90 moves in a clockwise direction in FIGS. 4A and 4B about the pivot shaft 91. This direction may be regarded as a direction in which each of the developing rollers 51*y* to 51*k* moves away from the photoconductor drum 2. This direction may be regarded as a direction in which the rotary body 90 approaches the opening 16*a* of the frame 16 and the door 14.

Thus, when the rotary body 90 rotates to switch from the development posture to the replacement posture, the rotary body 90 pivots about the pivot shaft 91. In the state where the rotary body 90 is in the replacement posture, the developing roller 51 separates from the photoconductor drum 2.

As shown in FIG. 4B, in the black replacement posture, the toner cartridge 70*k* stops at a position at which the toner cartridge 70*k* faces the opening 16*a* and the door 14 both provided at the side surface 16*b* of the apparatus body 1A. From this state, when the tray 80*k* is slid from the mounting position for the developing unit 50*k* to the outside of the rotary body 90, a user is able to replace the toner cartridge 70*k*.

Replacement Operation of Toner Cartridge

Figure 6A:
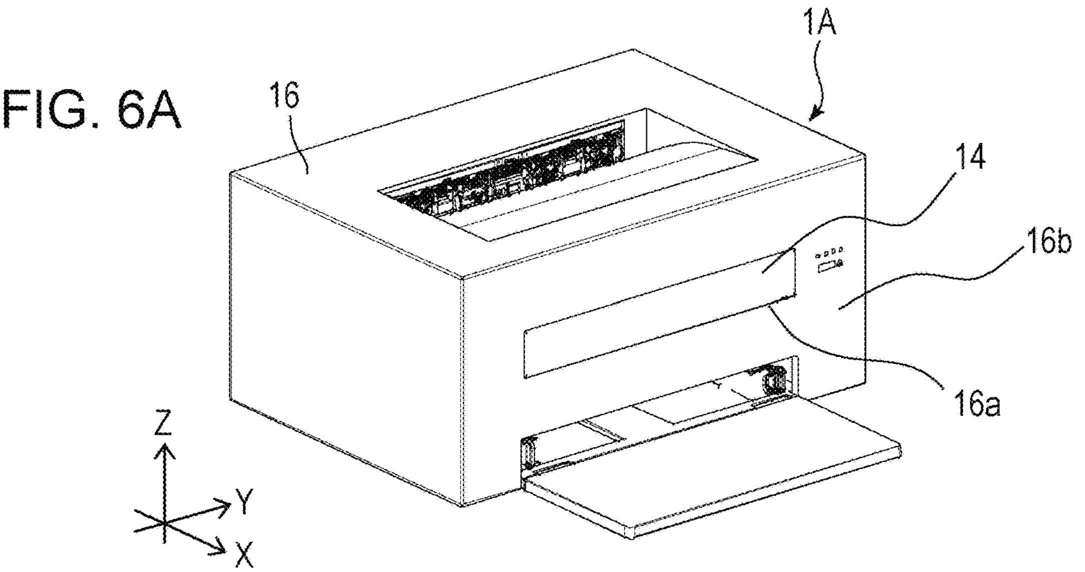
FIGS. 6A to 6C are perspective views of the image forming apparatus according to the first embodiment.
Figure 6B:
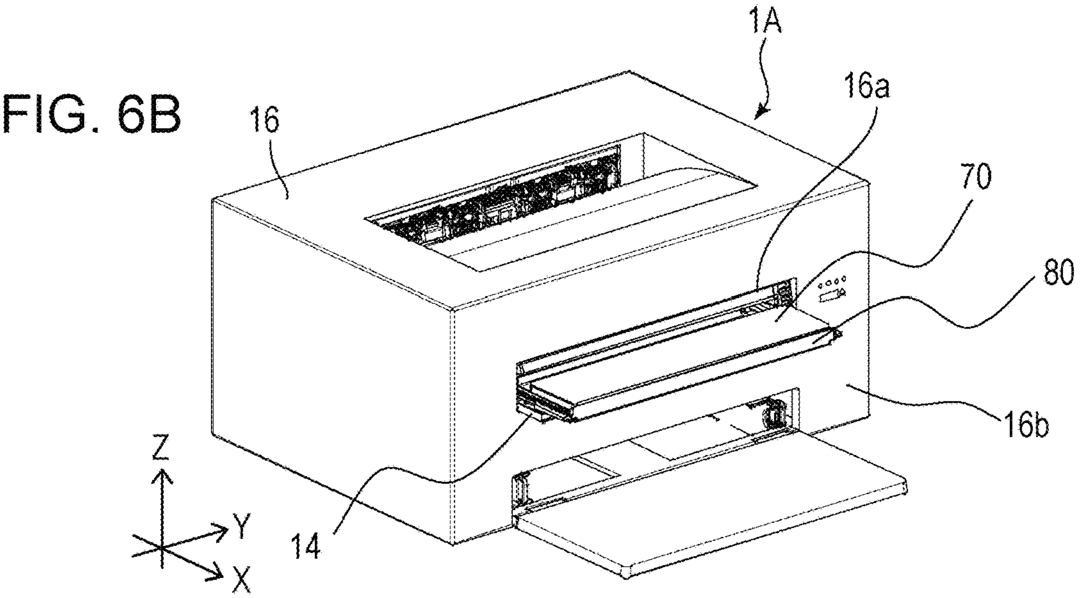
Figure 6C:
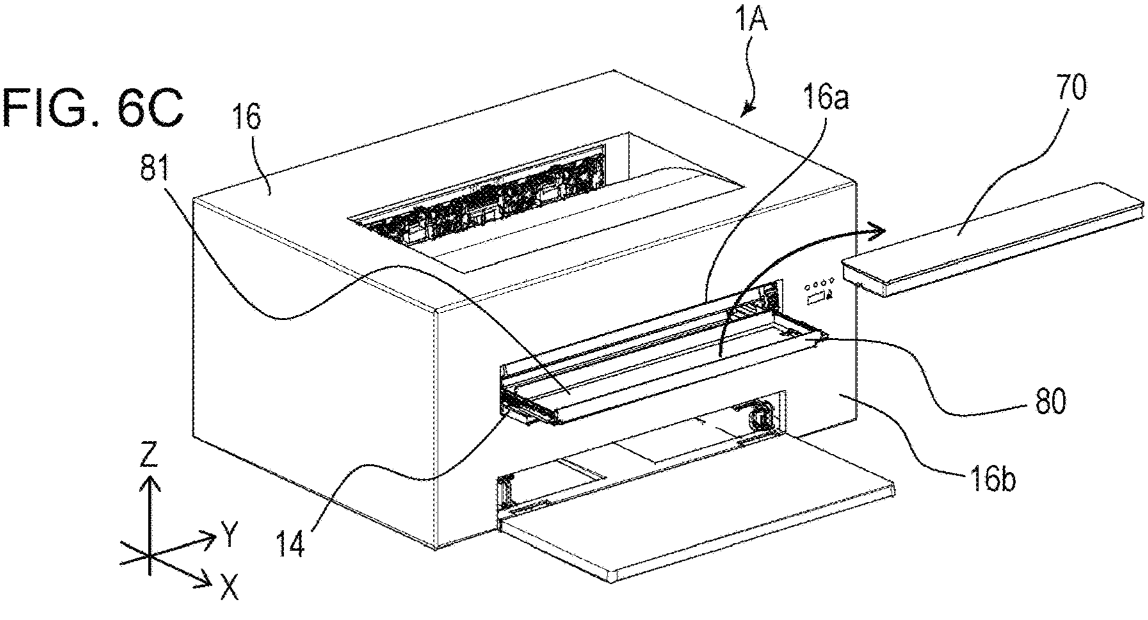
Figure 7A:
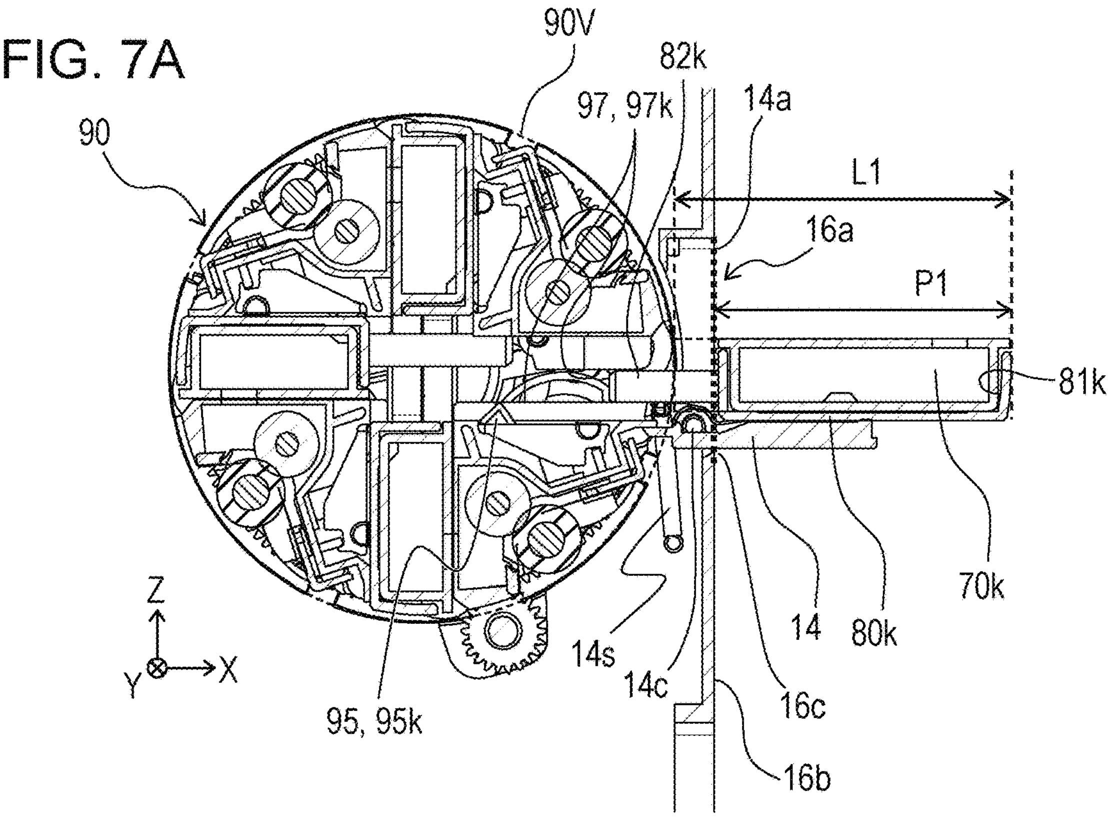
FIGS. 7A and 7B are sectional views of the image forming apparatus according to the first embodiment.
Figure 7B:
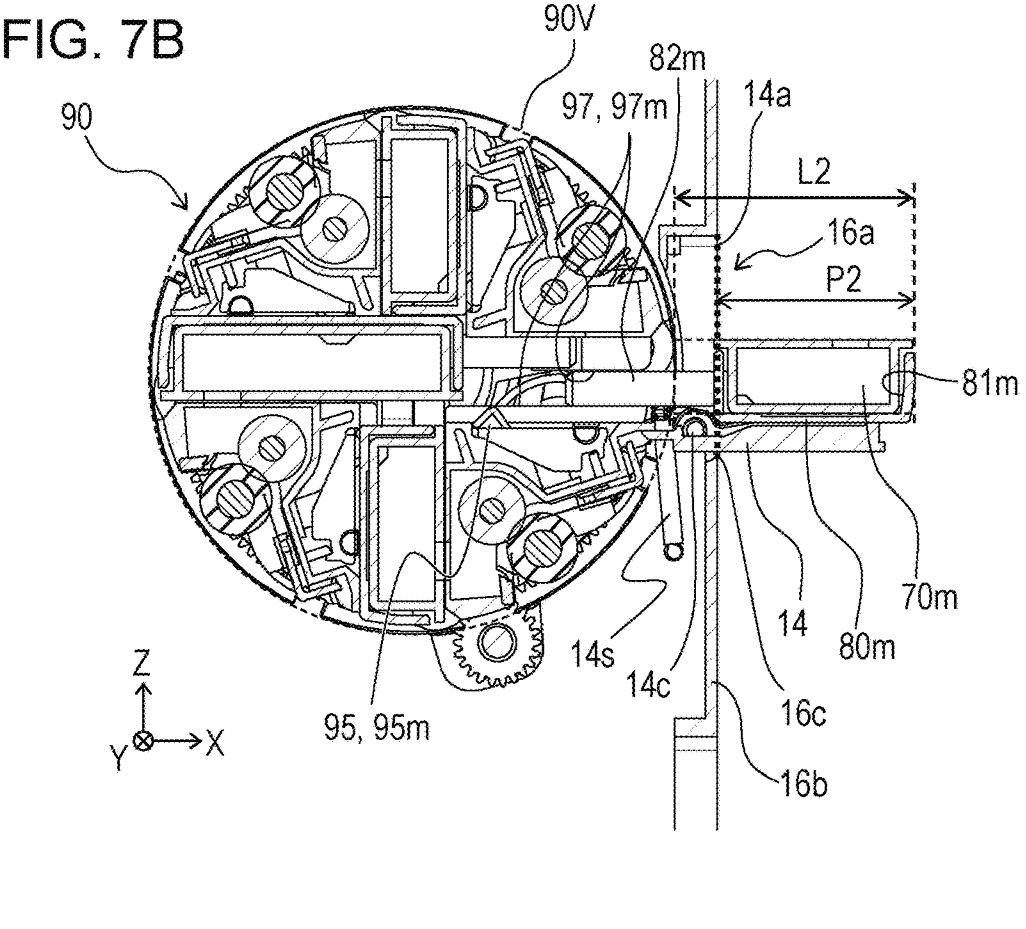

The toner cartridge replacement operation will be described with reference to FIGS. 4A, 6A to 6C, 7A, and 7B. FIGS. 6A to 6C are outer appearance views of the apparatus body 1A. FIGS. 7A and 7B are sectional views around the rotary body 90 when the toner cartridge is replaced. FIGS. 7A and 7B are sectional views of the apparatus, taken along an imaginary plane perpendicular to the rotation axis 90C of the rotary body 90.

FIG. 6A is the outer appearance of the apparatus body 1A during image forming operation and in a standby state. During the image forming operation, the image forming apparatus 1 is performing a series of operations in which the image forming apparatus 1 feeds a sheet S, forms an image on the sheet S, and then discharges the sheet S as a product. The standby state is a state in which the image forming apparatus 1 can start the image forming operation when receiving an image forming instruction (print instruction) and is a state of waiting for an image forming instruction from a user. As shown in FIG. 6A, the door 14 is in a closed state during the image forming operation and in the standby state.

FIG. 6B is the outer appearance of the apparatus body 1A when the toner cartridge is replaced. When the toner cartridge is replaced, the door 14 is placed in the open state, and the tray 80 and the toner cartridge 70 are moved to the outside of the apparatus body 1A.

The toner cartridge 70 is movable relative to the developing frame 53 of the developing unit 50 between the mounting position and the retreat position moved from the mounting position. The discharge opening 71*b* and the receiving opening 53*b* face each other as shown in FIG. 3 in the state where the toner cartridge 70 is at the mounting position relative to the developing frame 53. As shown in FIGS. 4A and 4B, the rotary body 90 is configured to rotate around the rotation axis 90C to take the development posture or the replacement posture when the toner cartridge 70 is at the mounting position.

The toner cartridge replacement operation will be described. Initially, the user instructs the control unit 30 of the apparatus body 1A to perform the toner cartridge replacement operation. The instruction for the toner cartridge replacement operation is provided by input through an operation panel (operating unit) provided, for example, on the apparatus body 1A.

When the control unit 30 receives the instruction for toner cartridge replacement operation, the rotary body 90 rotates to the replacement posture of the toner cartridge 70 to be replaced (toner-empty toner cartridge 70) and stops. In other words, the control unit 30 rotates the rotary body 90 to the replacement posture of the toner cartridge designated in the instruction for toner cartridge replacement operation (the black replacement posture for replacing the black toner cartridge 70*k* in FIG. 4B). In the replacement posture, the tray 80 supporting the designated toner cartridge 70 for replacement faces the opening 16*a* of the frame 16 of the apparatus body 1A.

For example, the rotary body 90 in FIG. 4A is in the yellow development posture in which the yellow developing roller 51*y* faces the photoconductor drum 2. At this time, the black toner cartridge 70*k* and the corresponding tray 80*k* do not need to face the opening 16*a* and the door 14. In other words, the toner cartridge 70 and the tray 80 do not need to face the opening 16*a* and the door 14 when the rotary body 90 is in a replacement posture other than the replacement posture of the toner cartridge, or a development posture. Therefore, the opening 16*a* just needs to have a size enough for each toner cartridge 70 to pass through individually. When the rotary body 90 rotates from the yellow development posture by a predetermined angle clockwise in the drawing, the black toner cartridge 70*k* and the corresponding tray 80*k* face the opening 16*a* and the door 14 as shown in FIG. 4B.

Here, "the tray 80 faces the opening 16*a*" means that the tray 80 is positioned so that the tray 80 is movable to the outside of the apparatus body 1A through the opening 16*a*. In other words, when the tray 80 faces the opening 16*a*, the tray 80 is moved to the radially outer side of the rotary body 90 by a moving mechanism (described later), with the result that the tray 80 and the toner cartridge 70 supported by the tray 80 can protrude to the outside of the apparatus body 1A. In FIG. 4A, none of the trays 80*y* to 80*k* are facing the opening 16*a*. In FIG. 4B, only the black tray 80*k* faces the opening 16*a*, while the other trays 80*y* to 80*c* do not face the opening 16*a*.

When the rotary body 90 is positioned in the replacement posture, the tray 80 supporting the toner cartridge 70 to be replaced is moved toward the outside of the apparatus body 1A by the motor M2.

As a result, the toner cartridge 70 to be replaced moves from the mounting position to the retreat position relative to the rotary body 90. As shown in FIGS. 6B, 6C, 7A, and 7B, the tray 80 and the toner cartridge 70 to be replaced, supported by the tray 80, protrude to the outside of the apparatus body 1A through the opening 16*a*.

More specifically, the tray 80 is movable relative to the rotary body 90 between a storage position and an eject position. In other words, the first tray is movable relative to the rotary body 90 between the storage position (first position) and the eject position (second position). The second tray is movable relative to the rotary body 90 between the storage position (third position) and the eject position (fourth position). The storage position is a position at which the tray 80 is stored in the rotary body 90. The eject position is a position at which the tray 80 protrudes to the outside of the rotary body 90 and the toner cartridge 70 is allowed to be removed from the tray 80 (removal position, replaceable position). Examples of the storage position include the positions of the trays 80*y* to 80*k* in FIGS. 4A and 4B. Examples of the eject position include the positions of the tray 80 in FIGS. 6B and 6C, the tray 80*k* in FIG. 7A, and the tray 80*m* in FIG. 7B.

When the tray 80 is at the storage position, the toner cartridge 70 attached to the tray 80 is positioned inside the rotary body 90 and positioned at the mounting position. When the tray 80 is at the eject position, the toner cartridge 70 attached to the tray 80 is positioned outside of the rotary body 90 and positioned at the retreat position.

Figure 8:
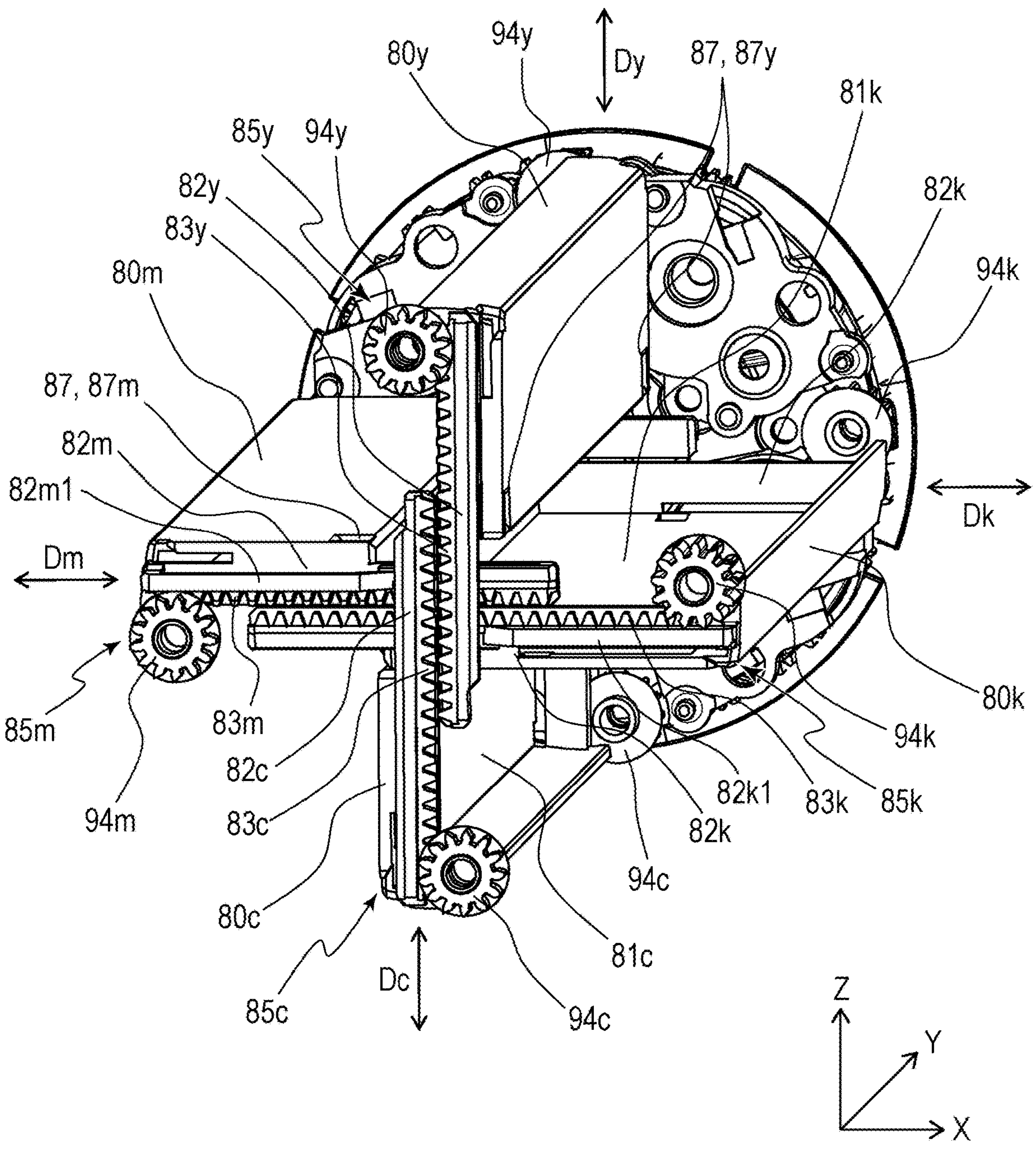
FIG. 8 is a view that illustrates the rotary body according to the first embodiment.

Here, as shown in FIGS. 7A and 7B, the rotary body 90 has protrusions 95 to hold the tray 80 at the storage position and to hold the toner cartridge 70 at the mounting position. As shown in FIG. 8, the tray 80 has recesses 87 that fit the protrusions 95. FIGS. 7A and 7B show protrusions 95*k*, 95*m* corresponding to the trays 80*k*, 80*m*, and FIG. 8 shows recesses 87*y*, 87*m* of the trays 80*y*, 80*m*; however, the protrusions 95 and the recesses 87 are provided for each of the trays 80*y* to 80*k*. The protrusions 95 can be urged in a direction to engage with the recesses 87.

When the protrusions 95 fit the recesses 87 of the tray 80, the tray 80 is locked to the rotary frame 90*f*. This makes the tray 80 stay at the storage position even when the rotary body 90 rotates and prevents the movement of the toner cartridge 70 from the mounting position. When the tray 80 is moved between the storage position and the eject position by the moving device (described later), the protrusions 95 can be configured to be moved by the tray 80 to come off from the recesses 87.

In the present embodiment, the door 14 is pivotally supported relative to the apparatus body 1A. As shown in FIG. 7A, the door 14 is urged from the open position toward the closed position by a spring 14*s*. The spring 14*s* is, for example, a tension spring that urges the door 14 to generate moment in the counterclockwise direction in FIGS. 7A and 7B about a support shaft 14*c* of the door 14.

The tray 80 pushes the door 14 to place the door 14 in the open state (the state shown in FIG. 6B). This state can also be referred to as the state where the tray 80 is supported by the door 14. The door 14 supports at least part of the tray 80 protruding to the outside of the apparatus body 1A, with the result that the toner cartridge 70 can be further stably supported. In other words, when the first toner cartridge (toner cartridge 70*k*) is at the first retreat position, the opening and closing member (door 14) at the open position supports the first support member (tray 80*k*). When the second toner cartridge (any one of the toner cartridges 70*y* to 70*c*) is at the second retreat position, the opening and closing member (door 14) at the open position supports the second support member (a corresponding one of the trays 80*y* to 80*c*).

The door 14 is configured to contact a part (for example, a lower edge 16*c* of the opening 16*a*) of the frame 16 of the apparatus body 1A at the open position and not to pivot downward beyond the open position. When the tray 80 is pulled back from the outside to the inside of the apparatus body 1A, the door 14 returns to the closed position due to the urging force of the spring 14*s*.

The toner cartridge 70 is detachably held by the tray 80. Therefore, as shown in FIG. 6C, a user is able to perform the work for removing the toner cartridge 70 from the tray 80 and attaching a new toner cartridge 70 (replacement work). When the plurality of toner cartridges 70 is replaced, replacement work can be performed by repeating the above-described actions.

FIGS. 7A and 7B show a cross-section around the rotary body 90 when the toner cartridge is replaced.

FIG. 7A shows a state when the black toner cartridge 70*k* is replaced. FIG. 7B shows a state when the magenta toner cartridge 70*m* is replaced.

The image forming apparatus 1 includes moving devices 85*y*, 85*m*, 85*c*, 85*k* (FIG. 8) that respectively move the toner cartridges 70*y*, 70*m*, 70*c*, 70*k* from the mounting position to the retreat position. When the "moving device 85" is mentioned without a suffix, the moving device 85 ordinarily refers to any one of the moving devices 85*y*, 85*m*, 85*c*, 85*k*. In the present embodiment, it may be understood that the moving device 85 includes the tray 80. The moving device 85*k* including the tray 80*k* may be regarded as an example of a first moving device including the first support member.

The moving device 85*m* including the tray 80*m* may be regarded as an example of a second moving device including the second support member.

Even when the toner cartridge 70 is at the retreat position, the tray 80 is still connected to the rotary body 90 (supported by the rotary body 90). To easily perform operation to remove the toner cartridge 70 from the rotary body 90, the length by which the toner cartridge 70 protrudes from the rotary body 90 at the retreat position can be long. Since the toner cartridge 70 is configured to be detachably attachable to the rotary body 90 via the tray 80, the toner cartridge 70 can be stably supported by the tray 80 even when the length by which the toner cartridge 70 protrudes from the rotary body 90 is long.

The moving direction of the toner cartridge 70 when the toner cartridge 70 moves from the mounting position to the retreat position is referred to as a retrieval direction. In the present embodiment, the retrieval direction of the toner cartridge 70 is a direction that crosses the direction of the rotation axis 90C (Y direction). Therefore, as shown in FIGS. 7A and 7B, when viewed in the direction of the rotation axis 90C (Y direction), the retrieval direction of the toner cartridge 70 is a direction orthogonal to the direction of the rotation axis 90C (Y direction). The retrieval direction of the toner cartridge 70 may be regarded as a direction outward in the radial direction of the rotary body 90 (a direction away from the rotation axis 90C).

As shown in FIGS. 7A and 7B, because the user performs operation to remove the toner cartridge 70 from the rotary body 90, at least part of the toner cartridge 70 can protrude from the rotary body 90 when the toner cartridge 70 is removed. In the present embodiment, when the toner cartridge 70 is at the retreat position, the entire toner cartridge 70 protrudes from the rotary body 90.

When the rotary body 90 rotates around the rotation axis 90C, the rotation trajectory of the rotary body 90 can be considered to coincide with the circumscribed circle (the imaginary circle 90V indicated by the dashed line in FIGS. 7A and 7B) of the rotary body 90 about the rotation axis 90C. When the toner cartridge 70 is at the retreat position, a half or more of the length of the toner cartridge 70 in the retrieval direction can be placed outside of the rotation trajectory of the rotary body 90. In other words, when viewed in the rotation axis direction of the rotary, a half or more of the total length of the toner cartridge can be positioned outside of the rotation trajectory of the rotary in the moving direction of the toner cartridge from the mounting position toward the retreat position in the state where the toner cartridge is at the retreat position. This applies to each of the toner cartridges 70 including the toner cartridge 70*k* as an example of the first cartridge and the toner cartridge 70*m* as an example of the second cartridge. In the present embodiment, as shown in FIGS. 7A and 7B, when the toner cartridge 70 is at the retreat position, the entire toner cartridge 70 is positioned outside of the rotation trajectory (imaginary circle 90V) of the rotary body 90.

Furthermore, to make it easier for the user to grasp the toner cartridge 70, when the toner cartridge 70 is at the retreat position, at least part of the toner cartridge 70 can be positioned outside of the machine of the image forming apparatus 1 (outside of the machine of the apparatus body 1A). Here, the "outside of the machine" means a space outside of the image forming apparatus 1 (outside of the apparatus body 1A) when the image forming apparatus 1 is used in, for example, image forming operation on a sheet S or the like.

In the present embodiment, the outer appearance surface of the apparatus body 1A is formed by the outer appearance surface of the frame 16. In other words, the "outside of the machine" may be regarded as the outside of the frame 16. Therefore, the state where at least part of the toner cartridge 70 is positioned outside of the machine may be regarded as the state where at least part of the toner cartridge 70 protrudes from the opening 16*a* of the frame 16 of the apparatus body 1A toward the outside of the frame 16.

In the present embodiment, when the door 14 is at the closed position, the opening 16*a* of the frame 16 of the apparatus body 1A is covered by the door 14. Part of the outer appearance surface of the apparatus body 1A is formed by the outer appearance surface 14*a* of the door 14 at the closed position. In this case, "outside of the machine" refers to outside of the outer appearance surface 14*a* of the door 14 at the closed position. In other words, where the position of the outer appearance surface 14*a* of the door 14 at the closed position is an outer appearance position, when the toner cartridge 70 is at the retreat position, at least part of the toner cartridge 70 is positioned outside of the apparatus body 1A beyond the outer appearance position.

In other words, if the door 14 is at the closed position, at least part of the toner cartridge 70 is positioned in a space outside of the apparatus body 1A. In the retrieval direction of the toner cartridge 70, at least part of the toner cartridge 70 is positioned downstream of the outer appearance position.

Where the side surface 16*b* having the opening 16*a* is the front of the apparatus body 1A, when the toner cartridge 70 is at the retreat position, at least part of the toner cartridge 70 may be regarded as protruding further to the front beyond the front-side outer appearance surface of the apparatus body 1A. In this case, a user is able to access the toner cartridge 70 from the front side of the image forming apparatus to easily replace the toner cartridge 70.

When the toner cartridge 70 is at the retreat position, a half or more of the length of the toner cartridge 70 in the retrieval direction can be placed outside of the machine. In other words, when viewed in the rotation axis direction of the rotary, a half or more of the total length of the toner cartridge can be positioned outside of the main body frame in the moving direction of the toner cartridge from the mounting position toward the retreat position in the state where the toner cartridge is at the retreat position. This applies to each of the toner cartridges 70 including the toner cartridge 70*k* as an example of the first cartridge and the toner cartridge 70*m* as an example of the second cartridge. When the toner cartridge 70 is at the retreat position, the entire toner cartridge 70 can be placed outside of the machine. In the present embodiment, the front-side outer appearance surface of the apparatus body 1A is formed by the outer appearance surface 14*a* of the door 14 and the side surface 16*b*; however, the configuration of the door 14 is not limited thereto. For example, the size of the door 14 may be a size covering the entire side surface 16*b*. In this case, the front-side outer appearance surface of the apparatus body 1A is formed by the outer appearance surface 14*a* of the door 14

The tray 80 includes a cartridge holding portion 81 that holds the toner cartridge 70 (see FIGS. 3 and 6C). The cartridge holding portion 81 is a mounted portion to which the toner cartridge 70 is mounted. When the tray 80 is at the eject position, the entire cartridge holding portion 81 can be positioned outside of the rotation trajectory of the rotary body 90 in the retrieval direction. When the tray 80 is at the eject position, a half or more of the length of the cartridge holding portion 81 can be positioned outside of the machine in the retrieval direction.

As described earlier, the toner cartridge 70*k* and the tray 80*k* are larger in size than the other toner cartridges 70*y* to 70*c* and the other trays 80*y* to 80*c*. Therefore, in the present embodiment, as shown in FIGS. 7A and 7B, the amount of movement of the tray 80 during toner cartridge replacement is changed according to the size of the toner cartridge 70.

Specifically, as shown in FIG. 7A, when the tray 80*k* (first support member) moves from the storage position (first storage position) to the eject position (first eject position), the moving distance is L1. When the tray 80*m* (second support member) moves from the storage position to the eject position (second eject position), the moving distance is L2. FIG. 7B shows the state where the toner cartridge 70*m* and the tray 80*m* have moved, and, when the trays 80*y*, 80*c* move from the storage position to the retreat position, the moving distance is also L2. At this time, L1 is greater than L2. In other words, the moving distance of the first support member when the first toner cartridge moves from the first mounting position to the first retreat position may be regarded as being longer than the moving distance of the second support member when the second toner cartridge moves from the second mounting position to the second retreat position.

As shown in FIG. 7A, in the state where the tray 80*k* is at the eject position and the toner cartridge 70*k* is at the retreat position, the toner cartridge 70*k* protrudes from the outer appearance surface of the apparatus body 1A to the outside of the machine by a distance P1. In the present embodiment, the tray 80*k* also protrudes from the outer appearance surface of the apparatus body 1A to the outside of the machine by a distance P1.

As shown in FIG. 7B, in the state where the tray 80*m* is at the eject position and the toner cartridge 70*m* is at the retreat position, the toner cartridge 70*m* protrudes from the outer appearance surface of the apparatus body 1A to the outside of the machine by a distance P2. In the present embodiment, the tray 80*m* also protrudes from the outer appearance surface of the apparatus body 1A to the outside of the machine by a distance P2. The toner cartridges 70*y*, 70*c* also protrude from the outer appearance surface of the apparatus body 1A to the outside of the machine by a distance P2.

The distance P1 is longer than the distance P2. In other words, the length by which the first toner cartridge at the first retreat position protrudes from the opening 16*a* of the apparatus body 1A is defined as a first length (P1), and the length by which the second toner cartridge at the second retreat position protrudes from the opening 16*a* is defined as a second length (P2). In this case, the first length may be regarded as being longer than the second length.

The smaller toner cartridges 70*y* to 70*c* as compared to the toner cartridge 70*k* can be beneficial in terms of strength when the distance P2 by which the toner cartridge protrudes to the outside of the machine at the retreat position is shorter than the distance P1 by which the toner cartridge 70*k* protrudes to the outside of the machine at the retreat position. This is due to the following reasons. When the toner cartridge 70 is at the retreat position, at least part of the toner cartridge 70 protrudes to the outside of the rotation trajectory of the rotary body 90 or to the outside of the machine from the outer appearance surface of the apparatus body 1A. At this time, the tray 80 supports the weight of the toner cartridge 70 in a state of being supported by the rotary body 90 in a cantilever manner. Therefore, as the distance P2 by which the toner cartridges 70*y* to 70*c* protrude to the outside of the machine at the retreat position is reduced, the load on the trays 80*y* to 80*c* and guide portions 97 of the rotary body 90, which support the trays 80*y* to 80*k*, can be reduced. Since the toner cartridges 70*y* to 70*c* are smaller in size than the toner cartridge 70*k*, even when the distance P2 is made shorter than the distance P1, it is possible to maintain the operability of cartridge replacement for the trays 80*y* to 80*c*.

Tray Arrangement in Rotary

Figure 9:
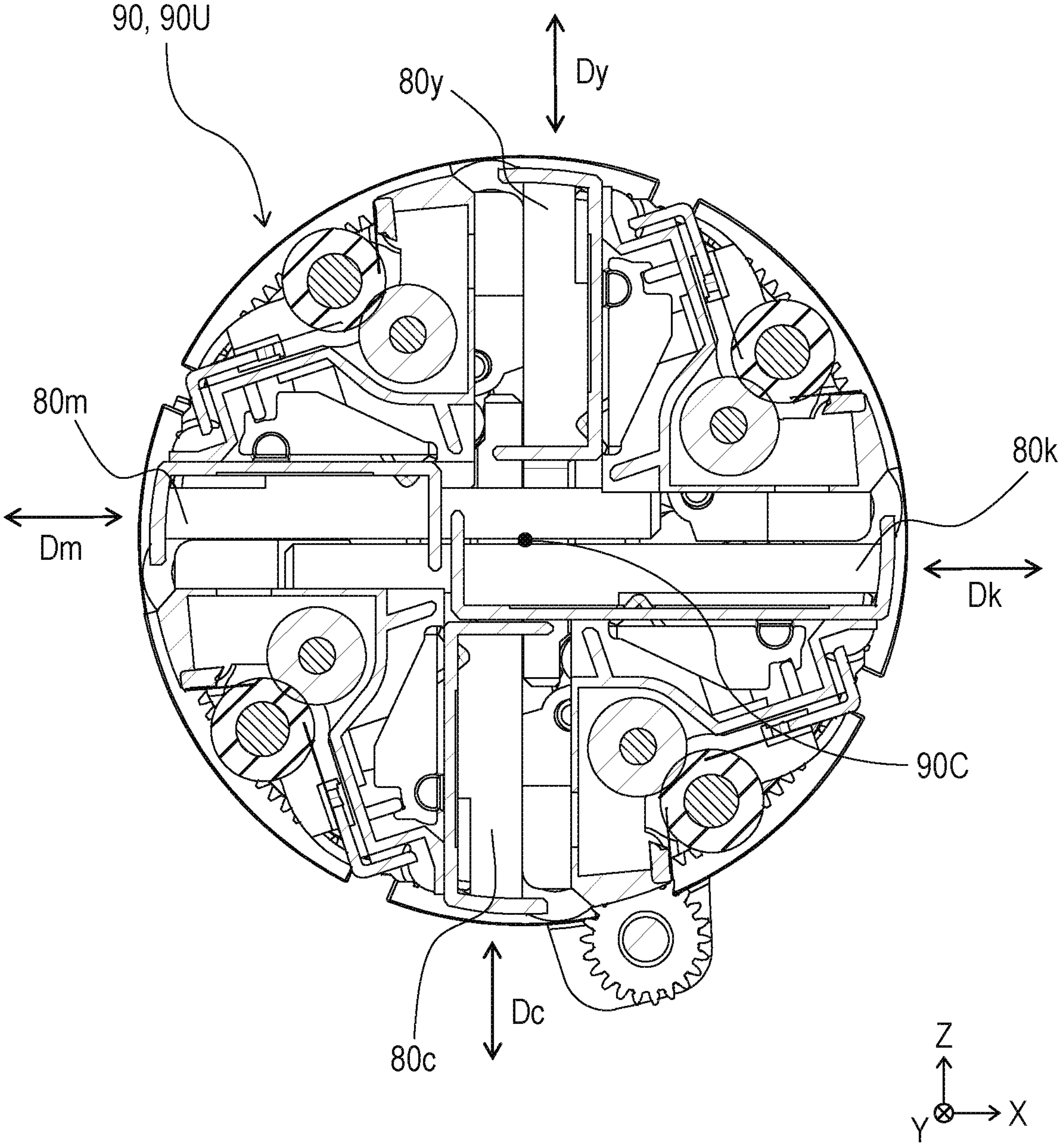
FIG. 9 is a view that illustrates the rotary body according to the first embodiment.
Figure 10:
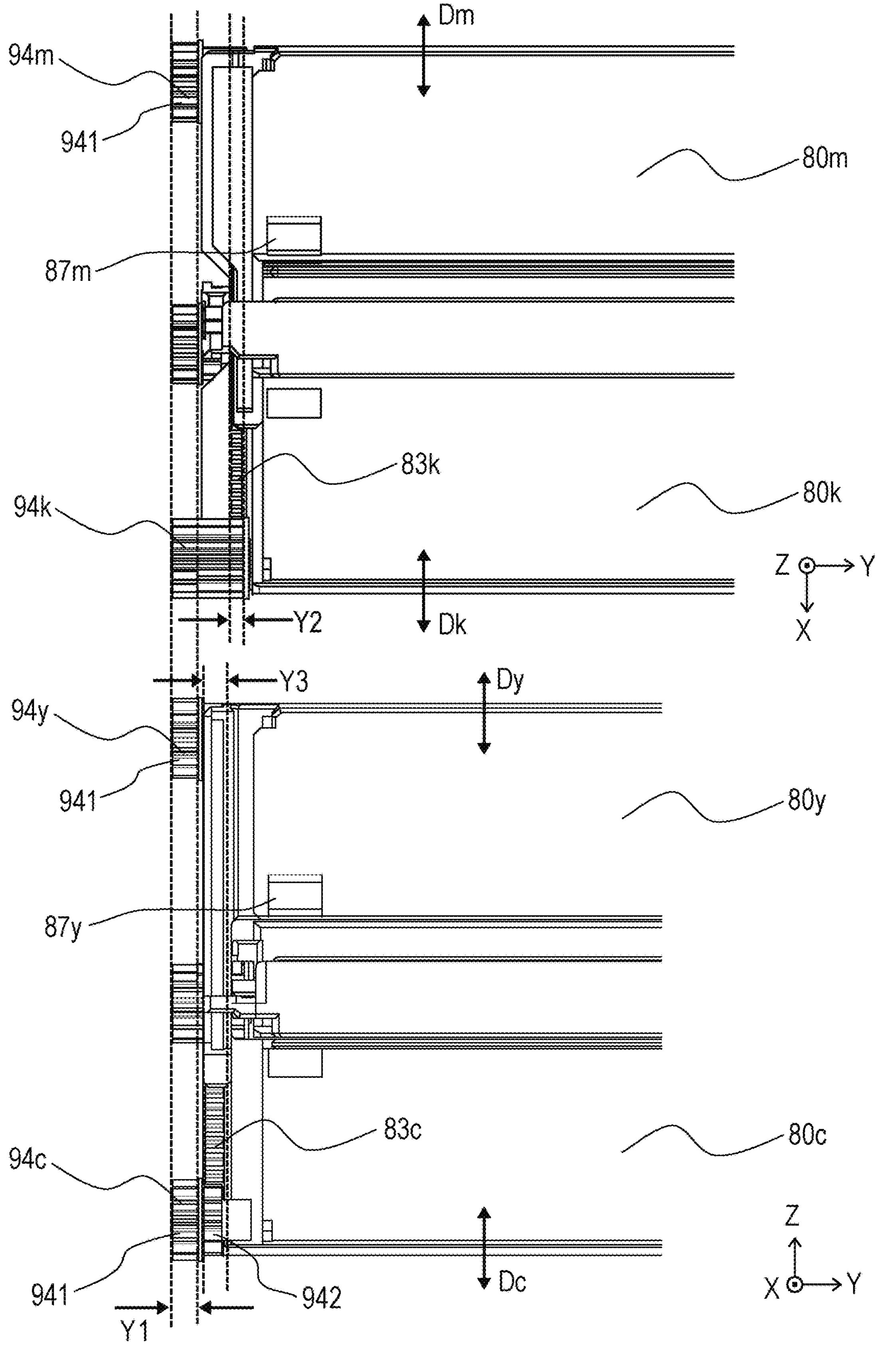
FIG. 10 is a view that illustrates the rotary body according to the first embodiment.

The arrangement of the trays 80*y* to 80*k* in the rotary body 90 will be described with reference to FIGS. 8, 9, and 10. FIG. 8 is a perspective view of the arrangement of the trays 80*y* to 80*k* in the rotary body 90. FIG. 9 is a sectional view of the arrangement of the trays 80*y* to 80*k* in the rotary body 90. FIG. 10 is a view of the arrangement of members on one end side of the trays 80*y* to 80*k* in the Y direction. FIG. 9 is a sectional view of the rotary body 90, taken along an imaginary plane perpendicular to the rotation axis 90C of the rotary body 90. The upper half of FIG. 10 is a view of the rotary body 90 and the trays 80*m*, 80*k* from the upper side (+Z side) of FIG. 8, and the lower half of FIG. 10 is a view of the rotary body 90 and the trays 80*c*, 80*y* from the right side (+X side) of FIG. 8.

As shown in FIG. 8, each of the trays 80*y* to 80*k* includes a corresponding one of the cartridge holding portions 81*y* to 81*k* and a corresponding one of guided portions 82*y* to 82*k*.

The toner cartridges 70*y* to 70*k* are respectively mounted on the cartridge holding portions 81*y* to 81*k*. Each of the cartridge holding portions 81*y* to 81*k* stores at least part of a corresponding one of the toner cartridges 70*y* to 70*k*, mounted thereon.

Each of the guided portions 82*y* to 82*k* is provided at each end of a corresponding one of the trays 80*y* to 80*k* so as to sandwich a corresponding one of the cartridge holding portions 81*y* to 81*k* in the Y direction. Each of the guided portions 82*y* to 82*k* is an elongated member extending in a direction orthogonal to the rotation axis of the rotary body 90.

Figure 11A:
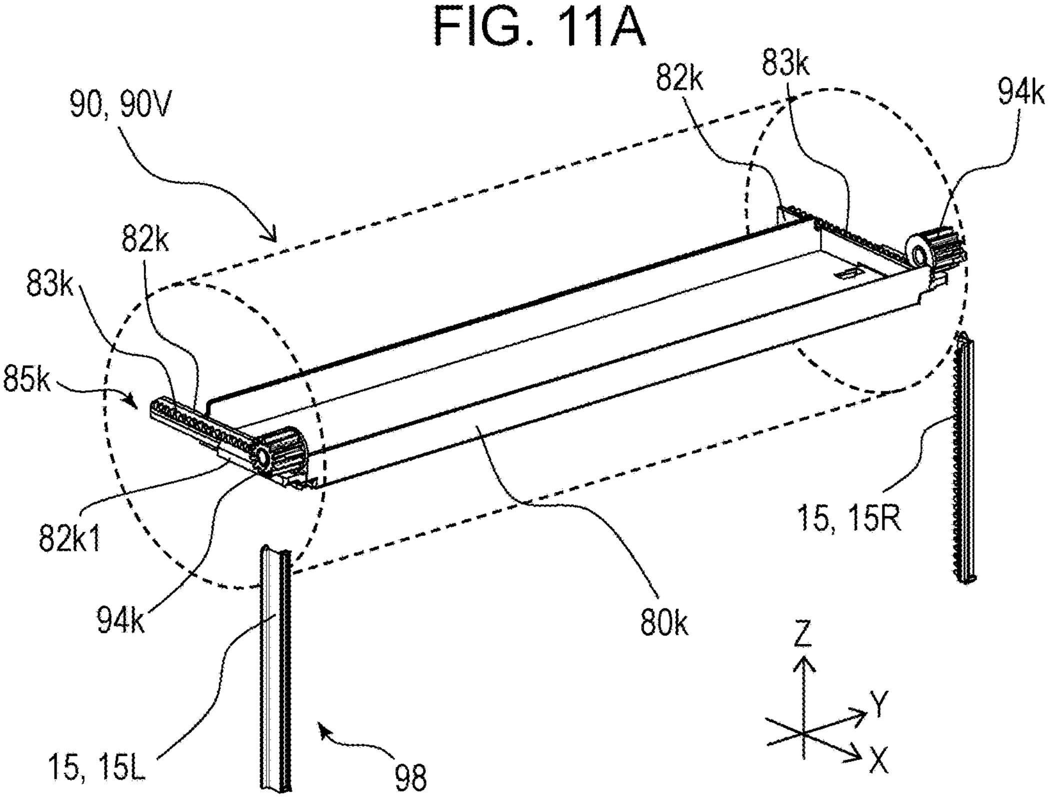
FIGS. 11A and 11B are views that illustrate a configuration related to movement of the tray according to the first embodiment.
Figure 11B:
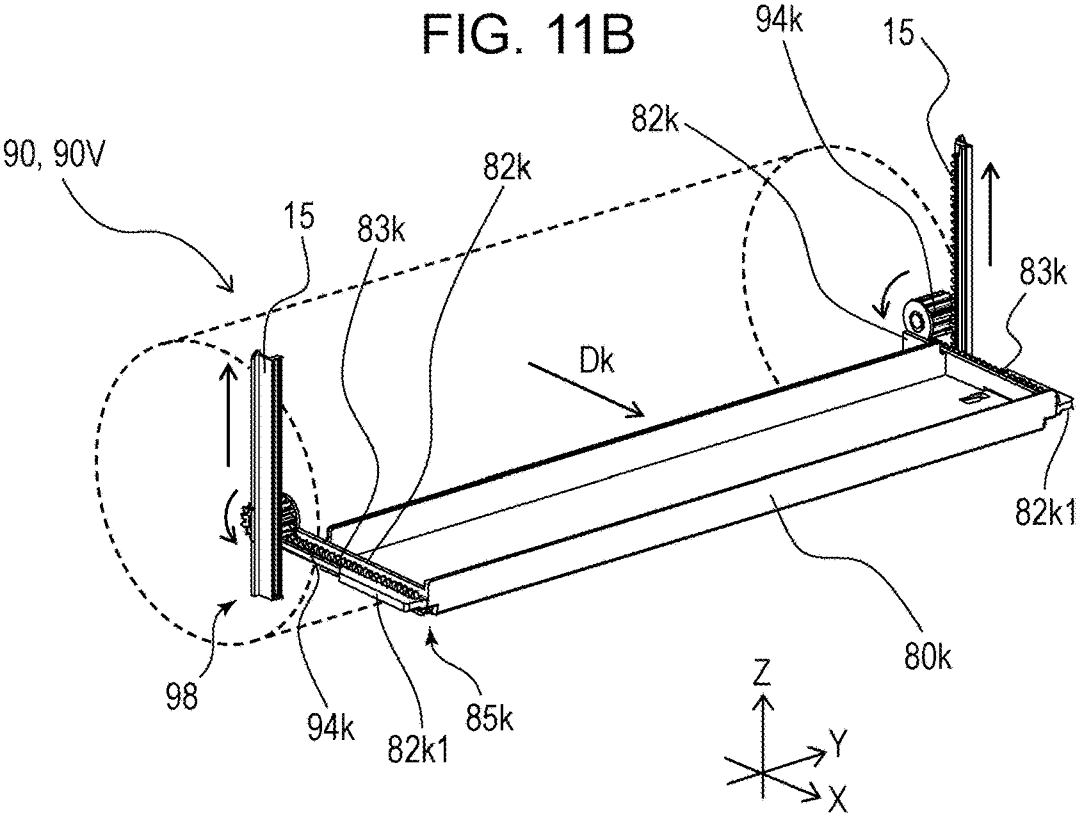

In the present embodiment, a reinforcement rib 82*k*1 is formed on part of the guided portion 82*k* in a moving direction Dk of the tray 80*k*, and a reinforcement rib 82*m*1 is formed on part of the guided portion 82*m* in a moving direction Dm of the tray 80*m* (see also FIGS. 11A and 11B). Each of the reinforcement ribs 82*k*1, 82*m*1 has an elongated rib shape (projection) extending outward from a corresponding one of the guided portions 82*k*, 82*m* provided at each end of a corresponding one of the trays 80*k*, 80*m* in the Y direction and extends in a corresponding one of the moving directions Dk, Dm of the trays 80*k*, 80*m*. With the reinforcement ribs 82*k*1, 82*m*1, the rigidity of the guided portions 82*k*, 82*m* improves.

In the present embodiment, the length of the reinforcement ribs 82*m*1, 82*k*1 is limited to avoid interference with the guided portions 82*y*, 82*c*. However, if there is no interference with the guided portions 82*y*, 82*c*, the reinforcement ribs 82*m*1, 82*k*1 may be provided along the entire length of the guided portions 82*m*, 82*k*. Reinforcement ribs may be added to the guided portions 82*y*, 82*c*. When the rigidity of the guided portions 82*m*, 82*k* is sufficient, the reinforcement ribs 82*m*1, 82*k*1 do not need to be provided.

Rack portions 83*y* to 83*k* (racks) are respectively formed at the guided portions 82*y* to 82*k*. Pinions 94*y* to 94*k* are rotatably held in the rotary body 90. The pinions 94*y* to 94*k* are respectively drivably in mesh with the rack portions 83*y* to 83*k*.

The tray 80*y* includes one or more rack portions 83*y*. The rotary body 90 includes one or more pinions 94*y* corresponding to one or more rack portions 83_y_. Similarly, the tray 80_m_ includes one or more rack portions 83_m_, the tray 80_c_ includes one or more rack portions 83_c_, and the tray 80_k_ includes one or more rack portions 83_k_. The rotary body 90 includes one or more pinions 94_m_ corresponding to one or more rack portions 83_m_, one or more pinions 94_c_ corresponding to one or more rack portions 83_c_, and one or more pinions 94_k_ corresponding to the rack portions 83_k_.

The rack portions 83_y_ to 83_k_ and the pinions 94_y_ to 94_k_ are respectively parts of the moving devices 85_y_ to 85_k_ configured to move the toner cartridges 70_y_ to 70_k_ from the mounting position to the retreat position. The rack portions 83_y_ to 83_k_ and the pinions 94_y_ to 94_k_ may be regarded as part of a driven device driven by the drive device 98 of the apparatus body 1A.

The pinions 94_y_ to 94_k_ may be regarded as rotating members (rotary members) that rotate to move the trays 80_y_ to 80_k_ relative to the rotary body 90.

The moving devices 85_y_ to 85_k_ are driven by the drive device 98 of the apparatus body 1A. The pinions 94_y_ to 94_k_ and the rack portions 83_y_ to 83_k_ function as driven units for the moving devices 85_y_ to 85_k_ of the rotary body 90 to receive driving force from the drive device 98 of the apparatus body 1A. The pinion 94_k_ and the rack portion 83_k_ are examples of a first pinion and a first rack that make up at least part of a first driven unit of the first moving device. The pinion 94_m_ and the rack portion 83_m_ are examples of a second pinion and a second rack that make up at least part of a second driven unit of the second moving device.

The rotary body 90 has the guide portions 97 that respectively engage with the guided portions 82_y_ to 82_k_ (see FIGS. 7A and 7B). FIG. 7A shows the guide portion 97 (97_k_) that engages with the guided portion 82_k_ of the tray 80_k_, and FIG. 7B shows the guide portion 97 (97_m_) that engages with the guided portion 82_m_ of the tray 80_m_. The rotary body 90 includes similar guide portions that engage with the guided portions 82_y_, 82_c_ of the trays 80_y_, 80_c_. FIGS. 7A and 7B show the guide portion 97 provided on one side (+Y side) of the rotary body 90 in the Y direction; however, a similar guide portion 97 is also provided on the other side (−Y side) of the rotary body 90 in the Y direction.

When the tray 80 moves between the storage position and the eject position, the guide portion 97 maintains engagement with the guided portion 82 at least in part of the moving range and guides the tray 80 in the moving direction. In the present embodiment, the guide portion 97 maintains engagement with the guided portion 82_k_ over the entire moving range between the storage position and the eject position of the tray 80_k_. In the present embodiment, the guide portion 97 maintains engagement with the guided portion 82_m_ over the entire moving range between the storage position and the eject position of the tray 80_m_.

As shown in FIGS. 8 and 9, four trays 80_y_ to 80_k_ are disposed so as to overlap each other in the rotary body 90, as will be specifically described below.

When the pinions 94_y_ to 94_k_ rotate, the rack portions 83_y_ to 83_k_ and the trays 80_y_ to 80_k_ move relative to the rotary body 90. As shown in FIG. 9, four trays 80_y_ to 80_k_ are disposed in the rotary body 90 such that the moving directions of the four trays 80_y_ to 80_k_ are rotated by 90 degrees. Therefore, the pair of tray 80_y_ and tray 80_c_ and the pair of tray 80_m_ and tray 80_k_ each are held so as to be slidable substantially in the same direction (parallel direction). The moving direction of each of the trays 80_y_ to 80_k_ during sliding is regulated by the engagement of a corresponding one of the guided portions 82_y_ to 82_k_ with a corresponding one of the guide portions 97.

Each of the trays 80_y_ to 80_k_ moves to the outside of the machine through the opening 16_a_. When each of the trays 80_y_ to 80_k_ moves to the outside of the machine through the opening 16_a_, the moving direction of each tray is substantially the same direction (parallel).

As shown in FIG. 9, in the moving direction Dk of the tray 80_k_, the range in which the tray 80_k_ is placed is disposed so as to overlap the range in which the tray 80_y_ is placed and the range in which the tray 80_c_ is placed. In the moving direction Dk of the tray 80_k_, the range in which the tray 80_k_ is placed overlaps the rotation axis 90C of the rotary body 90. In other words, the toner cartridge 70_k_ held by the cartridge holding portion 81_k_ of the tray 80_k_ may be regarded as overlapping the rotation axis 90C of the rotary body 90 (FIG. 4B).

On the other hand, in the moving direction Dm of the tray 80_m_, the range in which the tray 80_m_ is placed is disposed with an offset so as not to overlap the range in which the tray 80_y_ is placed or the range in which the tray 80_c_ is placed. Furthermore, in the moving direction Dy of the tray 80_y_, the range in which the tray 80_y_ is placed is disposed with an offset so as not to overlap the range in which the tray 80_m_ is placed or the range in which the tray 80_k_ is placed. Similarly, in the moving direction Dc of the tray 80_c_, the range in which the tray 80_c_ is placed is disposed with an offset so as not to overlap the range in which the tray 80_m_ is placed or the range in which the tray 80_k_ is placed.

The positional relationship among the trays 80 can also be described as follows. When viewed in the moving direction Dy of the tray 80_y_, the tray 80_y_ overlaps the tray 80_k_; however, the tray 80_y_ does not overlap the tray 80_m_. When viewed in the moving direction Dm of the tray 80_m_, the tray 80_m_ overlaps the tray 80_k_; however, the tray 80_m_ does not overlap the tray 80_y_ or the tray 80_c_. When viewed in the moving direction Dc of the tray 80_c_, the tray 80_c_ overlaps the tray 80_k_; however, the tray 80_c_ does not overlap the tray 80_m_.

Here, the phrase "two elements (members, components, units, or the like) overlap each other when viewed in a specific direction" means that, when each element is perpendicularly projected onto an imaginary plane perpendicular to the specific direction, the projection area of one element and the projection area of the other element at least partially overlap each other.

As shown in FIGS. 8 and 10, in the direction of the rotation axis 90C (Y direction), the range in which the rack portion 83_m_ and the guided portion 82_m_ are placed at least partially overlaps the range in which the rack portion 83_k_ and the guided portion 82_k_ are placed. In other words, in the present embodiment, in the rotation axis direction of the rotary (Y direction), the range in which the first rack (rack portion 83_k_) is placed at least partially overlaps the range in which the second rack (rack portion 83_m_) is placed. Therefore, compared to the arrangement in which the rack portion 83_m_ and the guided portion 82_m_ do not overlap the rack portion 83_k_ and the guided portion 82_k_, the rack portions 83_m_, 83_k_ and the guided portions 82_m_, 82_k_ can be disposed in a space-saving manner in the Y direction.

In the direction of the rotation axis 90C (Y direction), the range in which the rack portion 83_y_ and the guided portion 82_y_ are placed at least partially overlaps the range in which the rack portion 83_c_ and the guided portion 82_c_ are placed. In other words, in the present embodiment, in the rotation axis direction of the rotary (Y direction), the range in which a third rack (rack portion 83_y_) is placed at least partially overlaps the range in which a fourth rack (rack portion 83_c_) is placed. Therefore, compared to the arrangement in which the rack portion 83*y* and the guided portion 82*y* do not overlap the rack portion 83*c* and the guided portion 82*c*, the rack portions 83*y*, 83*c* and the guided portions 82*y*, 82*c* can be disposed in a space-saving manner in the Y direction.

Here, the meshing position between the rack portion 83 and the pinion 94 will be described with reference to FIG. 10. The upper half of FIG. 10 shows the meshing position between the rack portion 83*k* and the pinion 94*k*.

The lower half of FIG. 10 shows the meshing position between the rack portion 83*c* and the pinion 94*c*.

In the direction of the rotation axis 90C (Y direction) of the rotary body 90, in the range Y1 in the drawing, driving force transmitted by the transmission device (described later) from the motor M2 (FIG. 2) serving as the drive source is transmitted to the pinions 94*y* to 94*k*. In the range Y2 in the drawing in the Y direction, the pinion 94*k* is drivably in mesh with the rack portion 83*k*. In the range Y3 in the drawing in the Y direction, the pinion 94*c* is drivably in mesh with the rack portion 83*c*. The rack portion 83*m*, as in the case of the rack portion 83*k*, is drivably in mesh with the pinion 94*m* (FIG. 8) in the range Y2. The rack portion 83*y*, as in the case of the rack portion 83*c*, is drivably in mesh with the pinion 94*y* (FIG. 8) in the range Y3.

Here, the range Y2 and the range Y3 lie at different positions in the Y direction (lie with an offset in the Y direction). The range Y1 is located at a different position in the Y direction from any one of the range Y2 and the range Y3. In other words, the range Y1 lies with an offset in the Y direction from the range Y2 and the range Y3.

Furthermore, in the state where the toner cartridges 70*y*, 70*c* are at the mounting position, the range in which the rack portion 83*y* is placed at least partially overlaps the range in which the rack portion 83*c* is placed in the moving direction of the rack portion 83*y* (the moving direction Dy of the tray 80*y*). In the present embodiment, since the moving directions Dy, Dc of the trays 80*y*, 80*c* are substantially the same direction (parallel), the range in which the rack portion 83*y* is placed at least partially overlaps the range in which the rack portion 83*c* is placed also in the moving direction Dc of the tray 80*c*. Therefore, in the state where the toner cartridges 70*y*, 70*c* are at the mounting position, the tooth surface of the rack portion 83*y* faces the tooth surface of the rack portion 83*c* in a direction orthogonal to the moving directions Dy, Dc of the rack portions 83*y*, 83*c* (the right and left direction in FIG. 8).

Furthermore, in the state where the toner cartridges 70*m*, 70*k* are at the mounting position, the range in which the rack portion 83*m* is placed at least partially overlaps the range in which the rack portion 83*k* is placed in the moving direction of the rack portion 83*m* (the moving direction Dm of the tray 80*m*). In the present embodiment, since the moving directions Dm, Dk of the trays 80*m*, 80*k* are substantially the same direction (parallel), the range in which the rack portion 83*m* is placed at least partially overlaps the range in which the rack portion 83*k* is placed also in the moving direction Dk of the tray 80*k*. Therefore, in the state where the toner cartridges 70*m*, 70*k* are at the mounting position, the tooth surface of the rack portion 83*m* faces the tooth surface of the rack portion 83*k* in a direction orthogonal to the moving directions Dm, Dk of the rack portions 83*m*, 83*k* (the up and down direction in FIG. 8).

Figure 12A:
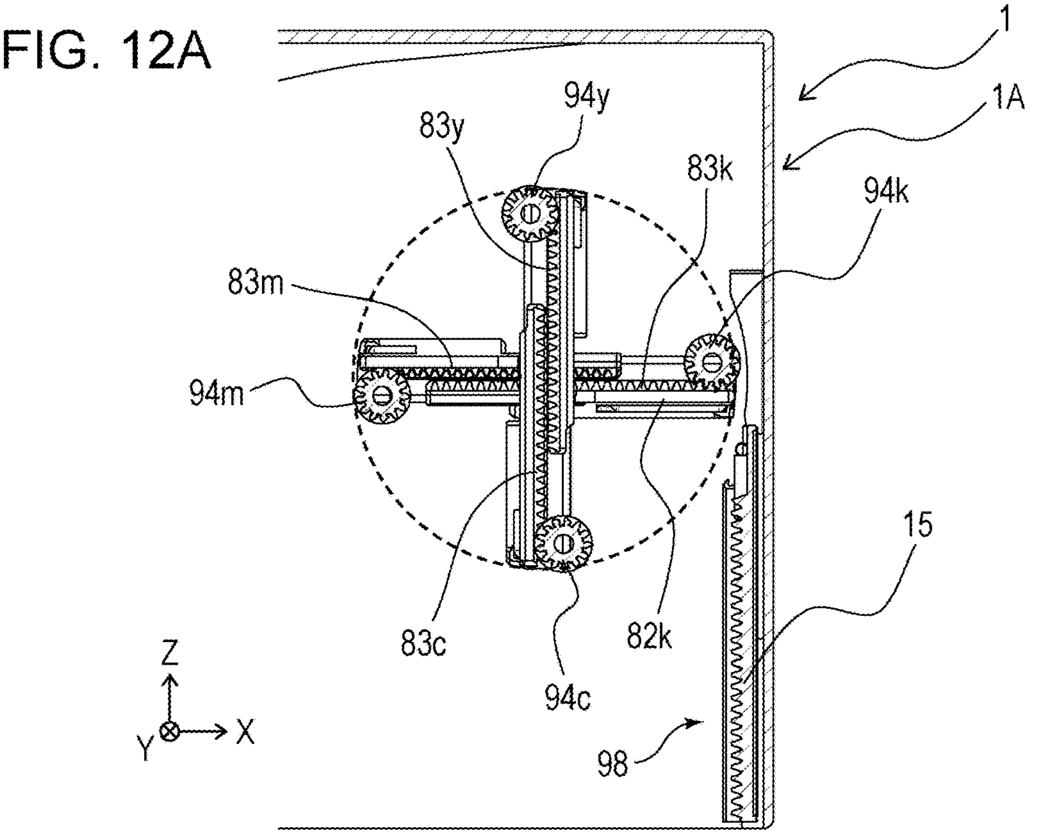
FIGS. 12A and 12B are views that illustrate the configuration related to movement of the tray according to the first embodiment.

As shown in FIG. 12A (described later), when viewed in the direction of the rotation axis 90C (Y direction), the rack portion 83*y* overlaps the rack portion 83*m* and the rack portion 83*k*. When viewed in the direction of the rotation axis 90C (Y direction), the rack portion 83*m* overlaps the rack portion 83*y* and the rack portion 83*c*. When viewed in the direction of the rotation axis 90C (Y direction), the rack portion 83*c* overlaps the rack portion 83*m* and the rack portion 83*k*. When viewed in the direction of the rotation axis 90C (Y direction), the rack portion 83*k* overlaps the rack portion 83*y* and the rack portion 83*c*. In other words, in the rotation axis direction of the rotary (Y direction), the range in which the first rack (rack portion 83*k*) is placed does not overlap the range in which the second rack (rack portion 83*y*) is placed. When viewed in the rotation axis direction of the rotary (Y direction), the first rack (rack portion 83*k*) overlaps the second rack (rack portion 83*y*) in the state where the first toner cartridge 70*k* is at the first mounting position and the second toner cartridge 70*y* is at the second mounting position.

In this way, since the positions at which the rack portions 83*k*, 83*m* are placed in the Y direction differ from the positions at which the rack portions 83*y*, 83*c* are placed in the Y direction, the rack portions 83*y*, 83*c* and the rack portions 83*m*, 83*k* can be disposed so as to overlap each other when viewed in the Y direction.

Tray Movement Configuration

Figure 12B:
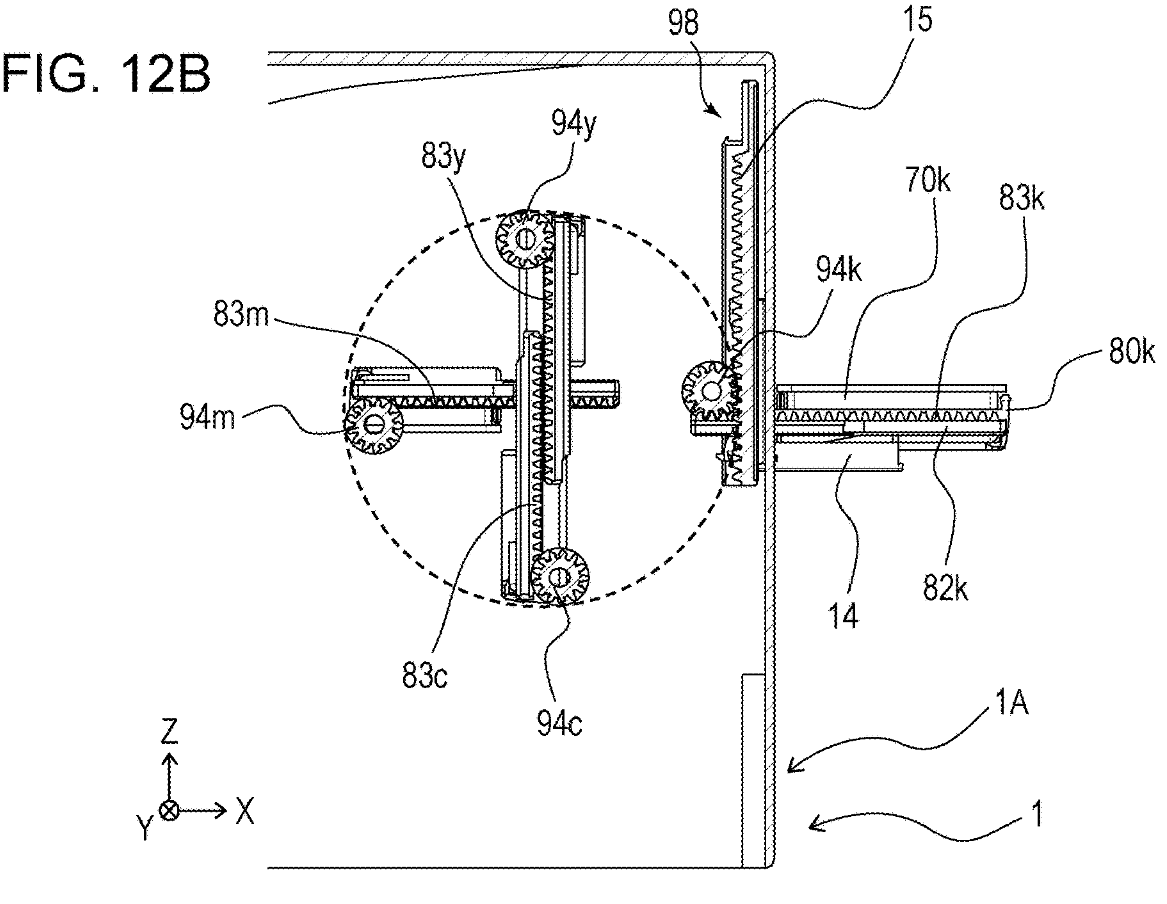

The configuration related to the movement of the trays 80*y* to 80*k* disposed in the rotary body 90 will be described with reference to FIGS. 11A, 11B, 12A, and 12B. FIGS. 11A and 11B are perspective views of the configuration related to the movement of the tray 80*k*. FIGS. 12A and 12B are sectional views of the configuration related to the movement of the tray 80*k*.

In the present embodiment, the trays 80*y* to 80*k* are driven by the driving force of the motor M2, transmitted to the pinions 94*y* to 94*k* by drive racks 15R, 15L serving as the transmission device. Here, the configuration for moving the tray 80*k* relative to the rotary body 90 will be described, and the configuration for moving the trays 80*y* to 80*c* relative to the rotary body 90 is substantially the same as the configuration for moving the tray 80*k*, so the description thereof is omitted.

FIG. 11A shows the state where the tray 80*k* is placed inside the rotary body 90 (that is, the state where the toner cartridge 70*k* is mounted to the developing unit 50*k*). In other words, FIG. 11A shows the state where the tray 80*k* is at the storage position and corresponds to the state where the toner cartridge 70*k* is at the mounting position relative to the developing frame 53*k* (FIG. 4A). FIG. 11B shows the state where the tray 80*k* has been slid to the outside of the rotary body 90. In other words, FIG. 11B shows the state where the tray 80*k* is at the eject position and corresponds to the state where the toner cartridge 70*k* is at the retreat position relative to the developing frame 53*k* (FIG. 4A).

The apparatus body 1A of the present embodiment includes the drive racks 15R, 15L as drive gears that drive the pinions 94. Each of the drive racks 15 is driven by the motor M2 via the transmitting unit 15*t*. As shown in FIG. 11A, in the state where the tray 80*k* is inside the rotary body 90 (that is, the state where the toner cartridge 70*k* is mounted to the developing unit 50*k*), the drive racks 15R, 15L are at a disengaged position away from the pinions 94*k*. The drive racks 15R, 15L move from the disengaged position and engage with the pinions 94*k* so that the tray 80*k* moves from the storage position to the eject position and the toner cartridge 70*k* moves from the mounting position to the retreat position.

As described earlier, two rack portions 83*k* are provided at both ends of the tray 80*k* in the Y direction. The two pinions 94*k* and the two drive racks 15R, 15L are respectively disposed at the positions corresponding to the rack portions 83*k* at both ends. In other words, the apparatus body 1A of the present embodiment includes the drive racks 15L, 15R as a first drive gear and a second drive gear. The drive rack 15L is an example of the first drive gear, and the drive rack 15R is an example of the second drive gear.

However, numbering is used for the sake of convenience of description and can generally be interchanged as needed. When there is no need to distinguish between the drive racks 15R, 15L, the drive racks 15R, 15L are referred to as "drive racks 15".

The rack portions 83 of the present embodiment are configured as a rack pair, and the pinions 94 of the present embodiment are configured as a pinion pair. In the present embodiment, the rack pair and the pinion pair are disposed at one end and the other end of the support member (tray 80) in the Y direction; however, the rack pair and the pinion pair may be disposed at other positions. The rack portions 83*k* and pinions 94*k* of the moving device 85*k* corresponding to the tray 80*k* may be regarded as examples of a first rack pair and a first pinion pair.

Any one set of the rack portions 83*y* to 83*c* and the pinions 94*y* to 94*c* of the moving devices 85*y* to 85*c* corresponding to the other trays 80*y* to 80*c* may be regarded as examples of a second rack pair and a second pinion pair.

One of the rack pair is in mesh with one of the pinion pair, and the other one of the rack pair is in mesh with the other one of the pinion pair. At least one of the pinion pair is driven by the drive rack 15L serving as a first drive rack. In the present embodiment, both of the pinion pair are driven at the same time by the drive racks 15R, 15L serving as the first drive rack and a second drive rack. Thus, the tray 80 is less likely to rotate, with the result that it is possible to stably move the toner cartridge 70. The tray 80 may have a single rack portion 83 and may be configured to be moved by a single drive rack 15 through a single pinion 94.

The tray 80*k* is held so as to be slidable in a direction parallel to the guided portion 82*k* (that is, the moving direction Dk) relative to the rotary body 90. The drive rack 15 is held so as to be slidable in a direction that crosses the moving direction Dk of the tray 80*k* relative to the apparatus body 1A. The drive rack 15 is configured to slide (reciprocate) in a first direction (vertically upward in the present embodiment) and in a second direction (vertically downward in the present embodiment) opposite to the first direction relative to the apparatus body 1A. In other words, the moving direction of the drive rack 15 of the present embodiment is a direction that crosses (which can be a direction orthogonal to) both the moving direction Dk of the tray 80*k* and the direction of the rotation axis 90C (Y direction) of the rotary body 90.

The tray moving operation for sliding the tray 80*k* between the storage position and the eject position will be described with reference to FIGS. 11A and 11B. The tray moving operation of the tray 80*k* is performed by the motor M2 (FIG. 2), the transmitting unit 15*t*, the drive racks 15, the pinions 94*k*, and the rack portions 83*k*.

Initially, the tray moving operation (tray ejection operation) when the toner cartridge 70*k* is removed from the rotary body 90 will be described. In a state before the tray ejection operation is started, the drive rack 15 is positioned below the position at which the drive rack 15 meshes with the pinion 94*k* (FIG. 11A).

As described earlier, in the replacement operation of the toner cartridge 70*k*, the rotary body 90 takes the replacement posture of the toner cartridge 70*k* (FIG. 4B).

When the tray ejection operation is started, the drive rack 15 is slid upward of the apparatus body 1A by the driving force of the motor M2. During the process in which the drive rack 15 moves, the drive rack 15 engages with the pinion 94*k*, and the pinion 94*k* is rotationally driven.

As shown in FIG. 11B, when the pinion 94*k* is rotationally driven in the direction of the arrow in the drawing, the driving force is input to the rack portion 83*k* that is in mesh with the pinion 94*k*. As a result, the tray 80*k* is pushed out to the outside of the machine and moves from the storage position to the eject position relative to the rotary body 90. The moving direction of the tray 80*k* at this time is guided in the predetermined moving direction Dk by the engagement of the guided portion 82*k* with the guide portion 97*k* of the rotary body 90 (FIG. 7A).

As a result of the tray 80*k* moving from the storage position to the eject position, the toner cartridge 70*k* is moved from the mounting position to the retreat position relative to the developing unit 50*k*.

In the state where the tray 80*k* is at the eject position and the toner cartridge 70*k* is at the retreat position, a user is able to attach the toner cartridge 70*k* to or detach the toner cartridge 70*k* from the tray 80*k*.

The tray moving operation (tray insertion operation, tray insertion operation) when the toner cartridge 70 is attached to the rotary body 90 is performed in the process reverse to the tray ejection operation. For example, when the user operates a predetermined operating unit, the tray insertion operation is started. When the tray insertion operation is started, the drive rack 15 is slid downward of the apparatus body 1A by the driving force of the motor M2. Here, the rotation direction of the motor M2 in the tray insertion operation is opposite to the tray ejection operation.

When the pinion 94*k* is rotationally driven in a direction opposite to the arrow in FIG. 11B, the driving force is input to the rack portion 83*k* that is in mesh with the pinion 94*k*. As a result, the tray 80*k* is pulled into the machine and moves from the eject position to the storage position relative to the rotary body 90.

The moving direction of the tray 80*k* is guided in the moving direction Dk (the direction opposite to the arrow in FIG. 11B) by the engagement of the guided portion 82*k* with the guide portion 97*k* (FIG. 7A) of the rotary body 90. As a result of the tray 80*k* moving from the eject position to the storage position, the toner cartridge 70*k* is moved from the retreat position to the mounting position relative to the developing unit 50*k*.

The movement of the black tray 80*k* and the black toner cartridge 70*k* has been described, and the movement of the other trays 80*y* to 80*c* and the other toner cartridges 70*y* to 70*c* is also performed by similar mechanisms. In other words, the drive rack 15 transmits driving force to the pinions 94*y* to 94*c* in the replacement posture of each toner cartridge.

The drive device 98 for driving the moving device 85 provided in the rotary body 90 is made up of the motor M2 provided in the apparatus body 1A and the transmission device including the drive racks 15 (15R, 15L) and the transmitting unit 15*t*. The moving device 85 of the present embodiment may be regarded as a moving device powered by electric power.

As described earlier, in the present embodiment, the plurality of moving devices 85*y* to 85*k* corresponding to the plurality of toner cartridges 70*y* to 70*k* is disposed in the rotary body 90. The drive device 98 of the apparatus body 1A is a common drive device that drives the plurality of moving devices 85*y* to 85*k* (a plurality of driven devices) of the rotary body 90.

In the present embodiment, the target to be driven by the drive device 98 switches with the rotation of the rotary body 90. In other words, the drive device of the present embodiment includes the drive rack 15 as a transmission member for transmitting the driving force of the drive source. The drive device is capable of taking the state where the transmission member drivably engages with the first driven unit (pinion 94*k*) and the state where the transmission member drivably engages with the second driven unit (pinion 94*m*). The drive device is capable of taking the state where the transmission member is disconnected from the first driven unit and the second driven unit.

As described above, the pinions 94*y* to 94*k* are held in the rotary body 90. Therefore, when the rotary body 90 rotates, the meshing of the pinions 94*y* to 94*k* with the drive rack 15 can be released.

FIG. 12A shows the state where the tray 80*k* is placed inside the rotary body 90 (the state at the storage position). FIG. 12B shows the state where the tray 80*k* has moved to the outside of the rotary body 90 (the state of having moved to the eject position).

As shown in FIG. 12A, when the tray 80*k* is placed inside the rotary body 90, the drive rack 15 is positioned at the bottom in the apparatus body 1A. At this time, the drive rack 15 is retracted from the pinion 94*k*. Therefore, the rotary body 90 is allowed to be rotated without any interference with the drive rack 15. More specifically, the drive rack 15 can retract to the outside of the rotation trajectory of the rotary body 90, indicated by the dashed line in FIGS. 12A and 12B.

As described above, when the motor M2 is rotationally driven in the forward and reverse directions, the tray 80 attached to the rotary body 90 can be moved from the storage position to the eject position and from the eject position to the storage position relative to the rotary body 90. In other words, the drive device of the present embodiment is capable of not only driving each moving device of the rotary such that the toner cartridge moves from the mounting position to the retreat position but also driving each moving device such that the toner cartridge moves from the retreat position to the mounting position.

Here, as described earlier, in the present embodiment, the amount of movement of the tray 80 during toner cartridge replacement is changed according to the size of the toner cartridge 70. Specifically, as shown in FIGS. 7A and 7B, the moving distance L1 when the black tray 80*k* moves from the storage position to the eject position is longer than the moving distance L2 when the other trays 80*y* to 80*c* move from the storage position to the eject position.

Therefore, in the present embodiment, when the toner cartridges 70*y* to 70*k* are moved from the mounting position to the retreat position, the value obtained by dividing the speed of the rack portion 83*k* by the speed of the drive rack 15 is greater than the value obtained by dividing the speed of each of the rack portions 83*y* to 83*c* by the speed of the drive rack 15.

For example, as shown in FIG. 10, the pinion 94*c* is a stepped gear, the pitch radius of a small-diameter gear 942 that meshes with the rack portion 83*c* is smaller than the pitch radius of a large-diameter gear 941 that meshes with the drive rack 15. The pinions 94*m*, 94*y* are also similar stepped gears. On the other hand, the pinion 94*k* is made such that a portion that meshes with the drive rack 15 and a portion that meshes with the rack portion 83*k* have the same pitch radius. At this time, the pitch radius of the pinion 94*k* can be set to the same radius as the pitch radius of the large-diameter gears 941 of the pinions 94*y* to 94*c*.

With this configuration, even when the moving distance of drive rack 15 is the same, the moving distance of the rack portion 83*k* can be made larger than the moving distances of the other rack portions 83*y* to 83*c*. In other words, the moving distance L1 when the black tray 80*k* moves from the storage position to the eject position can be made longer than the moving distance L2 when the other trays 80*y* to 80*c* move from the storage position to the eject position.

When the pinions 94*y* to 94*c* are stepped gears, the moving distance L1 of the tray 80*k* can be made larger than the moving distance L2 of the other trays 80*y* to 80*c* with the configuration that the pinions 94*y* to 94*k* receive driving force from the same drive rack 15.

Modifications

The configuration in which the driven unit includes the pinion 94 that meshes with both the drive rack 15 and the rack portion 83 has been described. Alternatively, the driven unit may include a gear that meshes with the drive rack 15 and a gear that meshes with the rack portion 83.

The configuration of the moving device 85 for moving the tray 80 is not limited to a so-called rack and pinion mechanism. For example, the member corresponding to the pinion 94 may be replaced with a roller that rotates under the drive of the motor M2, and the tray 80 is moved by the friction between the roller and the tray 80.

When a roller that rotates under the drive of the motor M2, the roller may be brought into contact with the toner cartridge 70. In this case, the toner cartridges 70*y* to 70*k* may be configured to be directly attached to and detached from the rotary body 90 without intervening the trays 80*y* to 80*k*. In this case, the moving device 85 is made up of rollers.

Right and Left Connecting Configuration of Tray Drive System

A drive system 100 for moving the tray 80*k* as an example of a moving member and a configuration for connecting the right and left drive racks 15L, 15R (right and left connecting configuration). The drive system 100 for moving the tray 80*k* relative to the rotary body 90 will be described. Drive systems for moving the trays 80*y* to 80*c* that are other examples of the moving member are substantially similar to the drive system 100 that will be described below, so the description is omitted.

For the purpose of description, when the apparatus body 1A is viewed from the +X side (when viewed from the front), the +Y side can be referred to as the right side of the apparatus body 1A, and the −Y side can be referred to as the left side of the apparatus body 1A. For example, one drive rack 15L is provided at the left side of the apparatus body 1A, and the other drive rack 15R is provided at the right side of the apparatus body 1A.

Figure 13A:
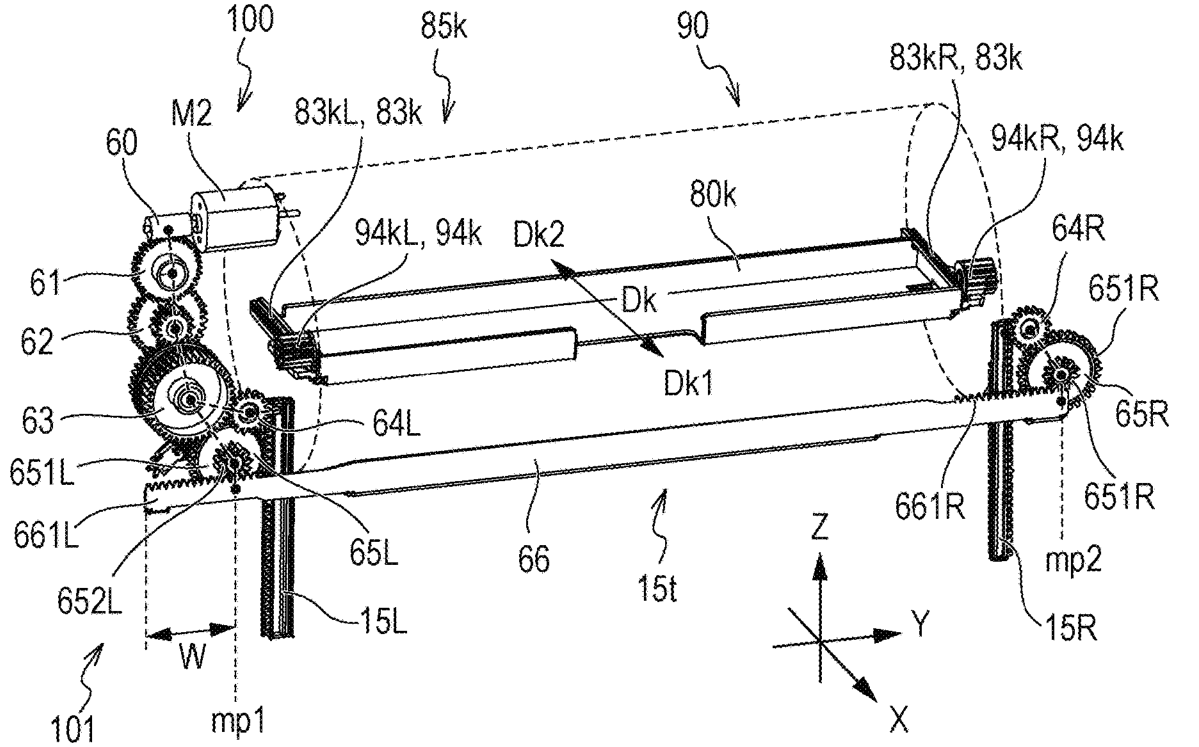
FIGS. 13A and 13B are views that illustrate a configuration related to a drive system of the tray according to the first embodiment.
Figure 13B:
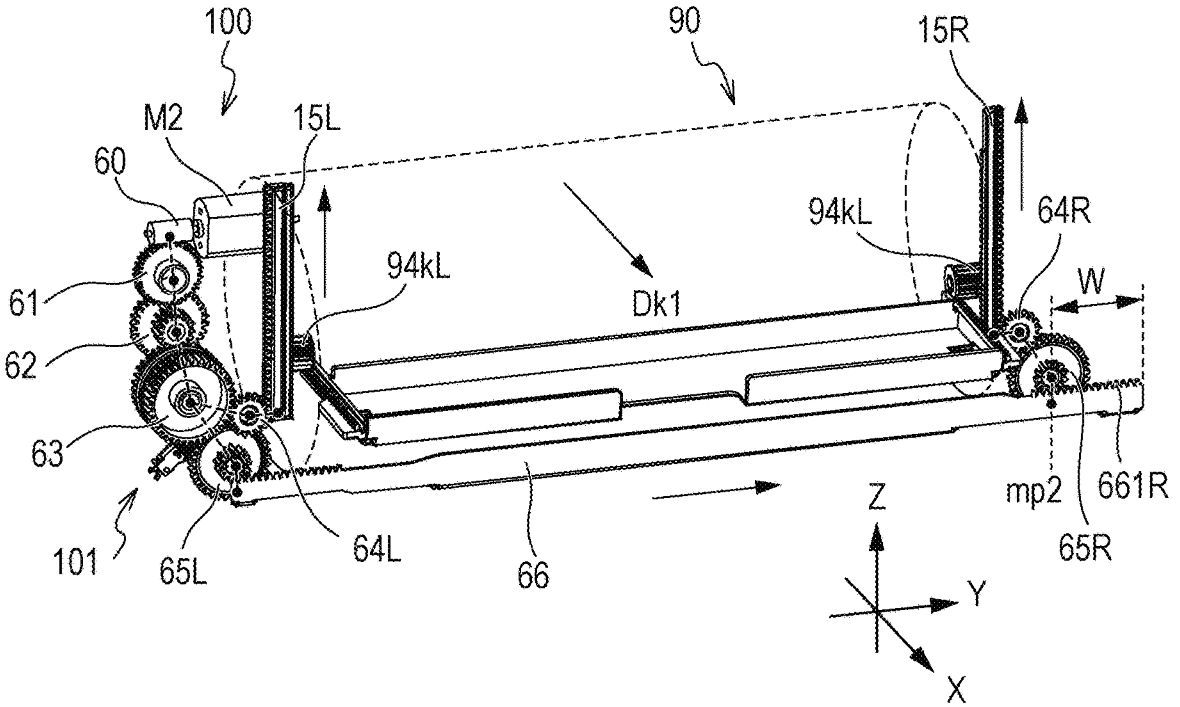
Figure 14B:
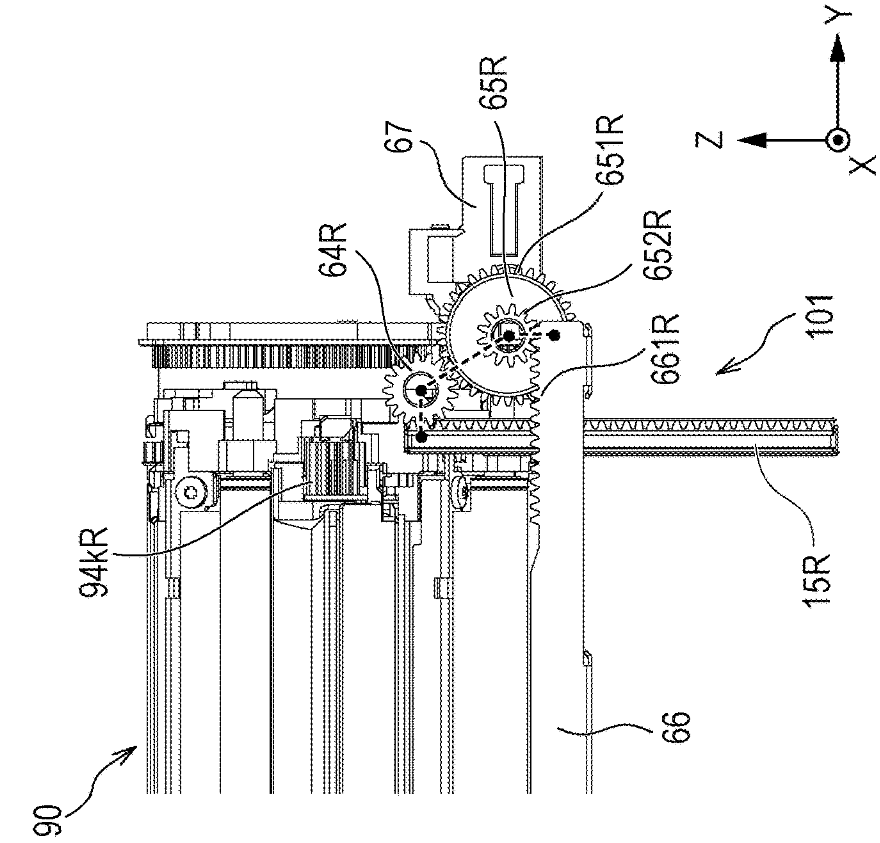
FIGS. 14A and 14B are views that illustrate the configuration related to the drive system of the tray according to the first embodiment.
Figure 14A:
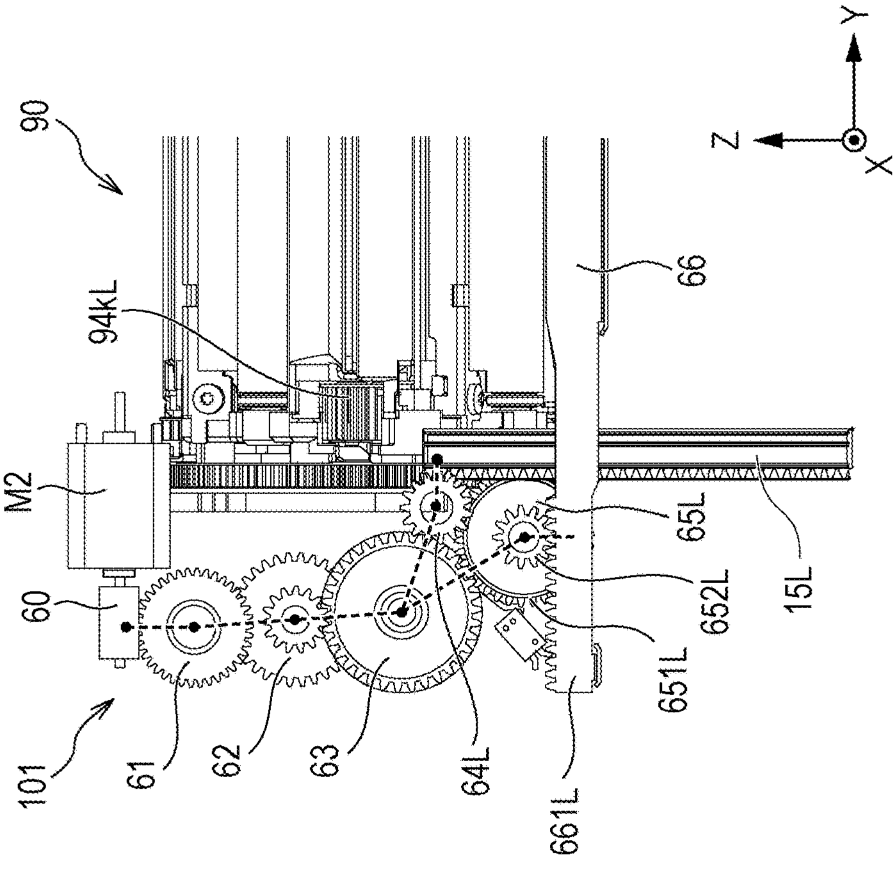

FIGS. 13A and 13B are perspective views of the drive system 100 for the tray 80*k*. FIG. 13A shows the state where the tray 80*k* is positioned inside the rotary body 90 (the state where the tray 80*k* is at the storage position). FIG. 13B shows the state where the tray 80*k* has moved to the outside of the rotary body 90 (the state where the tray 80*k* is at the eject position). FIGS. 14A and 14B are views illustrating the configuration of the drive system 100 for the tray 80*k*. FIG. 14A shows the configuration of the drive system 100 at the left side of the apparatus body 1A. FIG. 14B shows the configuration of the drive system 100 at the right side of the apparatus body 1A. FIGS. 14A and 14B show the state of the drive system 100 when the tray 80*k* is at the storage position.

As shown in FIGS. 13A and 13B, the drive system 100 of the tray 80*k* includes the motor M2 as a drive source, and a drive transmission mechanism 101 that transmits the driving force of the motor M2 to the tray 80*k*. The drive transmission mechanism 101 includes a rotating member that transmits the driving force of the motor M2 by rotation, and a linear motion member that transmits the driving force of the motor M2 by linear motion. More specifically, the drive transmission mechanism 101 of the present embodiment includes a worm gear 60, stepped gears 61, 62, an idle gear 63, drive rack input gears 64R, 64L, and the drive racks 15R, 15L.

The drive transmission mechanism 101 of the present embodiment includes stepped gear 65R, 65L, a connecting rack 66, and the pinions 94*k* (94KR, 94*k*L). The tray 80*k* includes the rack portions 83*k* (83*k*R, 83*k*L) as a force receiving portion that receives the driving force from the drive transmission mechanism 101. The connecting rack 66 is an example of the linear motion member.

The drive system 100 for the tray 80*k* may also be regarded as being made up of the drive device 98 of the apparatus body 1A and the moving device 85*k* of the rotary body 90 (FIG. 2).

The drive device 98 includes the motor M2, the drive racks 15R, 15L, and the transmitting unit 15*t* that transmits driving force from the motor M2 to the drive racks 15R, 15L. The transmitting unit 15*t* includes the worm gear 60, the stepped gears 61, 62, the idle gear 63, the drive rack input gears 64R, 64L, the stepped gears 65L, 65R, and the connecting rack 66. The moving device 85*k* includes the pinions 94*k* (94KR, 94*k*L) and the rack portions 83*k* (83*k*R, 83*k*L). Therefore, the "drive transmission mechanism 101" includes elements of the drive device 98 other than the motor M2, elements of the moving device 85*k* other than the elements provided in the tray 80*k* (the rack portions 83*k*R, 83*k*L).

The drive system for the tray 80*y* is obtained by replacing the moving device 85*k* of the drive system 100 with the moving device 85*y* corresponding to the tray 80*y*, and the drive device 98 is common.

The drive system for the tray 80*m* is obtained by replacing the moving device 85*k* of the drive system 100 with the moving device 85*m* corresponding to the tray 80*m*, and the drive device 98 is common. The drive system for the tray 80*c* is obtained by replacing the moving device 85*k* of the drive system 100 with the moving device 85*c* corresponding to the tray 80*c*, and the drive device 98 is common.

As shown in FIG. 13A, the tray 80*k* of the present embodiment includes two rack portions 83*k*R, 83*k*L. The rack portion 83*k*L is an example of a first force receiving portion, and the rack portion 83*k*R is an example of a second force receiving portion.

The rack portion 83*k*R (second force receiving portion) is disposed at a position away from the rack portion 83*k*L (first force receiving portion) in a direction that crosses the moving direction Dk of the tray 80*k*. In the present embodiment, the rack portion 83*k*R is positioned away from the rack portion 83*k*L in the rotation axis direction (Y direction) of the rotary body 90. In the present embodiment, the rack portion 83*k*L is disposed at one end (left end) of the tray 80*k* in the rotation axis direction (Y direction) of the rotary body 90. On the other hand, the rack portion 83*k*R is disposed at the other end (right end) of the tray 80*k* in the rotation axis direction (Y direction) of the rotary body 90.

The rotary body 90 of the present embodiment includes two pinions 94*k*R, 94*k*L corresponding to two rack portions 83*k*R, 83*k*L. The two pinions 94*k*R, 94*k*L include the pinion 94*k*L corresponding to the rack portion 83*k*L and the pinion 94*k*R corresponding to the rack portion 83*k*R.

As shown in FIG. 13A, the worm gear 60 is secured to the output shaft of the motor M2. The stepped gear 61 integrally has a large-diameter gear that meshes with the worm gear 60 and a small-diameter gear smaller in diameter than the large-diameter gear. The stepped gear 62 integrally has a large-diameter gear that meshes with the small-diameter gear of the stepped gear 61, and a small-diameter gear smaller in diameter than the large-diameter gear. The idle gear 63 is in mesh with each of the small-diameter gear of the stepped gear 62, the stepped gear 65L, and the drive rack input gear 64L. The drive rack input gear 64L is in mesh with the drive rack 15L.

As shown in FIGS. 14A and 14B, the stepped gear 65L integrally has a large-diameter gear 651L that meshes with the idle gear 63, and a small-diameter gear 652L (third small-diameter gear) smaller in diameter than the large-diameter gear 651L.

The stepped gear 65L is configured to transmit the driving force of the motor M2, received by the large-diameter gear 651L, to the connecting rack 66 via the small-diameter gear 652L. The connecting rack 66 has a first rack portion 661L that meshes with the small-diameter gear 652L of the stepped gear 65L, and a second rack portion 661R that meshes with the small-diameter gear 652R of the stepped gear 65R. The stepped gear 65R integrally has the large-diameter gear 651R that meshes with the drive rack input gear 64R, and the small-diameter gear 652R smaller in diameter than the large-diameter gear 651R. The stepped gear 65R is configured to transmit the driving force of the motor M2, received by the small-diameter gear 652R from the connecting rack 66, to the rack portion 83*k*R via the large-diameter gear 651R. The drive rack input gear 64R is in mesh with the drive rack 15R.

The connecting rack 66 is a rack member that is capable of reciprocating in a direction that crosses (which can be a direction orthogonal to) the moving direction Dk of the tray 80*k*. In the present embodiment, the connecting rack 66 reciprocates in the Y direction that is the rotation axis direction of the rotary body 90. In other words, the connecting rack 66 moves in a direction different from the moving direction of the drive racks 15R, 15L (a direction that crosses the Y direction, and the Z direction in the present embodiment) that are the other rack members of the drive transmission mechanism 101. The connecting rack 66 of the present embodiment is elongated so as to extend in the Y direction. In other words, the longitudinal direction of the connecting rack 66 is the Y direction. The first rack portion 661L is provided at one end of the connecting rack 66 in the Y direction, and the second rack portion 661R is provided at the other end of the connecting rack 66 in the Y direction. The first rack portion 661L and the second rack portion 661R may be continuous.

The left drive rack 15L is an example of a first transmission member for transmitting the driving force of the motor M2 to the rack portion 83*k*L of the tray 80*k*, which serves as the first force receiving portion. The right drive rack 15R is an example of a second transmission member for transmitting the driving force of the motor M2 to the rack portion 83*k*R of the tray 80*k*, which serves as the second force receiving portion. The right and left drive racks 15R, 15L are connected to each other via the connecting rack 66 so as to operate in conjunction with each other. Specifically, the left drive rack 15L is connected to the right drive rack 15R via the drive rack input gear 64L, the idle gear 63, the stepped gear 65L, the connecting rack 66, the stepped gear 65R, and the drive rack input gear 64R.

The connecting rack 66 is configured to transmit the force received from one of the drive racks 15R, 15L to the other one of the drive racks 15R, 15L. The drive transmission mechanism 101 including the connecting rack 66 is configured to transmit the force received from one of the two rack portions 83kR, 83kL of the tray 80k to the other one of the rack portions 83kR, 83kL. The benefits of this configuration will be described later.

The operation of the drive system 100 when the tray 80k is moved from the storage position (FIG. 13A) to the eject position (FIG. 13B) will be described. Hereinafter, the rotation direction of the motor M2 (first rotation direction, first direction) when the tray 80k is moved from the storage position toward the eject position is referred to as a forward direction. The rotation direction of the motor M2 (second rotation direction, second direction) when the tray 80k is moved from the eject position toward the storage position is referred to as a reverse direction. In the moving direction Dk in which the tray 80k moves between the eject position and the storage position, the direction from the storage position toward the eject position is referred to as an ejection direction Dk1, and the direction from the eject position toward the storage position is referred to as an insertion direction Dk2.

When the motor M2 rotates in the forward direction, the driving force is transmitted in order of the worm gear 60, the stepped gear 61, the stepped gear 62, and the idle gear 63. Subsequently, the driving force is transmitted from the idle gear 63 to both the drive rack input gear 64L and the stepped gear 65L. The left drive rack 15L is slid upward (+Z direction) by the drive rack input gear 64L to which the driving force is transmitted from the idle gear 63.

The left drive rack 15L engages with the left pinion 94kL during the process of moving upward to rotate the pinion 94kL. When the pinion 94kL is rotated, the driving force is transmitted to the rack portion 83kL of the tray 80k that is in mesh with the pinion 94kL. As a result, the rack portion 83kL of the tray 80k receives the force in the ejection direction Dk1 from the storage position toward the eject position via the left drive train (the drive rack input gear 64L, the drive rack 15L, and the pinion 94kL) of the drive transmission mechanism 101.

On the other hand, the driving force of the idle gear 63 is also transmitted to the right drive train (the drive rack input gear 64R, the drive rack 15R, and the pinion 94kR) of the drive transmission mechanism 101 via the stepped gear 65L and the connecting rack 66. In other words, the connecting rack 66 is slid to the right side (in the +Y direction) of the apparatus body 1A by the stepped gear 65L to which the driving force is transmitted from the idle gear 63. When the connecting rack 66 is slid, the driving force is transmitted to the drive rack input gear 64R via the stepped gear 65R, and the right drive rack 15L is slid upward (in the +Z direction).

The right drive rack 15R meshes with the right pinion 94kR during the process of moving upward to rotate the pinion 94KR. When the pinion 94kR is rotated, the driving force is transmitted to the rack portion 83kR of the tray 80k that is in mesh with the pinion 94KR. As a result, the tray 80k receives the force in the ejection direction Dk1 from the storage position toward the eject position via the right drive train (the drive rack input gear 64R, the drive rack 15R, and the pinion 94kR) of the drive transmission mechanism 101.

In this way, when the motor M2 rotates in the forward direction, the tray 80k moves from the storage position (FIG. 13A) toward the eject position (FIG. 13B) by receiving the force in the ejection direction Dk1 at the right and left rack portions 83kR, 83kL.

The operation of the drive system 100 when the tray 80k is moved from the eject position to the storage position is similar to the case when the tray 80k is moved from the storage position to the eject position, except that the rotation direction or sliding direction of each element of the drive system 100 is reversed. In other words, when the motor M2 rotates in the reverse direction, the left drive rack 15L is slid downward (in the −Z direction) via the worm gear 60, the stepped gear 61, the stepped gear 62, the idle gear 63, and the drive rack input gear 64L. When the drive rack 15L is slid, the driving force in the insertion direction Dk2 is transmitted to the rack portion 83kL of the tray 80k via the pinion 94kL. On the other hand, the driving force is transmitted from the idle gear 63 to the connecting rack 66 via the stepped gear 65L, and the connecting rack 66 is slid to the left side (in the −Y direction) of the apparatus body 1A. When the connecting rack 66 is slid, the right drive rack 15R is slid downward (in the −Z direction) via the stepped gear 65R and the drive rack input gear 64R. When the drive rack 15R is slid, the driving force in the insertion direction Dk2 is transmitted to the rack portion 83kR of the tray 80k via the pinion 94kR.

In this way, when the motor M2 rotates in the reverse direction, the tray 80k moves from the eject position (FIG. 13B) toward the storage position (FIG. 13A) by receiving the force in the insertion direction Dk2 at the right and left rack portions 83kR, 83kL.

As described above, during the tray ejection operation or the tray insertion operation of the tray 80k (hereinafter, collectively referred to as ejection or insertion operation), the driving force of the motor M2 is transmitted to the right and left rack portions 83kR, 83kL of the tray 80k by the drive transmission mechanism 101. In other words, during the tray ejection operation, the driving force in the ejection direction Dk1 is transmitted to each of the two rack portions 83kR, 83kL, and during the tray insertion operation, the driving force in the insertion direction Dk2 is transmitted to each of the two rack portions 83kR, 83kL. For this reason, compared to the configuration that the driving force is transmitted to only one rack portion of the tray 80k during the ejection or insertion operation of the tray 80k, the tray 80k is less likely to tilt, so further stable ejection or insertion operation is possible.

Benefits of Right and Left Connecting Configuration

Hereinafter, the benefits of the configuration that the right and left drive racks 15R, 15L are connected by the connecting rack 66 will be described.

The connecting rack 66 of the present embodiment transmits the force received from the left drive rack 15L to the right drive rack 15R, and transmits the force received from the right drive rack 15R to the left drive rack 15L. The drive transmission mechanism 101 of the present embodiment, including the connecting rack 66, transmits the force received from the left rack portion 83kL of the tray 80k to the right rack portion 83kR, and transmits the force received from the right rack portion 83kR of the tray 80k to the left rack portion 83kL. In other words, the drive transmission mechanism is configured to transmit the force received by the drive transmission mechanism from the first force receiving portion of the moving member to the second force receiving portion, and to transmit the force received by the drive transmission mechanism from the second force receiving portion of the moving member to the first force receiving portion.

Therefore, the right and left drive racks 15R, 15L are connected to each other via the connecting rack 66 so as to move in conjunction with each other. The drive transmission mechanism 101 including the connecting rack 66 can move the rack portion 83kL of the tray 80k and the rack portion 83kR of the tray 80k in conjunction with each other. Thus, the tray 80k is less likely to tilt.

More specifically, when the tray 80*k* is at the eject position, a user is able to execute the tray insertion operation by operating the operating unit provided on the apparatus body 1A (for example, buttons on the operating panel) to move the tray 80*k* to the storage position.

On the other hand, when the user pushes in the tray 80*k* in the state where the tray 80*k* is at the eject position, the tray 80*k* is allowed to move toward the storage position (the details of a mechanism that allows this movement will be described later). At this time, the user does not necessarily push the center of the tray 80*k* in the width direction (right and left direction, Y direction) of the apparatus body 1A. If an area near one end of the tray 80*k* in the Y direction is pushed by the user, one end moves in the insertion direction Dk2, and the other end does not move, the tray 80*k* tilts. When the tray 80*k* tilts, it is difficult for the user to smoothly push the tray 80*k* into the rotary body 90. When the tray 80*k* tilts, the drive system 100 can have difficulty in smoothly executing the tray insertion operation.

When the right and left drive racks 15R, 15L for the tray 80*k* are connected as in the case of the present embodiment, it is possible to suppress the tilting of the tray 80*k*. This is because, even when one end of the tray 80*k* in the Y direction is pushed and moved in the insertion direction Dk2, the other end of the tray 80*k* also moves in the insertion direction Dk2 since the right and left drive racks 15R, 15L are connected to each other.

For example, assuming that, in the state shown in FIG. 13B, the user pushes in an area near the left end (−Y side) of the tray 80*k* in the insertion direction Dk2. In this case, the drive rack 15L is moved downward via the pinion 94*k*L by the movement of the rack portion 83*k*L in the insertion direction Dk2. When the drive rack 15L moves downward, the drive rack input gear 64L, the idle gear 63, and the stepped gear 65L rotate, and the connecting rack 66 moves to the left side (in the −Y direction).

When the connecting rack 66 moves to the left side, the stepped gear 65R and the drive rack input gear 64R rotate, and the drive rack 15R moves downward. When the drive rack 15R moves downward, the rack portion 83*k*R receives the force in the insertion direction Dk2 via the pinion 94*k*R.

In other words, the tray 80*k* receives the force in the insertion direction Dk2 from the user near the rack portion 83*k*L provided at the left-side (−Y-side) end and also receives the force in the insertion direction Dk2 at the rack portion 83*k*R provided at the right-side (+Y-side) end. The drive transmission mechanism 101 enables the transmission of force in the insertion direction Dk2 to the rack portion 83*k*R by transmitting part of the force received by the drive rack 15L from the tray 80*k* via the pinion 94*k*L to the drive rack 15R via the connecting rack 66. Therefore, it is possible to suppress the tilting of the tray 80*k* compared to the configuration that the force in the insertion direction Dk2 acts only near the left-side (−Y-side) end of the tray 80*k*. This also applies to the case where an area near the rack portion 83*k*R is pushed in the insertion direction Dk2.

The drive transmission mechanism 101 is configured such that, when the tray 80*k* is pushed in the insertion direction Dk2, the force rotates the idle gear 63, but the force is not transmitted from the idle gear 63 to the motor M2. In the present embodiment, the force transmission path when the tray 80*k* is pushed in the insertion direction Dk2 is interrupted by the idle gear 63 as will be described later. Therefore, when one end of the tray 80*k* in the Y direction is pushed and moved in the insertion direction Dk2 without being affected by the static torque of the motor M2, the other end of the tray 80*k* can move in the insertion direction Dk2 together.

Therefore, the tray 80*k* is less likely to tilt, so it is possible to achieve smooth operability at the time when the user pushes the tray 80*k* in.

Benefits in Using Stepped Gear in Right and Left Connecting Configuration

As shown in FIG. 13A, in the state where the tray 80*k* is at the storage position, the connecting rack 66 is in mesh with both the right and left stepped gears 65R, 65L. As shown in FIG. 13B, in the state where the tray 80*k* is at the eject position as well, the connecting rack 66 is in mesh with both the right and left stepped gears 65R, 65L.

As described earlier, the connecting rack 66 moves to the right side (in the +Y direction) of the apparatus body 1A when the tray 80*k* moves from the storage position to the eject position. The amount of movement of the connecting rack 66 during the movement of the tray 80*k* from the storage position to the eject position is denoted as W. In this case, in the state where the tray 80*k* is at the storage position (FIG. 13A), the first rack portion 661L of the connecting rack 66 extends at least the length of the amount of movement W to the left side (in the −Y direction) from a meshing position mp1 with the stepped gear 65L. In the state where the tray 80*k* is at the eject position (FIG. 13B), the second rack portion 661R of the connecting rack 66 extends at least the length of the amount of movement W to the right side (in the +Y direction) from a meshing position mp2 with the stepped gear 65R. In other words, the length of the connecting rack 66 in the moving direction (the Y direction in the present embodiment) of the connecting rack 66 is equal to or greater than the sum of the distance from the meshing position mp1 with the stepped gear 65L to the meshing position mp2 with the stepped gear 65R and the amount of movement W of the connecting rack 66.

Therefore, in order to achieve downsizing in the right and left direction (width direction, Y direction) of the apparatus body 1A, the amount of movement W of the connecting rack 66 is desirably small. Hereinafter, a configuration that reduces the amount of movement W of the connecting rack 66 and that enables downsizing of the apparatus body 1A in the width direction (Y direction) will be described.

As shown in FIG. 14A, the stepped gear 65L (first stepped gear) includes the large-diameter gear 651L (first large-diameter gear) and the small-diameter gear 652L (first small-diameter gear) smaller in pitch radius than the large-diameter gear 651L. The large-diameter gear 651L is in mesh with the idle gear 63 and can receive the driving force of the motor M2 via the idle gear 63. In other words, the large-diameter gear 651L (first large-diameter gear) is drivably connected to the motor M2 (drive source). The small-diameter gear 652L is in mesh with the first rack portion 661L of the connecting rack 66.

The large-diameter gear 651L is connected to the rack portion 83*k*L of the tray 80*k* via the idle gear 63, the drive rack input gear 64L, the drive rack 15L, and the pinion 94*k*L. In other words, the large-diameter gear 651L (first large-diameter gear) is drivably connected to the rack portion 83*k*L (first force receiving portion).

The ratio (r2/r1) of the pitch radius r2 of the small-diameter gear 652L to the pitch radius r1 of the large-diameter gear 651L is referred to as the pitch radius ratio of the stepped gear 65L. With the configuration that the driving force is transmitted to the connecting rack 66 via the stepped gear 65L, the amount of movement W of the connecting rack 66 reduces depending on the pitch radius ratio (r2/r1) of the stepped gear 65L. In other words, when the speed is reduced with the stepped gear 65L, it is possible to reduce the amount of movement W during the ejection or insertion operation of the tray 80*k* and achieve downsizing in the width direction (Y direction) of the apparatus body 1A.

Here, the amounts of movement of the right and left rack portions 83*k*R, 83*k*L when the tray 80*k* is moved are desirably equal to each other. The moving speeds of the right and left rack portions 83*k*R, 83*k*L when the tray 80*k* is moved are desirably equal to each other. In the present embodiment, the numbers of teeth of the right and left pinions 94*k*R, 94*k*L are equal to each other. In other words, the amounts of movement (moving speeds) of the right and left drive racks 15R, 15L are equal to each other.

In the present embodiment, the stepped gear 65R is interposed between the connecting rack 66 and the drive rack input gear 64R. The stepped gear 65R has a function to increase the amount of movement (movement speed) of the drive rack 15R relative to the amount of movement (moving speed) of the connecting rack 66.

As shown in FIG. 14B, the stepped gear 65R (second stepped gear) includes the large-diameter gear 651R (second large-diameter gear) and the small-diameter gear 652R (second small-diameter gear) smaller in pitch radius than the large-diameter gear 651R. The large-diameter gear 651R is in mesh with the drive rack input gear 64R, and is connected to the rack portion 83*k*R of the tray 80*k* via the drive rack input gear 64R, the drive rack 15R, and the pinion 94*k*R. In other words, the large-diameter gear 651R (second large-diameter gear) is drivably connected to the rack portion 83*k*R (second force receiving portion). The small-diameter gear 652R (second small-diameter gear) is in mesh with the second rack portion 661R of the connecting rack 66.

For example, the pitch radii of the large-diameter gears 651R, 651L of the right and left stepped gears 65R, 65L are set so as to be equal to each other, and the pitch radii of the small-diameter gears 652R, 652L are set so as to be equal to each other. As a result, the pitch radius ratio of the stepped gear 65L can be made equal to the pitch radius ratio of the stepped gear 65R, and the amounts of movement (moving speeds) of the rack portions 83*k*R, 83*k*L can be made equal to each other.

In the present embodiment, the amount of movement of the rack portion 83*k*L and the amount of movement of the drive rack 15L are almost equal to each other, and the amount of movement of the rack portion 83*k*R and the amount of movement of the drive rack 15R are almost equal to each other. On the other hand, the amount of movement W of the connecting rack 66 is less than the amounts of movement of the rack portion 83*k*L and the drive rack 15L and the amounts of movement of the rack portion 83*k*R and the drive rack 15R. Therefore, it is possible to reduce the amount of movement W of the connecting rack 66 compared to the amounts of movement of the tray 80*k* and the drive rack 15R during the ejection or insertion operation of the tray 80*k*. Therefore, it is possible to move the tray 80*k* by the desired amount of movement and achieve downsizing in the width direction (Y direction) of the apparatus body 1A.

Lock Mechanism of Rotary

When the tray 80 is moved to attach or detach the toner cartridge 70, the pinion 94 can be positioned such that the pinion 94 (driven unit) of the rotary body 90 and the drive rack 15 (drive member) of the apparatus body 1A are reliably engaged with each other. The pinion 94 can be accurately positioned at a position where the pinion 94 can appropriately mesh with the corresponding drive rack 15 (hereinafter, referred to as meshing position).

Therefore, in the present embodiment, a lock mechanism 90L is provided to restrict (lock) the rotation of the rotary body 90 in the state where the rotary body 90 is in the replacement posture. The lock mechanism 90L switches between a locked state where the rotation of the rotary body 90 is restricted and an unlocked state where the rotation of the rotary body 90 is allowed. The lock mechanism 90L is configured to take the locked state when the rotary body 90 takes any one of the yellow, magenta, cyan, and black replacement postures. The lock mechanism 90L of the present embodiment switches between the locked state and the unlocked state in conjunction with the ejection or insertion operation of the tray 80.

Figure 15A:
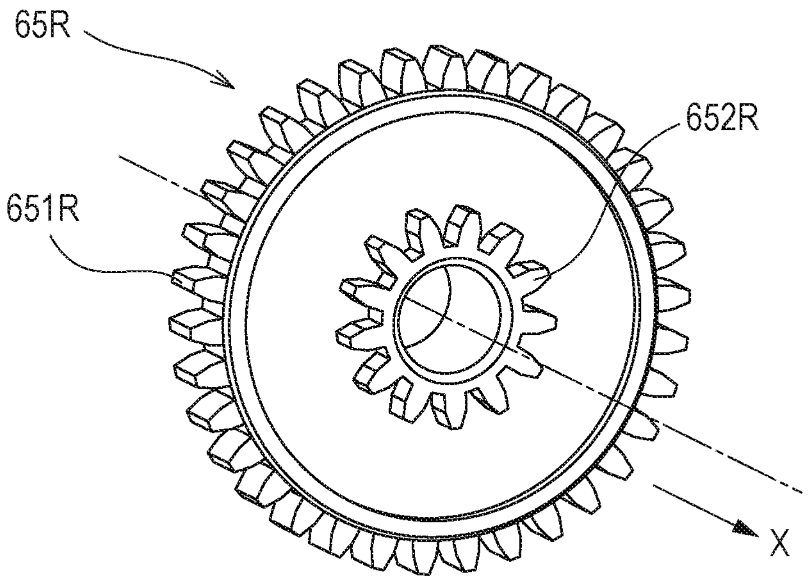
FIGS. 15A and 15B are perspective views of a stepped gear according to the first embodiment.
Figure 15B:
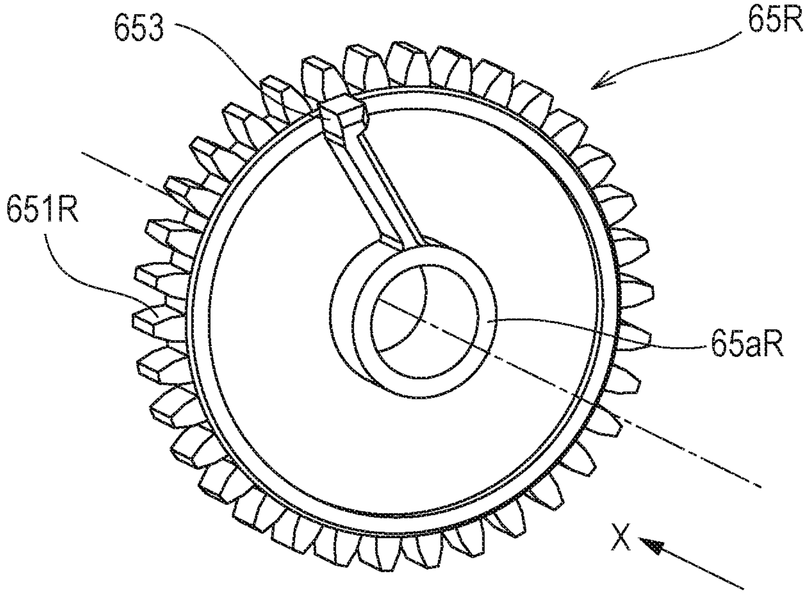
Figure 16:
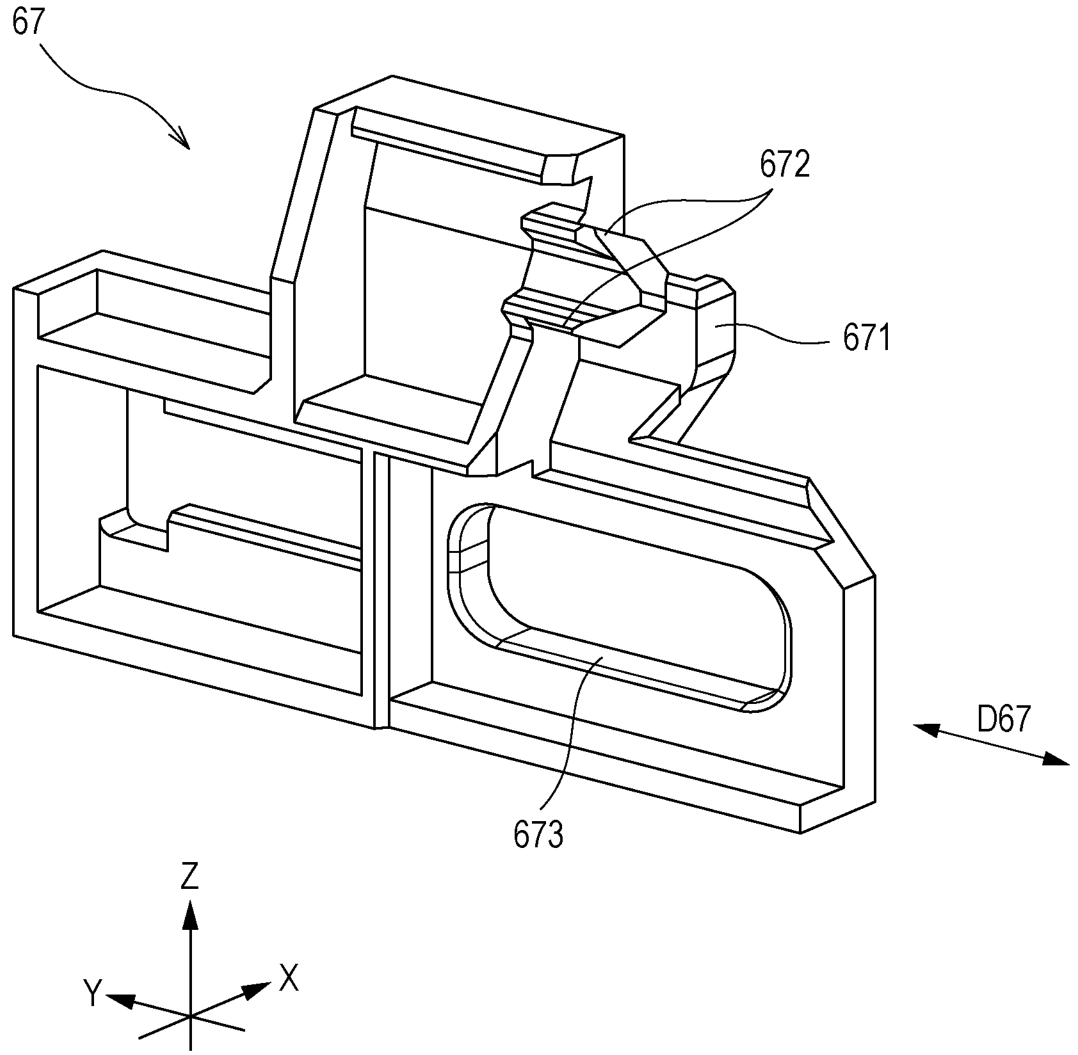
FIG. 16 is a perspective view of a lock member according to the first embodiment.
Figure 17A:
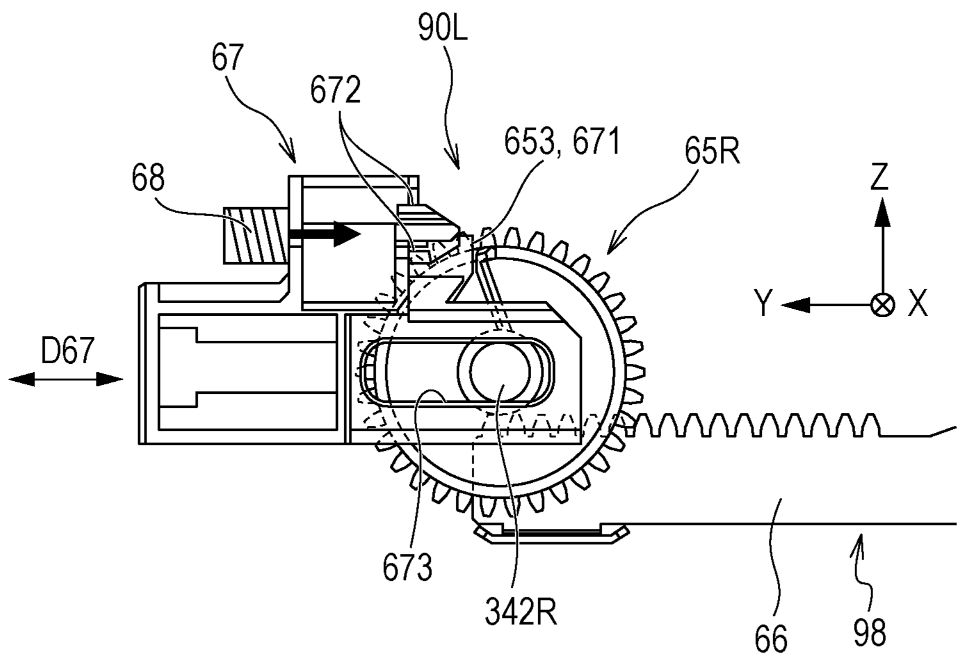
FIGS. 17A and 17B are views that illustrate a configuration related to a lock mechanism of the rotary body according to the first embodiment.
Figure 17B:
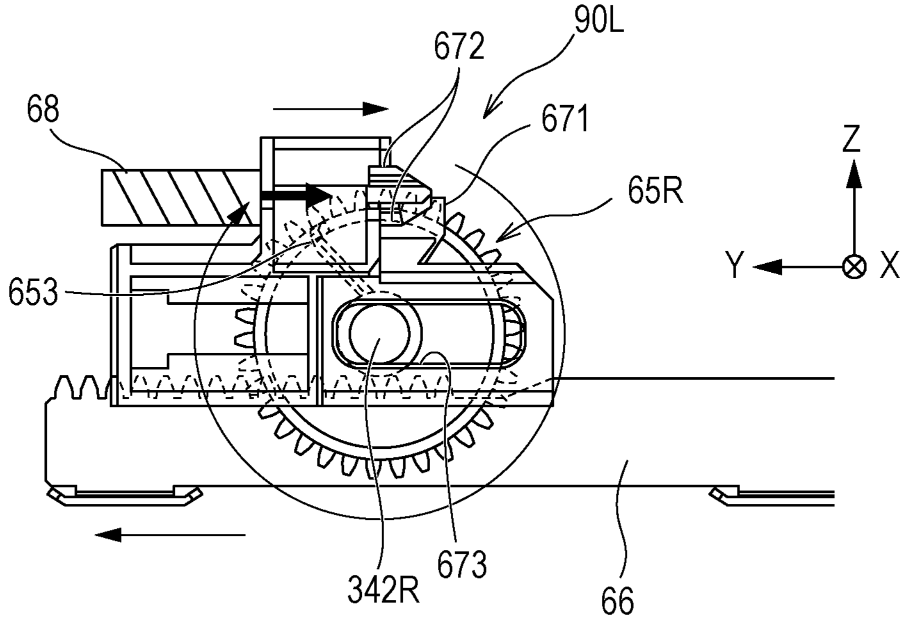
Figure 18A:
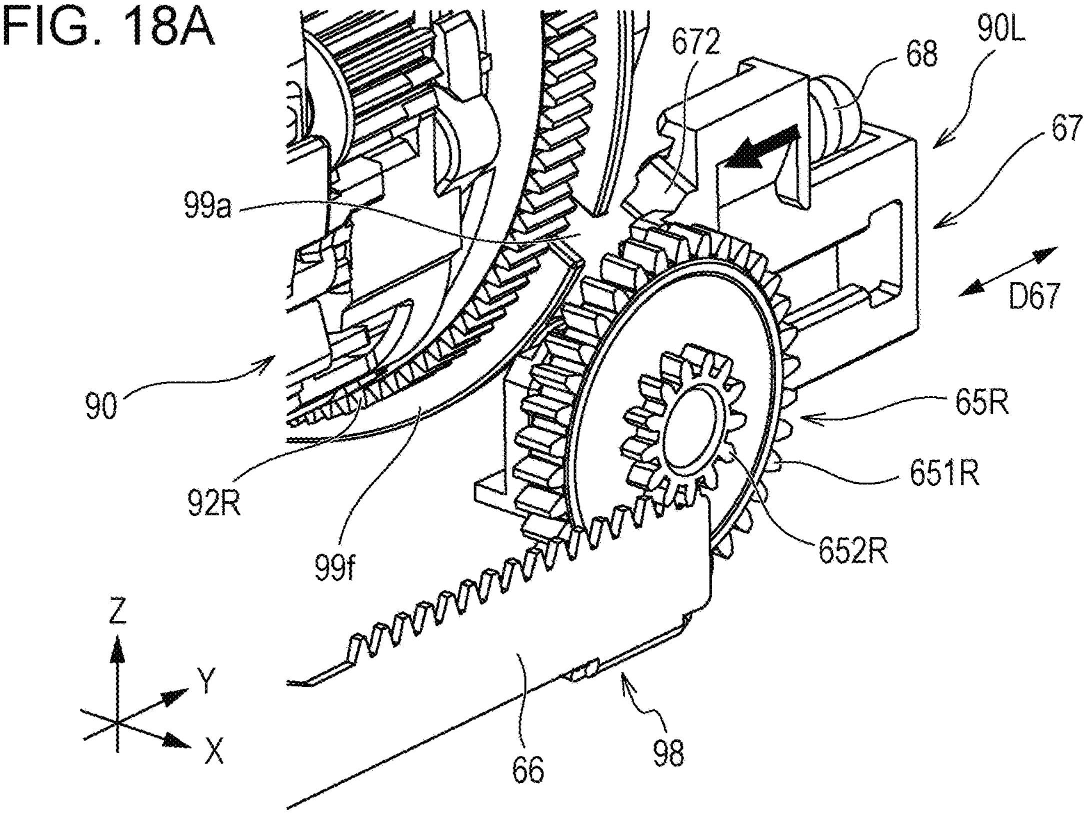
FIGS. 18A and 18B are views that illustrate the configuration related to the lock mechanism of the rotary body according to the first embodiment.
Figure 18B:
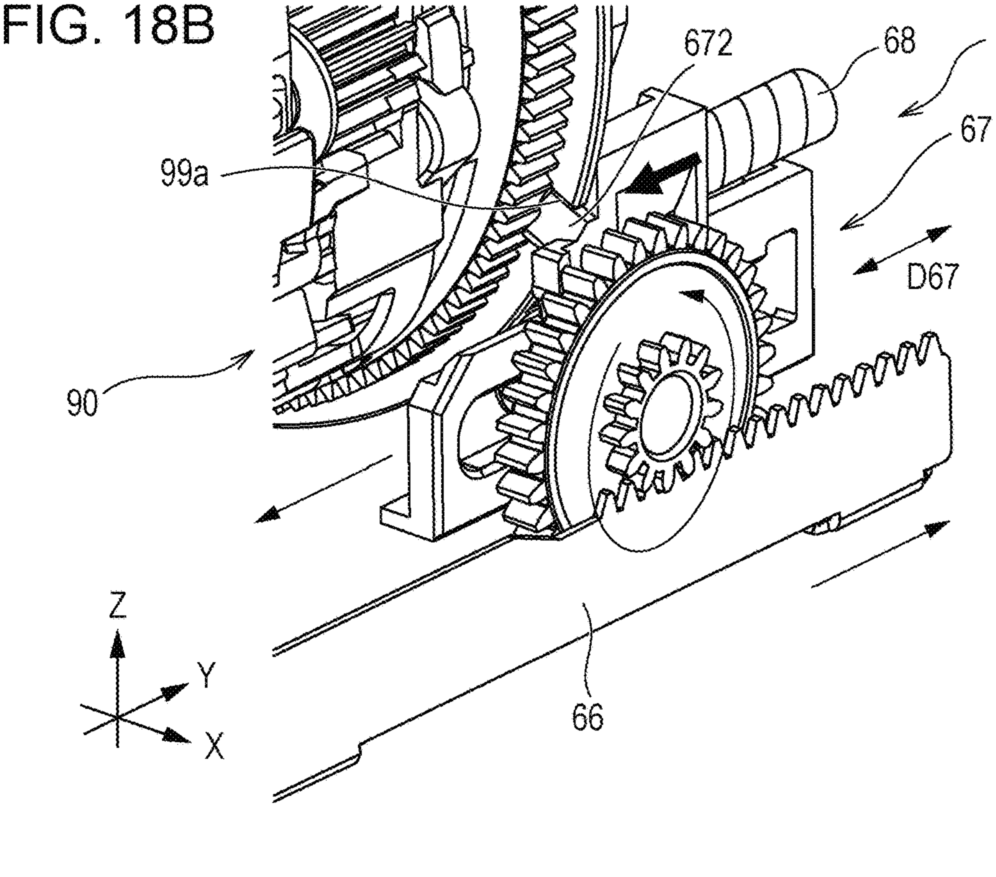

The lock mechanism 90L of the rotary body 90 will be described with reference to FIGS. 15A, 15B, 16, 17A, 17B, 18A, and 18B. FIGS. 15A and 15B are perspective views of the stepped gear 65R. FIG. 16 is a view showing the lock member 67. FIGS. 17A and 17B are views illustrating the configuration of the lock mechanism 90L. FIGS. 18A and 18B are perspective views of the configuration of the lock mechanism 90L.

As shown in FIGS. 15A, 15B, 16, 17A, 17B, 18A, and 18B, the lock mechanism 90L includes a pressing portion 653 provided on the stepped gear 65R, the lock member 67, an urging member 68, and an engaged portion 99*a* provided in the rotary body 90.

As shown in FIG. 15B, the pressing portion 653 is formed on the large-diameter gear 651R of the stepped gear 65R. As will be described later, the pressing portion 653 has a function to move the lock member 67 in conjunction with the ejection or insertion operation of the tray 80. Therefore, the lock member 67 can move in conjunction with the operation of the drive device 98 when the toner cartridge 70 is moved. In other words, the lock member 67 is moved by the driving force of the motor M2.

The pressing portion 653 is a protruding portion provided at a predetermined position in the rotation direction of the stepped gear 65R and extending radially outward from a boss portion 65*a*R of the stepped gear 65R. The boss portion 65*a*R is fitted to a support shaft 342R of a lower holding member 34R (FIG. 20B) (described later), with the result that the stepped gear 65R is rotatably supported by the lower holding member 34R.

In the present embodiment, the pressing portion 653 is provided on one-side (−X-side) side surface of the large-diameter gear 651R in the rotation axis direction of the stepped gear 65R, and the small-diameter gear 652R is provided on the other-side (+X-side) side surface of the large-diameter gear 651R. In the state viewed in the rotation axis direction of the stepped gear 65R, some teeth of the small-diameter gear 652R overlap the pressing portion 653.

As shown in FIG. 16, the lock member 67 has a pressed portion 671 pressed by the pressing portion 653 of the stepped gear 65R, and an engagement portion 672 that can engage with the engaged portion 99*a* of the rotary body 90. The lock member 67 is movably supported by the frame 16 of the apparatus body 1A. The lock member 67 of the present embodiment is capable of reciprocating in the moving direction D67 along the Y direction that is the moving direction of the connecting rack 66. The engagement portion 672 has a protruded shape that protrudes in one direction (−Y direction) of the moving direction D67.

The lock member 67 is movable between an engaged position (lock position) in which the engagement portion 672 is engaged with the engaged portion 99*a* of the rotary body 90 and a disconnected position (unlock position) in which the engagement portion 672 is disconnected from the engaged portion 99*a* of the rotary body 90.

The lock member 67 is configured to move in conjunction with the drive rack 15 (drive member) as will be described below. The lock member 67 of the present embodiment is connected to the connecting rack 66 (rack member) serving as a transmitting unit that transmits force to actuate the right and left drive racks 15R, 15L (first drive member, second drive member), and is in conjunction with the drive racks 15R, 15L via the connecting rack 66.

The lock member 67 has an elongated hole 673 formed in the moving direction D67. When the elongated hole 673 is engaged with the support shaft 342R of the lower holding member 34R (FIG. 20B), the lock member 67 is guided to move in the moving direction D67 relative to the lower holding member 34R. In other words, the support shaft 342R that holds the stepped gear 65R also functions as a guide portion that guides the lock member 67.

As shown in FIG. 18A, the urging member 68 urges the lock member 67 toward any one side of the moving direction D67. The urging member 68 of the present embodiment urges the lock member 67 in a direction from the unlock position toward the lock position (in the −Y direction). The urging member 68 is a compression spring disposed between, for example, a spring receiving surface of the lock member 67 and a spring receiving surface provided on the frame 16 of the apparatus body 1A.

As shown in FIG. 18A, the rotary body 90 includes a number (four in the present embodiment) of the engaged portions 99*a*, corresponding to the number of the trays 80. The engaged portions 99*a* of the present embodiment are formed in a flange portion 99*f* provided at the end of the rotary body 90 in the rotation axis direction (Y direction) of the rotary body 90. The flange portion 99*f* projects outward from a disk gear 92R (see also FIG. 5) in the radial direction (the radial direction of the rotary body 90) with respect to the rotation axis 90C.

The engaged portions 99*a* are provided at positions in the rotation direction of the rotary body 90. The positions correspond to the replacement postures that the rotary body 90 can take. In the present embodiment, four engaged portions 99*a* (99*ay*, 99*am*, 99*ac*, 99*ak*) respectively corresponding to the yellow, magenta, cyan, and black replacement postures are disposed at equal intervals of 90 degrees in the rotation direction (see FIGS. 20A and 20B). When the rotary body 90 is viewed in the rotation axis direction of the rotary body 90 in the state where the rotary body 90 is in any one of the replacement postures, one of the engaged portions 99*a* overlaps the engagement portion 672 of the lock member 67.

When the engagement portion 672 of the lock member 67 engages with the engaged portion 99*a* of the rotary body 90, the rotation of the rotary body 90 is restricted. The state of the lock mechanism 90L when the engagement portion 672 of the lock member 67 is engaged with any one of the engaged portions 99*a* of the rotary body 90 is referred to as a locked state. The state of the lock mechanism 90L when the engagement portion 672 of the lock member 67 is disconnected from all the engaged portions 99*a* of the rotary body 90 is referred to as an unlocked state. The locked state is the state where the lock mechanism 90L restricts the rotation of the rotary body 90 around the rotation axis 90C, and the unlocked state is the state where the lock mechanism 90L allows the rotation of the rotary body 90 around the rotation axis 90C. In the locked state, the lock mechanism 90L restricts the rotation of the rotary body 90 around the rotation axis 90C in the first direction and in the second direction opposite to the first direction.

The operation of the lock mechanism 90L to switch from the unlocked state to the locked state is referred to as locking operation, and the operation of the lock mechanism 90L to switch from the locked state to the unlocked state is referred to as unlocking operation. The locking operation and the unlocking operation are performed in conjunction with the ejection and insertion operations of the tray 80.

FIGS. 17A and 18A show the lock mechanism 90L in the unlocked state. FIGS. 17B and 18B show the lock mechanism 90L in the locked state. Hereinafter, the operation of the lock mechanism 90L will be described in detail.

As described earlier, when the tray 80 is at the storage position, the rotary body 90 is rotatable. In other words, the engagement portion 672 of the lock member 67 is disconnected from the engaged portions 99*a* of the rotary body 90, and the lock mechanism 90L is in the unlocked state (FIGS. 17A and 18A). During the process in which the tray 80 moves from the storage position to the eject position, the engagement portion 672 of the lock member 67 engages with the engaged portion 99*a* of the rotary body 90. In other words, during the process of the tray ejection operation, the lock mechanism 90L switches from the unlocked state to the locked state (FIGS. 17B and 18B).

As shown in FIG. 17A, when the rotary body 90 is in any one of the yellow, magenta, cyan, and black replacement postures and the tray 80 is at the storage position, the lock member 67 is held at the disconnected position by the pressing portion 653 of the stepped gear 65R. In other words, the pressing portion 653 of the stepped gear 65R contacts the pressed portion 671 of the lock member 67 to prevent the lock member 67 from moving in the urging direction of the urging member 68 (−Y direction). At this time, as shown in FIG. 18A, the engagement portion 672 of the lock member 67 is placed at a position away from the engaged portion 99*a* of the rotary body 90 in the +Y direction.

In this way, when the rotary body 90 is in any one of the yellow, magenta, cyan, and black replacement postures and the toner cartridge 70 corresponding to the posture of the rotary body 90 is at the mounting position, the lock mechanism 90L is maintained in the unlocked state.

Next, the case where the tray 80 is moved from the storage position to the eject position (when the tray ejection operation is performed) will be described. When the tray 80 is moved from the storage position toward the eject position, the connecting rack 66 moves to the left side in the drawing (to the right side of the apparatus body 1A, in the +Y direction) as shown in FIG. 17B. The stepped gear 65R rotates clockwise in the drawing under the driving force from the connecting rack 66. Then, the pressing portion 653 of the stepped gear 65R rotates to move in the direction to retract from the pressed portion 671 of the lock member 67 (to the left side of the apparatus body 1A, in the −Y direction). As the pressing portion 653 rotates to move, the lock member 67 moves to the right side in the drawing (in the −Y direction) due to the urging force of the urging member 68, and, as shown in FIG. 18B, the engagement portion 672 of the lock member 67 engages with the engaged portion 99*a* of the rotary body 90. In other words, when the pressing portion 653 retracts from the lock member 67, the lock member 67 is moved from the disconnected position (unlock position) to the engaged position (lock position).

In this way, in the state where the rotary body 90 is in any one of the yellow, magenta, cyan, and black replacement postures, when the corresponding toner cartridge 70 is moved from the mounting position to the retreat position, the lock mechanism 90L switches from the unlocked state to the locked state.

After the engagement portion 672 engages with the engaged portion 99*a*, the pressing portion 653 of the stepped gear 65R separates from the pressed portion 671 of the lock member 67. The rotation angle of the stepped gear 65R during the period from the start to the end of the tray ejection operation is set to smaller than 360°, and the pressing portion 653, which is separated from the pressed portion 671 in the middle of the tray ejection operation, is configured not to collide with the pressed portion 671 until the end of the tray ejection operation.

As shown in FIG. 18A, when the rotary body 90 is in any one of the yellow, magenta, cyan, and black replacement postures and the tray 80 is at the eject position, the lock member 67 is held at the engaged position by the urging force of the urging member 68. In other words, when the rotary body 90 is in any one of the yellow, magenta, cyan, and black replacement postures and the corresponding toner cartridge 70 is at the retreat position, the lock mechanism 90L is maintained in the locked state.

The operation of each element of the lock mechanism 90L when the tray 80 is moved from the eject position to the storage position (when the tray insertion operation is performed) is reverse to when the tray 80 is moved from the storage position to the eject position. In other words, the connecting rack 66 moves to the right in FIG. 17B (to the left side of the apparatus body 1A, in the −Y direction). The stepped gear 65R rotates counterclockwise in the drawing under the driving force from the connecting rack 66. Then, the pressing portion 653 of the stepped gear 65R contacts the pressed portion 671 of the lock member 67 to push in the lock member 67 in the direction (+Y direction) opposite to the urging direction of the urging member 68. As a result, the lock member 67 moves to the left side in the drawing (in the +Y direction) in FIG. 17A against the urging force of the urging member 68, and, as shown in FIG. 18A, the engagement portion 672 of the lock member 67 disconnects from the engaged portion 99*a* of the rotary body 90.

In this way, in the state where the rotary body 90 is in any one of the yellow, magenta, cyan, and black replacement postures, when the corresponding toner cartridge 70 is moved from the retreat position to the mounting position, the lock mechanism 90L switches from the locked state to the unlocked state.

Here, as will be described later with reference to FIGS. 22A to 22D, when the tray ejection operation is performed, the drive rack 15 (drive member) is configured to start moving from a position away from the pinion 94 (lower position) toward the pinion 94. The lock mechanism 90L of the present embodiment is configured such that, during the process of the tray ejection operation, the lock mechanism 90L switches from the unlocked state to the locked state and then the drive rack 15 meshes with the pinion 94. In other words, the lock mechanism 90L switches from the unlocked state to the locked state after the drive rack 15 (drive member) starts moving from a position away from the pinion 94 (driven unit) toward the pinion 94 and before the drive rack 15 contacts the pinion 94.

As a result, the drive rack 15 meshes with the pinion 94 in the state where the rotation of the rotary body 90 is restricted (in other words, the state where positional deviation of the pinion 94 is suppressed). Thus, it is possible to achieve further reliable meshing of the drive rack 15 with the pinion 94.

The lock mechanism 90L of the present embodiment is configured to switch from the locked state to the unlocked state after the meshing of the drive rack 15 with the pinion 94 is released during the process in which the tray 80 moves from the eject position to the storage position. Thus, it is possible to reduce the possibility of positional deviation in the rotation direction of the rotary body 90 due to the force received by the pinion 94 from the drive rack 15.

In the present embodiment, the configuration that the drive device 98 (transmission device) for moving the toner cartridge 70 between the mounting position and the retreat position mechanically operates in conjunction with the lock mechanism 90L has been illustrated. Not limited to this configuration, a lock mechanism that does not mechanically operate in conjunction with the drive device 98 (transmission device) and that switches between the locked state and the unlocked state based on an instruction from the control unit 30 (FIG. 2) may be used.

Regulation of Gear Clearance between Pinion and Drive Rack

Next, the configuration to suppress the variation in gear clearance between the pinion 94 and the drive rack 15 (hereinafter, which may be simply referred to as gear clearance) will be described. If there is variation in the gear clearance, the meshing between the drive rack 15 and the pinion 94 may become shallow, and in some cases, tooth skipping may occur. Therefore, it is desirable to suppress variation in the gear clearance.

The gear clearance between the pinion 94 and the drive rack 15 is the distance between the pitch circle of the pinion 94 and the pitch line of the rack portion of the drive rack 15 meshing with the pinion 94 when viewed in the rotation axis direction of the pinion 94. The pitch circle referred to here is a circle that is a reference for the shape of the gear (reference pitch circle). The pitch line referred to here is a straight line on a plane (reference plane) that is a reference for the shape of the rack.

The configuration for regulating the gear clearance will be described with reference to FIGS. 19A to 19D, 20A, 20B, 21A, 21B, 22A to 22D, and 23.

Figure 19A:
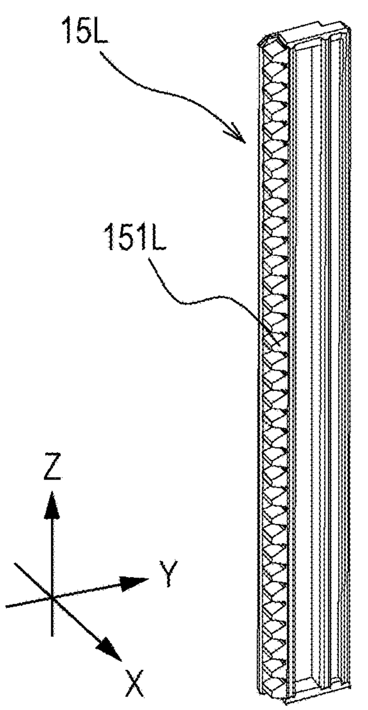
FIGS. 19A to 19D are perspective views of a drive rack according to the first embodiment.
Figure 19B:
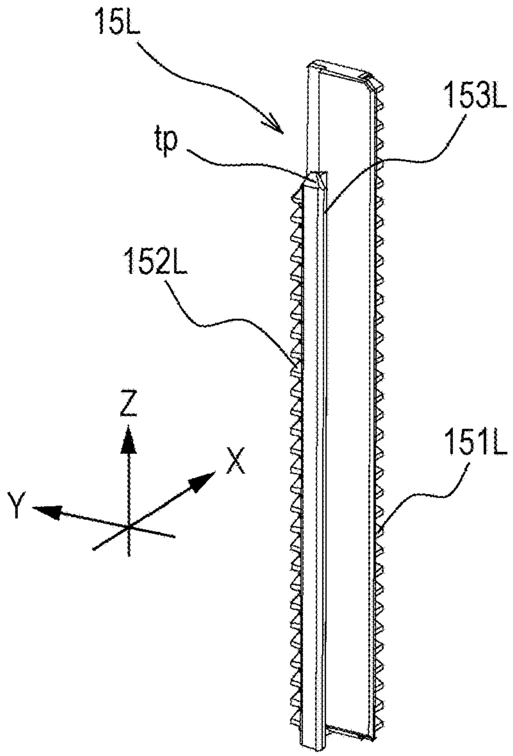
Figure 19C:
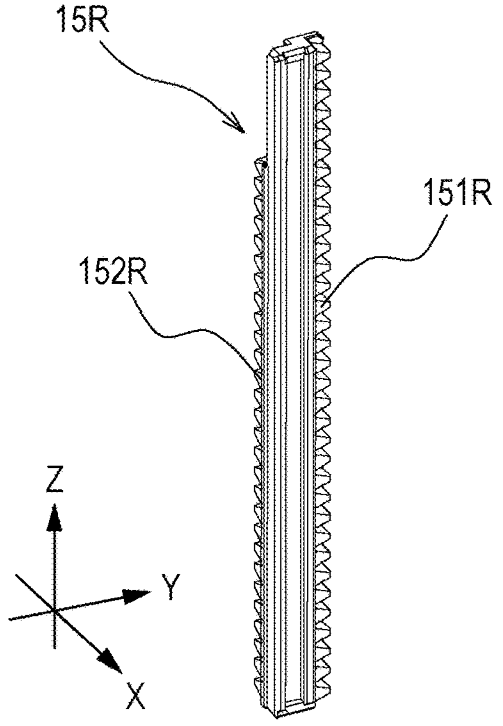
Figure 19D:
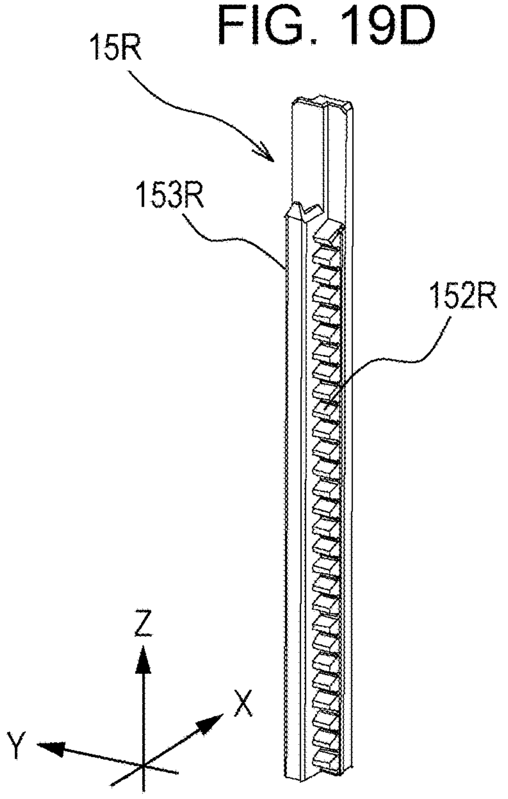

FIGS. 19A and 19B are perspective views of the drive rack 15L. FIGS. 19C and 19D are perspective views of the drive rack 15R.

As shown in FIGS. 19A and 19B, the drive rack 15L has an input rack portion 151L, an output rack portion 152L, and an engagement portion 153L. The input rack portion 151L has a rack shape for meshing with the drive rack input gear 64L to receive (input) the driving force from the motor M2. The output rack portion 152L has a rack shape for meshing with any one of the pinions 94 (94*y*L to 94*k*L) to transmit (output) the driving force from the motor M2 to the pinion 94. The input rack portion 151L and the output rack portion 152L each are formed such that a plurality of teeth is arranged in the Z direction that is the sliding direction of the drive rack 15L. When viewed in the Z direction, the protruding direction of the teeth of the input rack portion 151L and the protruding direction of the teeth of the output rack portion 152L are perpendicular. The engagement portion 153L will be described later.

As shown in FIGS. 19C and 19D, the drive rack 15R, as in the case of the drive rack 15L, has an input rack portion 151R, an output rack portion 152R, and an engagement portion 153R. The input rack portion 151R has a rack shape for meshing with the drive rack input gear 64R to receive (input) the driving force from the motor M2. The output rack portion 152R has a rack shape for meshing with any one of the pinions 94 (94*y*R to 94*k*R) to transmit (output) the driving force from the motor M2 to the pinion 94. The input rack portion 151R and the output rack portion 152R each are formed such that a plurality of teeth is arranged in the Z direction that is the sliding direction of the drive rack 15R. When viewed in the Z direction, the protruding direction of the teeth of the input rack portion 151R and the protruding direction of the teeth of the output rack portion 152R are perpendicular. The engagement portion 153R will be described later.

The output rack portions 152R, 152L are examples of a force transmitting portion configured to transmit the driving force by engaging with the pinion 94 serving as the driven unit. The engagement portions 153R, 153L have a function to restrict the relative movement (movement relative to each other) of the drive racks 15R, 15L (drive members) and the rotary body 90 (rotary) such that the output rack portions 152R, 152L (force transmitting portions) separate from the pinions 94 (driven units).

The driven units of the present embodiment include the pinion 94 (94*y*L to 94*k*L) serving as a first force receiving portion provided at one end of the rotary body 90 in the rotation axis direction of the rotary body 90, and the pinion 94 (94*y*R to 94*k*R) serving as a second force receiving portion provided at the other end of the rotary body. The drive members of the present embodiment include the drive rack 15L serving as a first force application member that engages with the first force receiving portion, and the drive rack 15R serving as a second force application member that engages with the second force receiving portion. The output rack portion 152R (force transmitting portion) and the engagement portion 153R are provided in the drive rack 15R. The output rack portion 152L (force transmitting portion) and the engagement portion 153L are provided in the drive rack 15L.

Figure 20A:
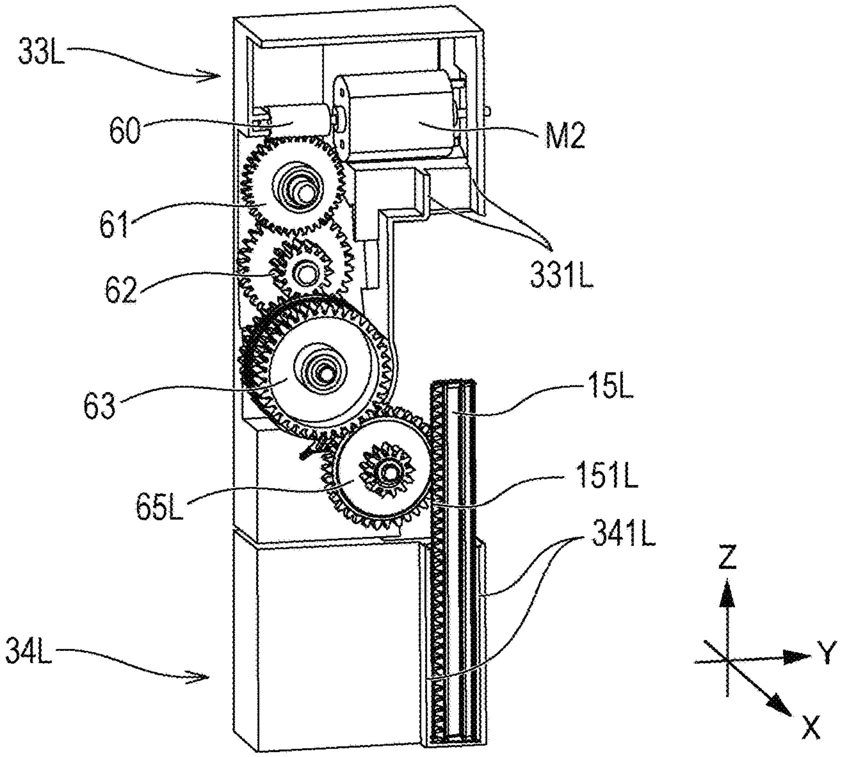
FIGS. 20A and 20B are perspective views of a configuration related to holding of the drive rack according to the first embodiment.
Figure 20B:
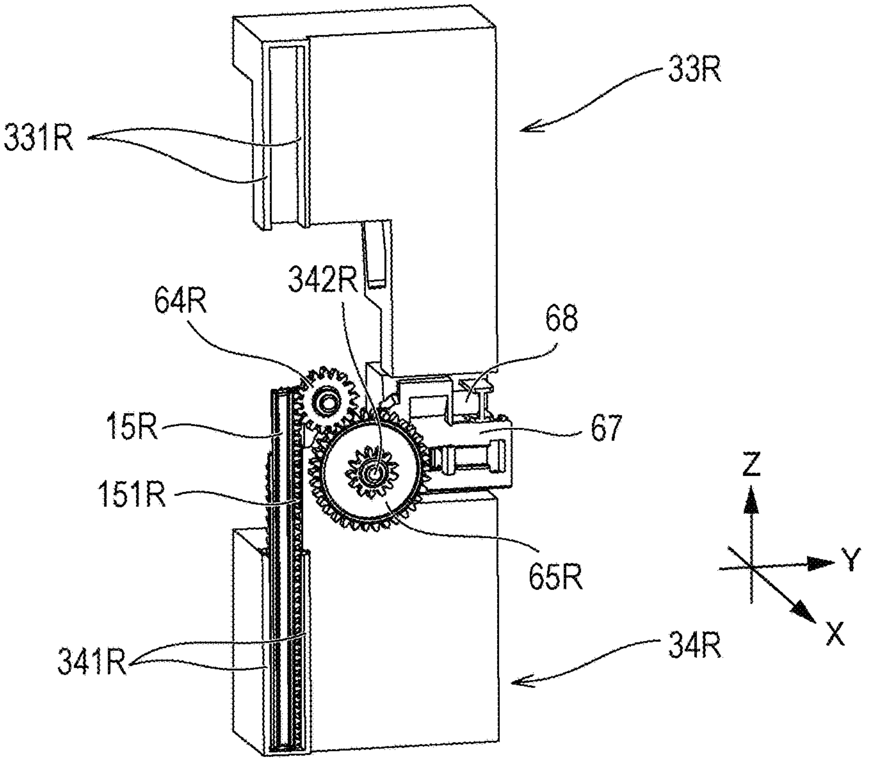

FIGS. 20A and 20B are views showing the holding configuration of the drive racks 15R, 15L. FIG. 20A shows the holding configuration of the drive rack 15L. FIG. 20B shows the holding configuration of the drive rack 15R.

As shown in FIGS. 20A and 20B, the drive rack 15L is held so as to be slidable by the lower holding member 34L and an upper holding member 33L provided in the apparatus body 1A. The drive rack 15R is held so as to be slidable by the lower holding member 34R and an upper holding member 33R provided in the apparatus body 1A. The lower holding members 34R, 34L and the upper holding members 33R, 33L are members fixed to the frame 16 of the apparatus body 1A.

More specifically, as shown in FIG. 20A, the drive rack 15L is supported so as to be slidable in the up and down direction (Z direction) of the apparatus body 1A by a lower guide portion 341L of the lower holding member 34L. When the drive rack 15L moves from the position in FIG. 20A upward (+Z direction) of the apparatus body 1A, the drive rack 15L is supported so as to be slidable by an upper guide portion 331L of the upper holding member 33L.

The lower guide portion 341L and the upper guide portion 331L of the present embodiment have a groove shape formed in the sliding direction of the drive rack 15L. The width of the groove shape in the direction (here, the Y direction) that crosses the sliding direction of the drive rack 15L corresponds to the width of the drive rack 15L. Therefore, it is possible to suppress the positional deviation of the drive rack 15L in the direction that crosses the sliding direction. The upper holding member 33L supports the motor M2 and also supports the stepped gears 61, 62, the idle gear 63, and the stepped gear 65L such that they are rotatable.

As shown in FIG. 20B, the drive rack 15R is supported so as to be slidable in the up and down direction (Z direction) of the apparatus body 1A by a lower guide portion 341R of the lower holding member 34R. When the drive rack 15R moves from the position in FIG. 20B upward (+Z direction) of the apparatus body 1A, the drive rack 15R is supported so as to be slidable by an upper guide portion 331R of the upper holding member 33R.

The lower guide portion 341R and the upper guide portion 331R of the present embodiment have a groove shape formed in the sliding direction of the drive rack 15R. The width of the groove shape in the direction (here, the Y direction) that crosses the sliding direction of the drive rack 15R corresponds to the width of the drive rack 15R. Therefore, it is possible to suppress the positional deviation of the drive rack 15L in the direction that crosses the sliding direction. The lower holding member 34R supports the stepped gear 65R and the drive rack input gear 64R such that they are rotatable, and also supports the lock member 67 such that the lock member 67 is slidable in the right and left direction (Y direction) of the apparatus body 1A.

Figure 21A:
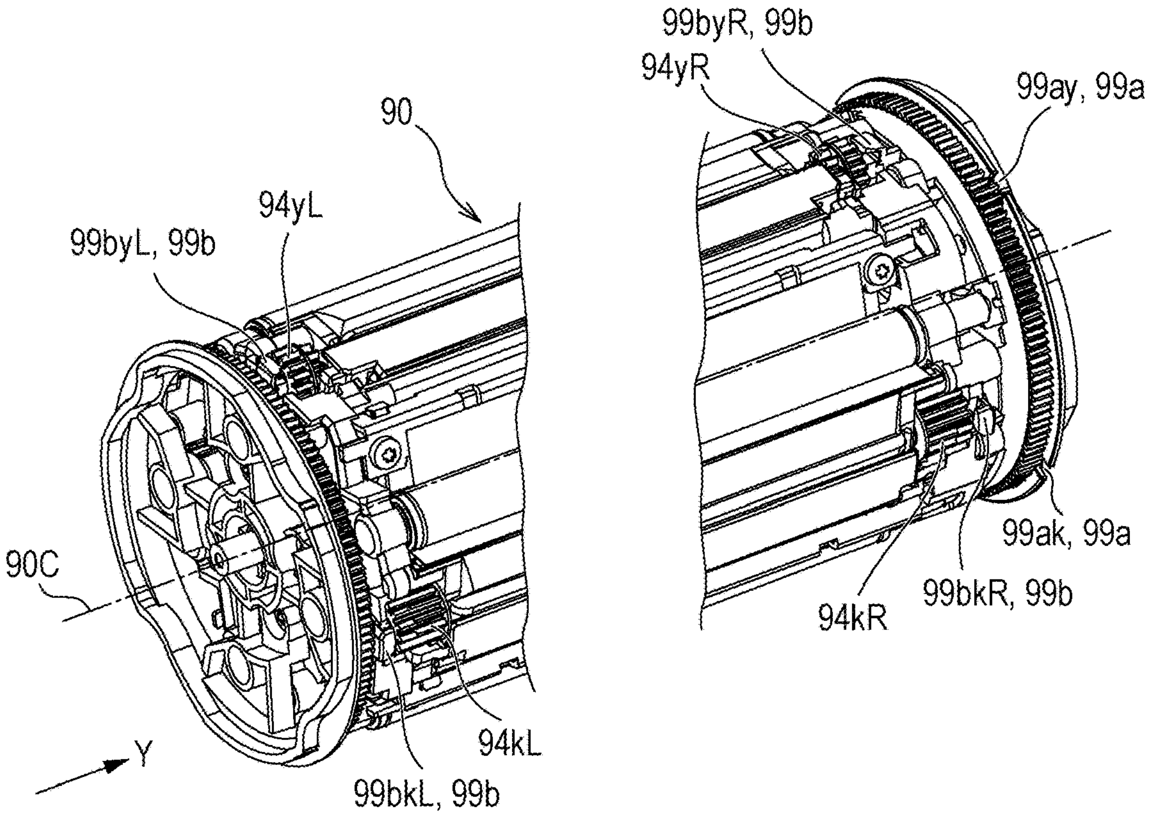
FIGS. 21A and 21B are perspective views of the rotary body according to the first embodiment.
Figure 21B:
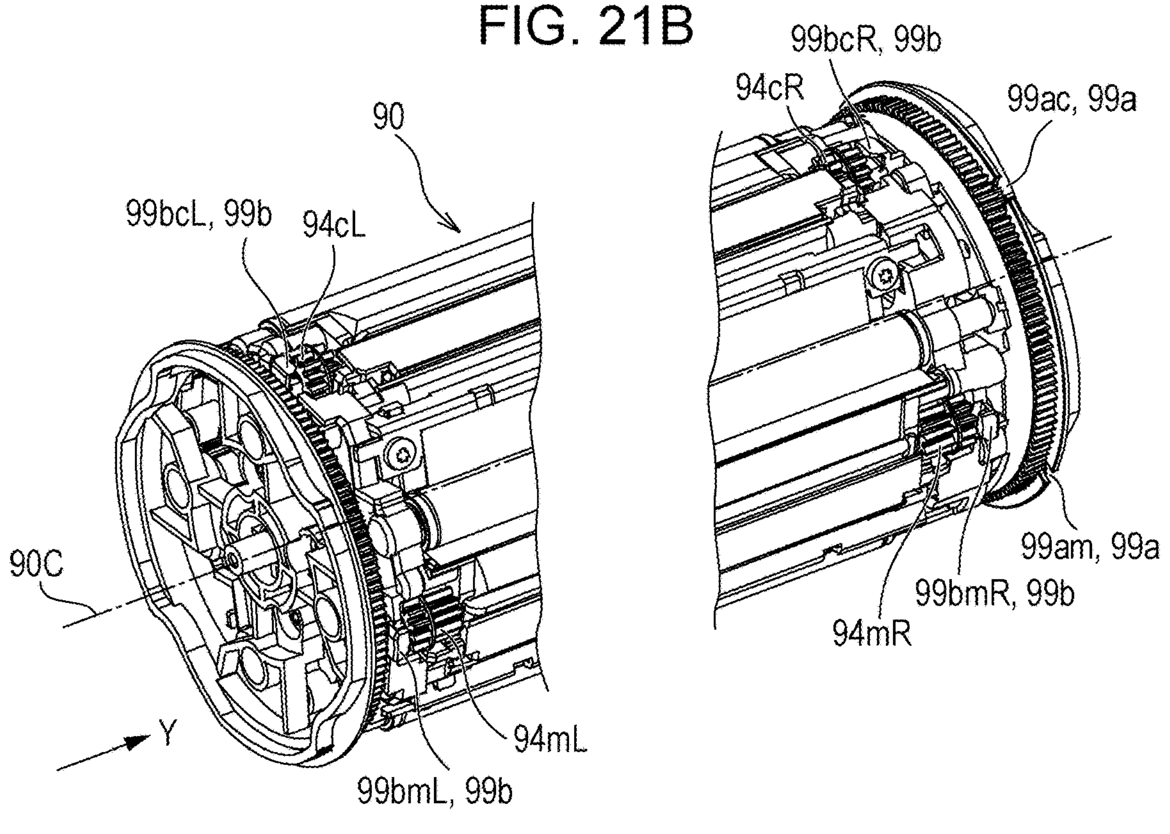

FIGS. 21A and 21B are perspective views of the rotary body 90. FIG. 21B shows the state where the rotary body 90 of FIG. 21A is rotated 180° around the rotation axis 90C.

The center area of the rotary body 90 in the Y direction is not shown in FIGS. 21A and 21B.

As shown in FIGS. 21A and 21B, the engaged portion 99*b* is provided one by one near each of the pinions 94 of the rotary body 90. In other words, the rotary body 90 includes an engaged portion 99*by*L corresponding to the pinion 94*y*L, an engaged portion 99*bm*L corresponding to the pinion 94*m*L, an engaged portion 99*bc*L corresponding to the pinion 94*c*L, and an engaged portion 99*bk*L corresponding to the pinion 94*k*L. The rotary body 90 includes an engaged portion 99*by*R corresponding to the pinion 94*y*R, an engaged portion 99*bm*R corresponding to the pinion 94*m*R, an engaged portion 99*bc*R corresponding to the pinion 94*c*R, and an engaged portion 99*bk*R corresponding to the pinion 94*k*R. The left-side four engaged portions 99*by*L to 99*bk*L are disposed at intervals of 90° around the rotation axis 90C, and the right-side four engaged portions 99*by*R to 99*bk*R are disposed at intervals of 90° around the rotation axis 90C.

Each of the left-side engaged portions 99*by*L to 99*bk*L is an example of a first engaged portion engaged with the engagement portion 153L of the drive rack 15L serving as the first force applying member. Each of the right-side engaged portions 99*by*R to 99*bk*R is an example of a second engaged portion that engages with the engagement portion 153R of the drive rack 15R serving as the second force application member.

FIGS. 22A to 22D are views illustrating the configuration related to the regulation of the gear clearance. The left-side view of each of FIGS. 22A to 22D is a cross section orthogonal to the rotation axis C of the rotary body 90. The right-side view of each of FIGS. 22A to 22D is a perspective view of the left side of the rotary body 90. In the right-side view (perspective view) of each of FIGS. 22A to 22C, the pinion 94*k*L is not shown.

Hereinafter, the operation of the drive rack 15 and the pinion 94*k* in the tray ejection operation of the tray 80*k* will be described. Here, the operation of the drive rack 15 and each of the pinions 94*y* to 94*c* in the tray ejection operation of a corresponding one of the trays 80*y* to 80*c* is substantially similar to the operation of the drive rack 15 and the pinion 94*k*, so the description is omitted. The following description will be performed by using the drive rack 15L and the pinion 94*k*L disposed at the left side of the apparatus body 1A. The operation of the drive rack 15R and the pinion 94*k*R disposed at the right side of the apparatus body 1A is substantially similar to the operation of the drive rack 15L and the pinion 94*k*L, so the description is omitted.

The lower-side (−Z-side) end position of the apparatus body 1A in the range in which the drive rack 15L is slidable is referred to as the lower position of the drive rack 15L. The upper-side (+Z-side) end position of the apparatus body 1A in the range in which the drive rack 15L is slidable is referred to as the upper position of the drive rack 15L. During the process in which the drive rack 15L moves from the lower position toward the upper position, the position of the drive rack 15L when the output rack portion 152L of the drive rack 15L first contacts the teeth of the pinion 94*k* is referred to as a meshing start position. During the process in which the drive rack 15L moves from the lower position to the upper position, the position of the drive rack 15L when the engagement portion 153L of the drive rack 15L starts engaging with the engaged portion 99*bk*L of the rotary body 90 is referred to as an engagement start position.

Figure 22A:
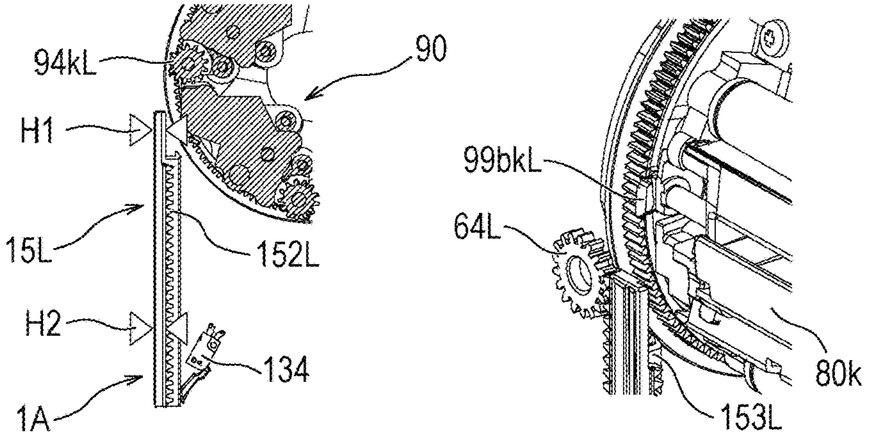
FIGS. 22A to 22D are views that illustrate a configuration related to regulation of a gear clearance according to the first embodiment.
Figure 22B:
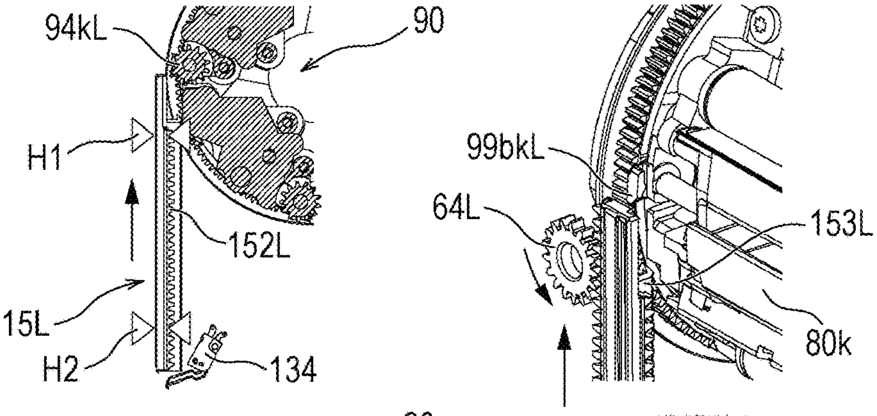

FIG. 22A shows the state of the drive rack 15L in the case where the tray 80*k* is at the storage position. In this case, the drive rack 15L is at the lower position. The output rack portion 152L is not in mesh with the pinion 94*k*L. In other words, the lower position of the drive rack 15L is a position (disengaged position) at which the output rack portion 152L (force transmitting portion) of the drive rack 15L is away from the pinion 94*k*L (driven unit). The engagement portion 153L of the drive rack 15L is not engaged with the engaged portion 99*bk*L of the rotary body 90.

When the drive rack 15L is at the lower position, the drive rack 15L is positioned in the front and rear direction (X direction) of the apparatus body 1A at two locations, that is, a support portion H1 (first support portion) and a support portion H2 (second support portion). In other words, the support portions H1, H2 restrict the movement of the drive rack 15L (drive member) in a direction to separate from the rotary body 90 (rotary). The support portions H1, H2 are provided on the frame 16 of the apparatus body 1A (main body frame) to support the drive rack 15L (drive member). The support portions H1, H2 are disposed at positions spaced apart from each other in the moving direction of the drive rack 15L. Because the movement of the drive rack 15L in the front and rear direction (X direction) of the apparatus body 1A is restricted at least at two locations spaced apart in the up and down direction, the tilting of the drive rack 15L is also suppressed.

In the present embodiment, the support portions H1, H2 are provided on the lower guide portion 341L of the lower holding member 34L (FIG. 20A). Alternatively, the support portions H1, H2 may be provided on another member. The support portions H1, H2, as in the case of the engaged portions 99*bk*L (FIG. 23), have a shape (hook shape) that engages with the engagement portion 153L of the drive rack 15L.

Subsequently, when the tray ejection operation is started, the drive rack 15L moves upward (in the +Z direction) of the apparatus body 1A. Then, in the state shown in FIG. 22B, the rotation of the rotary body 90 is restricted by the lock mechanism 90L. At this time, the output rack portion 152L of the drive rack 15L has not yet meshed with the pinion 94*k*L. The drive rack 15L is positioned in the front and rear direction (X direction) of the apparatus body 1A at two locations, that is, the support portions H1, H2.

Figure 22C:
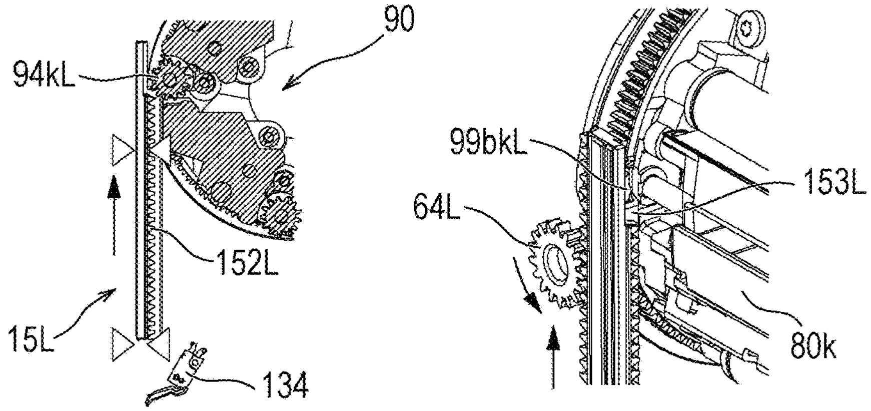

As the tray ejection operation progresses further, the drive rack 15L reaches the engagement start position at which the engagement portion 153L of the drive rack 15L engages with the engaged portion 99*bk*L of the rotary body 90 as shown in FIG. 22C. After that, the meshing of the output rack portion 152L of the drive rack 15L with the pinion 94*k*L starts.

In other words, by the time the output rack portion 152L meshes with the pinion 94*k*L, the engagement portion 153L of the drive rack 15L is engaged with the engaged portion 99*bk*L of the rotary body 90. In other words, the drive rack 15L (drive member) moves from the lower position (disengaged position) at which the output rack portion 152L (force transmitting portion) is away from the pinion 94*k*L (driven unit), in the direction in which the output rack portion 152L approaches the pinion 94*k*L. Then, after the drive rack 15L starts moving from the lower position, the engagement portion 153L engages with the rotary body 90 (rotary) before the output rack portion 152L engages with the pinion 94*k*L.

Figure 23:
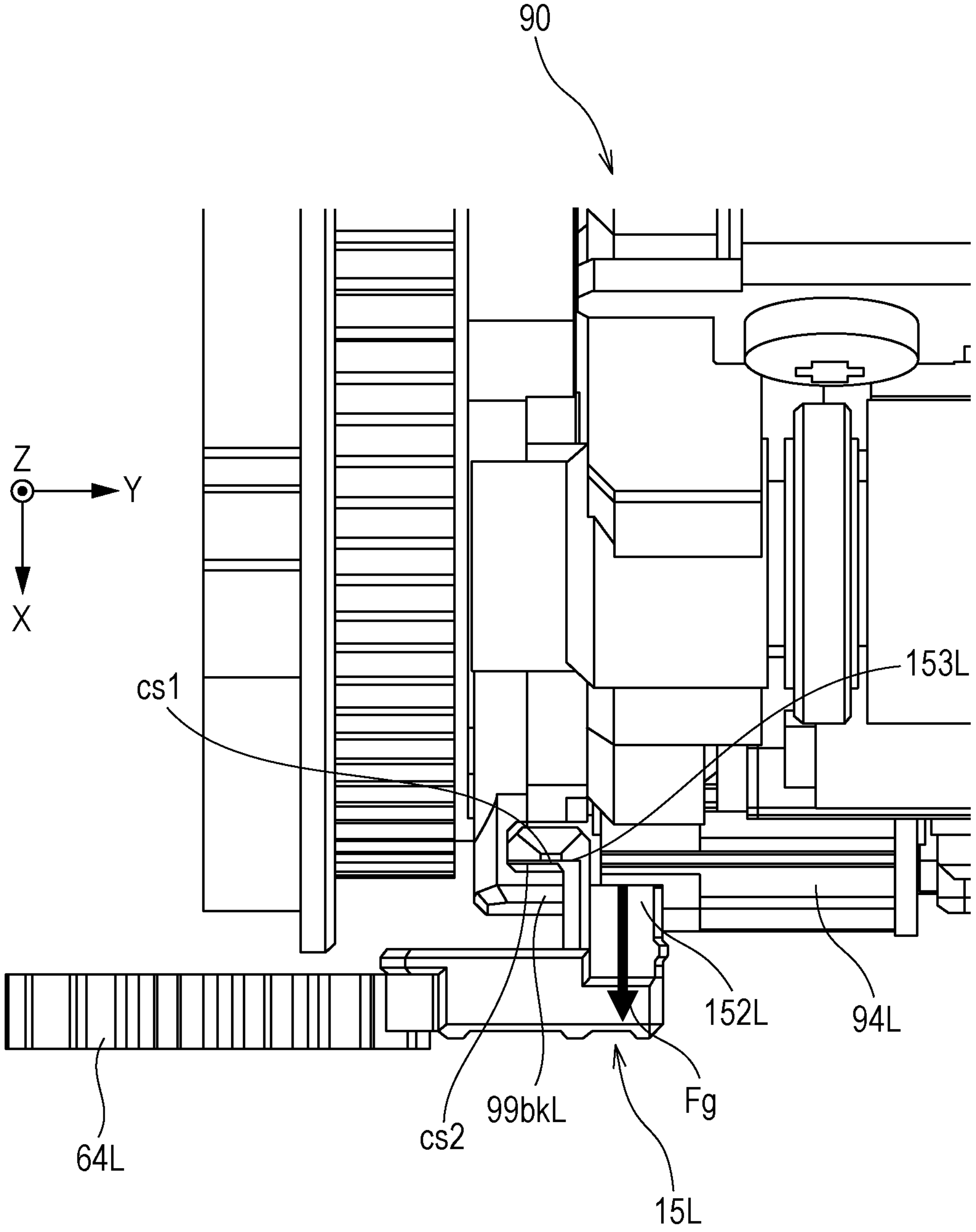
FIG. 23 is a view that illustrates the configuration related to regulation of the gear clearance according to the first embodiment.

FIG. 23 is a view of the configuration related to the regulation of the gear clearance between the pinion 94*k*L and the drive rack 15L when viewed from the upper side (+Z side) of the apparatus body 1A. As shown in FIG. 23, when the output rack portion 152L meshes with the pinion 94*k*L, the tooth surface of the output rack portion 152L receives the force Fg including the component in the direction of the arrow in the drawing (+X direction, the direction in which the gear tooth surfaces move away from each other) from the tooth surface of the pinion 94*k*L. In other words, when viewed in the sliding direction of the drive rack 15L, the drive rack 15L receives the force including the component in the direction (+X direction) to move away from the rotation axis of the pinion 94*k*L.

Here, as shown in FIG. 23, the engagement portion 153L of the drive rack 15L has a contact surface cs1 (first surface) facing in the direction away from the rotation axis of the pinion 94*k*L (+X direction). The engaged portion 99*bk*L of the rotary body 90 has a contacted surface cs2 (second surface) configured to face in the −X direction when the rotary body 90 is in the black replacement posture. As a result, when the engagement portion 153L engages with the engaged portion 99*bk*L, the drive rack 15L is restricted from moving in the +X direction relative to the rotary body 90. When the engagement portion 153L engages with the engaged portion 99*bk*L, the rotary body 90 is restricted from moving in the −X direction relative to the drive rack 15L.

When the contact surface cs1 contacts the contacted surface cs2, the relative movement between the drive rack 15L and the pinion 94*k*L to cause the drive rack 15L to move away from the rotation axis of the pinion 94*k*L in the orthogonal direction is restricted.

Figure 22D:
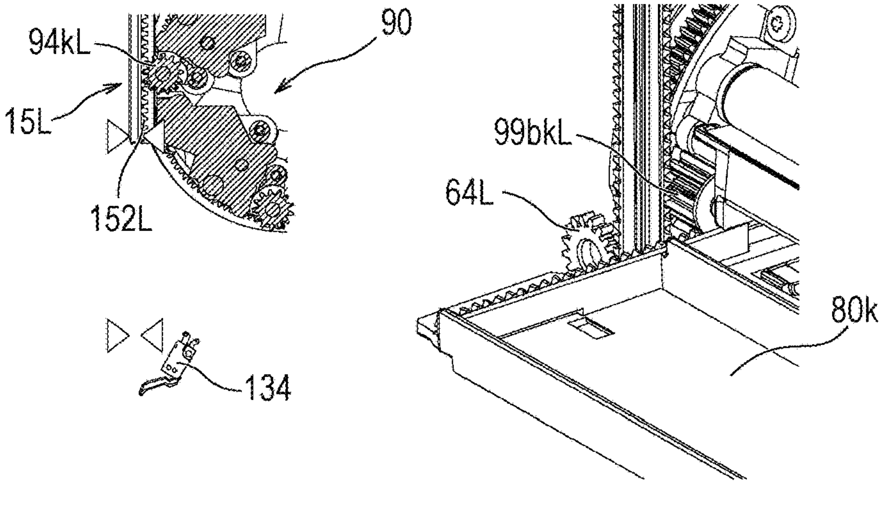

FIG. 22D shows the state of the drive rack 15L in the state where the tray 80*k* is at the eject position (the state after completion of the tray ejection operation). At this time, the drive rack 15L is at the upper position. The engagement of the engagement portion 153L of the drive rack 15L with the engaged portion 99*bk*L of the rotary body 90 is maintained. In other words, during the period from when the drive rack 15L passes through the engagement start position (FIG. 22C) to when the tray 80*k* reaches the eject position (FIG. 22D), the engagement of the engagement portion 153L of the drive rack 15L with the engaged portion 99*bk*L of the rotary body 90 is maintained.

Therefore, in the present embodiment, the engagement of the engagement portion 153L of the drive rack 15L with the engaged portion 99*bk*L of the rotary body 90 is maintained throughout the entire period of time during which the output rack portion 152L of the drive rack 15L is in mesh with the pinion 94*k*L in the tray ejection operation. It is possible to further suppress variation in gear clearance between the pinion 94kL and the drive rack 15L.

In the present embodiment, the lower end of the drive rack 15L is configured to pass through the lower-side support portion H2 before the drive rack 15L reaches the engagement start position with the engaged portion 99bkL (FIG. 22C). In other words, after the drive rack 15L starts moving from the lower position (disengaged position), the drive rack 15L disconnects from any one of the first support portion (H1) and the second support portion (H2) before the engagement portion 153L engages with the rotary body 90. The timing at which the lower end of the drive rack 15L passes through the lower-side support portion H2 may be just before the drive rack 15L reaches the engagement start position with the engaged portion 99bkL.

A tapered or other guiding portion (entry guide) can be provided at at least one of the upper end of the engagement portion 153L of the drive rack 15L and the entrance-side end (lower end in the posture of FIG. 21A) of the engaged portion 99bkL. In the present embodiment, a tapered guiding portion tp is provided at the upper end of the engagement portion 153L (FIG. 19B). By the time the lower end of the drive rack 15L passes through the lower-side support portion H2, the guiding portion tp can have entered the engaged portion 99bkL (the tip of the guiding portion tp can be above the lower end of the engaged portion 99bkL).

In the above description, the benefits of suppressing variation in gear clearance in the operation to move the tray 80k from the storage position to the eject position (tray ejection operation) have been described. However, there are similar benefits also in the operation to move the tray 80k from the eject position to the storage position (tray insertion operation).

Automatic Insertion Function when Tray Pushing Action Is Detected

When the tray 80k is at the eject position, a user is able to instruct the image forming apparatus 1 to perform the tray insertion operation by operating the operating unit (for example, buttons on the operating panel) of the apparatus body 1A. However, with the configuration that the tray 80k at the eject position is automatically pulled in to the storage position when the user pushes the tray 80k in, further intuitive operation is possible, so the operability improves.

Hereinafter, the function (automatic tray insertion function) to automatically start tray insertion operation by detecting that the user pushes the tray 80k in will be described with reference to FIGS. 24A, 24B, and 25A to 25E. "Automatically" means that the control unit 30 determines to execute the tray insertion operation in the state where the user has not explicitly provided an instruction to execute the tray insertion operation through the operating unit or the like. In the following description, the configuration to detect pushing action and the automatic insertion function for the tray 80k will be described; however, the image forming apparatus 1 also has substantially the same configuration to detect pushing action and automatic insertion function for the trays 80y to 80c.

To enable the control unit 30 to detect that the user pushes the tray 80k in, it is sufficient to provide a configuration that detects the movement of the tray 80k itself or the movement of a component that operates in conjunction with the tray 80k. In the present embodiment, as will be described below in detail, a sensor (tray eject sensor 135) that detects the rotation of the idle gear 63 serving as a member that operates in conjunction with the tray 80k is provided. The tray eject sensor 135 is an example of a detector configured such that a signal changes when the tray 80k (support member) supporting the toner cartridge 70k (cartridge) is moved from the eject position (second position) toward the storage position (first position). The signal output from the tray eject sensor 135 varies between the state where the tray 80k is at the eject position and the state where the tray 80k is at the storage position. The signal output from tray eject sensor 135 varies between the state where the toner cartridge 70k (cartridge) is at the mounting position and the state where the toner cartridge 70k (cartridge) is at the retreat position.

Incidentally, as described earlier, the drive system 100 of the tray 80k includes the motor M2 that is the drive source, and the drive transmission mechanism 101 that transmits the driving force of the motor M2 to the tray 80k (FIGS. 13A and 13B). The drive transmission mechanism 101 includes the worm gear 60 and the gears 61, 62, 65R, 65L as a speed reduction mechanism that can reduce and transmit the rotation speed (angular velocity) of the output shaft of the motor M2 to downstream drive transmission elements. With the speed reduction mechanism, the motor M2 with a small output power can be used to perform the tray insertion operation. In other words, with the speed reduction mechanism, a small-size motor can be used as the drive source, with the result that it is possible to achieve downsizing and cost reduction of the apparatus body 1A.

Here, when the user attempts to push the tray 80k in at the eject position, the user's pushing force is transmitted toward the upstream side (the motor M2 side) through the drive transmission elements of the drive transmission mechanism 101. If the motor M2 is configured to rotate in conjunction with the pushing-in of the tray 80k, pushing force used to move the tray 80k increases due to the load to rotate the motor M2 in a stopped state. Particularly, in the case of the configuration that the force of the motor M2 is transmitted to the tray 80k through the speed reduction mechanism, the force for pushing the tray 80k in to rotate the motor M2 further increases. When the speed reduction mechanism includes a worm gear like the present embodiment, the worm gear self-locks even when the user attempts to push the tray 80k in, so the motor M2 cannot be reversed. In this case, the user cannot basically push the tray 80k in.

Therefore, in the present embodiment, the idle gear 63 is disposed in the drive transmission path from the worm gear 60 to the tray 80k, and the idle gear 63 is configured to rotate freely in conjunction with the pushing-in of the tray 80k. Due to the free rotation of the idle gear 63, the drive transmission element (stepped gear 62) does not operate in conjunction with the pushing-in of the tray 80k compared to the idle gear 63, so the user is able to push the tray 80k in with light pushing force. Furthermore, in the present embodiment, the sensor (tray eject sensor 135) capable of detecting the rotation of the idle gear 63 serving as a transmission unit is used to detect pushing-in of the tray 80k and automatically execute the tray insertion operation.

Figure 24A:
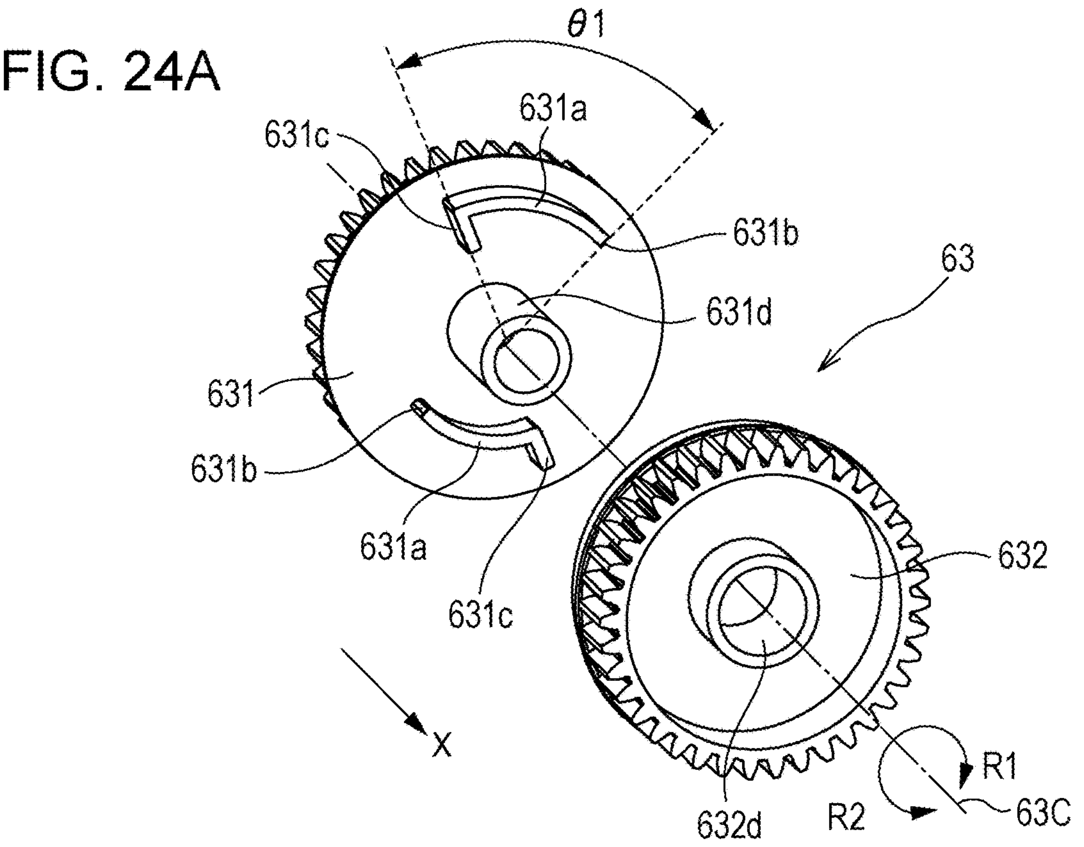
FIGS. 24A and 24B are views that illustrate a configuration of an idle gear according to the first embodiment.
Figure 24B:
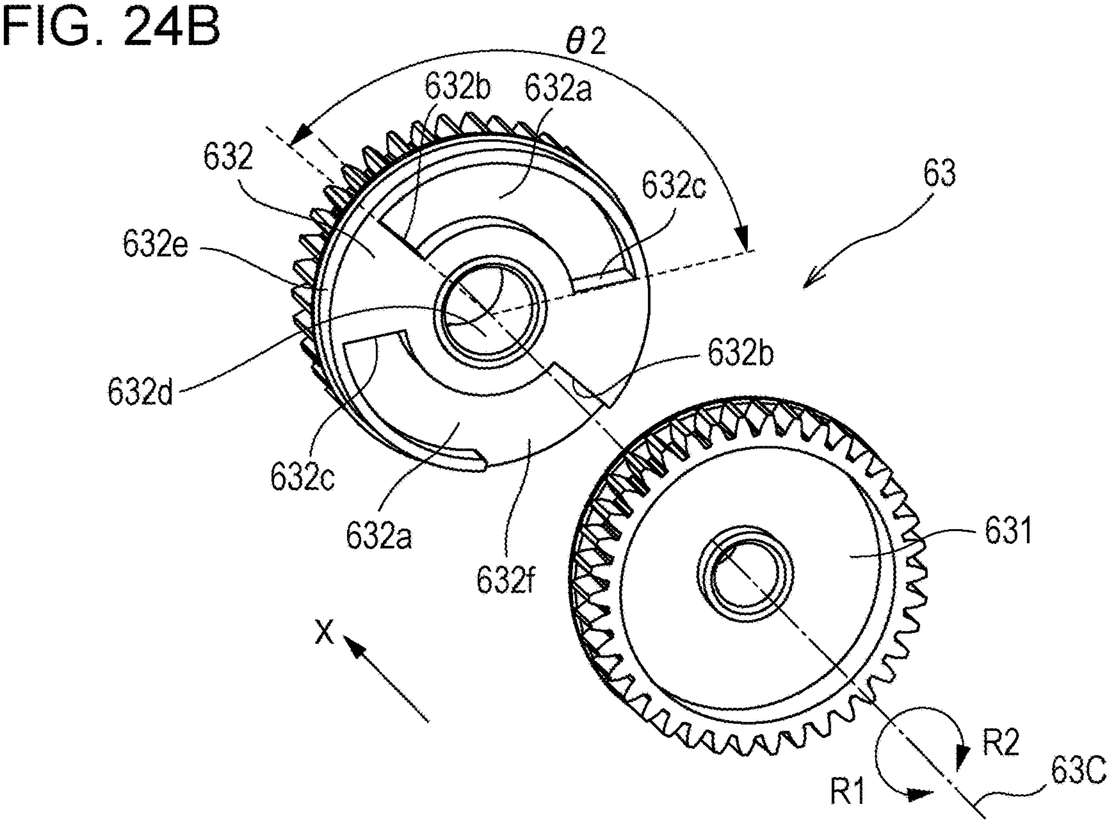

Hereinafter, a push-in detection mechanism for detecting the pushing-in of the tray 80k will be described. FIGS. 24A and 24B are exploded views of the idle gear 63 according to the present embodiment. FIG. 24A is a perspective view of the idle gear 63 when viewed from one side in the direction along the rotation axis 63C of the idle gear 63. FIG. 24B is a perspective view of the idle gear 63 when viewed from the other side in the direction along the rotation axis 63C.

As shown in FIGS. 24A and 24B, the idle gear 63 is a gear unit including two gears, that is, an input gear 631 and an output gear 632. The input gear 631 and the output gear 632 are arranged in the direction of the rotation axis 63C. The input gear 631 and the output gear 632 each are rotatable around the rotation axis 63C.

The input gear 631 has a gear portion that meshes with the stepped gear 62 (FIG. 13A), and the driving force of the motor M2 is input to the input gear 631. In other words, the input gear 631 is drivably connected to the motor M2 via the stepped gear 62 and the like. The output gear 632 has a gear portion (tooth portion) that meshes with the drive rack input gear 64L and the stepped gear 65L (see FIG. 13A), and outputs driving force toward the tray 80*k*. In other words, the output gear 632 is configured to be drivably connected to the tray 80*k* via the drive rack input gear 64L, the stepped gear 65L, and the like.

The idle gear 63 is an example of a transmission unit configured to transmit the driving force of the motor M2 to the tray 80*k*. In the present embodiment, the idle gear 63 functions as a transmission unit capable of taking an interrupted state in which the transmission of force from the tray 80*k* to the motor M2 is interrupted. The input gear 631 is an example of an input portion of the transmission unit. The output gear 632 is an example of an output portion of the transmission unit.

Hereinafter, the rotation direction of the input gear 631 when the motor M2 rotates in the forward direction is referred to as the forward rotation direction R1 of the idle gear 63. The rotation direction of the input gear 631 when the motor M2 rotates in the reverse direction is referred to as the reverse rotation direction R2 of the idle gear 63.

As shown in FIG. 24A, the input gear 631 has a protrusion 631*a*. The protrusion 631*a* protrudes toward the output gear 632 in the direction along the rotation axis 63C.

A forward rotation contact portion 631*b* is provided at one end (the end in the forward rotation direction R1) of the protrusion 631*a*. A reverse rotation contact portion 631*c* is provided at the other end (the end in the reverse rotation direction R2) of the protrusion 631*a*. In the present embodiment, two protrusions 631*a* are disposed at positions 180° apart from each other around the rotation axis 63C.

As shown in FIG. 24B, a groove 632*a* is provided on the output gear 632. The groove 632*a* is a recess recessed from the input gear 631 side toward the output gear 632 in the direction along the rotation axis 63C. A forward rotation contacted portion 632*b* is provided at one end (the end in the forward rotation direction R1) of the groove 632*a*. A reverse rotation contacted portion 632*c* is formed at the other end (the end in the reverse rotation direction R2) of the groove 632*a*. In the present embodiment, two grooves 632*a* are provided at positions 180° apart from each other around the rotation axis 63C.

The output gear 632 has a substantially cylindrical (arc-shaped) outer peripheral surface 632*e* centered on the rotation axis 63C, and an outer peripheral recess 632*f* recessed toward the side closer to the rotation axis 63C relative to the outer peripheral surface 632*e*. The outer peripheral recess 632*f* is continuously connected to one of the grooves 632*a*.

The protrusion 631*a* of the input gear 631 is formed within the range of angle θ1 in the forward rotation direction R1. The groove 632*a* of the output gear 632 is formed within the range of angle θ2 in the forward rotation direction R1. The range in which the protrusion 631*a* is formed is narrower than the range in which the groove 632*a* is formed. In other words, $\theta 1<\theta 2$.

A cylindrical shaft portion 631*d* is formed at the center of the input gear 631 (FIG. 24A). A hole 632*d* is formed at the center of the output gear 632 (FIG. 24B). When the shaft portion 631*d* of the input gear 631 engages with the hole 632*d* of the output gear 632, the input gear 631 and the output gear 632 are connected so as to be rotatable around the common rotation axis 63C and relatively rotatable. The input gear 631 is rotatably supported by fitting the shaft portion 631*d* into a support shaft provided on the upper holding member 33L (see FIG. 20A).

The protrusion 631*a* is accommodated within the space inside the groove 632*a* in the state where the input gear 631 and the output gear 632 are connected. At this time, since $\theta 1<\theta 2$, the protrusion 631*a* and the groove 632*a* allow the input gear 631 and the output gear 632 to rotate relative to each other within an angle of $\theta 3=\theta 2-\theta 1$. In other words, the input gear 631 and the output gear 632 can rotate (freely rotate) relative to each other within the range of angle θ3.

FIGS. 25A to 25E are views for illustrating the push-in detection mechanism for the tray 80*k*. The right-side views of FIGS. 25A to 25E show the positions of the tray 80*k*. The left-side views of FIGS. 25A to 25E are views showing the states of the idle gear 63 and the tray eject sensor 135, corresponding to the right-side views.

As shown in FIGS. 25A to 25E, the tray eject sensor 135 is disposed so that the tray eject sensor 135 can contact the outer peripheral surface 632*e* of the output gear 632. The tray eject sensor 135 is configured to switch a detection signal between the state where the tray eject sensor 135 is in contact with the outer peripheral surface 632*e* of the output gear 632 and the state where the tray eject sensor 135 is not in contact with the outer peripheral surface 632*e* (that is, the state where the tray eject sensor 135 faces the outer peripheral recess 632*f*).

In other words, the tray eject sensor 135 can detect whether the output gear 632 is within a predetermined rotation range (the range in which the tray eject sensor 135 faces the outer peripheral recess 632*f*).

The output gear 632 is an example of a rotating member rotatable around the rotation axis. The signal output by the tray eject sensor 135 serving as the detector of the present embodiment changes according to the rotation of the output gear 632. In the present embodiment, the rotation angle of the output gear 632 (rotating member) during the period when the tray 80*k* (support member) moves from the storage position (first position) to the eject position (second position) is smaller than 360°. In other words, because the position of the tray 80*k* when the signal of the tray eject sensor 135 changes is uniquely determined, accurate control according to the position of the tray 80*k* can be achieved.

The operations from when the tray ejection operation for the tray 80*k* is performed to when the tray insertion operation is automatically performed as a result of user's pushing-in of the tray 80*k* will be described with reference to FIGS. 25A to 25E.

Figure 25A:
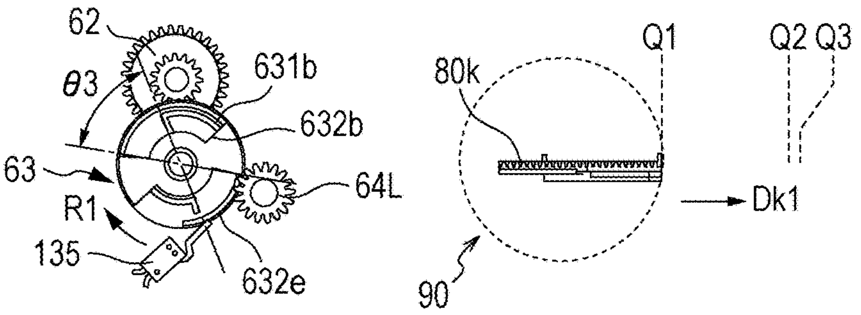
FIGS. 25A to 25E are views that illustrate a configuration related to detection of tray pushing action according to the first embodiment.

FIG. 25A shows the state of the idle gear 63 and the tray eject sensor 135 when the tray 80*k* is at the storage position Q1. At this time, the tray eject sensor 135 is in contact with the outer peripheral surface 632*e* of the output gear 632. FIGS. 25A to 25E show the positions of the tray 80*k* with reference to the tip of the tray 80*k* in the ejection direction Dk1.

When the user provides an instruction for the tray ejection operation by operating the buttons and the like on the control panel, the control unit 30 rotates the motor M2 in the forward rotation direction. As a result, the driving force of the motor M2 is transmitted to the tray 80*k*, with the result that the tray 80*k* moves in the ejection direction Dk1. At this time, the input gear 631 of the idle gear 63 rotates in the forward rotation direction R1 under the driving force from the motor M2. The forward rotation contact portion 631*b* (first engagement portion) of the input gear 631 contacts the forward rotation contacted portion 632*b* (first contacted portion) of the output gear 632, the driving force is transmitted from the input gear 631 to the output gear 632, and the output gear 632 also rotates in the forward rotation direction R1.

Figure 25B:
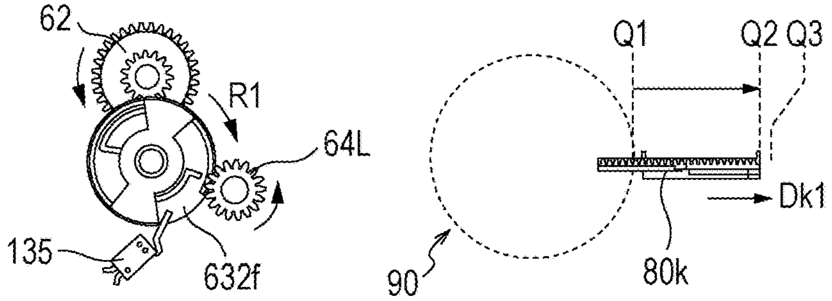

FIG. 25B shows the state of the idle gear 63 and the tray eject sensor 135 when the tray 80*k* is ejected to a predetermined position Q2 between the storage position and the eject position. When the tray 80*k* reaches the predetermined position Q2, the tray eject sensor 135 switches from the state where the tray eject sensor 135 faces the outer peripheral surface 632*e* of the output gear 632 to the state where the tray eject sensor 135 faces the outer peripheral recess 632*f* of the output gear 632. The control unit 30 detects that the tray 80*k* has reached the predetermined position Q2 based on the change in the detection signal of the tray eject sensor 135.

Figure 25C:
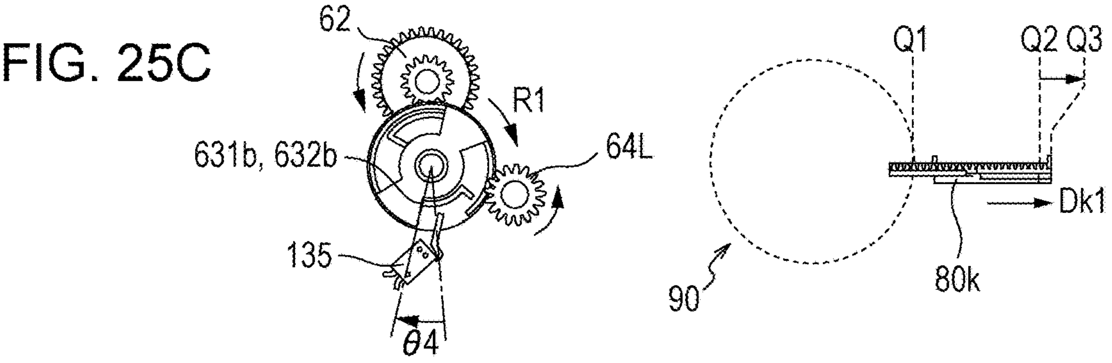

The control unit 30 stops the motor M2 after the forward rotation of the motor M2 is continued for a predetermined time T4 even after the tray 80*k* has reached the predetermined position Q2. As a result, the tray 80*k* moves to the eject position Q3 as shown in FIG. 25C. At this time, the input gear 631 rotates clockwise in the drawing by an angle of θ4. In other words, the angle θ4 is the amount of rotation of the input gear 631 during the period when the tray 80*k* moves from the predetermined position Q2 to the eject position Q3.

FIG. 25C shows the state of the idle gear 63 and the tray eject sensor 135 when the tray 80*k* is ejected to the eject position Q3. In this state, the forward rotation contact portion 631*b* of the input gear 631 is in contact with the forward rotation contacted portion 632*b* of the output gear 632. The tray eject sensor 135 is in the state of facing the outer peripheral recess 632*f* of the output gear 632.

In the state where the tray 80*k* is ejected to the eject position Q3, the control unit 30 rotates the motor M2 in the reverse direction for a certain period of time, and then the motor M2 is stopped.

Figure 25D:
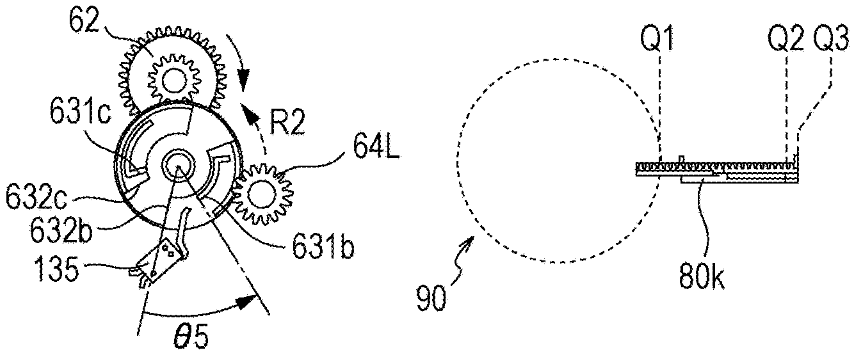

As shown in FIG. 25D, the input gear 631 rotates in the reverse rotation direction R2 under the driving force from the motor M2 due to the reverse rotation of the motor M2. As a result, the forward rotation contact portion 631*b* of the input gear 631 separates from the forward rotation contacted portion 632*b* of the output gear 632.

The angle by which the input gear 631 rotates in the reverse rotation direction R2 during the period when the motor M2 reverses for a predetermined time is denoted as θ5. The angle θ5 is smaller than the angle θ3 by which the input gear 631 and the output gear 632 can freely rotate (θ5>θ3). Therefore, the reverse rotation contact portion 631*c* of the input gear 631 does not contact the reverse rotation contacted portion 632*c* of the output gear 632 while the motor M2 reverses. In other words, the driving force of the motor M2 is not transmitted to the output gear 632, and the tray 80*k* does not move in the insertion direction Dk2 from the eject position Q3. Thus, the tray ejection operation from the storage position to the eject position of the tray 80*k* is completed.

FIG. 25D shows the state of the idle gear 63 and the tray eject sensor 135 when the tray ejection operation for the tray 80*k* completes. In this state, the forward rotation contact portion 631*b* of the input gear 631 is spaced apart from the forward rotation contacted portion 632*b* of the output gear 632. The reverse rotation contact portion 631*c* of the input gear 631 is also spaced apart from the reverse rotation contacted portion 632*c* of the output gear 632. The tray eject sensor 135 is in the state of facing the outer peripheral recess 632*f* of the output gear 632.

Figure 25E:
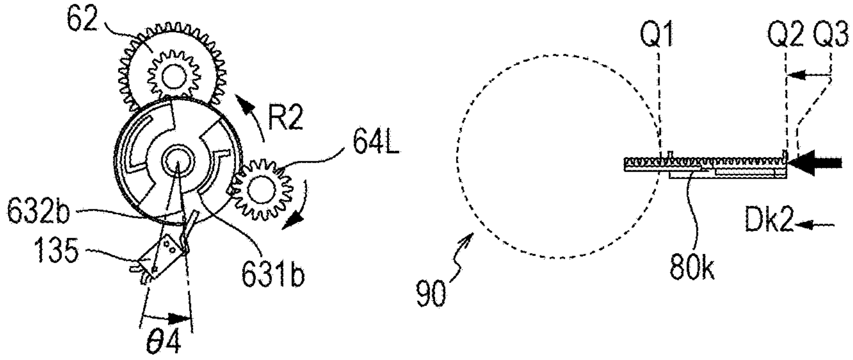

Here, considering the case where the user pushes in the tray 80*k* in the insertion direction Dk2 as shown in FIG. 25E. In this case, the pushing force that the user pushes the tray 80*k* in is transmitted to the output gear 632 in the reverse direction along the drive transmission path from the motor M2 to the tray 80*k*. As a result, the output gear 632 rotates in the reverse rotation direction R2.

On the other hand, because of the reverse rotation of the motor M2 during the tray ejection operation, there is the above-described gap of angle θ5 between the forward rotation contact portion 631*b* and the forward rotation contacted portion 632*b*. Therefore, even when the output gear 632 rotates in the reverse rotation direction R2, the input gear 631 does not rotate in the reverse rotation direction R2. In other words, the input gear 631 and the drive transmission elements on the upstream side (motor M2 side) of the input gear 631 do not operate in conjunction with the pushing-in of the tray 80*k*. Therefore, the user can push the tray 80*k* in with light pushing force.

The angle by which the output gear 632 rotates during the period when the tray 80*k* is pushed in from the eject position Q3 to the predetermined position Q2 is denoted as θ4. The angle θ4 can be smaller than the angle θ5 of the gap present between the forward rotation contact portion 631*b* and the forward rotation contacted portion 632*b* at the completion of the tray ejection operation (θ4<θ5). The angle θ5 is the angle by which the output gear 632 can rotate in the reverse rotation direction R2 in the state where the input gear 631 is stopped. Therefore, where the relationship θ4<θ5 holds, the user is able to push the tray 80*k* in with light pushing force until at least the tray 80*k* reaches the predetermined position Q2.

When the tray 80*k* is pushed in to the predetermined position Q2 as shown in FIG. 25E, the tray eject sensor 135 switches from the state where the tray eject sensor 135 faces the outer peripheral recess 632*f* of the output gear 632 to the state where the tray eject sensor 135 faces the outer peripheral surface 632*e* of the output gear 632. The control unit 30 detects that the tray 80*k* has been pushed into the predetermined position Q2 based on the change in detection signal from the tray eject sensor 135.

When the control unit 30 detects the pushing-in of the tray 80*k*, the control unit 30 rotates the motor M2 in the reverse direction and starts the tray insertion operation. When the motor M2 is reversed, the input gear 631 rotates in the reverse rotation direction R2, and the reverse rotation contact portion 631*c* (second engagement portion) of the input gear 631 engages with the reverse rotation contacted portion 632*c* (second engaged portion) of the output gear 632. As a result, the output gear 632 rotates in the reverse rotation direction R2, and the tray 80*k* moves toward the storage position. Then, when the control unit 30 detects that the tray 80*k* has reached the storage position Q1, the control unit 30 stops the motor M2 and completes the tray insertion operation.

As shown in FIG. 22A, a tray insertion sensor 134 capable of detecting that the tray 80*k* has reached the storage position is disposed in the apparatus body 1A.

The tray insertion sensor 134 is disposed so as to contact the drive rack 15L when the tray 80*k* is at the storage position Q1. In other words, the tray insertion sensor 134 is configured to change the detection signal in accordance with whether the drive rack 15L is at the lower position.

The control unit 30 can detect that the drive rack 15L has reached the lower position, that is, the tray 80*k* has reached the storage position Q1, based on the change in the detection signal of the tray insertion sensor 134.

As described above, the control unit 30 is configured to automatically execute the tray insertion operation when the control unit 30 detects that the tray 80*k* has been pushed in from the eject position Q3 to the predetermined position Q2.

In the present embodiment, the tray eject sensor 135 is used as a detector of which the signal changes when the tray 80*k* moves from the eject position toward the storage position. Alternatively, a detector that detects that the tray 80*k* receives a force in the direction from the eject position toward the storage position may be used. For example, a force/torque sensor, such as a load cell, is used as the detector. In this case, the control unit 30 just needs to reverse the motor M2 to execute the tray insertion operation based on the change in force/torque sensor signal when the user attempts to push the tray 80*k* in after the tray 80*k* has been ejected to the eject position and the motor M2 is not being driven.

In the present embodiment, an example in which the tray insertion operation is started due to the start of the motor M2 in a stopped state when the movement of the tray 80*k* is detected by the detector. Not limited to this, when the movement of the tray 80*k* is detected by the detector, the tray insertion operation may be started by connecting a clutch interposed between the motor M2 and the tray 80*k* in the state where the motor M2 is rotating.

Automatic Ejection Function in Case of Tray Insertion Abnormality

If an abnormality occurs in the tray insertion operation, the tray 80 can possibly stop at a position (abnormal position) that is neither the storage position nor the eject position. An abnormality occurs when, for example, foreign matter is caught between the tray 80 and another member to hinder the movement of the tray 80 in the insertion direction Dk2.

At this time, it is desirable to perform restoration work to return the apparatus to the state where the tray insertion operation can be executed by eliminating the cause of the abnormality (such as removing foreign matter).

When the tray 80 is at the eject position, the user is able to provide an instruction to start the tray insertion operation with a method of operating the operating unit (for example, buttons on the operating panel) provided on the apparatus body 1A or the above-described method of pushing the tray 80 in. When the control unit 30 detects a tray insertion operation instruction (insertion instruction) or pushing-in of the tray 80, the control unit 30 rotates the motor M2 in the reverse rotation direction. As a result, the tray insertion operation is started, and the tray 80 starts moving from the eject position toward the storage position under the driving force of the motor M2.

Here, assuming that an abnormality has occurred in the tray insertion operation and the movement of the tray 80 is hindered. In this case, the drive rack 15 cannot move to the lower position, and the tray insertion sensor 134 does not detect the drive rack 15. In other words, the control unit 30 determines that the tray insertion operation is not complete.

In the present embodiment, when the tray insertion sensor 134 does not detect the drive rack 15 even after a predetermined time has elapsed since the start of reverse rotation of the motor M2, the control unit 30 determines that an abnormality has occurred in the tray insertion operation.

When the control unit 30 determines that an abnormality has occurred in the tray insertion operation, the control unit 30 temporarily stops the motor M2 and then rotates the motor M2 in the forward rotation direction. As a result, the tray 80 starts moving from the abnormal position toward the eject position under the driving force of the motor M2. The control unit 30 determines that the tray 80 has reached the eject position, for example, after a predetermined time has elapsed from the start of forward rotation of the motor M2, stops the motor M2, and ends the automatic ejection operation. The tray 80 may be configured to be moved to the eject position by using the tray eject sensor 135 through control similar to the normal tray ejection operation.

Automatic Tray Insertion Function in Case of Tray Ejection Abnormality

If an abnormality occurs in the tray ejection operation, the tray 80 can possibly stop at a position (abnormal position) that is neither the storage position nor the eject position.

For example, there may be a case where an obstacle is present at a position overlapping the movement trajectory of the tray 80 (for example, near the opening 16*a* of the apparatus body 1A) in the tray ejection operation, and the movement of the tray 80 is restricted when the tray 80 (or the door 14) in move contacts the obstacle. In this case, the tray 80 stops at the abnormal position.

Therefore, in the present embodiment, the image forming apparatus 1 has a function (tray automatic insertion function) to automatically move the tray 80 to the storage position if an abnormality occurs while the tray 80 is moving from the storage position to the eject position (during the tray ejection operation). Hereinafter, the tray automatic insertion function will be described.

When the tray 80 is at the storage position, a user is able to instruct the image forming apparatus 1 to start the tray ejection operation with a method of operating the operating unit (for example, buttons on the operating panel) provided on the apparatus body 1A.

Here, assuming that an abnormality has occurred in the tray ejection operation and the movement of the tray 80 is hindered. In this case, the tray eject sensor 135 does not detect that the tray 80 has reached the predetermined position Q2. In other words, the control unit 30 determines that the tray ejection operation is not complete.

In the present embodiment, when the tray eject sensor 135 does not detect that the tray 80 has reached the predetermined position Q2 even after a predetermined time has elapsed since the start of the tray ejection operation, the control unit 30 determines that an abnormality has occurred in the tray ejection operation.

When the control unit 30 determines that an abnormality has occurred in the tray ejection operation, the control unit 30 temporarily stops the motor M2 and then rotates the motor M2 in the reverse rotation direction. As a result, the tray 80 starts moving from the abnormal position toward the storage position under the driving force of the motor M2. The control unit 30 determines that the tray 80 has reached the storage position, for example, after a predetermined time has elapsed from the start of reverse rotation of the motor M2, stops the motor M2, and ends the automatic insertion operation. The tray 80 may be configured to be moved to the storage position by using the tray insertion sensor 134 through control similar to the normal tray insertion operation.

Other Embodiments

The present invention can be implemented by processing of supplying a program for implementing one or more functions of the above-described embodiments to a system or apparatus via a network or storage medium, and causing one or more processors in the computer of the system or apparatus to read and run the program. Alternatively, the present invention may be implemented by a circuit (for example, ASIC) that implements one or more functions.

Guide for Toner to Discharge Opening

As described above, toner contained in the toner storage chamber 71*a* is discharged from the discharge opening 71*b*, and the toner discharged from the discharge opening 71*b* is put into the developing-side storage chamber 53*a* through the receiving opening 53*b*.

In the following description, it is assumed that the toner cartridge 70 is attached to the rotary body 90. A configuration for efficiently discharging toner contained in the toner storage chamber 71*a* through the discharge opening 71*b* will be described with reference to FIGS. 26 and 27.

Figure 26:
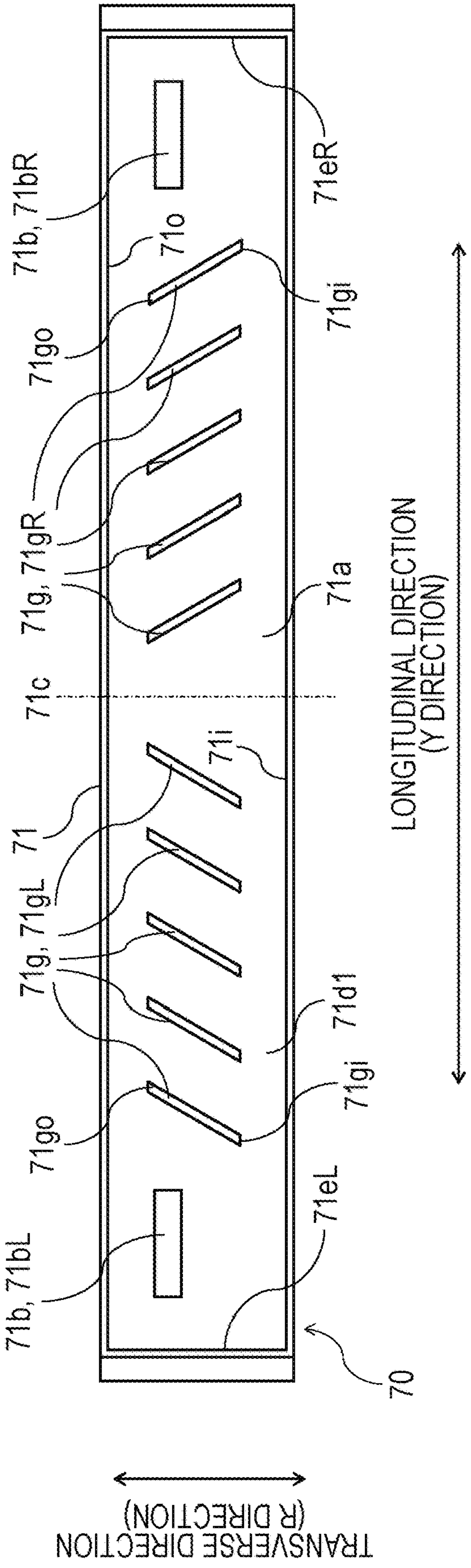
FIG. 26 is a view that shows the internal structure of a toner cartridge according to the first embodiment.
Figure 27:
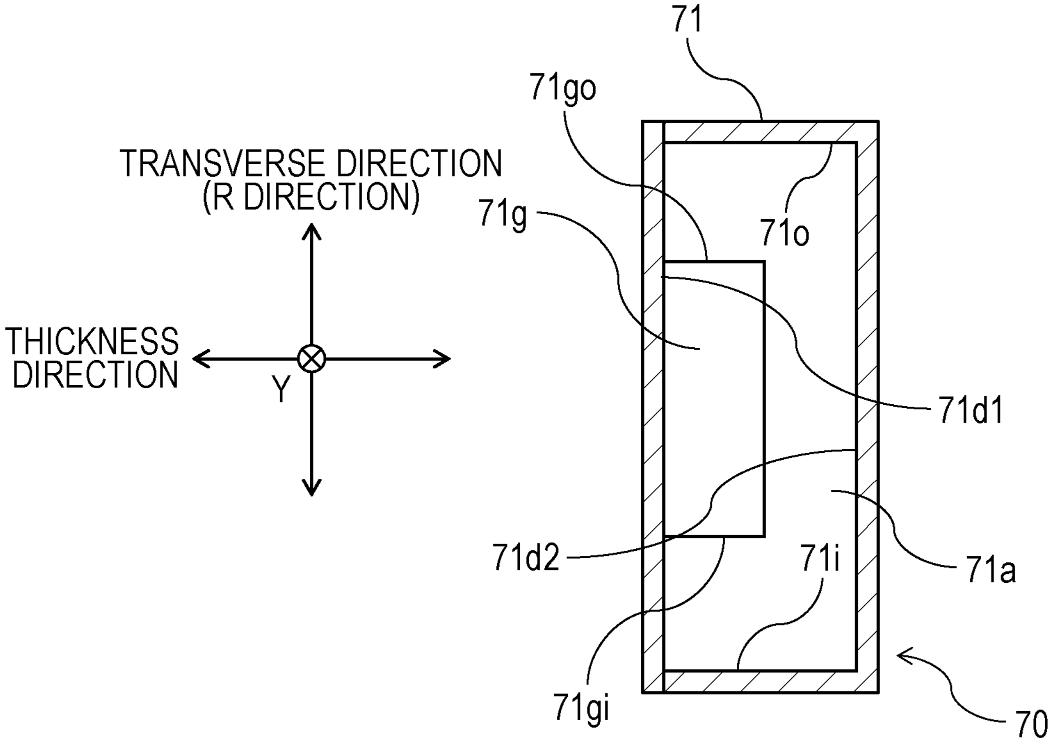
FIG. 27 is a sectional view that shows the internal structure of the toner cartridge according to the first embodiment.

FIG. 26 is a view that shows the internal structure of the toner cartridge 70. FIG. 27 is a sectional view showing the internal structure of the toner cartridge 70 and, specifically, a sectional view of the toner cartridge 70, taken in a direction orthogonal to the rotation axis 90C, when viewed in the Y direction.

Here, assuming that the toner cartridge 70 is projected in a first projection direction onto a first imaginary plane orthogonal to the first projection direction. At this time, the first projection direction that minimizes the projected area on the first imaginary plane can be referred to as the longitudinal direction of the toner cartridge 70.

As described above, in the state where the toner cartridge 70 is mounted to the rotary body 90, the longitudinal direction of the toner cartridge 70 is parallel to the direction (Y direction) of the rotation axis 90C of the rotary body 90.

Furthermore, assuming that a direction orthogonal to the first projection direction is a second projection direction and the toner cartridge 70 is projected in the second projection direction onto a second imaginary plane orthogonal to the second projection direction. At this time, the second projection direction that minimizes the projected area on the second imaginary plane can be referred to as the transverse direction of the toner cartridge 70. In other words, the transverse direction of the toner cartridge 70 is a direction orthogonal to the longitudinal direction of the toner cartridge 70. Furthermore, a direction orthogonal to the longitudinal direction and the transverse direction of the toner cartridge 70 is referred to as the thickness direction of the toner cartridge 70.

In the present embodiment, the longitudinal direction, transverse direction, and thickness direction of the toner frame 71 can be defined in the same manner as the longitudinal direction, transverse direction, and thickness direction of the toner cartridge 70. In other words, the longitudinal direction, transverse direction, and thickness direction of the toner frame 71 are the same as the longitudinal direction, transverse direction, and thickness direction of the toner cartridge 70. Therefore, the length of each of the toner cartridge 70 and the toner frame 71 in the longitudinal direction is longer than the length in the transverse direction and the length in the thickness direction.

The length in the transverse direction of each of the toner cartridge 70 and the toner frame 71 is longer than the length in the thickness direction.

In the following description, the longitudinal direction, transverse direction, and thickness direction of the toner frame 71 and the longitudinal direction, transverse direction, and thickness direction of the toner cartridge 70 are not distinguished from each other and are simply referred to as the longitudinal direction, the transverse direction, and the thickness direction.

As shown in FIG. 26, the toner frame 71 has the toner storage chamber 71*a*, and a right side surface 71*e*R and a left side surface 71*e*L facing each other. The right side surface 71*e*R and the left side surface 71*e*L are surfaces that expand in a direction that crosses (which can be a direction orthogonal to) the longitudinal direction, and face each other in the longitudinal direction. In the longitudinal direction, the left side surface 71*e*L is located on one end side relative to the center 71*c* of the toner frame 71, and the right side surface 71*e*R is located on the other end side relative to the center 71*c* of the toner frame 71. In the longitudinal direction, the left side surface 71*e*L is located at one end of the toner storage chamber 71*a*, while the right side surface 71*e*R is located at the other end of the toner storage chamber 71*a*.

As shown in FIGS. 26 and 27, the toner frame 71 has the toner storage chamber 71*a*, and an outer surface 710 and an inner surface 71*i* facing each other. The outer surface 710 and the inner surface 71*i* are surfaces that expand in a direction that crosses (which can be a direction orthogonal to) the transverse direction and that face each other in the transverse direction. In the radial direction of the rotary body 90, the inner surface 71*i* is closer to the rotation axis 90C than the outer surface 710 is to the rotation axis 90C. In the transverse direction, the outer surface 710 is located at one end of the toner storage chamber 71*a*, and the inner surface 71*i* is located at the other end of the toner storage chamber 71*a*.

As shown in FIGS. 26 and 27, the toner frame 71 has the toner storage chamber 71*a*, and a first receiving surface 71*dl* and a second receiving surface 71*d*2 facing each other. The first receiving surface 71*dl* and the second receiving surface 71*d*2 are surfaces that expand in a direction that crosses (which can be a direction orthogonal to) the thickness direction and that face each other in the thickness direction. In the thickness direction, the first receiving surface 71*dl* is located at one end of the toner storage chamber 71*a*, and the second receiving surface 71*d*2 is located at the other end of the toner storage chamber 71*a*.

As shown in FIG. 26, the toner frame 71 of the present embodiment has the plurality of discharge openings including discharge openings (second openings) 71*b*R and discharge openings (first openings) 71*b*L. Each of the discharge openings 71*b*R, 71*b*L has a function as a discharge opening communicating with the toner storage chamber 71*a*. In the longitudinal direction, the discharge opening 71*b*L is located on one end side relative to the center 71*c* of the toner frame 71, and is located between the center 71*c* and the left side surface 71*e*L. In the longitudinal direction, the discharge opening 71*b*R is located on the other end side relative to the center 71*c* of the toner frame 71, and is located between the center 71*c* and the right side surface 71*e*R. In the present embodiment, in the longitudinal direction, the discharge opening 71*b*L is closer to the left side surface 71*e*L than the center 71*c*, and the discharge opening 71*b*R is closer to the right side surface 71*e*R than the center 71*c*.

In the present embodiment, the discharge opening 71*b*L is disposed such that, when the discharge opening 71*b*L is projected in the thickness direction onto a plane perpendicular to the thickness direction, the projected area is maximum. The discharge opening 71*b*R is disposed such that, when the discharge opening 71*b*R is projected in the thickness direction onto a plane perpendicular to the thickness direction, the projected area is maximum.

In the present embodiment, the discharge openings 71*b*R, 71*b*L are provided at the first receiving surface 71*dl* of the toner frame 71. Therefore, the discharge openings 71*b*R, 71*b*L face the second receiving surface 71*d*2 of the toner frame 71. In the present embodiment, the first receiving surface 71*dl* having the discharge opening 71*b*L and the first receiving surface 71*dl* having the discharge opening 71*b*R are continuous. However, the first receiving surface 71*dl* having the discharge opening 71*b*L and the first receiving surface 71*dl* having the discharge opening 71*b*R may be discontinuous.

The toner frame 71 has at least one guide portion 71*g* for guiding toner contained in the toner storage chamber 71*a*. The toner frame 71 of the present embodiment includes a plurality of the guide portions 71*g*. Each of the guide portions 71*g* is configured to guide toner moving by its own weight in a direction that crosses the Y direction toward the discharge openings 71*b* in the Y direction.

In the present embodiment, the spacing between the plurality of guide portions 71*g* is constant, and the inclination angle of each of the plurality of guide portions 71*g* is the same. However, the spacing between the plurality of guide portions 71*g* does not need to be constant. The inclination angles of the plurality of guide portions 71*g* may be different from each other.

In the present embodiment, the toner frame 71 includes at least one right-side guide 71*g*R and at least one left-side guide 71*g*L. In the present embodiment, the toner frame 71 includes a plurality of the right-side guides 71*g*R and a plurality of the left-side guides 71*g*L. The left-side guide 71*g*L guides toner toward the discharge opening 71*b*L in the Y direction, and the right-side guide 71*g*R guides toner toward the discharge opening 71*b*R in the Y direction. In other words, the toner frame 71 includes a plurality of toner guides, and the plurality of toner guides includes the right-side guides 71*g*R and the left-side guides 71*g*L.

In the longitudinal direction, the left-side guides 71*g*L are located between the center 71*c* of the toner frame 71 and the discharge opening 71*b*L, and the right-side guides 71*g*R are located between the center 71*c* of the toner frame 71 and the discharge opening 71*b*R. The left-side guides 71*g*L and the discharge opening 71*b*L and the right-side guides 71*g*R and the discharge opening 71*b*R have a symmetric shape in the longitudinal direction; however, the left-side guides 71*g*L and the discharge opening 71*b*L and the right-side guides 71*g*R and the discharge opening 71*b*R do not need to have a perfect symmetric shape. The number of the left-side guides 71*g*L may be different from the number of the right-side guides 71*g*R.

The right-side guide 71*g*R and the left-side guide 71*g*L guide toner in different directions; however, the right-side guide 71*g*R and the left-side guide 71*g*L generally have substantially a common basic configuration and function. Therefore, in the following description, the right-side guide 71*g*R and the left-side guide 71*g*L are referred to as the guide portions 71*g*, the discharge opening 71*b*R and the discharge opening 71*b*L are referred to as the discharge openings 71*b*, and they will be collectively described.

As shown in FIG. 27, the guide portions 71*g* are closer to the first receiving surface 71*dl* than to the second receiving surface 71*d*2. In the present embodiment, the guide portions 71*g* are disposed on the first receiving surface 71*d*1. In other words, the base of each of the guide portions 71*g* is connected to the first receiving surface 71*d*1. The first receiving surface 71*dl* having the discharge opening 71*b*L, the first receiving surface 71*dl* having the discharge opening 71*b*R, and the first receiving surface 71*dl* connected with the guide portions 71*g* may be discontinuous. On the other hand, there is a gap formed between the guide portions 71*g* and the second receiving surface 71*d*2.

As shown in FIGS. 26 and 27, each of the guide portions 71*g* has an outer end 71*go* and an inner end 71*gi*. In the radial direction of the rotary body 90, the inner end 71*gi* is closer to the rotation axis 90C than the outer end 71*go* is to the rotation axis 90C. In the longitudinal direction, the inner end 71*gi* is closer to the discharge opening 71*b* than the outer end 71*go* is to the discharge opening 71*b*. When viewed in a direction perpendicular to the first receiving surface 71*d*1, the angle formed by the straight line passing through the inner end 71*gi* and the outer end 71*go* and the longitudinal direction can be larger than the angle of repose of toner.

In the present embodiment, in the transverse direction, the distance between the outer end 71*go* and the inner end 71*gi* is shorter than the distance between the outer surface 710 and the inner surface 71*i*. In the transverse direction, the outer surface 710 faces the outer end 71*go*, and a gap is formed between the outer surface 710 and the outer end 71*go*. The inner surface 71*i* faces the inner end 71*gi*, and a gap is formed between the inner surface 71*i* and the inner end 71*gi*.

The guide portions 71*g* guide toner moving from the outer ends 71*go* toward the inner ends 71*gi* in the transverse direction, toward the discharge openings 71*b* in the longitudinal direction.

When the first receiving surface (first surface) 71*dl* receives the weight of toner and tilts relative to the horizontal direction and the tilting angle of the first receiving surface 71*dl* relative to the horizontal direction exceeds a predetermined angle, the toner moves on the first receiving surface 71*dl* along the first receiving surface 71*d*1. At this time, the guide portions 71*g* guide the toner moving along the first receiving surface 71*dl*, toward the discharge openings 71*b* in the longitudinal direction.

More specifically, assuming that, in the state where the first receiving surface 71*dl* is positioned below the second receiving surface 71*d*2, the first receiving surface 71*dl* tilts relative to the horizontal direction such that the outer end of the first receiving surface 71*dl* in the radial direction of the rotary body 90 is higher in level than the inner end of the first receiving surface 71*d*1. When the tilting angle of the first receiving surface 71*dl* relative to the horizontal direction exceeds the predetermined angle, toner moves along the first receiving surface 71*dl* from the outer end of the first receiving surface 71*dl* toward the inner end of the first receiving surface 71*dl* in a direction that crosses the rotation axis 90C of the rotary body 90.

When the toner moving on the first receiving surface 71*dl* contacts the surfaces of the guide portions 71*g* facing the discharge openings 71*b* in the longitudinal direction, the toner is guided by the guide portions 71*g* toward the discharge openings 71*b* in the longitudinal direction.

On the other hand, when the second receiving surface (second face) 71*d*2 receives the weight of toner and tilts relative to the horizontal direction and the tilting angle of the second receiving surface 71*d*2 relative to the horizontal direction exceeds the predetermined angle, the toner moves on the second receiving surface 71*d*2 along the second receiving surface 71*d*2. At this time, the toner moves from one of the outer end 71*go* and the inner end 71*gi* toward the other one of the outer end 71*go* and the inner end 71*gi* in the radial direction of the rotary body 90 through a gap between the guide portion 71*g* and the second receiving surface 71*d*2. The toner that moves through the gap between the guide portion 71*g* and the second receiving surface 71*d*2 can move without being guided by the guide portion 71*g*.

In the present embodiment, the rotary body 90 (rotary assembly 90A) rotates, and toner moves from the outer surface 710 toward the inner surface 71*i* in the transverse direction, and toner also moves from the inner surface 71*i* toward the outer surface 710. When toner moves from the outer surface 710 to the inner surface 71*i*, the toner is guided by the guide portions 71*g* toward the discharge openings 71*b* in the longitudinal direction. On the other hand, when the toner moves from the inner surface 71*i* to the outer surface 710, guiding of toner in the direction away from the discharge openings 71*b* in the longitudinal direction is suppressed.

Therefore, when the rotary body 90 (rotary assembly 90A) with the toner cartridge 70 attached rotates, the amount of toner moving in the direction to approach the discharge openings 71*b* in the longitudinal direction becomes greater than the amount of toner moving in the direction away from the discharge openings 71*b* in the longitudinal direction.

In this way, in the present embodiment, toner is guided toward the discharge openings 71*b* in the longitudinal direction, and discharged from the discharge openings 71*b*. Therefore, toner contained in the toner storage chamber 71*a* can be efficiently discharged from the discharge openings 71*b*.

Suppression of Toner Backflow from Developing Unit to Toner Cartridge.

With the rotation of the rotary assembly 90A, the receiving opening (development opening) 53*b* can be positioned above the discharge opening 71*b*. For example, when the rotary body 90 takes the replacement posture (attaching/detaching posture) in the state where the toner cartridge 70 is attached to the rotary body 90, the receiving opening 53*b* is positioned above the discharge opening 71*b*. When the receiving opening 53*b* is positioned above the discharge opening 71*b*, the backflow of toner from the developing unit 50 to the toner cartridge 70 can be suppressed.

Hereinafter, a configuration for suppressing toner backflow from the developing unit 50 to the toner cartridge 70 will be described with reference to FIGS. 28 and 29. In the following description, it is assumed that the toner cartridge 70 is attached to the rotary body 90.

Figure 28A:
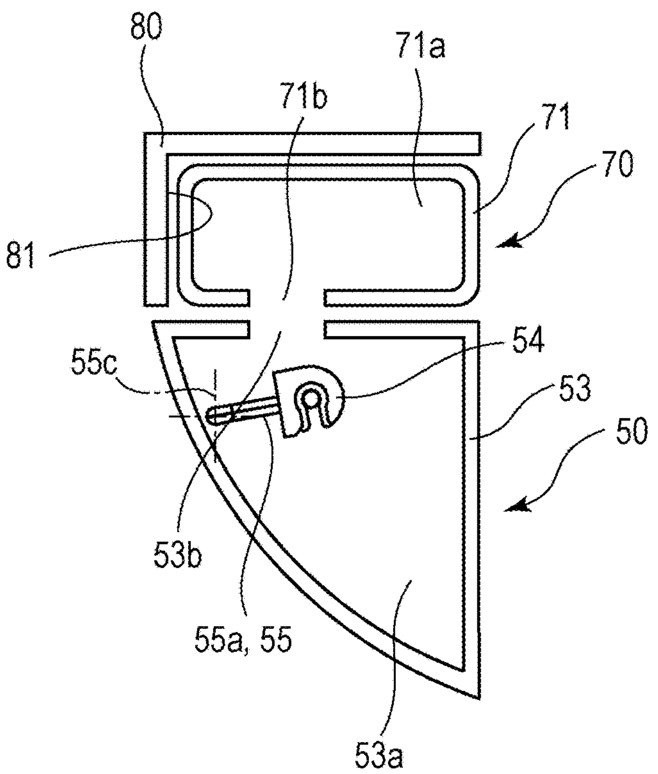
FIGS. 28A and 28B are sectional views of the toner cartridge and the developing unit according to the first embodiment.
Figure 28B:
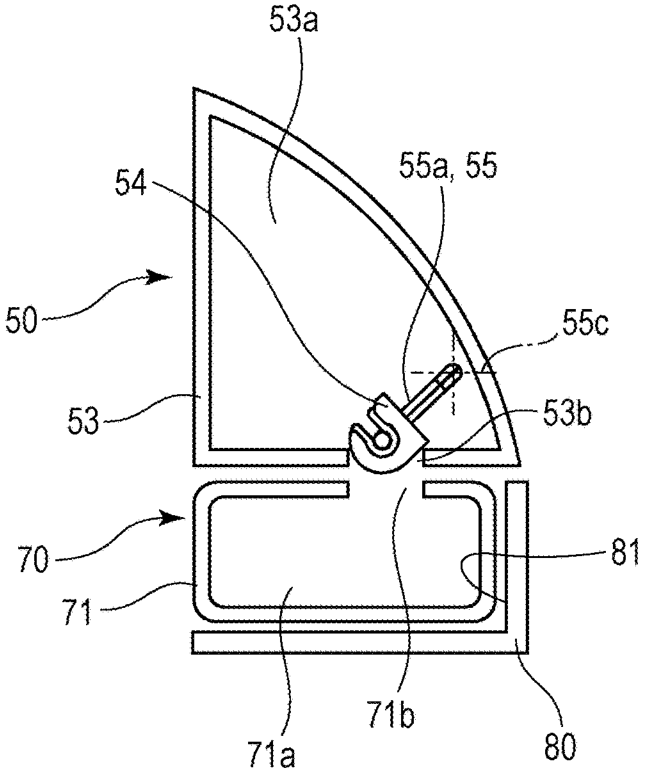

FIGS. 28A and 28B are sectional views of the toner cartridge 70 and the developing unit 50 according to the present embodiment. FIGS. 28A and 28B are sectional views taken in a direction perpendicular to the Y direction when viewed in the Y direction.

As shown in FIGS. 28A and 28B, the developing unit 50 includes a cover (restricting portion, toner restricting portion) 54. The cover 54 is accommodated in the developing-side storage portion (receiving-side storage chamber, developing-side storage chamber) 53*a*. The cover 54 is movable relative to the receiving opening 53*b*, and is movable between a cover position at which the receiving opening 53*b* is covered by the cover 54 and a retracted position (cover retracted position) at which the cover 54 is retracted from the cover position.

In the present embodiment, the developing unit 50 has a connecting portion 55 that supports the cover 54.

The connecting portion 55 is connected to the cover 54 and is movable relative to the receiving opening 53*b*. The connecting portion 55 and the cover 54 are configured to move integrally. When the connecting portion 55 is moved, the cover 54 is moved between the cover position and the cover retracted position. The connecting portion 55 includes a shaft (transmitting portion) 55*a*, and the cover 54 is secured to the shaft 55*a*.

The shaft 55*a* can pivot about a cover pivot axis 55*c*. When the shaft 55*a* pivots, the cover 54 also pivots around the cover pivot axis 55*c* to move between the cover position and the cover retracted position. The details of the configuration for moving the cover 54 will be described later.

As shown in FIG. 28B, in the state where the receiving opening 53*b* is positioned above the discharge opening (outlet) 71*b*, the cover 54 is at the cover position. At this time, the cover 54 covers the receiving opening 53*b*, and discharge of toner contained in the developing-side storage chamber 53*a* to outside the developing unit 50 through the receiving opening 53*b* is restricted. The posture of the rotary body 90, in which the receiving opening 53*b* is positioned above the discharge opening 71*b* and the cover 54 is at the cover position, can be referred to as a cover posture (first posture).

FIG. 28B is a view that shows the state where the rotary body 90 is in the first posture in the state where the toner cartridge 70 is attached to the rotary body 90. In other words, FIG. 28B may be regarded as a view showing the state where the rotary assembly 90A is in the first posture.

As shown in FIG. 28A, in the state where the receiving opening 53*b* is positioned below the discharge opening 71*b*, the cover 54 is positioned at the cover retracted position at which the cover 54 is retracted from the cover position. At this time, a gap through which toner can pass is formed between the cover 54 and the receiving opening 53*b*. When the cover 54 is at the cover retracted position, toner discharged from the discharge opening 71*b* is allowed to pass between the cover 54 and the receiving opening 53*b* and enter the developing-side storage chamber 53*a*. The posture of the rotary body 90, in which the receiving opening 53*b* is positioned below the discharge opening 71*b* and the cover 54 is at the cover retracted position, can be referred to as a cover retracted posture (second posture).

FIG. 28A is a view that shows the state where the rotary body 90 is in the second posture in the state where the toner cartridge 70 is attached to the rotary body 90. In other words, FIG. 28A may be regarded as a view showing the state where the rotary assembly 90A is in the second posture.

The receiving opening 53*b* does not need to be completely closed by the cover 54 in the state where the cover 54 is at the cover position. In other words, the discharge of toner from the receiving opening 53*b* does not need to be completely restricted by the cover 54. For example, a gap may be formed between the cover 54 and the receiving opening 53*b* in the state where cover 54 is at the cover position. In this case, the size of the gap formed between the cover 54 and the receiving opening 53*b* is smaller when the cover 54 is at the cover position than when the cover 54 is at the cover retracted position.

The cover 54 may close the receiving opening 53*b* so that no gap is formed between the cover 54 and the receiving opening 53*b* in the state where the cover 54 is at the cover position. In other words, the discharge of toner from the receiving opening 53*b* may be completely restricted.

Figure 29:
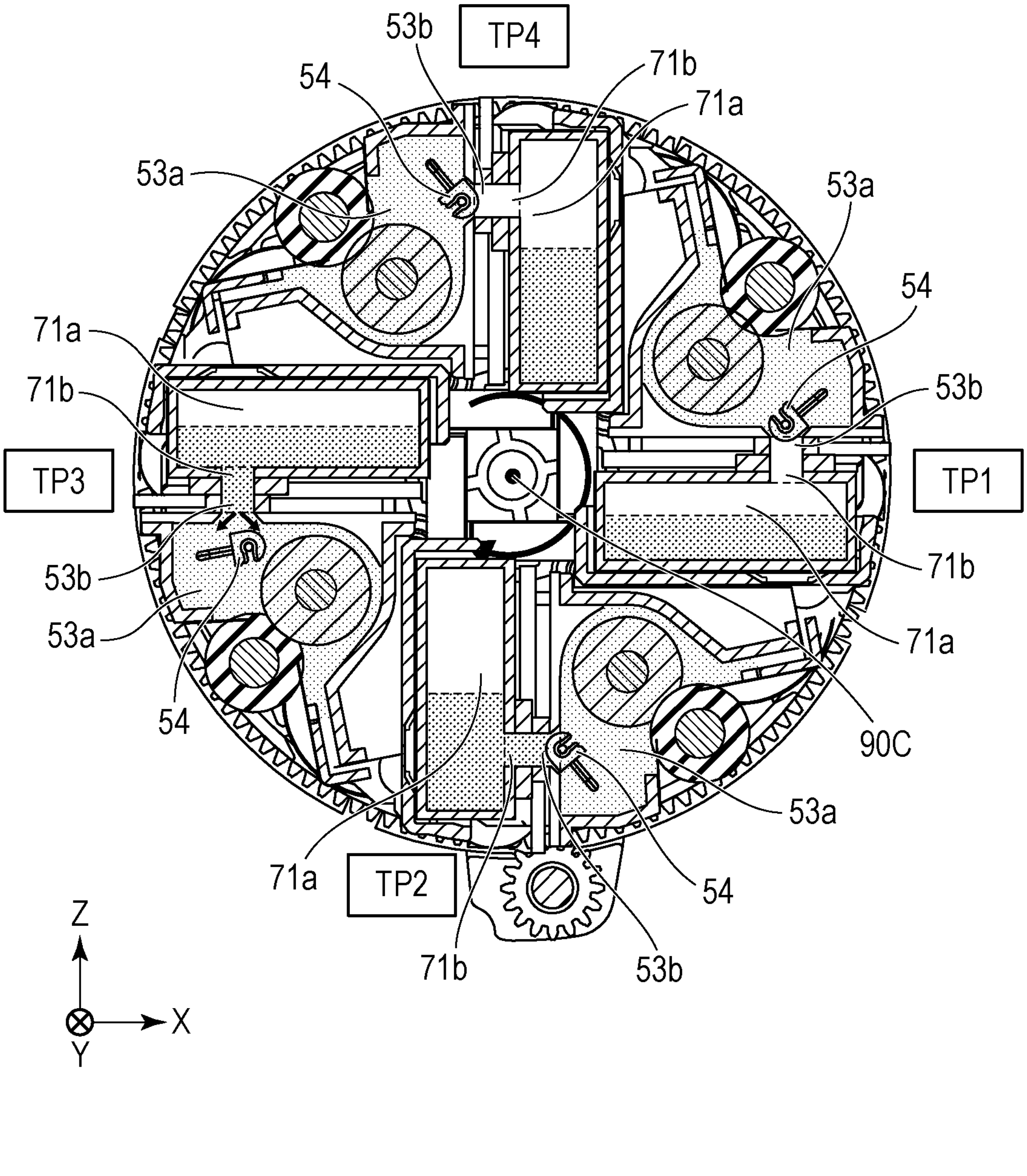
FIG. 29 is a sectional view of a rotary assembly according to the first embodiment.

FIG. 29 is a sectional view of the rotary assembly 90A according to the present embodiment. FIG. 29 is a sectional view taken in a direction perpendicular to the Y direction when viewed in the Y direction. FIG. 29 shows the state where the developing units 50 and the corresponding toner cartridges 70 are respectively positioned at positions TP1, TP2, TP3, TP4.

When the rotary body 90 to which the toner cartridge 70 is attached is in the replacement posture, the developing unit 50 and the toner cartridge 70 are positioned at the position TP1. At this time, the receiving opening 53*b* is positioned above the discharge opening 71*b*, and the cover 54 is at the cover position. In this state, backflow of toner from the developing unit 50 to the toner cartridge 70 is suppressed.

In the present embodiment, the rotary body 90 to which the toner cartridge 70 is attached rotates clockwise when viewed in the Y direction, rotates from the position TP1 in order of the positions TP2, TP3, TP4, and returns to the position TP1 again. When the developing unit 50 and the toner cartridge 70 are at the position TP2, the receiving opening 53*b* and the discharge opening 71*b* are positioned below the rotation axis 90C, and the receiving opening 53*b* and the discharge opening 71*b* are arranged in the horizontal direction. When the developing unit 50 and the toner cartridge 70 are at the position TP3, the receiving opening 53*b* is positioned below the discharge opening 71*b*. When the developing unit 50 and the toner cartridge 70 are at the position TP4, the receiving opening 53*b* and the discharge opening 71*b* are positioned above the rotation axis 90C, and the receiving opening 53*b* and the discharge opening 71*b* are arranged in the horizontal direction.

In the present embodiment, when the developing unit 50 and the toner cartridge 70 are at the position TP4 and at position TP2, the cover 54 is at the cover position. When the developing unit 50 and the toner cartridge 70 move from the position TP4 to the position TP2 via the position TP1, at least part of the receiving opening 53*b* is positioned above the discharge opening 71*b*. In the present embodiment, while the developing unit 50 and the toner cartridge 70 move from the position TP4 to the position TP2 via the position TP1 with the rotation of the rotary assembly 90A, the cover 54 is positioned at the cover position.

On the other hand, when the developing unit 50 and the toner cartridge 70 are at the position TP3, the cover 54 is positioned at the cover retracted position. In the present embodiment, the position at which the developing roller 51 of the developing unit 50 faces the photoconductor drum 2 is downstream of the position TP3 and upstream of the position TP4. In other words, while the posture of the rotary body 90 changes from the replacement posture to the development posture, the rotary body 90 takes the cover retracted posture, and the cover 54 is positioned at the cover retracted position. In the present embodiment, when the developing unit 50 is at the developing position, the receiving opening 53*b* is positioned below the discharge opening 71*b*, and the cover 54 is at the cover retracted position.

When the rotary body 90 rotates, the cover 54 moves to the cover retracted position after the developing unit 50 and the toner cartridge 70 pass through the position TP2, and moves to the cover position before the developing unit 50 and the toner cartridge 70 reach the position TP4.

Movement of Cover

The configuration of the covers 54 and the configuration for moving the covers 54 will be described with reference to FIGS. 30A, 30B, 31A, 31B, 32A, 32B, 33A, 33B, 33C, 34A, 34B, and 34C.

Figure 30A:
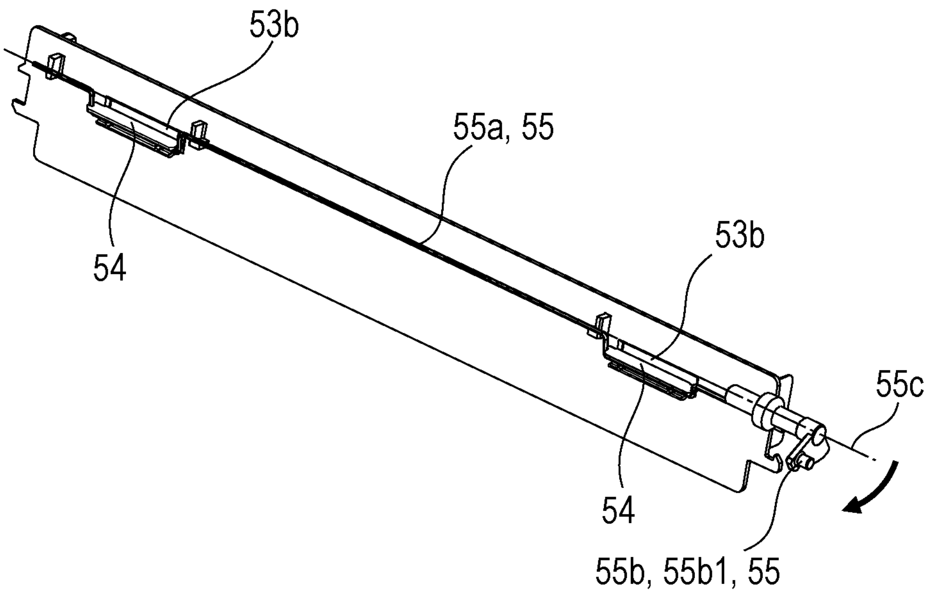
FIGS. 30A and 30B are views that show the configuration of a covers and a connecting portion according to the first embodiment.
Figure 30B:
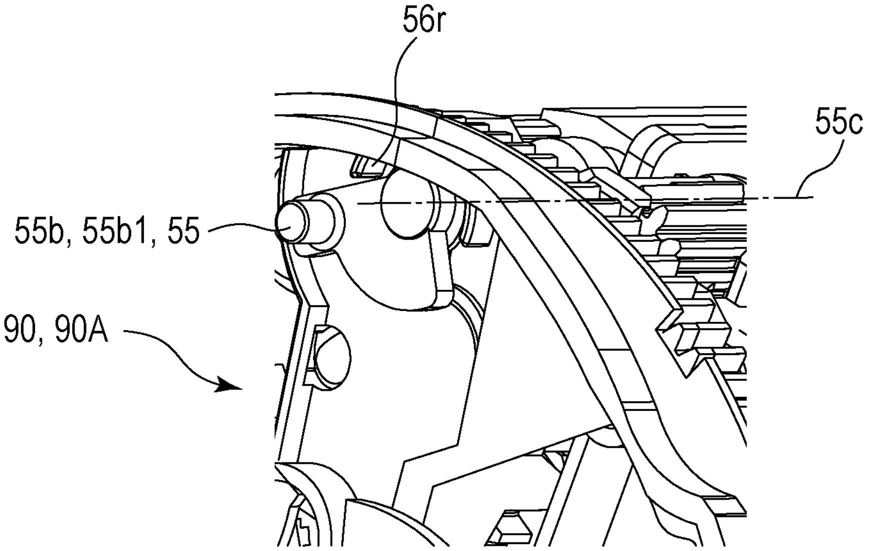
Figure 31A:
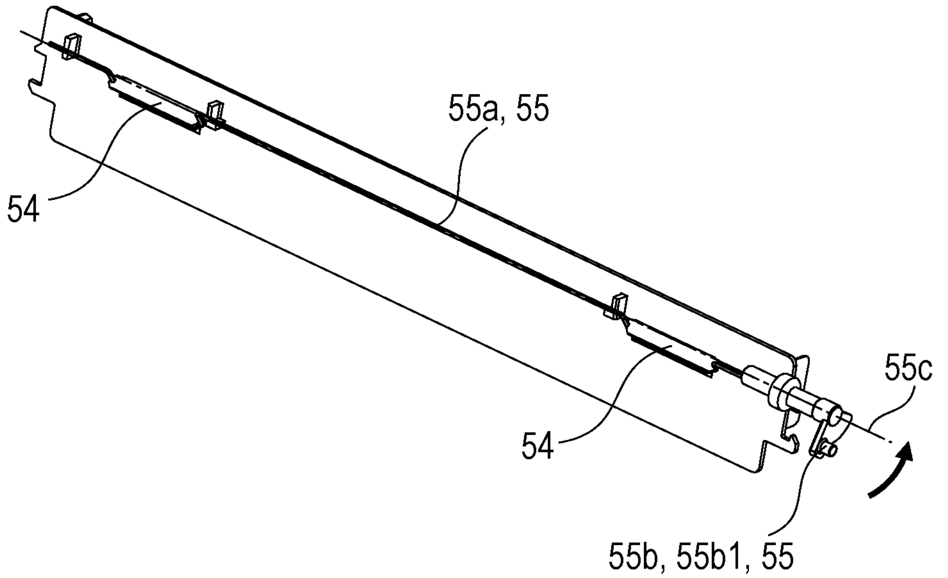
FIGS. 31A and 31B are views that show the configuration of the covers and the connecting portion according to the first embodiment.
Figure 31B:
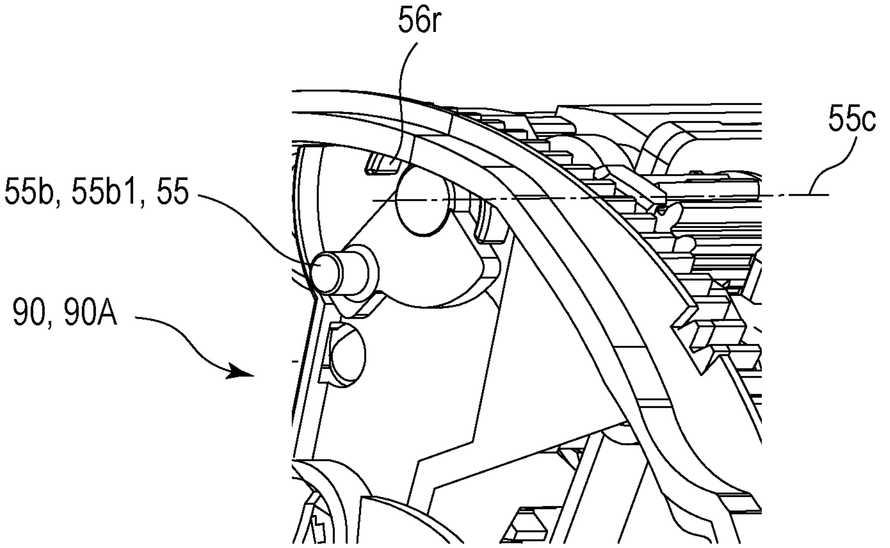
Figure 32A:
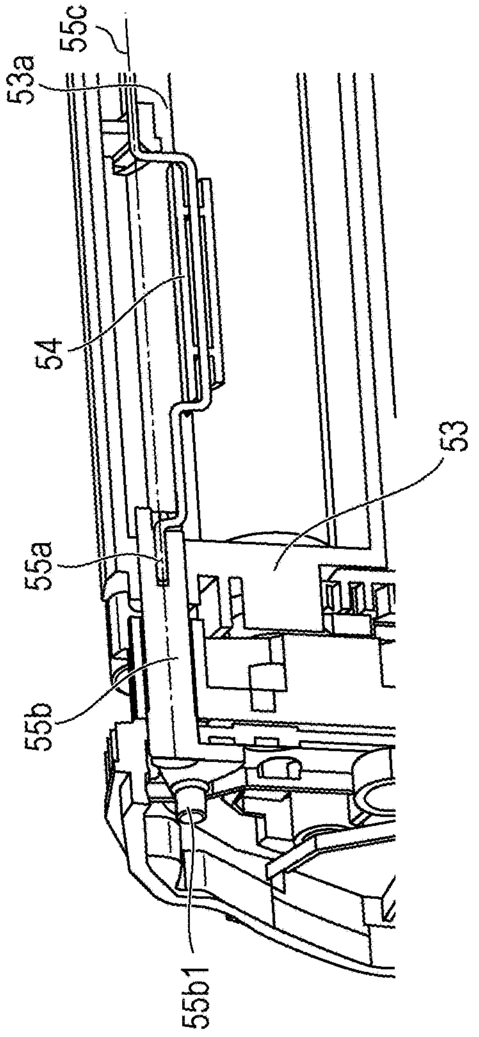
FIGS. 32A and 32B are sectional views of the developing unit according to the first embodiment.
Figure 32B:
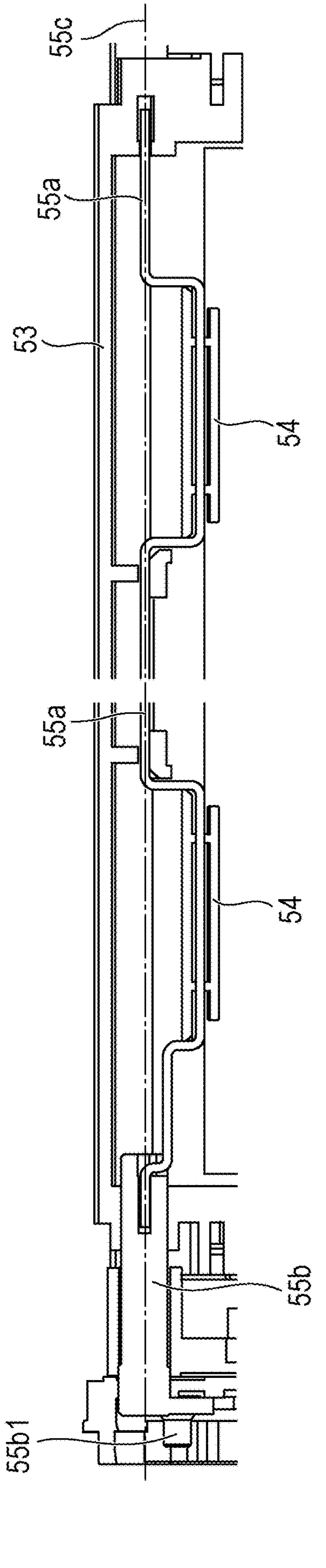

FIGS. 30A, 30B, 31A, and 31B are views that show the configuration of the covers 54 and the connecting portion 55 according to the present embodiment. In FIGS. 30A and 30B, the covers 54 are positioned at the cover retracted position. In FIGS. 31A and 31B, the covers 54 are positioned at the cover position. FIGS. 30A and 31A are views that show the inside of the developing unit 50. FIGS. 30B and 31B are perspective views of the rotary unit 90U when viewed from the outside of the developing unit 50. FIGS. 32A and 32B are sectional views of the developing unit 50.

As shown in FIGS. 30A and 31A, in the present embodiment, the developing frame 53 has the plurality of receiving openings 53*b*. Furthermore, the developing unit 50 includes the plurality of covers 54. In other words, the developing openings include the plurality of receiving openings 53*b*, and the restricting portion (toner restricting portion) includes the plurality of covers 54. When the plurality of covers 54 is at the cover position, the plurality of covers 54 covers the plurality of receiving openings 53*b*; whereas, when the plurality of covers 54 is at the cover retracted position, toner discharged from the toner cartridge 70 is allowed to pass between the plurality of covers 54 and the plurality of receiving openings 53*b* and enter the developing-side storage chamber 53*a*.

As described above, the developing unit 50 includes the connecting portion 55. The connecting portion 55 includes the shaft 55*a* pivotable around the cover pivot axis 55*c*, and the cover 54 is secured to the shaft 55*a*. Hereinafter, the direction in which the cover pivot axis 55*c* extends is referred to as the pivot axis direction. In the present embodiment, the pivot axis direction is parallel to the direction of the rotation axis 90C.

In the direction orthogonal to the pivot axis direction, the cover 54 is disposed at a location away from the cover pivot axis 55*c*. More specifically, the shaft 55*a* is bent and is made up of portions that overlap the cover pivot axis 55*c* and portions away from the cover pivot axis 55*c*. The covers 54 are secured to the parts away from the cover pivot axis 55*c*.

The connecting portion 55 includes a receiving portion (held portion) 55*b* secured to the shaft 55*a*. When the receiving portion 55*b* is moved, the cover 54 moves through the shaft 55*a* between the cover position and the cover retracted position. As shown in FIGS. 32A and 32B, the receiving portion 55*b* is secured to one end of the shaft 55*a*, and the other end of the shaft 55*a* is supported by the developing frame 53.

The receiving portion 55*b* is rotatably supported by the developing frame 53*c* and includes a protrusion (contact portion, restricted portion) 55*b*1. The cover 54 is accommodated in the developing-side storage chamber 53*a*, while the protrusion 55*b*1 is located outside the developing-side storage chamber 53*a*. In the direction orthogonal to the pivot axis direction, the protrusion 55*b*1 is disposed at a location away from the cover pivot axis 55*c*. When the protrusion 55*b*1 is moved, the cover 54 is moved between the cover position and the cover retracted position. In the present embodiment, the rotary body 90 has a movement restricting portion 56*r* facing the receiving portion 55*b*.

As understood from FIGS. 30B and 31B, the position of the protrusion 55*b*1, when the cover 54 is at the cover retracted position, is farther from the rotation axis 90C of the rotary body 90 than the position of the protrusion 55*b*1, when the cover 54 is at the cover position, is from the rotation axis 90C. In other words, when the protrusion 55*b*1 moves in the direction away from the rotation axis 90C in the direction orthogonal to the rotation axis 90C, the cover 54 moves from the cover position toward the cover retracted position. When the protrusion 55*b*1 moves in the direction to approach the rotation axis 90C in the direction orthogonal to the rotation axis 90C, the cover 54 moves from the cover retracted position toward the cover position.

The protrusion 55*b*1 is moved as the rotary body 90 rotates. Hereinafter, the rotation of the rotary body 90 and the movement of the protrusion 55*b*1 will be described.

Figure 33C:
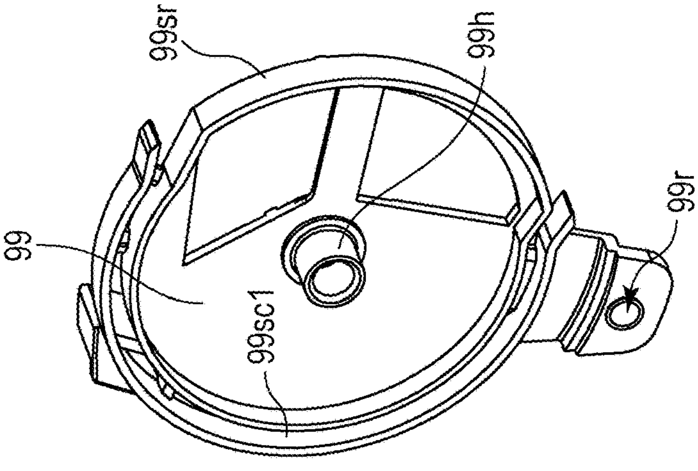
FIGS. 33A to 33C are views that show a rotary holder according to the first embodiment.
Figure 33B:
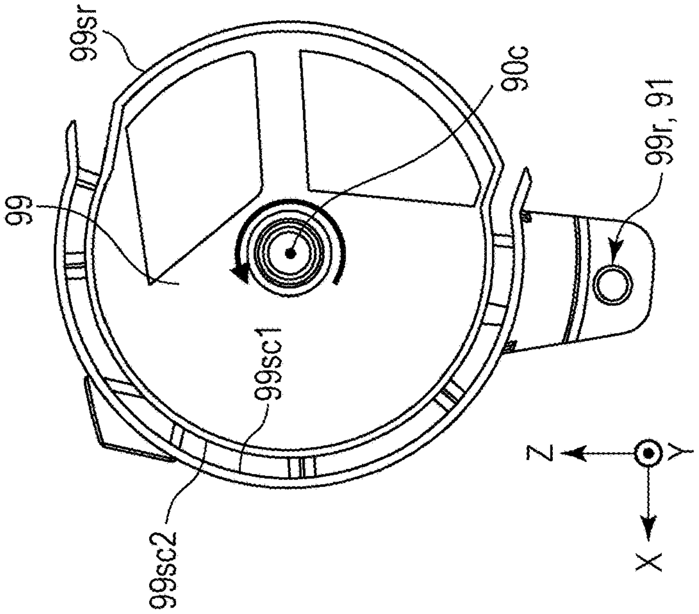
Figure 33A:
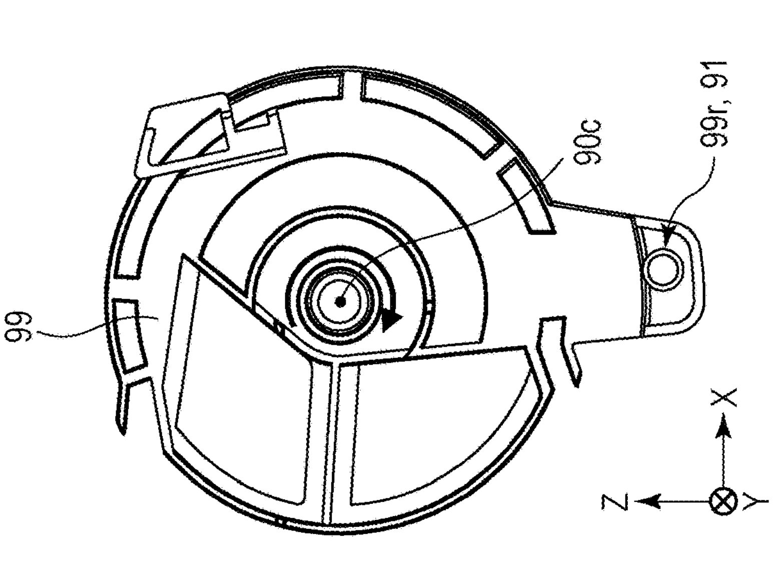

FIGS. 33A, 33B, and 33C are views that show a rotary holder 99 supporting the rotary body 90. FIG. 33A is a view of the rotary holder 99 when viewed in the Y direction. FIG. 33B is a view of the rotary holder 99 from the other side in the Y direction. FIG. 33C is a perspective view of the rotary holder 99.

Figure 34C:
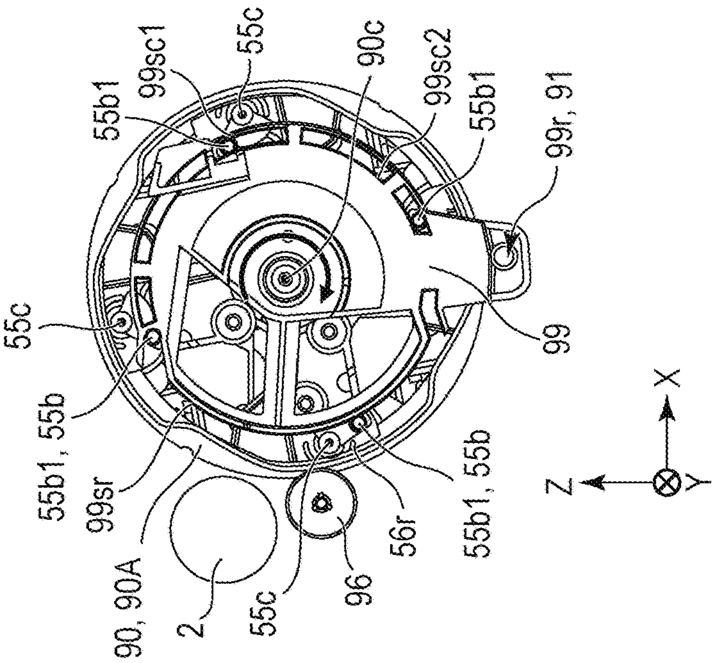
FIGS. 34A to 34C are views that show the relationship between the rotation of the rotary body and the movement of a protrusion relative to the rotary holder according to the first embodiment.
Figure 34B:
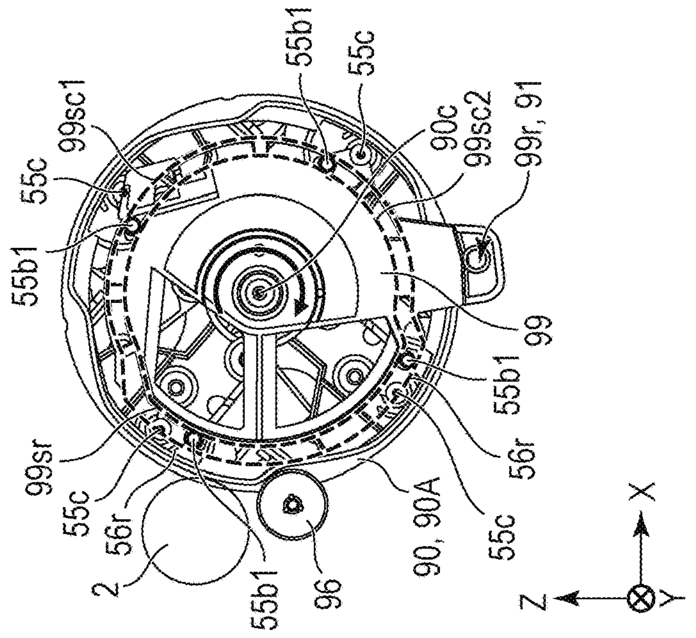
Figure 34A:
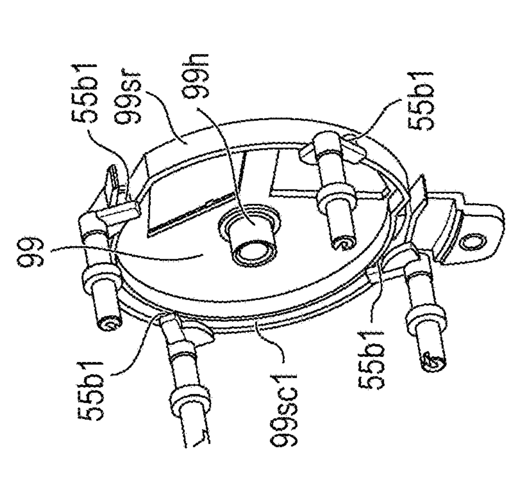

FIGS. 34A, 34B, and 34C are views that show the relationship between the rotation of the rotary body 90 and the movement of the projection 55*b*1 relative to the rotary holder 99. FIG. 34A is a perspective view of the rotary holder 99 and the protrusion 55*b*1. FIGS. 34B and 34C are side views of the rotary holder 99 and the rotary body 90. FIGS. 34B and 34C are views of the rotary holder 99 and the rotary body 90 when viewed in the Y direction.

The apparatus body 1A includes the rotary holder (rotary connecting member, rotary support member) 99. The rotary holder 99 has a rotary connecting portion (rotary support portion) 99*h*. The rotary body 90 (rotary assembly 90A) is supported by the rotary connecting portion 99*h* so as to be rotatable around the rotation axis 90C. The rotary holder 99 has a connecting hole 99*r*.

The pivot shaft 91 (FIG. 5) is inserted into the connecting hole 99*r*. Thus, the rotary holder 99 is pivotably supported about the pivot shaft 91. When the rotary cams 90*e*R, 90*e*L (FIG. 5) contact the roller 96, the rotary holder 99 pivots about the pivot shaft 91. As a result, the rotary body 90 pivots about the pivot shaft 91. In FIG. 34B, the rotary body 90 is in the development posture, and the rotation axis 90C of the rotary body 90 is at a position close to the photoconductor drum 2. In FIG. 34C, the rotary body 90 is in the replacement posture, and the rotation axis 90C of the rotary body 90 is at a position away from the photoconductor drum 2.

The rotary holder 99 has a surface 99*sr*, a surface 99*sc*1, and a surface 99*sc*2. In the present embodiment, the surface 99*sr*, the surface 99*sc*1, and the surface 99*sc*2 have a circular arc shape centered on the rotation axis 90C. The surface 99*sr*, the surface 99*sc*1, and the surface 99*sc*2 make up a guide portion that guides the connecting portion 55.

The protrusion 55*b*1 passes through the portion indicated by the dotted line in FIG. 34B when the rotary body 90 rotates relative to the rotary holder 99. The position of the protrusion 55*b*1 that is in contact with the surface 99*sr* is farther from the rotation axis 90C than the position of the protrusion 55*b*1 that is in contact with the surface 99*sc*1 is from the rotation axis 90C. The position of the protrusion 55*b*1 that is in contact with the surface 99*sr* is farther from the rotation axis 90C than the position of the protrusion 55*b*1 that is in contact with the surface 99*sc*2.

Each of the surface 99*sr*, the surface 99*sc*1, and the surface 99*sc*2 functions as a holding portion for holding the cover 54 at the cover position or at the cover retracted position. When the rotary body 90 (rotary assembly 90A) rotates relative to the rotary holder 99, the connecting portion 55 contacts each of the surface 99*sr*, the surface 99*sc*1, and the surface 99*sc*2 to cause the cover 54 to be positioned at the cover position or at the cover retracted position.

The cover 54 is positioned at the cover retracted position in the state where the protrusion 55*b*1 serving as part of the connecting portion 55 is in contact with the surface 99*sr*. The surface 99*sr* restricts the movement of the cover 54 from the cover retracted position toward the cover position.

When the connecting portion 55 moves in a direction in which the protrusion 55*b*1 moves away from the rotation axis 90C in the state where the protrusion 55*b*1 of the connecting portion 55 is in contact with the surface 99*sr*, the receiving portion 55*b* contacts the movement restricting portion 56*r*.

The cover 54 is positioned at the cover position in the state where the protrusion 55*b*1 is in contact with the surface 99*sc*1. The surface 99*sc*1 restricts the movement of the cover 54 from the cover position toward the cover retracted position.

The cover 54 is positioned at the cover position in the state where the protrusion 55*b*1 is in contact with the surface 99*sc*2. When the size of the protrusion 55*b*1 is smaller than the distance between the surface 99*sc*1 and the surface 99*sc*2, the position of the cover 54 when the protrusion 55*b*1 contacts the surface 99*sc*1 is not completely the same as the position of the cover 54 when the protrusion 55*b*1 contacts the surface 99*sc*2. Even in any one of the case where the protrusion 55*b*1contacts the surface 99*sc*1 and the case where the protrusion 55*b*1 contacts the surface 99*sc*2, the discharge of toner through the receiving opening 53*b* is suppressed by the cover 54. Therefore, the position of the cover 54 when the protrusion 55*b*1 contacts the surface 99*sc*1, and the position of the cover 54 when the protrusion 55*b*1 contacts the surface 99*sc*2 both can be referred to as the cover position.

In this way, the surface (first restricting portion) 99*sc*1 is configured to restrict the movement of the cover 54 from the cover position toward the cover retracted position when the rotary body 90 (rotary assembly 90A) is in the cover posture. The surface (second restricting portion) 99*sr* is configured to restrict the movement of the cover 54 from the cover retracted position toward the cover position when the rotary body 90 (rotary assembly 90A) is in the cover retracted posture.

After the rotary body 90 (rotary assembly 90A) rotates relative to the rotary holder 99 and the developing unit 50 and the toner cartridge 70 pass through the position TP2 (see FIG. 29), the protrusion 55*b*1 contacts the surface 99*sr*. As a result, the cover 54 is positioned at the cover retracted position. In the present embodiment, when the developing unit 50 is at the developing position, the protrusion 55*b*1 is in contact with the surface 99*sr*. In the state where the cover 54 is at the cover retracted position, toner discharged from the discharge opening 71*b* of the toner cartridge 70 is allowed to be supplied to the developing unit 50.

When the rotary body 90 (rotary assembly 90A) further rotates relative to the rotary holder 99 in the state where the developing unit 50 is at the developing position, the protrusion 55*b*1 separates from the surface 99*sr* before the developing unit 50 and the toner cartridge 70 reach the position TP4 (see FIG. 29).

After the protrusion 55*b*1 separates from the surface 99*sr*, the protrusion 55*b*1 enters a guide groove defined by the surface 99*sc*1 and the surface 99*sc*2 before the developing unit 50 and the toner cartridge 70 reach the position TP4. In the present embodiment, the width of the guide groove is larger than the protrusion 55*b*1. The protrusion 55*b*1 in the guide groove can contact at least one of the surface 99*sc*1 and the surface 99*sc*2. The cover 54 is positioned at the cover position when the protrusion 55*b*1 is in the guide groove.

Overall Configuration of Toner Cartridge

The overall configuration of the toner cartridge 70 will be described with reference to FIGS. 35A, 35B, 36, 37A, 37B, 38A, 38B, 38C, 39A, 39B, 39C, and 39D.

Figure 35A:
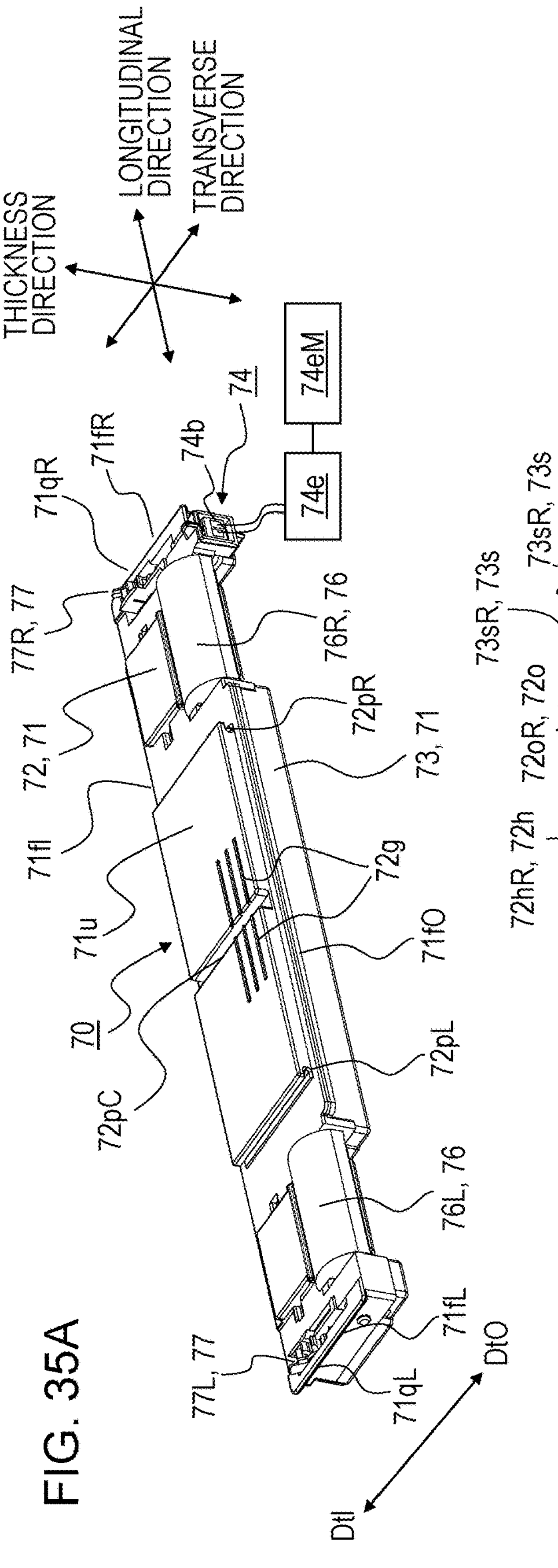
FIGS. 35A and 35B are perspective views of the toner cartridge according to the first embodiment.
Figure 35B:
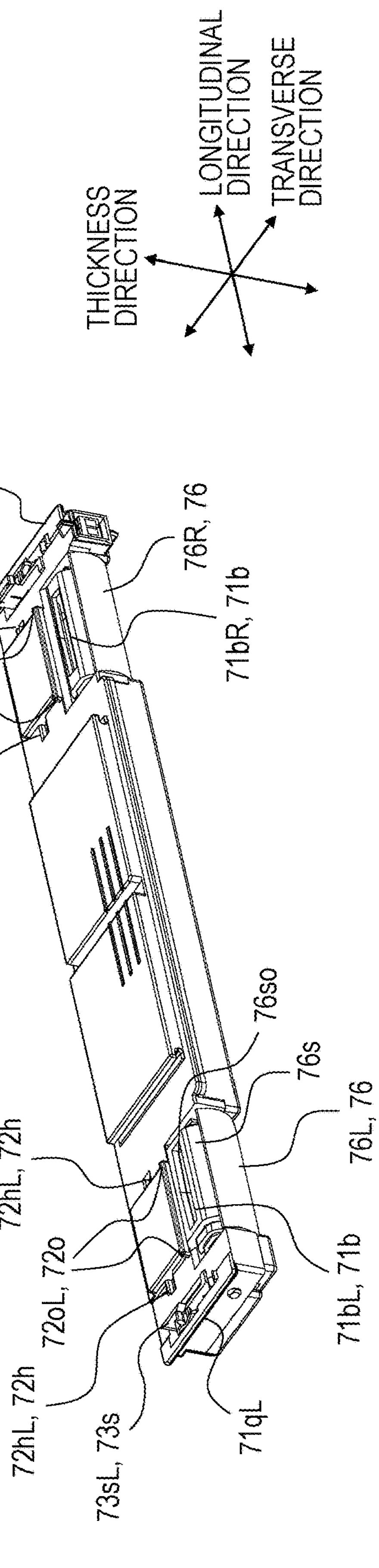

FIGS. 35A and 35B are perspective views of the toner cartridge 70. FIG. 35A shows the toner cartridge 70 of which a toner shutter 76 (described later) is at a closed position. FIG. 35B shows the toner cartridge 70 of which the toner shutter 76 is at an open position.

Figure 36:
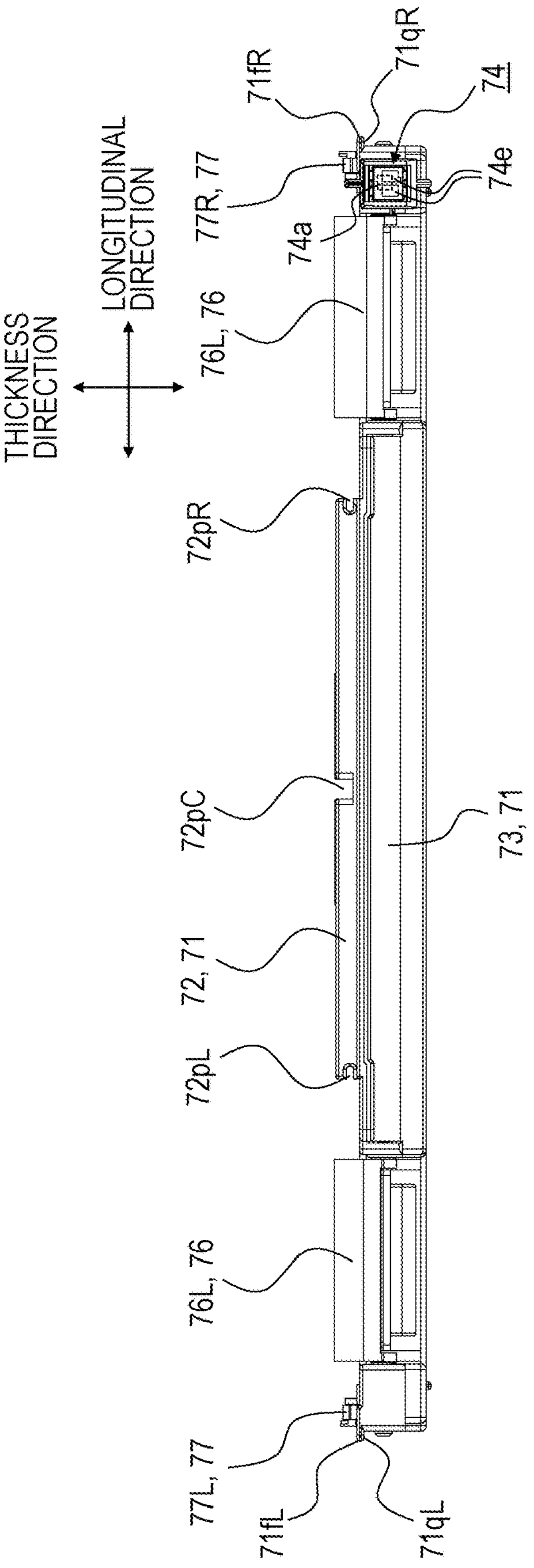
FIG. 36 is a view that shows the toner cartridge when viewed in a transverse direction according to the first embodiment.

FIG. 36 is a view that shows the toner cartridge 70 when viewed in the transverse direction. More specifically, FIG. 36 shows the toner cartridge 70 when viewed in the transverse direction such that a memory 74 (described later) is located at the front. In FIG. 36, the toner shutter 76 is at the closed position.

As shown in FIGS. 35A and 35B, the toner cartridge 70 includes a toner lid 72 and a toner container 73. The toner lid 72 and the toner container 73 are fixed to each other to form the toner frame 71. In other words, the toner lid 72 and the toner container 73 are parts of the toner frame 71. The toner storage chamber 71*a* is defined between the toner lid 72 and the toner container 73.

In the state where the toner cartridge 70 is attached to the tray 80 at the eject position, the toner lid 72 is positioned above the toner container 73, and the toner container 73 faces the tray 80. In the state where the toner cartridge 70 is at the mounting position relative to the developing frame 53, the toner lid 72 faces the developing frame 53.

The surface facing upward in the vertical direction V in the state where the toner cartridge 70 is attached to the tray 80 at the eject position is referred to as the upper surface 71*u* of the toner frame 71. In the present embodiment, the upper surface 71*u* of the toner frame 71 is the same as the upper surface of the toner lid 72. A grip portion 72*g* having at least one protrusion is provided on the upper surface 71*u* of the toner frame 71. The shape of the grip portion 72*g* may be at least one recess or may include at least one protrusion and at least one recess. The position of the grip portion 72*g* may be determined as needed in consideration of the positional relationship with other members and the ease of holding the toner cartridge 70 by a user.

The toner lid 72 has the discharge openings 71*b* (71*b*R, 71*b*L). The toner lid 72 is an example of a first toner frame having the discharge openings 71*b* (71*b*R, 71*b*L). The toner lid 72 has a positioning groove 72*p*C and supported grooves 72*p*R, 72*p*L.

In the longitudinal direction, the positioning groove 72*p*C is located between the supported grooves 72*p*R, 72*p*L, and the supported grooves 72*p*R, 72*p*L are located between the discharge openings 71*b*R, 71*b*L. In the present embodiment, in the longitudinal direction, the positioning groove 72*p*C is located at the center of the toner frame 71.

In the longitudinal direction, the toner frame 71 has one end (first end) 71*f*R and the other end (second end) 71*f*L opposite to the one end 71*f*R. In the transverse direction, the toner frame 71 has one end (front end, first end) 71*f*O and the other end (rear end, second end) 71*f*I opposite to the one end 71*f*O. In the following description, in order to distinguish one end 71*f*R, the other end 71*f*L, one end 71*f*O, and the other end 71*f*I from one another, one end 71*f*R is referred to as the right end 71*f*R, the other end 71*f*L is referred to as the left end 71*f*L, one end 71*f*O is referred to as the outer end 71*f*O, and the other end 71*f*I is referred to as the inner end 71*f*I.

When the tray 80 moves from the eject position to the storage position and the toner cartridge 70 moves from the retreat position to the mounting position, the toner cartridge 70 moves from the outer end 71*f*O toward the inner end 71*f*I. In the state where the toner cartridge 70 is at the mounting position relative to the developing frame 53, the outer end 71*f*O is farther from the rotation center (rotation axis 90C) of the rotary body 90 than the inner end 71*f*I is from the rotation center.

The moving direction of the toner cartridge 70 in which the toner cartridge 70 moves from the retreat position to the mounting position is referred to as an insertion direction DtI. The moving direction of the toner cartridge 70 in which the toner cartridge 70 is moved from the mounting position to the retreat position is referred to as an eject direction DtO. The insertion direction DtI is a direction from the outer end 71*f*0 toward the inner end 71*f*I, and the eject direction DtO is a direction opposite to the insertion direction DtI and is a direction from the inner end 71*f*I toward the outer end 71*f*O. In other words, in the insertion direction DtI, the inner end 71*f*I is located downstream of the outer end 71*f*O. In the present embodiment, the insertion direction DtI and the eject direction DtO are parallel to the transverse direction.

Here, FIG. 36 may also be regarded as a view of the toner cartridge 70 when viewed in the insertion direction DtI.

In the longitudinal direction, the supported groove 72*p*R is closer to the right end 71*f*R than the positioning groove 72*p*C is to the right end 71*f*R, and the discharge opening 71*b*R is closer to the right end 71*f*R than the supported groove 72*p*R is to the right end 71*f*R. In the longitudinal direction, the supported groove 72*p*L is closer to the left end 71*f*L than the positioning groove 72*p*C is to the left end 71*f*L, and the discharge opening 71*b*L is closer to the left end 71*f*L than the supported groove 72*p*L is to the left end 71*f*L.

As shown in FIG. 36, in the present embodiment, the positioning groove 72*p*C is a groove that is recessed away from the developing frame 53 in the thickness direction. In the longitudinal direction, the supported groove 72*p*R is a groove recessed from the right end 71*f*R toward the positioning groove 72*p*C, and the supported groove 72*p*L is a groove recessed from the left end 71*f*L toward the positioning groove 72*p*C. The positioning groove 72*p*C, the supported groove 72*p*R, and the supported groove 72*p*L extend in the transverse direction.

The toner frame 71 includes a supported portion 71*q*R at the right end 71*f*R and a supported portion 71*q*L at the left end 71*f*L. The discharge openings 71*b*R, 71*b*L are located between the supported portions 71*q*R, 71*q*L in the longitudinal direction. The discharge opening 71*b*R is located between the supported portion 71*q*R and the supported groove 72*p*R, and the discharge opening 71*b*L is located between the supported portion 71*q*L and the supported groove 72*p*L.

The toner cartridge 70 includes the memory 74 as a storage medium. The memory 74 includes a storage element 74*a*, a substrate 74*b*, and a plurality of electrodes (electric contacts) 74*e*. In the present embodiment, information related to the toner cartridge 70 can be stored in the storage element 74*a*. The plurality of electrodes (electric contacts) 74*e* is provided on the substrate 74*b* and electrically connected to the storage element 74*a*. In the present embodiment, the plurality of electrodes 74*e* and the storage element 74*a* both are provided on the substrate 74*b*. Alternatively, the memory 74 may separately include a substrate on which the plurality of electrodes 74*e* is provided and a substrate on which the storage element 74*a* is provided.

The apparatus body 1A includes a main body electrode 74*e*M connected to the plurality of electrodes 74*e* of the memory 74. The main body electrode 74*e*M serves as a reading apparatus for the memory 74. The main electrode 74*e*M is movable between a position at which the main body electrode 74*e*M contacts the plurality of electrodes 74*e* and a position at which the main body electrode 74*e*M is spaced apart from the plurality of electrodes 74*e*. When the rotary body 90 rotates in the state where the toner cartridge 70 is at the mounting position, the plurality of electrodes 74*e* of one toner cartridge 70 faces the main body electrode 74*e*M. The posture of the rotary body 90 at this time can be referred to as a reading posture for the one toner cartridge 70. When the rotary body 90 rotates, the main body electrode 74*e*M can be at a position spaced apart from the plurality of electrodes 74*e*. When the plurality of electrodes 74*e* is connected to the main body electrode 74*e*M of the apparatus body 1A, the control unit 30 of the apparatus body 1A can acquire information stored in the storage element 74*a*.

In the transverse direction, the plurality of electrodes 74*e* of the memory 74 is closer to the outer end 71*f*O than to the inner end 71*f*I. In the transverse direction, the plurality of electrodes 74*e* of the memory 74 is farther from the inner end 71*f*I than the discharge openings 71*b* (71*b*R, 71*b*L) are from the inner end 71*f*I. In other words, in the transverse direction, the plurality of electrodes 74*e* of the memory 74 is closer to the outer end 71*f*O than the discharge openings 71*b* (71*b*R, 71*b*L). Since the plurality of electrodes 74*e* is disposed near the outer end 71*f*O of the toner cartridge 70, it is possible to reduce the amount of movement of the main body electrode 74*e*M.

In the present embodiment, in the transverse direction, the entirety of the memory 74 is closer to the outer end 71*f*O than to the inner end 71*f*I. In the transverse direction, the entirety of the memory 74 is farther from the inner end 71*f*I than the discharge openings 71*b* (71*b*R, 71*b*L) are from the inner end 71*f*I. In other words, in the transverse direction, the entirety of the memory 74 is closer to the outer end 71*f*O than the discharge openings 71*b* (71*b*R, 71*b*L) are to the outer end 71*f*O.

The plurality of electrodes 74*e* of the memory 74 is disposed side by side in the longitudinal direction, and faces in a direction from the inner end 71*f*I toward the outer end 71*f*O in the transverse direction. The memory 74 is disposed such that the plurality of electrodes 74*e* faces outward in the radial direction of the rotary body 90.

In the longitudinal direction, the plurality of electrodes 74*e* is closer to the right end 71*f*R than to the center of the toner frame 71. Furthermore, in the longitudinal direction, the plurality of electrodes 74*e* is closer to the right end 71*f*R than the discharge opening 71*b*R is to the right end 71*f*R. In other words, in the longitudinal direction, the plurality of electrodes 74*e* is disposed at the outer side of the toner frame 71 relative to the discharge opening 71*b*R. In the present embodiment, in the longitudinal direction, the entirety of the memory 74 is closer to the right end 71*f*R than to the center of the toner frame 71. Furthermore, in the longitudinal direction, the entirety of the memory 74 is closer to the right end 71*f*R than the discharge opening 71*b*R is to the right end 71*f*R.

In other words, in the longitudinal direction, the entirety of the memory 74 is disposed at the outer side of the toner frame 71 relative to the discharge opening 71*b*R.

In the longitudinal direction, the plurality of electrodes 74*e* may be closer to the left end 71*f*L than to the center of the toner frame 71. In this case, in the longitudinal direction, the plurality of electrodes 74*e* may be closer to the left end 71*f*L than the discharge opening 71*b*L is to the left end 71*f*L. In other words, in the longitudinal direction, the plurality of electrodes 74*e* may be disposed at the outer side of the toner frame 71 relative to the discharge opening 71*b*L. In the longitudinal direction, the entirety of the memory 74 may be closer to the left end 71*f*L than to the center of the toner frame 71. In this case, in the longitudinal direction, the entirety of the memory 74 may be closer to the left end 71*f*L than the discharge opening 71*b*L. In the longitudinal direction, the entirety of the memory 74 may be disposed at the outer side of the toner frame 71 relative to the discharge opening 71*b*L.

The surface (electrode surface) of the substrate 74*b* on which the plurality of electrodes 74*e* is disposed expands in a direction that crosses (which can be orthogonal to) the transverse direction. The electrode surface can expand in the longitudinal direction and the thickness direction. The angle (narrow angle) between the electrode surface and the longitudinal direction is preferably smaller than 30 degrees and more preferably smaller than 10 degrees. In the present embodiment, the electrode surface is parallel to the longitudinal direction. The angle (narrow angle) between the electrode surface and the thickness direction is preferably smaller than 30 degrees and more preferably smaller than 10 degrees. In the present embodiment, the electrode surface is parallel to the thickness direction.

As described above, in the state where the toner cartridge 70 is not mounted to the developing unit 50, the discharge opening 71*b* and the receiving opening 53*b* each are desirably covered by a seal member to suppress the outflow of toner from the discharge opening 71*b* and the receiving opening 53*b*.

As shown in FIG. 35B, the toner cartridge 70 includes a seal member 76*s*.

The seal member 76*s* is disposed for each of the discharge openings 71*b*R, 71*b*L; however, in FIG. 35B, the seal member 76*s* for the discharge opening 71*b*R is not shown.

The toner cartridge 70 of the present embodiment includes the toner shutter 76 covering the discharge opening 71*b*, a shutter drive unit 77 for moving the toner shutter 76 relative to the discharge opening 71*b*, and a stopper 73*s*. Furthermore, the toner cartridge 70 has an opener (developing shutter opener, cartridge-side opener, first opener) 72*o* and a holder 72*h*. The opener 72*o* acts on the developing shutter 57 (described later). In the transverse direction, the holder 72*h* is closer to the inner end 71*fi* than the opener 72*o* is to the inner end 71*fi*.

The seal member 76*s* is stuck to the toner frame 71 (more specifically, the toner lid 72) and has a seal opening 76*so*. When viewed in the thickness direction, the seal opening 76*so* overlaps the discharge opening 71*b*. Toner discharged from the discharge opening 71*b* is supplied to the developing unit 50 through the seal opening 76*so*.

In the present embodiment, the toner frame 71 of the toner cartridge 70 has the discharge openings 71*b*R, 71*b*L. The toner shutter 76, the shutter drive unit 77, the stopper 73*s*, the opener 72*o*, and the holder 72*h* are provided for each of the discharge openings 71*b*R, 71*b*L. Specifically, the toner cartridge 70 includes the toner shutter 76R, the shutter drive unit 77R, the stopper 73*s*R, the opener 720R, and the holder 72 hR, provided for the discharge opening 71*b*R. The toner cartridge 70 includes the toner shutter 76L, the shutter drive unit 77L, the stopper 73*s*L, the opener 720L, and the holder 72*h*L, provided for the discharge opening 71*b*L.

Each of the discharge opening 71*b*R, the toner shutter 76R, the shutter drive unit 77R, the stopper 73*s*R, the opener 720R, and the holder 72 hR and a corresponding one of the discharge opening 71*b*L, the toner shutter 76L, the shutter drive unit 77L, the stopper 73*s*L, the opener 720L, and the holder 72*h*L are symmetric with respect to a plane orthogonal to the longitudinal direction. The seal member 76*s* provided for the discharge opening 71*b*R and the seal member 76*s* provided for the discharge opening 71*b*L are also symmetric with respect to a plane orthogonal to the longitudinal direction.

The configurations and functions of these members provided for the discharge opening 71*b*R and the configurations and functions of these members provided for the discharge opening 71*b*L are common. Therefore, when there is no need to distinguish between these members, in the following description, the suffixes R and L will be omitted, and the members provided for one of the discharge opening 71*b*R and the discharge opening 71*b*L will be described.

Figure 37B:
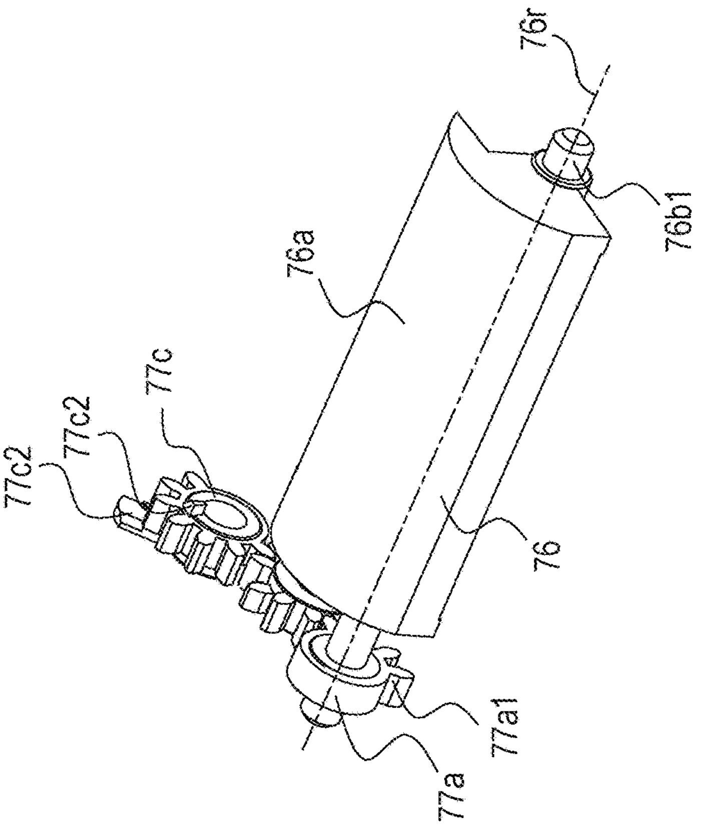
FIGS. 37A and 37B are views that illustrate a toner shutter and a shutter drive unit according to the first embodiment.
Figure 37A:
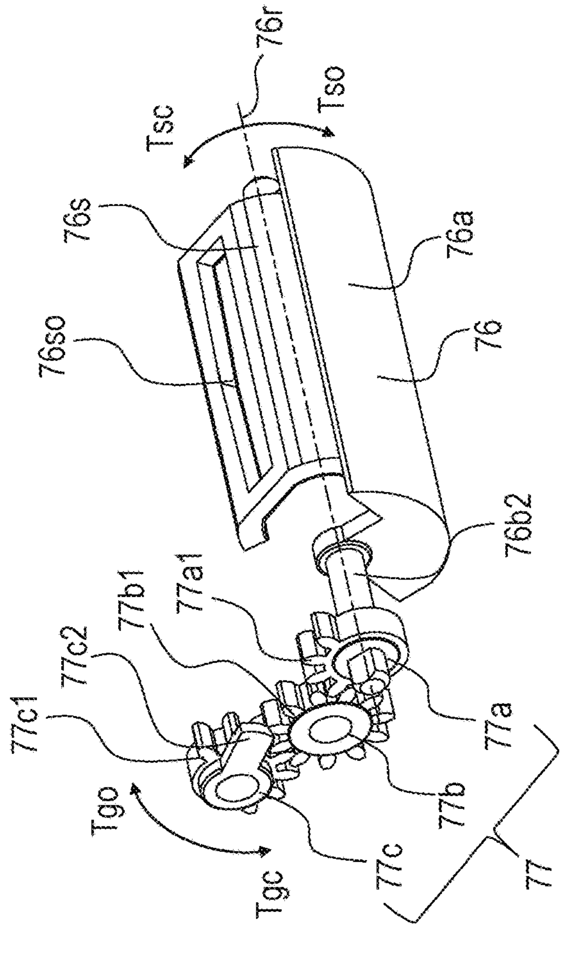

FIGS. 37A and 37B are views that illustrate the toner shutter 76 and the shutter drive unit 77. FIGS. 38A, 38B, 38C, 39A, 39B, 39C, and 39D are views that illustrate the toner shutter 76 and the shutter drive unit 77.

Figure 38B:
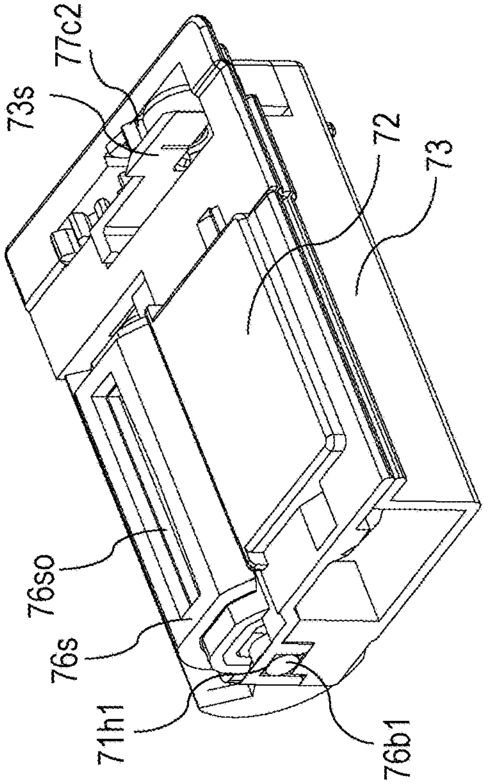
FIGS. 38A to 38C are views that illustrate the toner shutter and the shutter drive unit according to the first embodiment.
Figure 38C:
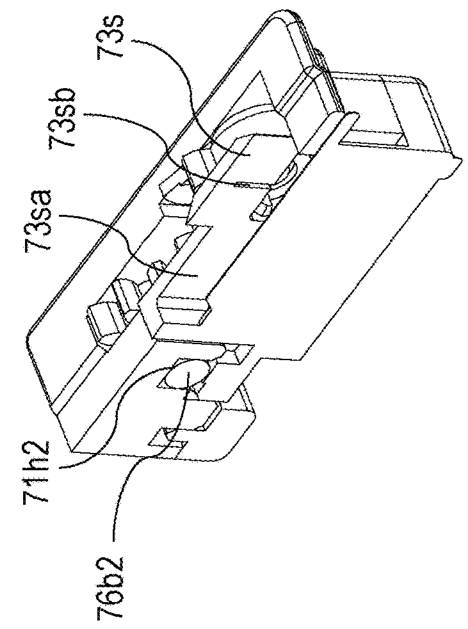
Figure 38A:
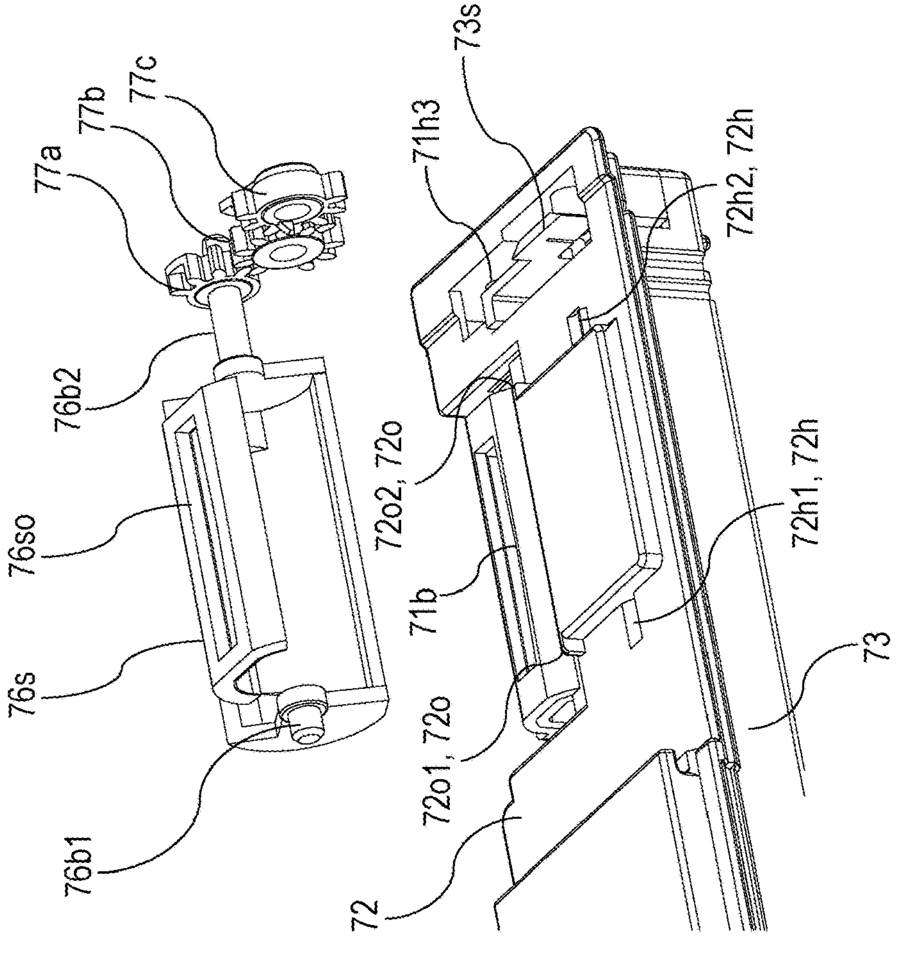

FIG. 38A is an exploded perspective view of the toner cartridge 70. FIG. 38B is a sectional view of the toner cartridge 70 in a shutter support portion **71*h*1 (described later). FIG. 38C is a sectional view of the toner cartridge 70 in a shutter support portion 71*h*2** (described later).

Figure 39A:
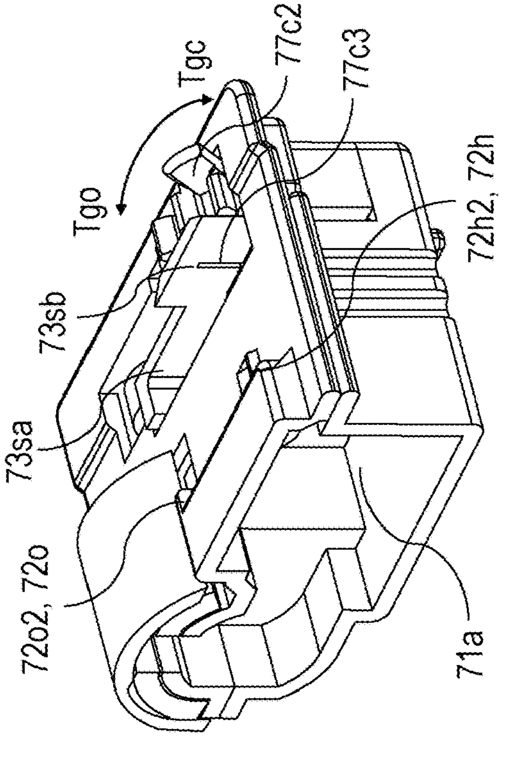
FIGS. 39A to 39D are views that illustrate the toner shutter and the shutter drive unit according to the first embodiment.
Figure 39B:
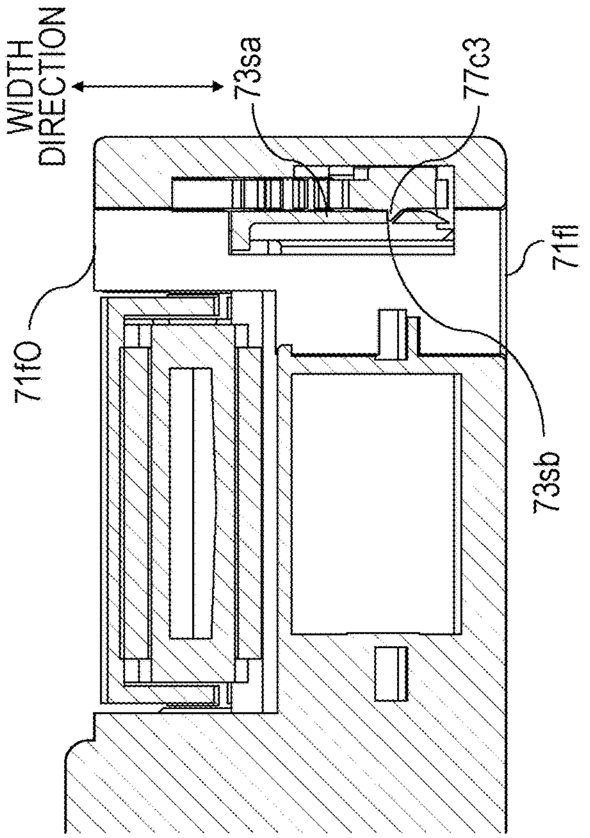
Figure 39C:
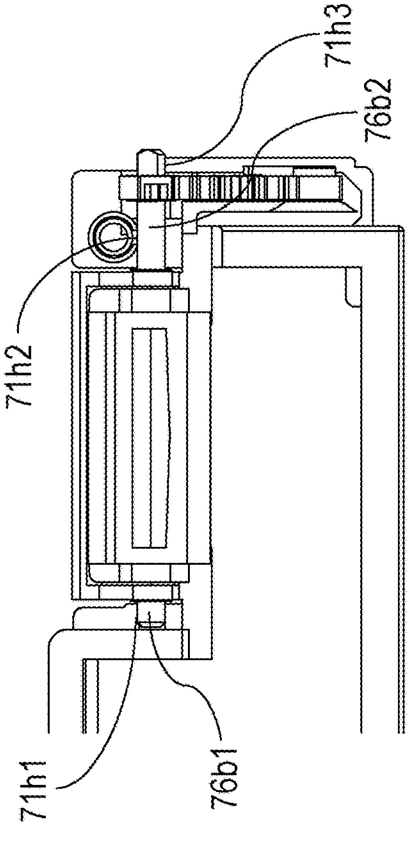
Figure 39D:
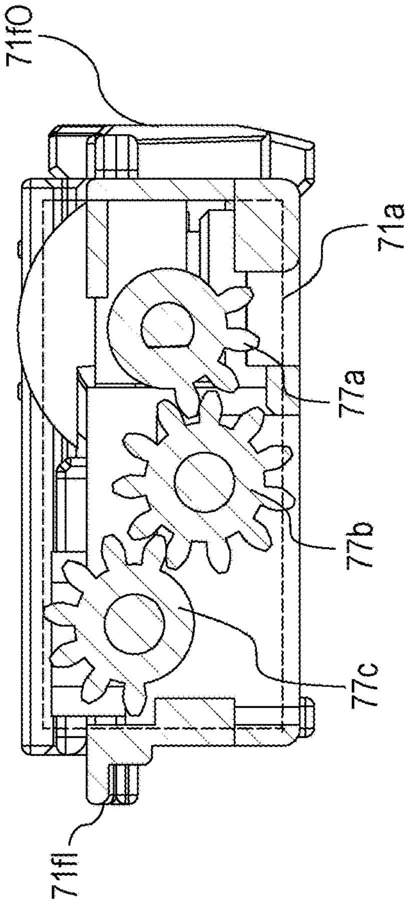

FIG. 39A is a sectional view of the toner cartridge 70 in the state where the toner shutter 76 is at the closed position. FIG. 39B is a sectional view of the engagement portion between an engagement protrusion **77*c*3 and an engagement opening 73*sb* (described later). FIG. 39C is a view that shows the configuration supporting the toner shutter 76. FIGS. 39B and 39C are views of the toner cartridge 70 when viewed in the thickness direction. FIG. 39D is a sectional view of the toner cartridge 70**, taken in the transverse direction.

The toner shutter 76 is configured to be rotatable (pivotable) around the rotation axis (pivot axis) **76*r***.

The direction of the rotation axis **76*r* of the toner shutter 76 can be a direction in the longitudinal direction and further can be parallel to the longitudinal direction. In other words, the direction of the rotation axis 76*r* of the toner shutter 76** is a direction that crosses (which can be a direction orthogonal to) the transverse direction and the thickness direction.

The toner shutter 76 includes a shutter body **76*a* for covering the discharge opening 71*b*, a support shaft 76*b*1, and a support shaft 76*b*2. The support shaft 76*b*1 is supported by the shutter support portion 71*h*1 of the toner frame 71, and the support shaft 76*b*2 is supported by the shutter support portion 71*h*2 of the toner frame 71. As a result, the toner shutter 76 is supported so as to be rotatable (pivotable) relative to the toner frame 71. As shown in FIGS. 38A and 38B, each of the shutter support portions 71*h*1, 71*h*2 is formed by the toner lid 72 and the toner container 73**.

When the toner shutter 76 is at the closed position, the shutter body **76*a* covers the discharge opening 71*b* and the seal opening 76*so*. As a result, the discharge of toner from the discharge opening 71*b* and the seal opening 76*so* is suppressed. The seal member 76*s* can be elastic. The seal member 76*s* sandwiched between the shutter body 76*a* and the toner frame 71 when the toner shutter 76 is at the closed position can be deformed (compressed). As a result, the discharge of toner from the discharge opening 71*b* and the seal opening 76*so*** is further reliably suppressed.

In the direction of the rotation axis **76*r*, the shutter body 76*a*, the discharge opening 71*b*, and the seal member 76*s* are disposed between the support shaft 76*b*1 and the support shaft 76*b*2. With this arrangement, the floating of the shutter body 76*a* relative to the seal member 76*s* due to reaction force received from the seal member 76*s*** is suppressed.

As shown in FIGS. 37A and 37B, the shutter drive unit 77 includes at least one gear. In the present embodiment, the shutter drive unit 77 includes a plurality of gears and, more specifically, includes a drive gear **77*a*, an idle gear 77*b*, and an engagement gear 77*c*. In the present embodiment, the directions of the rotation axes of the drive gear 77*a*, the idle gear 77*b*, and the engagement gear 77*c* are parallel to the direction of the rotation axis 76*r***.

The drive gear **77*a* has gear teeth 77*a*1. In the present embodiment, the drive gear 77*a* is an intermittent gear, and, in the rotation direction of the drive gear 77*a*, the size of the region in which the gear 77*a*1 is provided is smaller than 360 degrees. The engagement gear 77*c* has gear teeth 77*cl*. In the present embodiment, the engagement gear 77*c* is an intermittent gear, and, in the rotation direction of the engagement gear 77*c*, the range in which the gear teeth 77*c*1** are provided is smaller than 360 degrees.

The idle gear **77*b* is in mesh with the drive gear 77*a* and the engagement gear 77*c*. In the present embodiment, the gear teeth 77*b*1 of the idle gear 77*b* are in mesh with the gear teeth 77*a*1 and 77*cl*. The idle gear 77*b* may be a stepped gear, and the number of gear teeth that are in mesh with the gear teeth 77*a*1 may be different from the number of gear teeth that are in mesh with the gear teeth 77*c*1. Instead of the idle gear 77*b*, a belt may be used to transmit the drive of the engagement gear 77*c* to the drive gear 77*a***.

The drive gear **77*a* is secured to the toner shutter 76 and is configured to rotate integrally with the toner shutter 76. More specifically, the drive gear 77*a* is secured to the support shaft 76*b*2 in the state where the rotation relative to the support shaft 76*b*2 is restricted. The idle gear 77*b* and the engagement gear 77*c* are supported by the toner frame 71**.

When viewed in the direction of the rotation axis **76*r*, the rotation direction of the engagement gear 77*c* and the rotation direction of the drive gear 77*a* (the rotation direction of the toner shutter 76) are the same. When the engagement gear 77*c* rotates in an opening direction Tgo, the drive gear 77*a* and the toner shutter 76 also rotate in the same direction, and the toner shutter 76 moves from the closed position toward the open position. The direction to open the toner shutter 76 is referred to as the opening direction Tso. When the engagement gear 77*c* rotates in a closing direction Tgc, the drive gear 77*a* and the toner shutter 76 also rotate in the same direction, and the toner shutter 76 moves from the open position toward the closed position. The direction to close the toner shutter 76 is referred to as the closing direction Tsc. The moving direction (the opening direction Tso, the closing direction Tsc) of the toner shutter 76 at the time when the toner shutter 76 moves between the closed position and the open position crosses the longitudinal direction of the toner cartridge 70**.

As shown in FIG. 39D, in the transverse direction, the rotation axis of the engagement gear **77*c* is closer to the inner end 71*fi* than the rotation axis of the drive gear 77*a* or the rotation axis of the toner shutter 76 is to the inner end 71*fi***.

The shutter drive unit 77 is disposed outside of the toner storage chamber **71*a*. As shown in FIG. 39D, when viewed in the longitudinal direction, the shutter drive unit 77 overlaps the toner storage chamber 71*a*. Therefore, it is difficult to form a toner flow path from the toner storage chamber 71*a* to the discharge opening 71*b*, in the space for disposing the shutter drive unit 77**.

In the present embodiment, in the longitudinal direction, the side where the shutter drive unit 77 is disposed with respect to the center of the discharge opening **71*b* is referred to as a drive side. Also, the opposite side is referred to as a nondrive side. The volume of the toner storage chamber communicating with the discharge opening 71*b* is larger on the nondrive side than on the drive side. By doing so, it is easier to ensure the flexibility to dispose a toner flow path from the toner storage chamber 71*a* to the discharge opening 71*b***.

As shown in FIG. 38C, in the present embodiment, the toner frame 71 has a shutter support portion **71*h*3, and the support shaft 76*b*2 is supported by the shutter support portion 71*h*3 in addition to the shutter support portions 71*h*1, 71*h*2. As shown in FIG. 39C, in the direction of the rotation axis 76*r*, the drive gear 77*a* is disposed between the shutter support portion 71*h*2 and the shutter support portion 71*h*3. With this configuration, it is possible to suppress variation in axial interval distance between the drive gear 77*a* and the idle gear 77*b* when the toner shutter 76** moves.

On the other hand, as shown in FIGS. 39A, 39B, and 39C, the toner frame 71 has the stopper **73*s*. In the present embodiment, the toner container 73 has the stopper 73*s*. The stopper 73*s* has an arm 73*sa*, and the arm 73*sa* has an engagement opening 73***sb*. On the other hand, the engagement gear 77*c* has an engagement protrusion 77*c*3. When the toner shutter 76 is at the closed position, the engagement protrusion 77*c*3 is engaged with the engagement opening 73*sb*. In this state, the engagement gear 77*c* is restricted from rotating in the opening direction Tgo. This can suppress the user from accidentally moving the toner shutter 76 to the open position. In other words, the stopper 73*s* restricts the movement of the toner shutter 76 from the closed position toward the open position.

As shown in FIG. 39B, in the present embodiment, the engagement protrusion 77*c*3 has an inclined surface. As a result, when the engagement gear 77*c* rotates in the closing direction in the state where the engagement protrusion 77*c*3 is engaged with the engagement opening 73*sb*, the arm 73*sa* deflects to allow the rotation of the engagement gear 77*c*. This operation will be described later.

Furthermore, the engagement gear 77*c* has an adjustment protrusion 77*c*2. As shown in FIG. 38C, the toner frame 71 has the holder 72*h* and the opener 72*o*. The holder 72*h* is a recess formed on the upper surface 71*u* of the toner frame 71. The holder 72*h* includes a first holder 72*h*1 and a second holder 72*h*2. The opener 72*o* is a protrusion formed on the upper surface 71*u* of the toner frame 71. The opener 72*o* includes a first opener 72*o*1 and a second opener 72*o*2.

In the direction of the rotation axis 76*r*, the first holder 72*h*1 and the first opener 72*o*1 are provided on one side of the center of the discharge opening 71*b*, and the second holder 72*h*2 and the second opener 72*o*2 are provided on the other side of the center of the discharge opening 71*b*. In other words, in the direction of the rotation axis 76*r*, the center of the discharge opening 71*b* is located between the first holder 72*h*1 and the second holder 72*h*2. In the direction of the rotation axis 76*r*, the center of the discharge opening 71*b* is located between the first opener 72*o*1 and the second opener 72*o*2.

The functions of the holder 72*h*, the opener 72*o*, and the adjustment protrusion 77*c*2 will be described later.

Grip Portion of Toner Cartridge

The shape of the grip portion 72*g* is not limited to the above one. Hereinafter, modifications of the shape of the grip portion of the toner cartridge 70 will be described with reference to FIGS. 40A, 40B, 41A, 41B, 42A, and 42B.

Figure 40A:
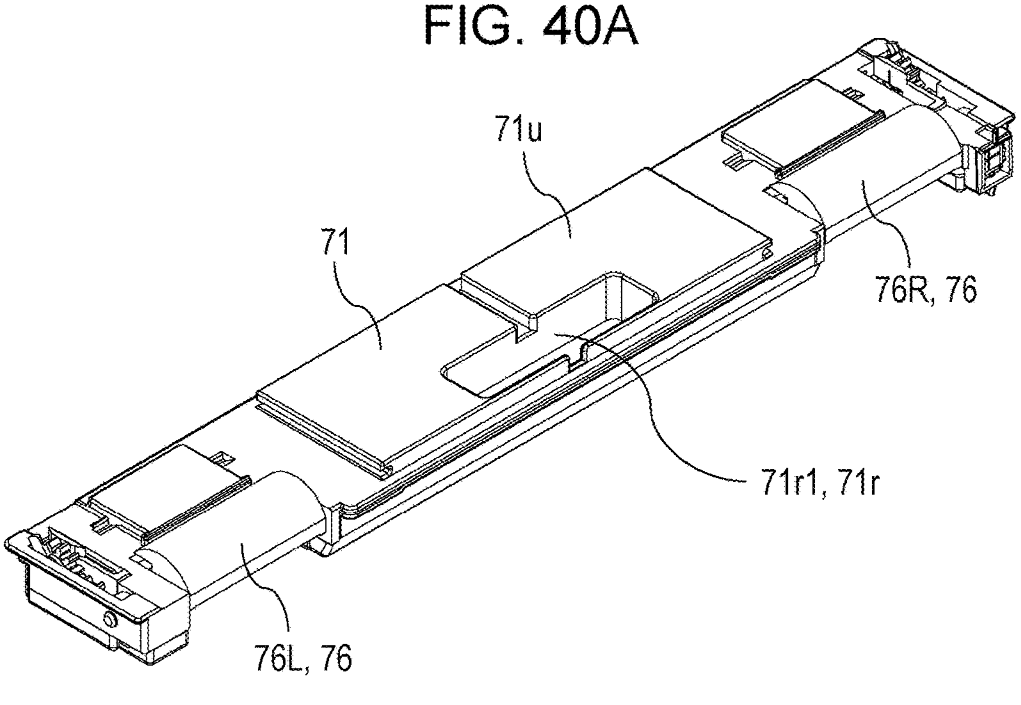
FIGS. 40A and 40B are views that illustrate a modification of a grip portion of the toner cartridge according to the first embodiment.
Figure 40B:
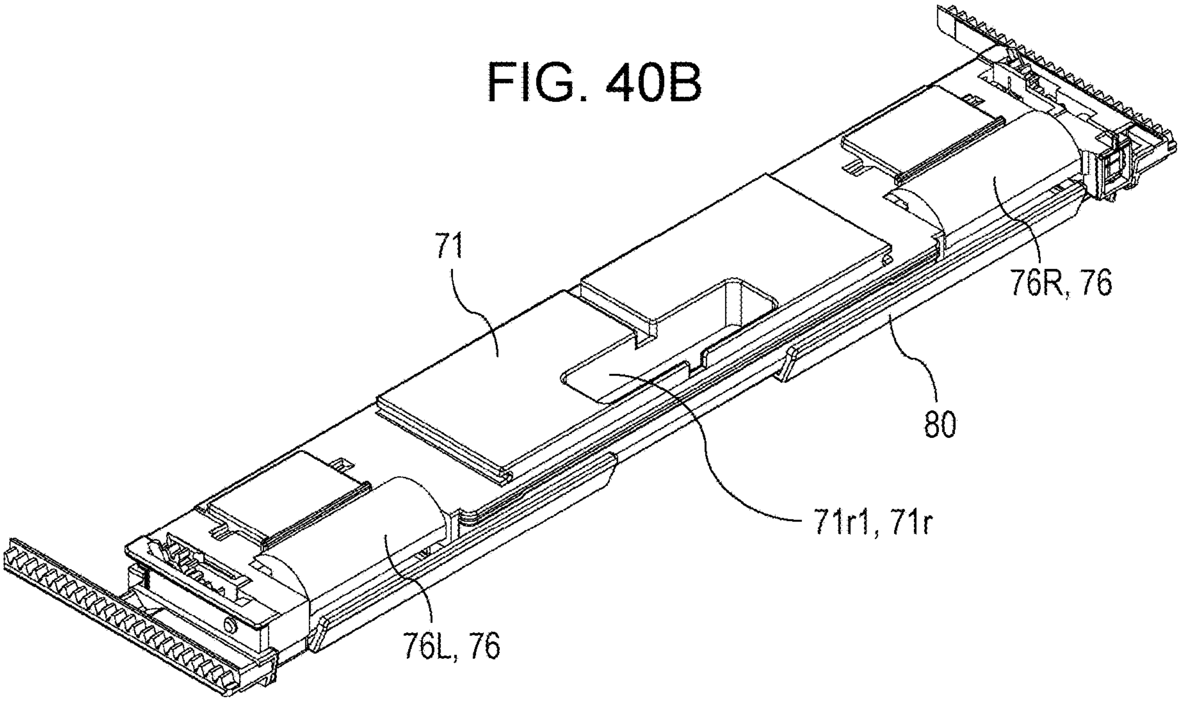
Figure 41A:
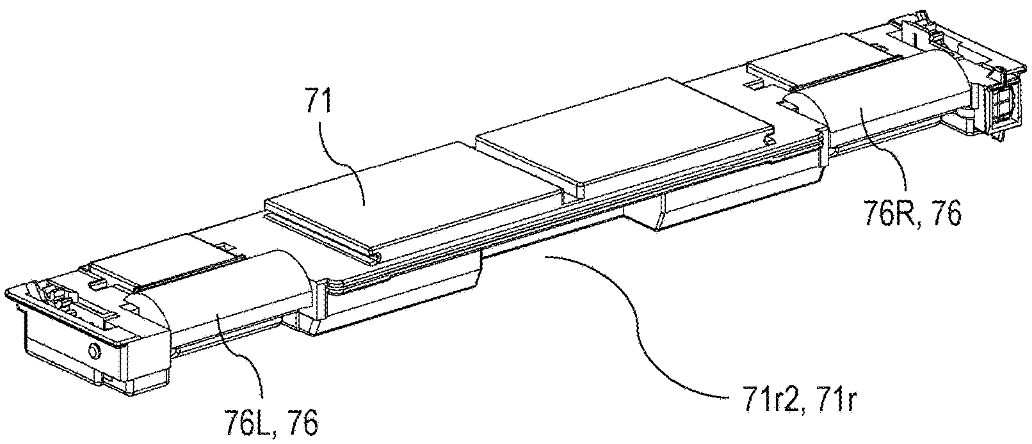
FIGS. 41A and 41B are views that illustrate a modification of the grip portion of the toner cartridge according to the first embodiment.
Figure 41B:
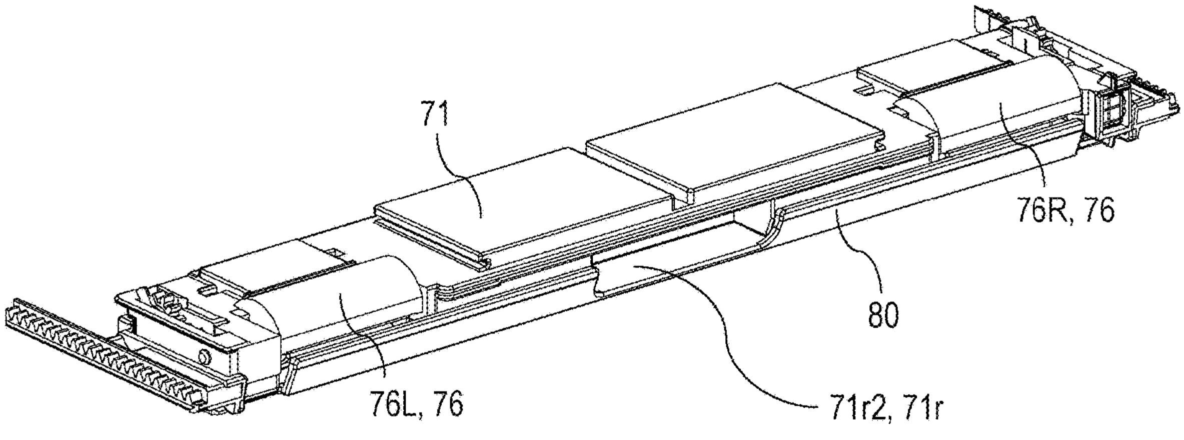
Figure 42A:
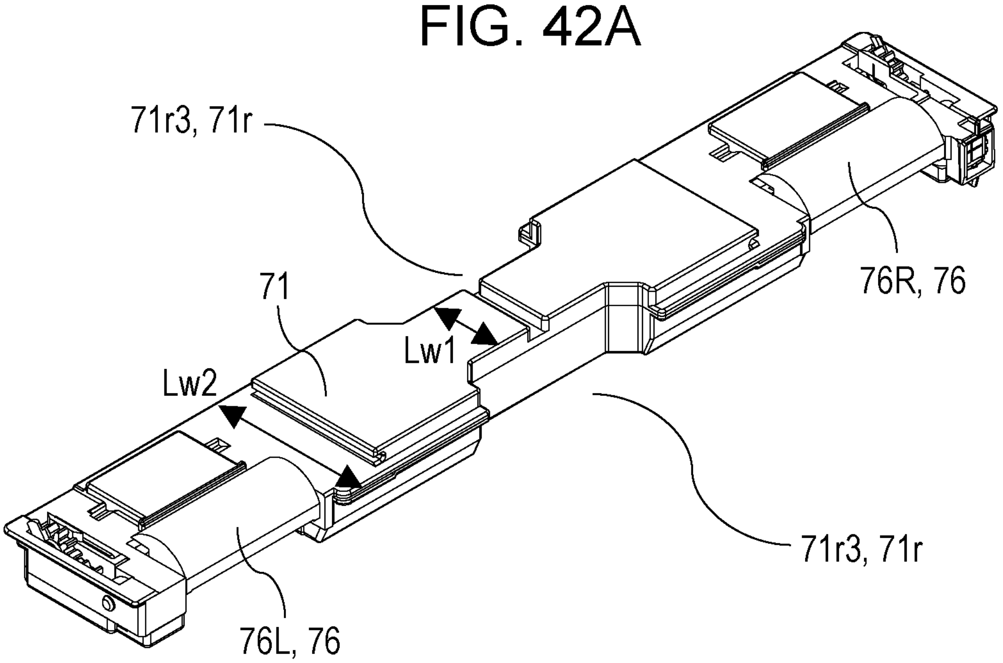
FIGS. 42A and 42B are views that illustrate a modification of the grip portion of the toner cartridge according to the first embodiment.
Figure 42B:
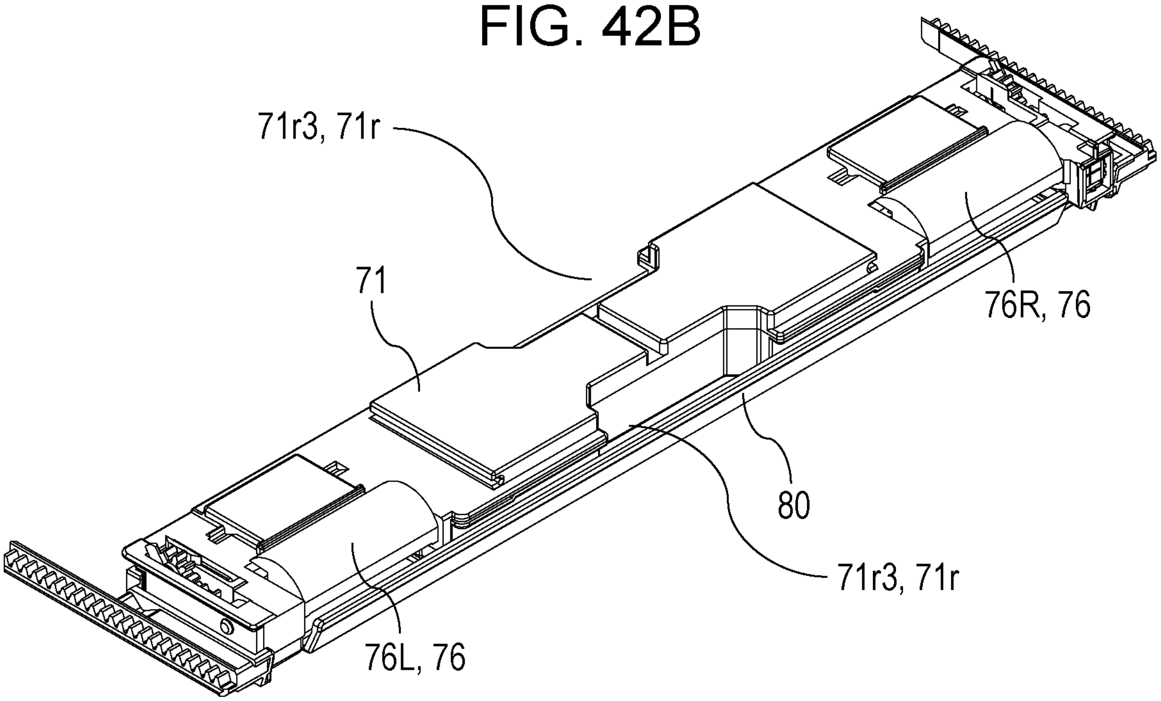

FIGS. 40A, 40B, 41A, 41B, 42A, and 42B are views that illustrate the grip portion 71*r* of the toner cartridge 70 according to modifications. FIGS. 40A, 41A, and 42A are perspective views of the toner cartridge 70. FIGS. 40B, 41B, and 42B are perspective views of the toner cartridge 70 in the state attached to the tray 80.

Instead of the above-described grip portion 72*g*, the toner cartridge 70 according to a modification has a recessed grip portion 71*r*. Each grip portion 71*r* is disposed between one toner shutter 76 and the other toner shutter 76 in the longitudinal direction of the toner cartridge 70.

The grip portion 71*r*1 shown in FIGS. 40A and 40B is a recess formed on the upper surface 71*u* of the toner frame 71. The grip portion 71*r*1 may reach a bottom surface that is the opposite side of the upper surface 71*u*. In other words, the grip portion 71*r*1 may be a hole penetrating the toner frame 71. A user is able to lift the toner cartridge 70 from the tray 80 by inserting the fingers into the grip portion 71*r*1. The toner frame 71 may have a plurality of recesses having a similar function to the grip portion 71*r*1.

The grip portion 71*r*2 shown in FIGS. 41A and 41B is a recess formed on the side surface of the toner frame 71. In the state where the toner cartridge 70 is attached to the tray 80, part of the toner frame 71 is positioned above the grip portion 71*r*2. A user is able to lift the toner cartridge 70 from the tray 80 by inserting the fingers into the grip portion 71*r*2. The toner frame 71 may have a plurality of recesses having a similar function to the grip portion 71*r*2.

The grip portion 71*r*3 shown in FIGS. 42A and 42B is a plurality of recesses formed on the side surface of the toner frame 71. Part of the toner cartridge 70 has a length Lw2 in the transverse direction. In the longitudinal direction, the range in which one grip portion 71*r*3 is disposed and the range in which the other grip portion 71*r*3 is disposed at least partially overlap. In the longitudinal direction, the range in which two grip portions 71*r*3 are disposed has a length Lw1 in the transverse direction. The length Lw1 is shorter than the length Lw2. A user is able to lift the toner cartridge 70 from the tray 80 by holding the part having the length Lw1.

With any configuration as well, in the state where the toner cartridge 70 is mounted on the tray 80, the grip portion 71*r* is exposed to the outside of the tray 80, and a user is able to visually recognize the grip portion 71*r*. Therefore, a user is able to lift the toner cartridge 70 from the tray 80 by using the grip portion 71*r* while checking the position of the grip portion 71*r*.

Overall Configuration of Developing Unit

Hereinafter, the overall configuration of the developing unit 50 of the rotary body 90 will be described with reference to FIGS. 43, 44A, 44B, 44C, 44D, 45A, 45B, 45C, 46A, and 46B.

Figure 43:
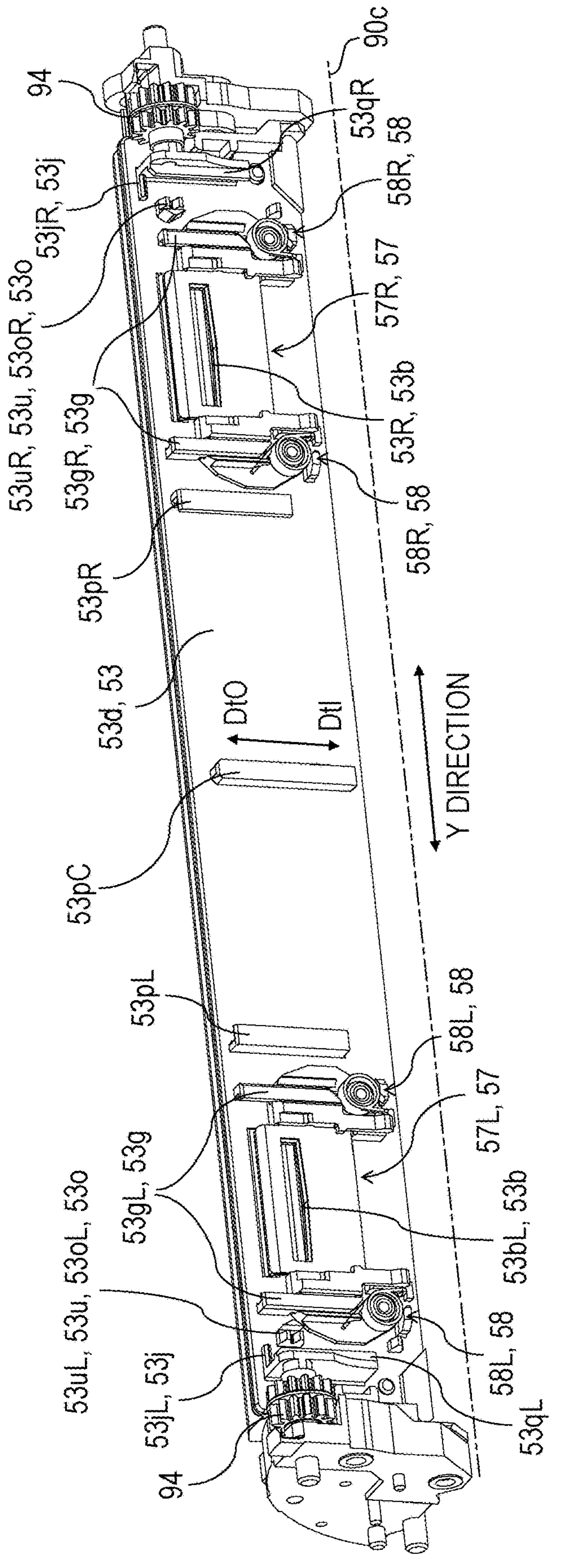
FIG. 43 is a perspective view of the developing unit according to the first embodiment.

FIG. 43 is a perspective view of the developing unit 50. FIG. 43 shows the state where the developing shutter 57 (described later) is at the open position.

As shown in FIG. 43, the developing frame 53 has a lower surface 53*d*. The lower surface 53*d* faces the toner cartridge 70 in the state where the toner cartridge 70 is at the mounting position. In the replacement posture in which the toner cartridge 70 is allowed to be removed relative to the developing unit 50, the lower surface 53*d* faces downward in the vertical direction V, and the lower surface 53*d* is positioned above the upper surface of the toner frame 71.

The developing frame 53 has the receiving openings 53*b* (53*b*R, 53*b*L). In the state where the toner cartridge 70 is at the mounting position, the receiving opening 53*b*R communicates with the discharge opening 71*b*R, and the receiving opening 53*b*L communicates with the discharge opening 71*b*L.

The developing frame 53 has a positioning protrusion 53*p*C, and support protrusions 53*p*R, 53*p*L. In the Y direction, the positioning protrusion 53*p*C is located between the support protrusions 53*p*R, 53*p*L, and the support protrusions 53*p*R, 53*p*L are located between the receiving openings 53*b*R, 53*b*L. The developing frame 53 has end support portions 53*q*R, 53*q*L. In the Y direction, the receiving openings 53*b*R, 53*b*L are located between the end support portions 53*q*R, 53*q*L. The receiving opening 53*b*R is located between the end support portion 53*q*R and the support protrusion 53*p*R, and the receiving opening 53*b*L is located between the end support portion 53*q*L and the support protrusion 53*p*L.

As shown in FIG. 43, in the present embodiment, the positioning protrusion 53*p*C and the support protrusions 53*p*R, 53*p*L extend in the insertion direction DtI. In the state where the toner cartridge 70 is at the mounting position, the positioning protrusion 53*p*C is engaged with the positioning groove 72*p*C, with the result that the movement of the toner cartridge 70 in the longitudinal direction relative to the developing frame 53 is restricted. In the state where the toner cartridge 70 is at the mounting position, the support protrusion 53*p*R is engaged with the supported groove 72*p*R, and the support protrusion 53*p*L is engaged with the supported groove 72*p*L. As a result, in the direction that crosses (which can be the direction orthogonal to) the insertion direction DtI, the movement of the toner cartridge 70 in the direction away from the lower surface 53*d* of the developing frame 53 is restricted.

As described above, in the state where the toner cartridge 70 is not mounted to the developing unit 50, the discharge opening 71*b* and the receiving opening 53*b* each are desirably covered by a seal member to suppress the outflow of toner from the discharge opening 71*b* and the receiving opening 53*b*.

The developing unit 50 of the present embodiment includes the developing shutter 57 for covering the receiving opening 53*b*, a shutter lock 58, a shutter guide 53*g* for guiding the developing shutter 57, an opener (toner shutter opener, main body-side opener, developing-side opener, first opener) 53*o*, a release portion 53*u*, and an adjustment portion 53*j*.

In the present embodiment, the developing frame 53 of the developing unit 50 has the receiving openings 53*b*R, 53*b*L. The developing shutter 57, the shutter lock 58, the shutter guide 53*g*, the opener 53*o*, the release portion 53*u*, and the adjustment portion 53*j* are provided for each of the receiving openings 53*b*R, 53*b*L. Specifically, the developing unit 50 includes the developing shutter 57R, the shutter lock 58R, the shutter guide 53*g*R, the opener 53*o*R, the release portion 53*u*R, and the adjustment portion 53*j*R, provided for the receiving opening 53*b*R. The developing unit 50 includes the developing shutter 57L, the shutter lock 58L, the shutter guide 53*g*L, the opener 53*o*L, the release portion 53*u*L, and the adjustment portion 53*j*L, provided for the receiving opening 53*b*L.

Each of the receiving opening 53*b*R, the developing shutter 57R, the shutter lock 58R, the shutter guide 53*g*R, the opener 53*o*R, the release portion 53*u*R, and the adjustment portion 53*j*R and a corresponding one of the receiving opening 53*b*L, the developing shutter 57L, the shutter lock 58L, the shutter guide 53*g*L, the opener 53*o*L, the release portion 53*u*L, and the adjustment portion 53*j*L are symmetric with respect to a plane orthogonal to the Y direction. A seal member 57*s* provided for the receiving opening 53*b*R and a seal member 57*s* provided for the receiving opening 53*b*L are also symmetric with respect to a plane orthogonal to the Y direction.

The configurations and functions of these members provided for the receiving opening 53*b*R and the configurations and functions of those members provided for the receiving opening 53*b*L are common. Therefore, when there is no need to distinguish between these members, in the following description, the suffixes R and L will be omitted, and the members provided for one of the receiving opening 53*b*R and the receiving opening 53*b*L will be described.

FIGS. 44A, 44B, 44C, 44D, 45A, 45B, 45C, 46A, and 46B are views that illustrate the movement of the developing shutter 57.

Figure 44C:
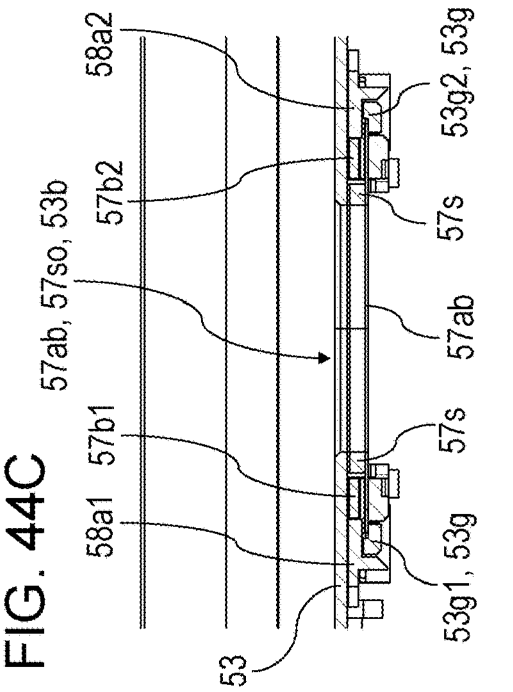
FIGS. 44A to 44D are views that illustrate the movement of a developing shutter according to the first embodiment.
Figure 44D:
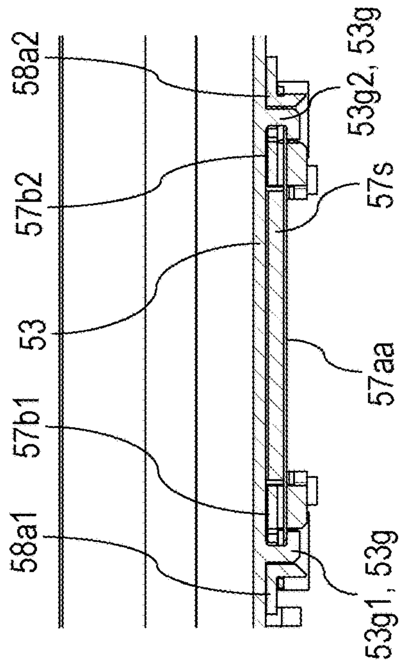
Figure 44A:
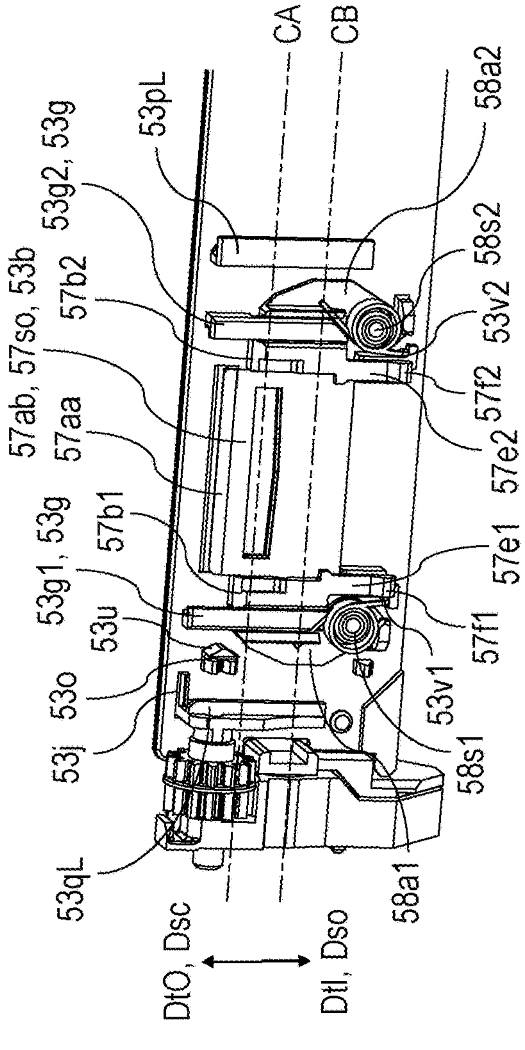
Figure 44B:
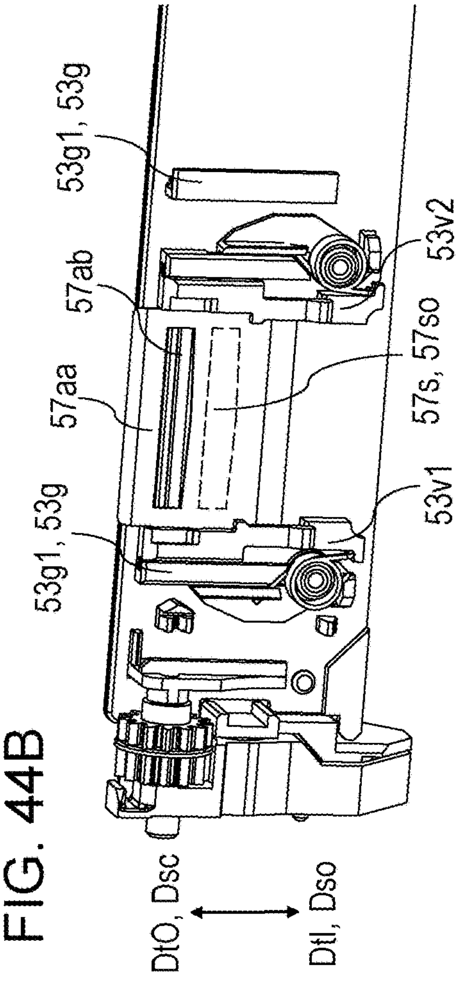

FIG. 44A shows the developing unit 50 in which the developing shutter 57 is at the open position. FIG. 44B shows the developing unit 50 in which the developing shutter 57 is at the closed position. FIG. 44C is a sectional view of the developing unit 50, taken at a position indicated by CA in FIG. 44A. FIG. 44D is a sectional view of the developing unit 50, taken at a position indicated by CB in FIG. 44A.

Figures 45A, 45B, 45C:
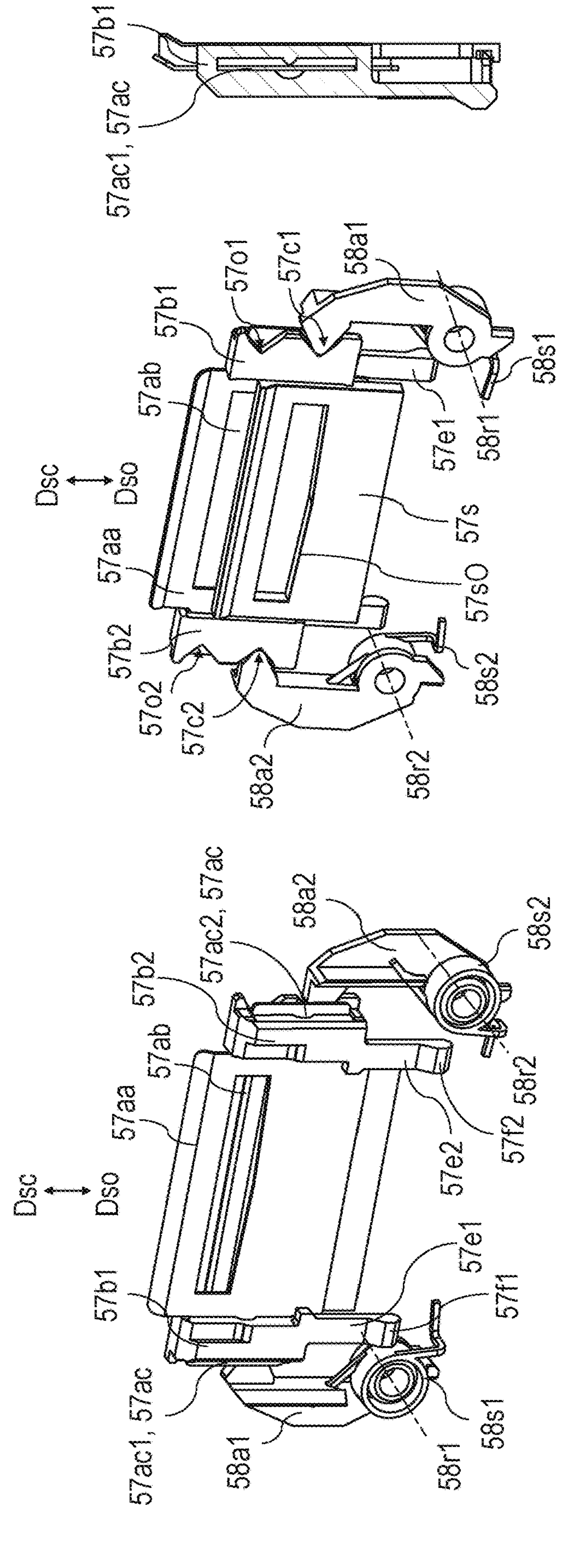
FIGS. 45A to 45C are views that illustrate the movement of the developing shutter according to the first embodiment.
Figure 46B:
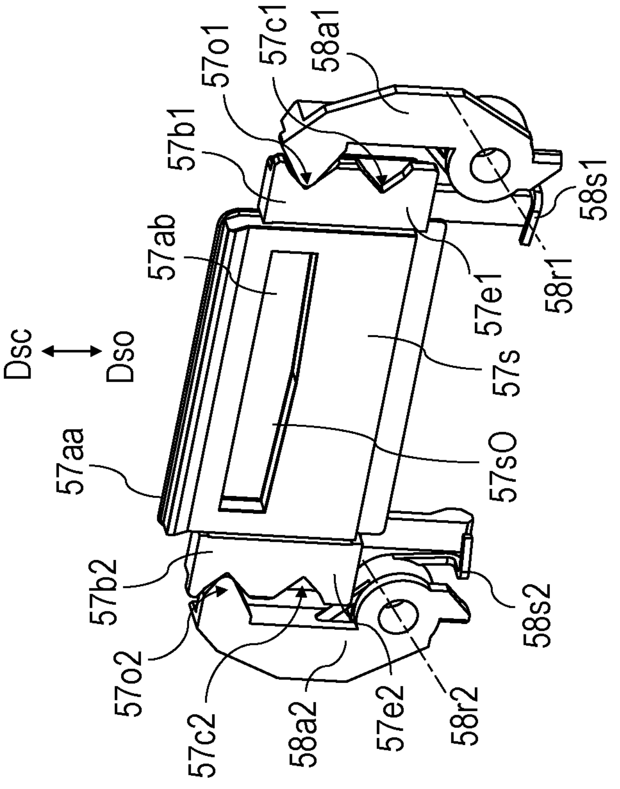
FIGS. 46A and 46B are views that illustrate the movement of the developing shutter according to the first embodiment.
Figure 46A:
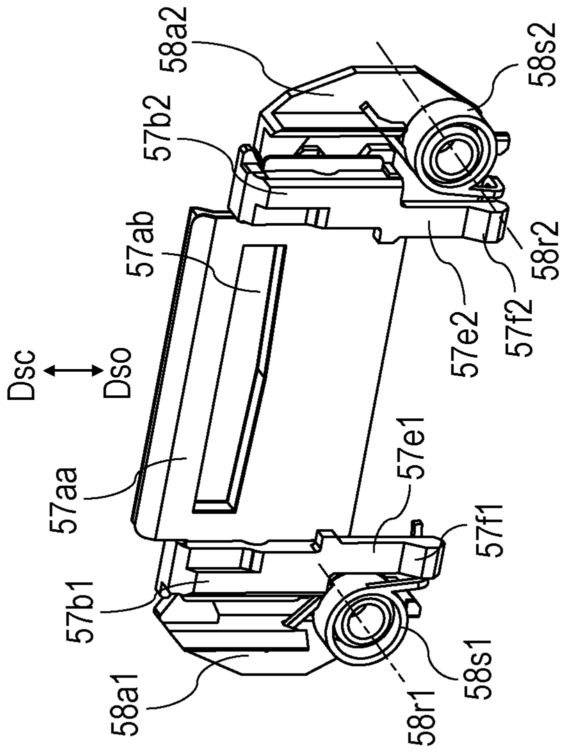

FIGS. 45A and 45B show the relationship between the developing shutter 57 and the shutter lock 58 when the developing shutter 57 is at the closed position. FIG. 45C is a sectional view that shows the relationship between a shutter body 57*a* and a shutter holder 57*b* (described later). FIGS. 46A and 46B show the relationship between the developing shutter 57 and the shutter lock 58 when the developing shutter 57 is at the open position.

The developing shutter 57 is configured to be movable in the insertion direction DtI and the eject direction DtO of the toner cartridge 70. The moving direction of the developing shutter 57 can be parallel to the insertion direction DtI and the eject direction DtO. The moving direction of the developing shutter 57 is a direction that crosses (which can be a direction orthogonal to) the direction of the rotation axis 90C of the rotary body 90.

The developing shutter 57 has the shutter body 57*a* for covering the receiving opening 53*b* and the shutter holder 57*b*. More specifically, the shutter holder 57*b* has a first shutter holder 57*b*1 and a second shutter holder 57*b*2.

The shutter body 57*a* is formed from sheet metal (metal plate), and has a cover portion 57*aa* and a shutter opening 57*ab*. When the developing shutter 57 is at the closed position, the cover portion 57*aa* covers the receiving opening 53*b*. When the developing shutter 57 is at the open position, the shutter opening 57*ab* overlaps the receiving opening 53*b*. The thickness of the shutter body 57*a* is thinner than the thickness of the seal member 57*s*. When the shutter body 57*a* is formed from sheet metal, the shutter body 57*a* can be made thinner, so the rotary body 90 can be downsized.

As shown in FIG. 45C, the shutter body 57*a* has engagement portions 57*ac* that engage with the shutter holders 57*b*. More specifically, the engagement portions 57*ac* include a first engagement portion 57*ac*1 that engages with the first shutter holder 57*b*1, and a second engagement portion 57*ac*2 that engages with the second shutter holder 57*b*2.

The developing frame 53 has the shutter guides 53*g*. More specifically, the shutter guides 53*g* include a first shutter guide 53*g*1 and a second shutter guide 53*g*2.

The first shutter holder 57*b*1 is supported by the first shutter guide 53*g*1 of the developing frame 53, and the second shutter holder 57*b*2 is supported by the second shutter guide 53*g*2 of the developing frame 53. As a result, the developing shutter 57 is supported such that the developing shutter 57 can linearly move relative to the developing frame 53. The moving direction of the developing shutter 57 when the developing shutter 57 moves from the closed position to the open position is referred to as an opening direction Dso, and the moving direction of the developing shutter 57 when the developing shutter 57 moves from the open position to the closed position is referred to as a closing direction Dsc. The opening direction Dso can be parallel to the insertion direction DtI, and the closing direction Dsc can be parallel to the eject direction DtO.

As shown in FIGS. 44A, 44B, 44C, and 44D, the seal member 57*s* is provided between the developing shutter 57 and the developing frame 53. The seal member 57*s* is stuck to the developing frame 53 and has a seal opening 57*so*. The seal opening 57*so* overlaps the receiving opening 53*b*. Toner discharged from the toner cartridge 70 is supplied to the developing unit 50 through the shutter opening 57*ab*, the seal opening 57*so*, and the receiving opening 53*b*.

When the developing shutter 57 is at the closed position, the cover portion 57*aa* of the shutter body 57*a* covers the receiving opening 53*b* and the seal opening 57*so*. As a result, the discharge of toner from the receiving opening 53*b* and the seal opening 57*so* is suppressed. The seal member 57*s* can be elastic. When the developing shutter 57 is at the closed position, the seal member 57*s* sandwiched between the shutter body 57*a* and the developing frame 53 can be deformed (compressed). As a result, the discharge of toner from the receiving opening 53*b* and the seal opening 57*so* is further reliably suppressed.

In the direction of the rotation axis 90C, the shutter body 57*a*, the receiving opening 53*b*, and the seal member 57*s* are located between the first shutter guide 53*g*1 and the second shutter guide 53*g*2. With this arrangement, the floating of the shutter body 57*a* relative to the seal member 57*s* due to reaction force received from the seal member 57*s* is suppressed.

On the other hand, as shown in FIGS. 44A, 44B, 44C, 44D, 45A, 45B, 45C, 46A, and 46B, the developing unit 50 includes the shutter lock 58. More specifically, the shutter lock 58 includes a first lock body (first arm) 58*a*1, a first lock spring (first urging portion) 58*s*1 urging the first lock body 58*a*1, a second lock body (second arm) 58*a*2, and a second lock spring (second urging portion) 58*s*2 urging the second lock body 58*a*2.

The first lock body 58*a*1 is rotatable around a rotation axis 58*r*1, and the second lock body 58*a*2 is rotatable around a rotation axis 58*r*2. The rotation axes 58*r*1, 58*r*2 each extend in a direction that crosses (which can be a direction orthogonal to) the moving direction (Dso, Dsc) of the developing shutter 57 when the developing shutter 57 moves between the open position and the closed position.

The first lock body 58*a*1 engages with the first shutter holder 57*b*1 through an opening provided in the first shutter guide 53*g*1. The second lock body 58*a*2 engages with the second shutter holder 57*b*2 through an opening provided in the second shutter guide 53*g*2.

The first shutter holder 57*b*1, the first shutter guide 53*g*1, the first lock body 58*a*1, and the first lock spring 58*s*1 and the second shutter holder 57*b*2, the second shutter guide 53*g*2, the second lock body 58*a*2, and the second lock spring 58*s*2 are symmetric with respect to a plane. Therefore, the configurations and relationships of the first shutter holder 57*b*1, the first shutter guide 53*g*1, the first lock body 58*a*1, and the first lock spring 58*s*1 and the configurations and relationships of the second shutter holder 57*b*2, the second shutter guide 53*g*2, the second lock body 58*a*2, and the second lock spring 58*s*2 are symmetric with respect to a plane.

The configurations and relationships of the first shutter holder 57*b*1, the first lock body 58*a*1, and the first lock spring 58*s*1 will be described in more details.

The first shutter holder 57*b*1 has a first positioning portion 57*c*1 and a second positioning portion 57*o*1. The first positioning portion 57*c*1 and the second positioning portion 57*o*1 are recesses with which the first lock body 58*a*1 engages. When the first lock body 58*a*1 engages with the first positioning portion 57*c*1, the developing shutter 57 is positioned at the closed position. When the first lock body 58*a*1 engages with the second positioning portion 57*o*1, the developing shutter 57 is positioned at the open position.

The first positioning portion 57*c*1 has two inclined portions that respectively incline relative to the opening direction Dso and the closing direction Dsc. When one of the inclined portions is pushed by the first lock body 58*a*1, the developing shutter 57 receives a force in the opening direction Dso. When the other one of the inclined portions is pushed by the first lock body 58*a*1, the developing shutter 57 receives a force in the closing direction Dsc. When the force that the first lock body 58*a*1 receives from one of the inclined portions and the force that the first lock body 58*a*1 receives from the other one of the inclined portions are balanced, the developing shutter 57 is positioned at the closed position.

The second positioning portion 571 has two inclined portions that respectively incline relative to the opening direction Dso and the closing direction Dsc. When one of the inclined portions is pushed by the first lock body 58*a*1, the developing shutter 57 receives a force in the opening direction Dso. When the other one of the inclined portions is pushed by the first lock body 58*a*1, the developing shutter 57 receives a force in the closing direction Dsc. When the force that the first lock body 58*a*1 receives from one of the inclined portions and the force that the first lock body 58*a*1 receives from the other one of the inclined portions are balanced, the developing shutter 57 is positioned at the open position.

In the state where the first lock body 58*a*1 is engaged with the first positioning portion 57*c*1, the first lock body 58*a*1 is urged by the first lock spring 58*s*1 in a direction to engage with the first positioning portion 57*c*1. In the state where the first lock body 58*a*1 is engaged with the second positioning portion 57*o*1, the first lock body 58*a*1 is urged by the first lock spring 58*s*1 in a direction to engage with the second positioning portion 57*o*1. In the present embodiment, the first lock spring 58*s*1 is a helical spring; however, the first lock spring 58*s*1 may also be a spring of another shape.

When the developing shutter 57 is urged in the opening direction Dso in the state where the first lock body 58*a*1 is engaged with the first positioning portion 57*c*1, the first lock body 58*a*1 moves against the urging force of the first lock spring 58*s*1 and disengages from the first positioning portion 57*c*1. When the developing shutter 57 is urged in the closing direction Dsc in the state where the first lock body 58*a*1 is engaged with the second positioning portion 57*o*1, the first lock body 58*a*1 moves against the urging force of the first lock spring 58*s*1 and disengages from the second positioning portion 57*o*1. In other words, when the developing shutter 57 moves from the closed position to the open position, or when the developing shutter 57 moves from the open position to the closed position, the developing shutter 57 moves the first lock body 58*a*1 against the urging force of the first lock spring 58*s*1.

As will be described later, the developing shutter 57 moves between the closed position and the open position under the driving force of the motor M2. Therefore, the first lock body 58*a*1 is moved against the urging force of the first lock spring 58*s*1 by the driving force of the motor M2.

The first shutter holder 57*b*1 has an arm 57*e*1 and a protrusion 57*f*1. The arm 57*e*1 is elastically deformable. The functions of the arm 57*e*1 and the protrusion 57*f*1 will be described later.

The configurations and relationships of the second shutter holder 57*b*2, the second lock body 58*a*2, and the second lock spring 58*s*2 will be described in more details.

The second shutter holder 57*b*2 has a first positioning portion 57*c*2 and a second positioning portion 57*o*2. The first positioning portion 57*c*2 and the second positioning portion 57*o*2 are recesses with which the second lock body 58*a*2 engages. When the second lock body 58*a*2 engages with the first positioning portion 57*c*2, the developing shutter 57 is positioned at the closed position. When the second lock body 58*a*2 engages with the second positioning portion 57*o*2, the developing shutter 57 is positioned at the open position.

The first positioning portion 57*c*2 has two inclined portions that respectively incline relative to the opening direction Dso and the closing direction Dsc. When one of the inclined portions is pushed by the second lock body 58*a*2, the developing shutter 57 receives a force in the opening direction Dso. When the other one of the inclined portions is pushed by the second lock body 58*a*2, the developing shutter 57 receives a force in the closing direction Dsc. When the force that the second lock body 58*a*2 receives from one of the inclined portions and the force that the second lock body 58*a*2 receives from the other one of the inclined portions are balanced, the developing shutter 57 is positioned at the closed position.

The second positioning portion 57*o*2 has two inclined portions that respectively incline relative to the opening direction Dso and the closing direction Dsc. When one of the inclined portions is pushed by the second lock body 58*a*2, the developing shutter 57 receives a force in the opening direction Dso. When the other one of the inclined portions is pushed by the second lock body 58*a*2, the developing shutter 57 receives a force in the closing direction Dsc. When the force that the second lock body 58*a*2 receives from one of the inclined portions and the force that the second lock body 58*a*2 receives from the other one of the inclined portions are balanced, the developing shutter 57 is positioned at the open position.

In the state where the second lock body 58*a*2 is engaged with the first positioning portion 57*c*2, the second lock body 58*a*2 is urged by the second lock spring 58*s*2 in a direction to engage with the first positioning portion 57*c*2. In the state where the second lock body 58*a*2 is engaged with the second positioning portion 57*o*2, the second lock body 58*a*2 is urged by the second lock spring 58*s*2 in a direction to engage with the second positioning portion 57*o*2. In the present embodiment, the second lock spring 58*s*2 is a helical spring; however, the second lock spring 58*s*2 may also be a spring of another shape.

When the developing shutter 57 is urged in the opening direction Dso in the state where the second lock body 58*a*2 is engaged with the first positioning portion 57*c*2, the second lock body 58*a*2 moves against the urging force of the second lock spring 58*s*2 and disengages from the first positioning portion 57*c*2. In the state where the second lock body 58*a*2 is engaged with the second positioning portion 57*o*2, when the developing shutter 57 is urged in the closing direction Dsc, the second lock body 58*a*2 moves against the urging force of the second lock spring 58*s*2 and disengages from the second positioning portion 57*o*2. In other words, when the developing shutter 57 moves from the closed position to the open position, or when the developing shutter 57 moves from the open position to the closed position, the developing shutter 57 moves the second lock body 58*a*2 against the urging force of the second lock spring 58*s*2.

As will be described later, the developing shutter 57 moves between the closed position and the open position under the driving force of the motor M2. Therefore, the second lock body 58*a*2 is moved against the urging force of the second lock spring 58*s*2 by the driving force of the motor M2.

The second shutter holder 57*b*2 has an arm 57*e*2 and a protrusion 57*f*2. The arm 57*e*2 is elastically deformable. The functions of the arm 57*e*2 and the protrusion 57*f*2 will be described later.

Positional Relationships of Developing Shutter and Toner Shutter Relative to Photoconductor Drum The positional relationships of the developing shutter 57 and the toner shutter 76 relative to the photoconductor drum 2 will be described with reference to FIGS. 47A, 47B, 48A, and 48B.

Figure 47B:
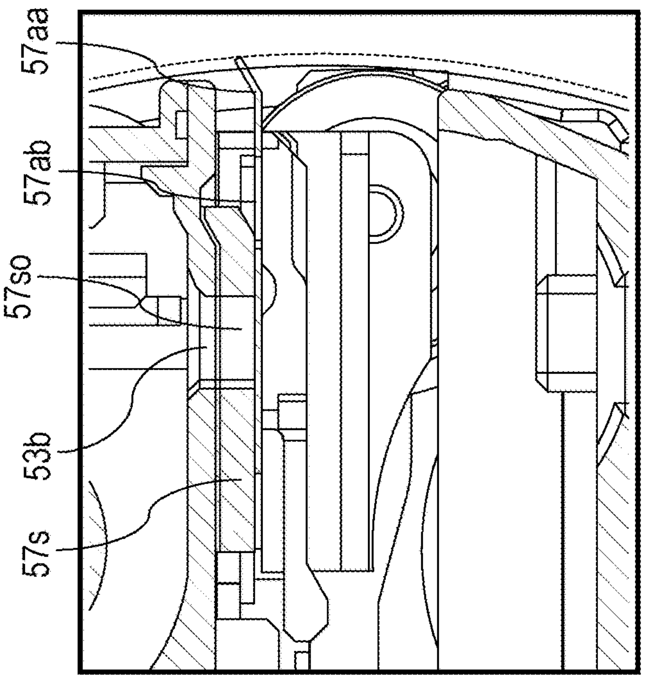
FIGS. 47A and 47B are views that illustrate the position of the developing shutter at a closed position according to the first embodiment.
Figure 47A:
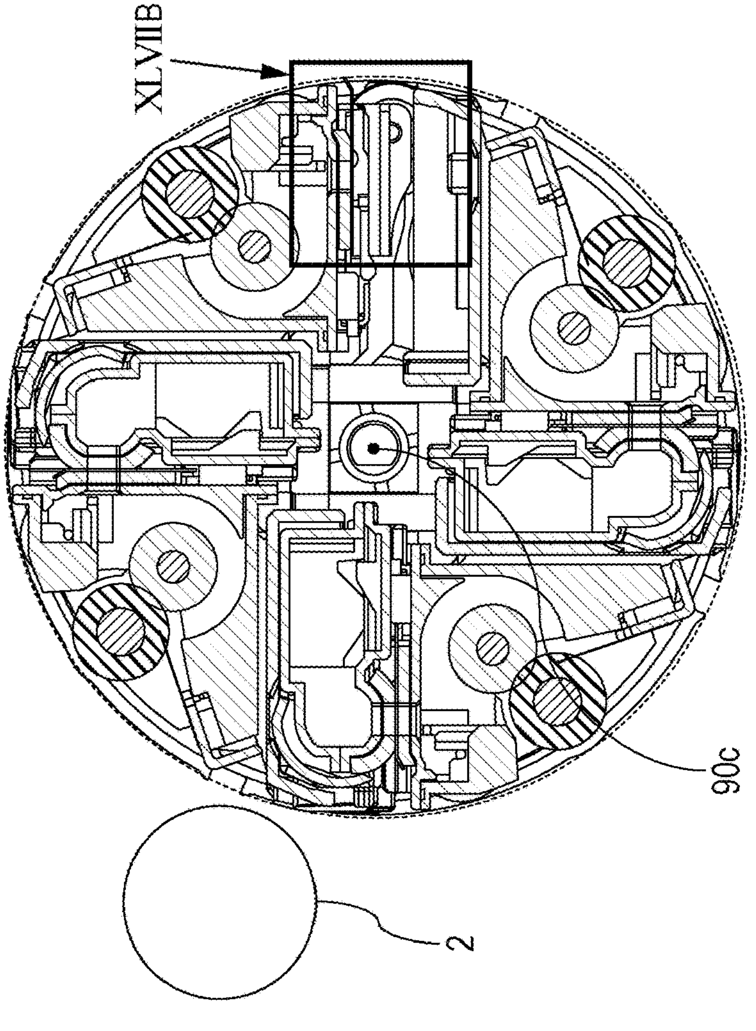

FIGS. 47A and 47B are views that illustrate the position of the developing shutter 57 at the closed position. The dashed line in FIGS. 47A and 47B is an imaginary circle centered on the rotation axis 90C and passing through the tips of the developing shutters 57 at the closed position. As will be described later, the developing shutter 57 is at the closed position when the toner cartridge 70 is not mounted to the rotary body 90.

In the state where the developing shutter 57 is at the closed position, the shutter opening 57*ab* is misaligned from the seal opening 57*so* and the receiving opening 53*b*, and the cover portion 57*aa* covers the seal opening 57*so* and the receiving opening 53*b*.

As described earlier, when the rotary body 90 rotates about the rotation axis 90C, the rotary body 90 pivots about the pivot shaft 91. In the present embodiment, when the rotary body 90 rotates and the developing shutter 57 faces the photoconductor drum 2, the rotary body 90 pivots away from the photoconductor drum 2. In FIG. 47A, the rotary body 90 is at a position where the rotary body 90 has been moved away from the photoconductor drum 2 about the pivot shaft 91, and there is a gap between the imaginary circle and the photoconductor drum 2.

In the present embodiment, in the direction of the rotation axis 90C of the rotary body 90, the position of the developing shutter 57 overlaps the position of the photoconductor drum 2. Even when the rotary body 90 rotates in the state where the toner cartridge 70 is not mounted to the rotary body 90, the developing shutter 57 at the closed position is rotating at a position away from the photoconductor drum 2 and does not contact the photoconductor drum 2.

Figure 48B:
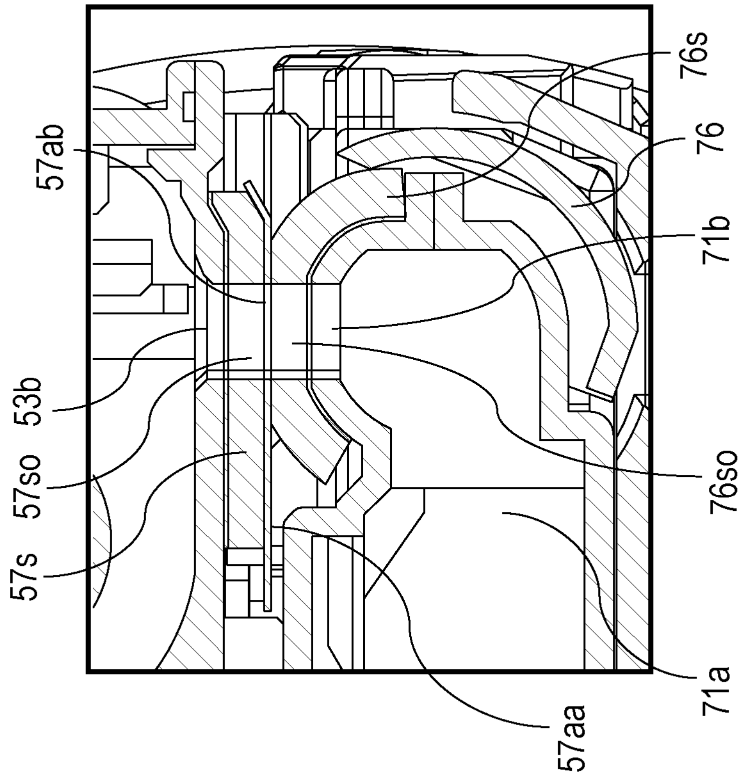
FIGS. 48A and 48B are views that show the relationship between the developing shutter at an open position, the toner shutter at an open position, and a photoconductor drum according to the first embodiment.
Figure 48A:
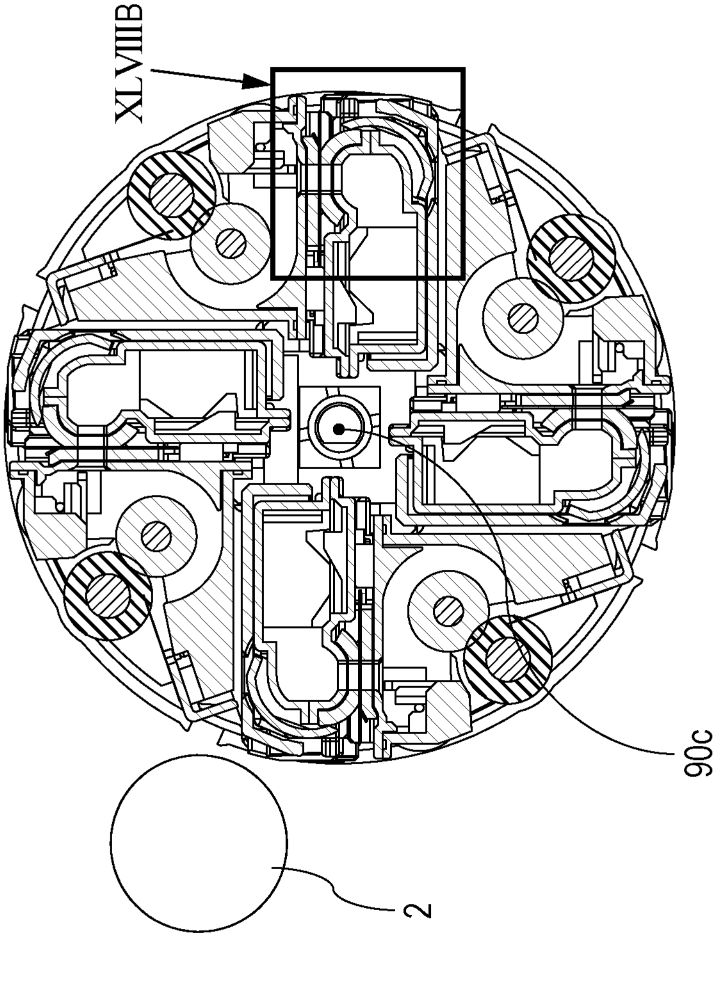

FIGS. 48A and 48B are views that show the relationship among the developing shutter 57 at the open position, the toner shutter 76 at the open position, and the photoconductor drum 2.

As will be described later, when the toner cartridge 70 is mounted to the developing unit 50, the developing shutter 57 is positioned at the open position, and the toner shutter 76 is positioned at the open position.

As shown in FIG. 48B, in the state where the developing shutter 57 is at the open position, the shutter opening 57*ab* overlaps the seal opening 57*so* and the receiving opening 53*b*. In the state where the toner shutter 76 is at the open position, the seal opening 76*so* and the discharge opening 71*b* are exposed. As a result, the discharge opening 71*b*, the seal opening 76*so*, the shutter opening 57*ab*, the seal opening 57*so*, and the receiving opening 53*b* communicate with each other, toner is allowed to be supplied from the toner cartridge 70 to the developing unit 50 through these openings.

In the direction orthogonal to the rotation axis 90C (the radial direction of the rotary body 90), the tip of the developing shutter 57 at the open position is closer to the rotation axis 90C than the tip of the developing shutter 57 at the closed position is to the rotation axis 90C. Even when the rotary body 90 rotates in the state where the toner cartridge 70 is mounted to the rotary body 90, the developing shutter 57 at the open position and the toner shutter 76 at the open position are rotating at a position away from the photoconductor drum 2 and do not contact the photoconductor drum 2.

Operation to Open Toner Shutter and Developing Shutter

Hereinafter, the operation to open the toner shutter 76 and the developing shutter 57 will be described with reference to FIGS. 49 to 57.

Figure 49:
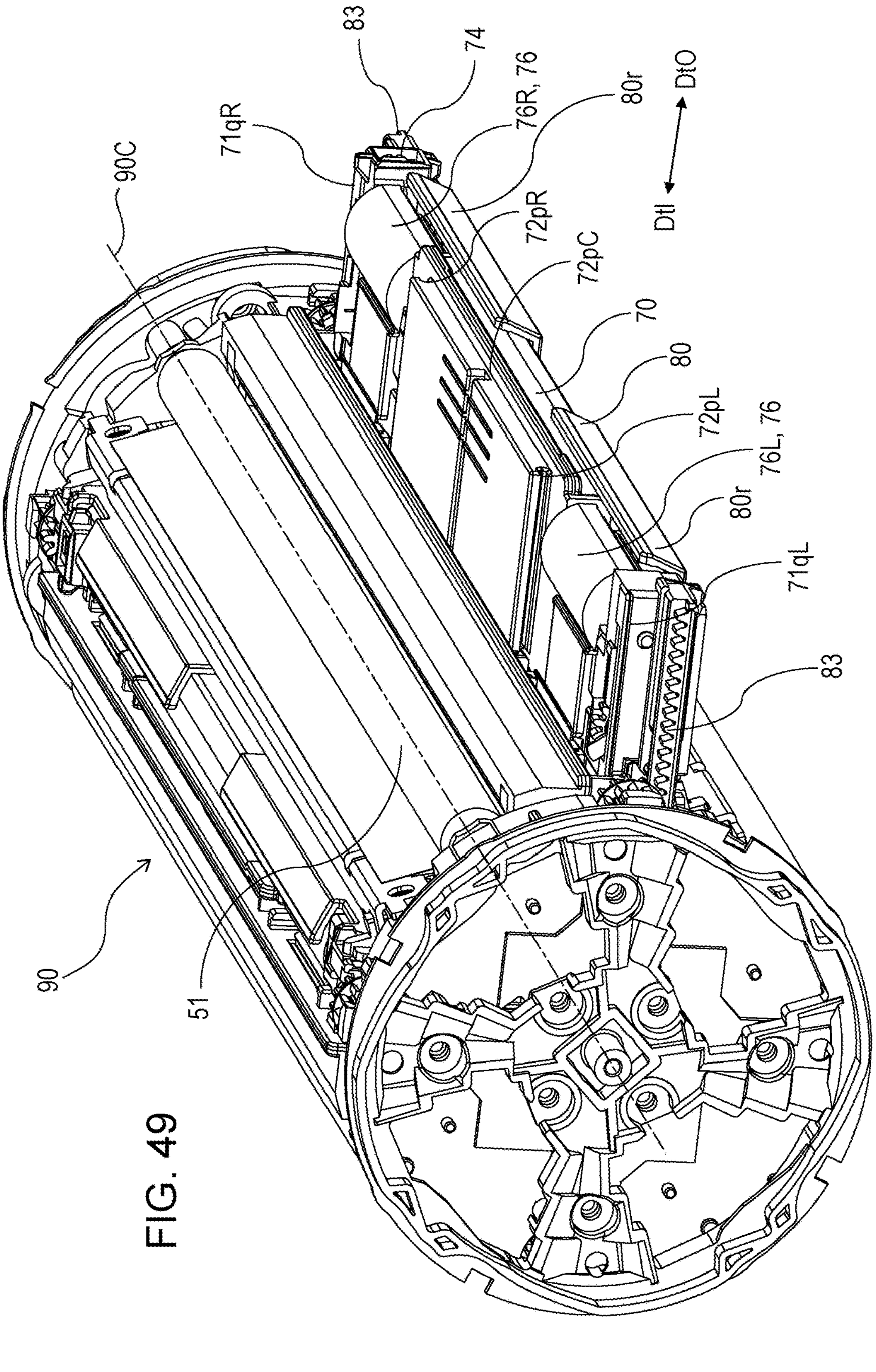
FIG. 49 is a view that illustrates the engagement of a positioned portion of the toner cartridge with a positioning portion of the developing unit according to the first embodiment.
Figure 50A:
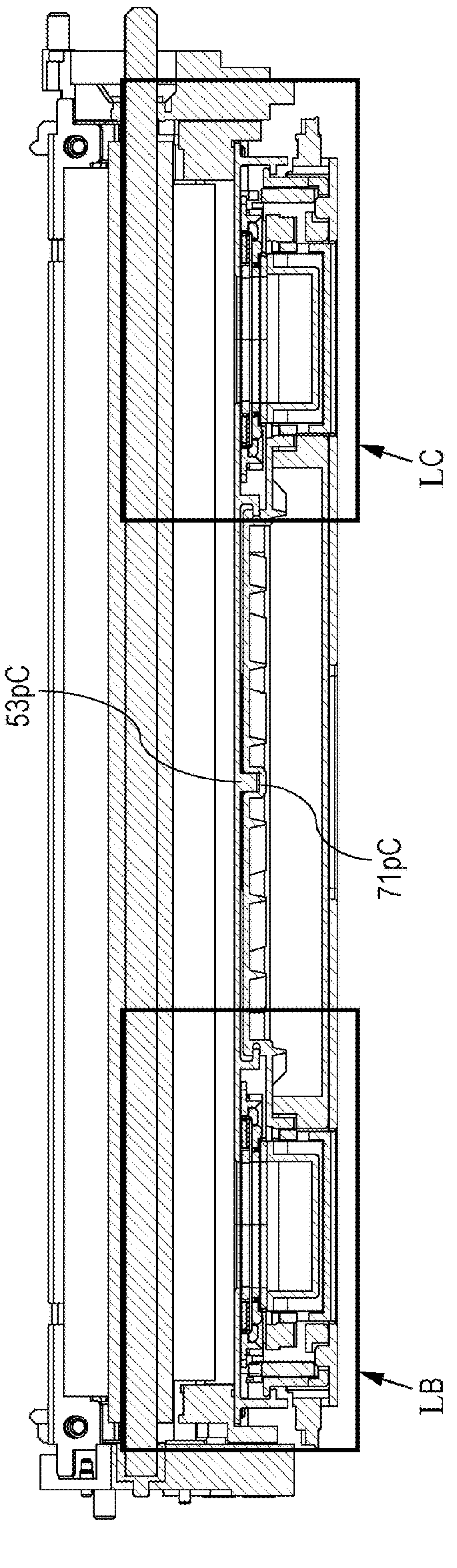
FIGS. 50A to 50C are views that illustrate the engagement of the positioned portion of the toner cartridge with the positioning portion of the developing unit according to the first embodiment.
Figure 50B:
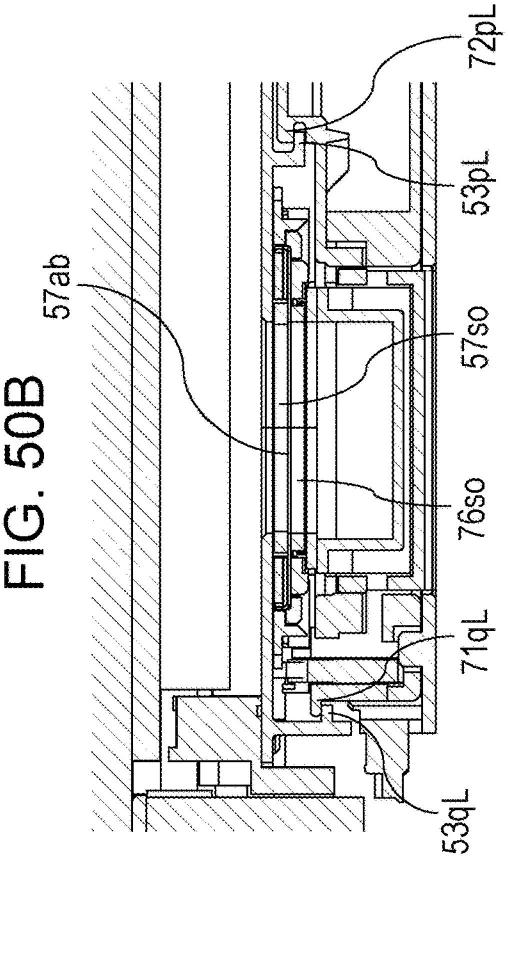
Figure 50C:
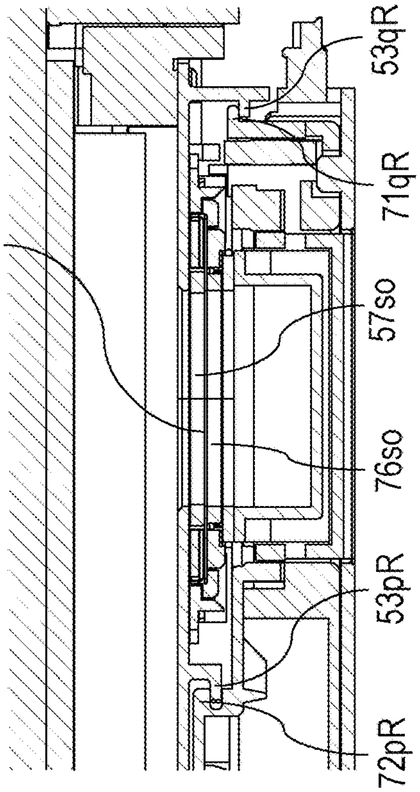

FIGS. 49, and 50A to 50C are views that illustrate the engagement between a positioned portion of the toner cartridge 70 and a positioning portion of the developing unit 50. FIG. 49 is a perspective view that shows the state where the positioned portion of the toner cartridge 70 and the positioning portion of the developing unit 50 start engaging with each other. FIGS. 50A to 50C are sectional views that show the state where the positioned portion of the toner cartridge 70 and the positioning portion of the developing unit 50 start engaging with each other. FIG. 50A shows an overall sectional view of the toner cartridge 70 and the developing unit 50. FIG. 50B is an enlarged view of the portion indicated by LB in FIG. 50A. FIG. 50C is an enlarged view of the portion indicated by LC in FIG. 50A.

As described earlier, the toner cartridge 70 is moved from the retreat position toward the mounting position by the moving device 85 driven by the motor M2. Specifically, a user is able to move the toner cartridge 70 from the retreat position toward the mounting position by loading the toner cartridge 70 on the tray 80 at the eject position and performing operation to move the tray 80 supporting the toner cartridge 70 from the eject position to the storage position. A user is able to perform the operation to move the tray 80 from the eject position to the storage position through not only the operating unit, such as buttons and a touch panel, provided on the apparatus body 1A, or through a peripheral device connected to the apparatus body 1A but also pushing the tray 80 toward the storage position.

The position of the rack portion 83 of the tray 80 is misaligned from the position of the toner shutter 76 in the direction of the rotation axis 90C. The tray 80 has a rear wall 80*r*. In the state where the toner cartridge 70 is mounted on the tray 80, the rear wall 80*r* is located on the upstream side of the toner cartridge 70 in the insertion direction DtI of the toner cartridge 70. The toner cartridge 70 is pushed by the rear wall 80*r* to move from the retreat position toward the mounting position.

The state where the rotary body 90 takes the replacement posture may be regarded as the state where the toner cartridge 70 is movable between the retreat position and the mounting position. In this state, the toner cartridge 70 is positioned below the developing unit 50. In the state where the toner cartridge 70 is at the retreat position, the toner shutter 76 is at the closed position, and the developing shutter 57 is at the closed position.

The toner shutter 76 and the developing shutter 57 are opened and closed in conjunction with the movement of the toner cartridge 70 between the retreat position and the mounting position. In other words, the toner shutter 76 and the developing shutter 57 are opened and closed in conjunction with the operation to attach or detach the toner cartridge 70 to and from the developing unit 50.

As described earlier, in the state where the toner cartridge 70 is positioned below the developing unit 50 and the discharge opening 71*b* is positioned below the receiving opening 53*b*, the toner cartridge 70 moves from the retreat position toward the mounting position and moves from the mounting position toward the retreat position. In other words, the opening and closing of the toner shutter 76 and the developing shutter 57 are performed in the state where the toner cartridge 70 is positioned below the developing unit 50 and the discharge opening 71*b* is positioned below the receiving opening 53*b*. In the state where the toner cartridge 70 is positioned below the developing unit 50 and the discharge opening 71*b* is positioned below the receiving opening 53*b*, the cover 54 is at the cover position.

In the state where the toner cartridge 70 is mounted on the tray 80, the supported portions 71*q*L, 71*q*R are positioned above the side wall of the tray 80. Therefore, a user is able to use the supported portions 71*q*L, 71*q*R as grip portions.

When the toner cartridge 70 moves from the retreat position in the insertion direction DtI, the positioning protrusion 53*p*C of the developing unit 50 engages with the positioning groove 72*p*C of the toner frame 71. As a result, the toner cartridge 70 is positioned relative to the developing unit 50 in the Y direction.

The support protrusions 53*p*R, 53*p*L of the developing unit 50 engage with the supported grooves 72*p*R, 72*p*L of the toner cartridge 70, and the end support portions 53*q*R, 53*q*L engage with the supported portions 71*q*R, 71*q*L of the toner cartridge 70. As a result, the toner cartridge 70 is positioned relative to the developing unit 50 in the direction orthogonal to both the Y direction and the insertion direction DtI. More specifically, the movement of the toner cartridge 70 in the direction away from the developing unit 50 in the direction orthogonal to both the Y direction and the insertion direction DtI is restricted.

Since the positioning protrusion 53*p*C engages with the positioning groove 72*p*C, a positional deviation between the support protrusions 53*p*R, 53*p*L and the supported grooves 72*p*R, 72*p*L, and a positional deviation between the end support portions 53*q*R, 53*q*L and the supported portions 71*q*R, 71*q*L are suppressed. However, the order of engagement between the positioning protrusion 53*p*C and the positioning groove 72*p*C, engagement between the support protrusions 53*p*R, 53*p*L and the supported grooves 72*p*R, 72*p*L, and engagement between the end support portions 53*q*R, 53*q*L and the supported portions 71*q*R, 71*q*L may be different from the above order.

Figure 51A:
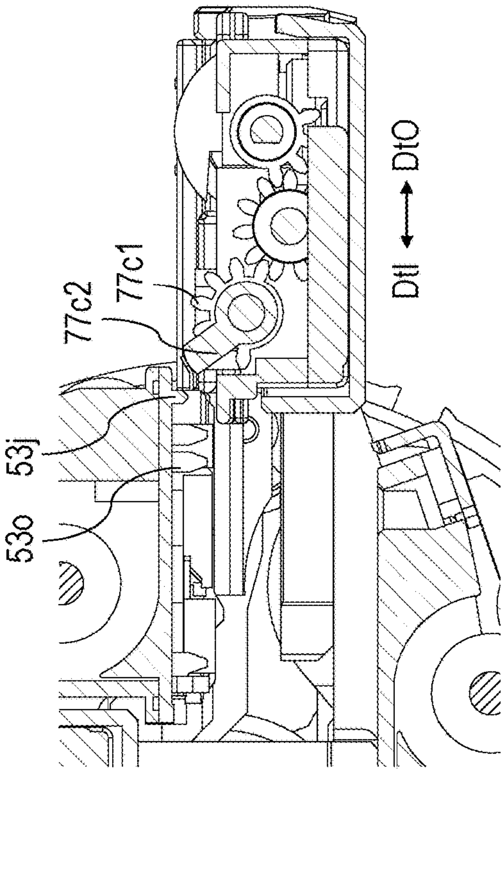
FIGS. 51A to 51D are views that illustrate the developing shutter and the toner shutter in the state where the positioned portion of the toner cartridge and the positioning portion of the developing unit start to engage according to the first embodiment.
Figure 51B:
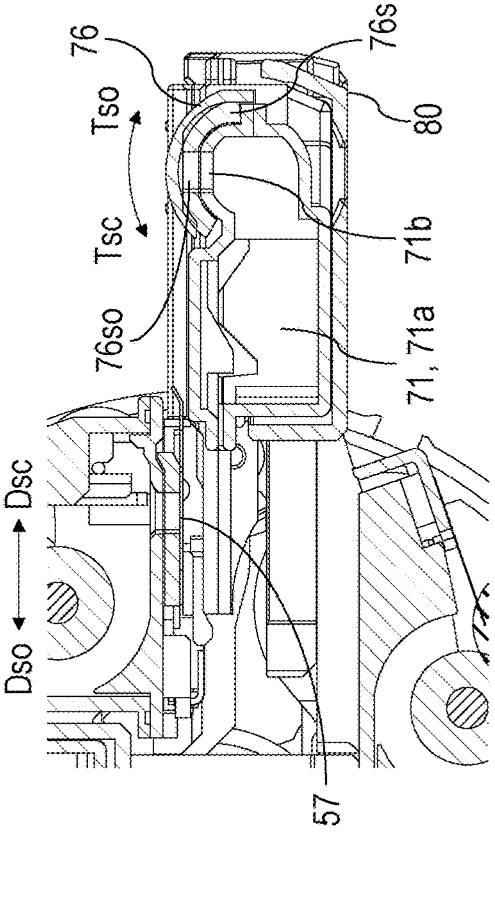
Figure 51C:
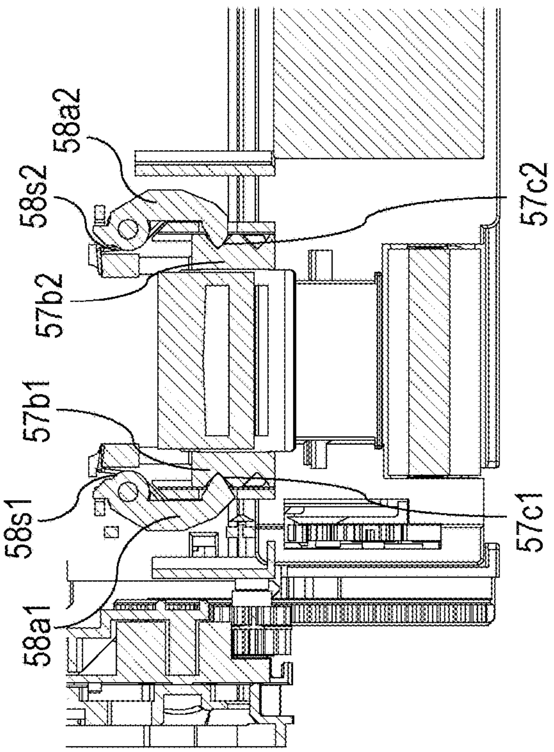
Figure 51D:
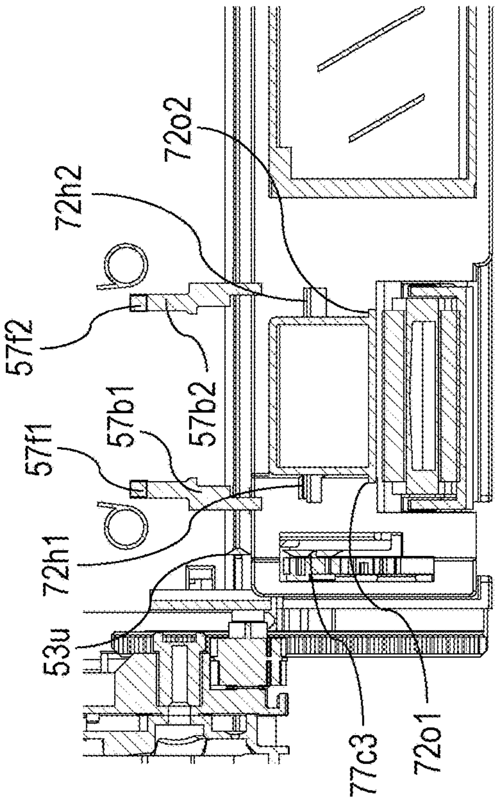

FIGS. 51A, 51B, 51C, and 51D are views that illustrate the developing shutter 57 and the toner shutter 76 in the state where the positioned portion of the toner cartridge 70 and the positioning portion of the developing unit 50 start engaging with each other. Specifically, FIGS. 51A and 51B are sectional views of the developing unit 50 and the toner cartridge 70 when viewed in the longitudinal direction of the toner cartridge 70. FIGS. 51C and 51D are sectional views of the developing unit 50 and the toner cartridge 70 when viewed in the thickness direction of the toner cartridge 70.

When the toner cartridge 70 is at the retreat position, the toner shutter 76 is at the closed position, and the developing shutter 57 is at the closed position. In this state, the adjustment portion 53*j* is separated from the adjustment protrusion 77*c*2 of the engagement gear 77*c*, and the opener 53*o*is separated from the gear teeth 77*c*1 of the engagement gear 77*c*. The openers 72*o*1, 72*o*2 are separated from the shutter holders 57*b*1, 57*b*2, and the holders 72*h*1, 72*h*2 are separated from the protrusions 57*f*1, 57*f*2. Furthermore, the release portion 53*u* is separated from the stopper 73*s*.

From this state, when the toner cartridge 70 further moves in the insertion direction DtI, the adjustment portion 53*j* contacts the adjustment protrusion 77*c*2.

Figure 52A:
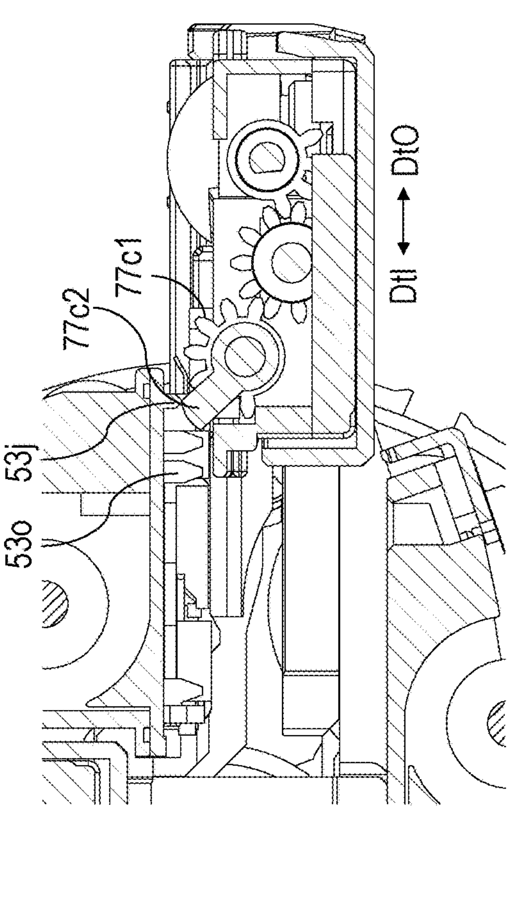
FIGS. 52A to 52D are views that illustrate the developing shutter and the toner shutter in the state where an adjustment protrusion has passed through an adjustment portion according to the first embodiment.
Figure 52B:
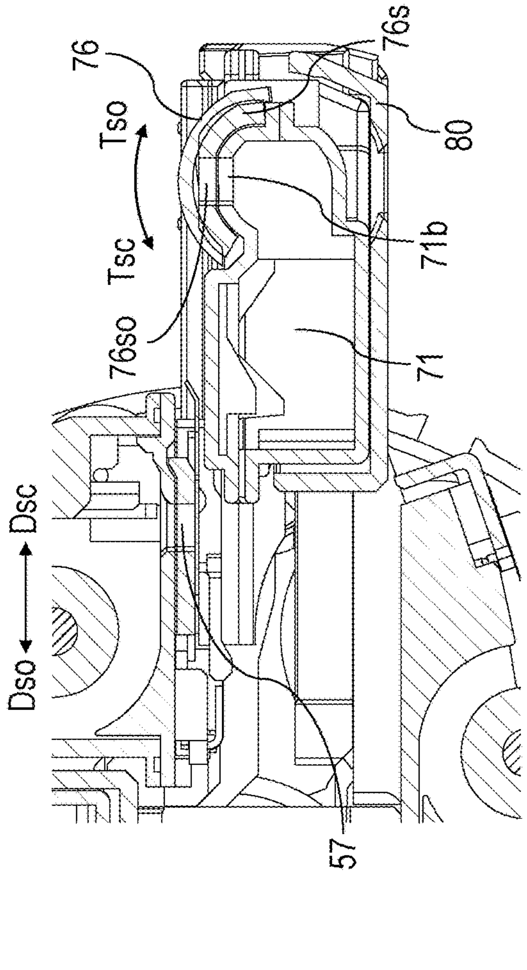
Figure 52C:
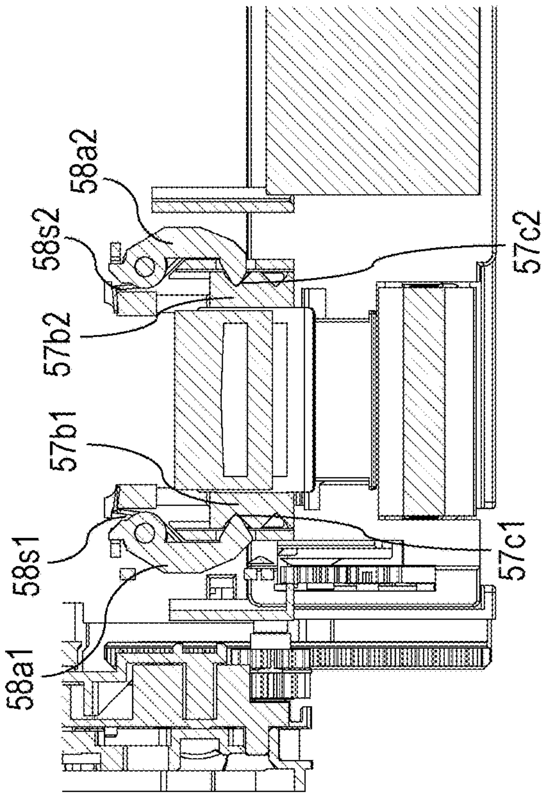
Figure 52D:
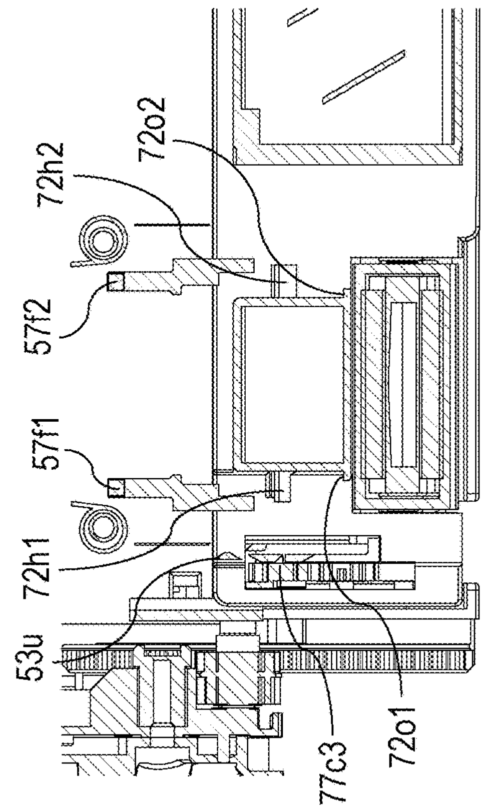

FIGS. 52A, 52B, 52C, and 52D are views that illustrate the developing shutter 57 and the toner shutter 76 in the state where the adjustment protrusion 77*c*2 has passed through the adjustment portion 53*j*. Specifically, FIGS. 52A and 52B are sectional views of the developing unit 50 and the toner cartridge 70 when viewed in the longitudinal direction of the toner cartridge 70. FIGS. 52C and 52D are sectional views of the developing unit 50 and the toner cartridge 70 when viewed in the thickness direction of the toner cartridge 70.

When the adjustment portion 53*j* contacts the adjustment protrusion 77*c*2 and the toner cartridge 70 moves in the insertion direction DtI, the engagement gear 77c is rotated in the closing direction Tgc. The benefits of this operation will be described later.

In the state where the adjustment protrusion 77c2 has passed through the adjustment portion 53j, the toner shutter 76 is at the closed position, and the developing shutter 57 is at the closed position. In this state, the opener 53ois separated from the gear teeth 77c1 of the engagement gear 77c. The openers 72o1, 72o2 are separated from the shutter holders 57b1, 57b2, and the holders 72h1, 72h2 are separated from the protrusions 57f1, 57f2. Furthermore, the release portion 53u is separated from the stopper 73s.

Strictly speaking, the position of the toner shutter 76 is slightly different before and after the engagement gear 77c rotates in the closing direction Tgc. However, even after the engagement gear 77c rotates in the closing direction Tgc, the shutter body 76a of the toner shutter 76 covers the discharge opening 71b and the seal opening 76so, so the toner shutter 76 may be regarded as being at the closed position.

From this state, when the toner cartridge 70 further moves in the insertion direction DtI, the release portion 53u contacts the stopper 73s. Then, when the toner cartridge 70 further moves in the insertion direction DtI, the stopper 73s is moved by the release portion 53u.

Figure 53A:
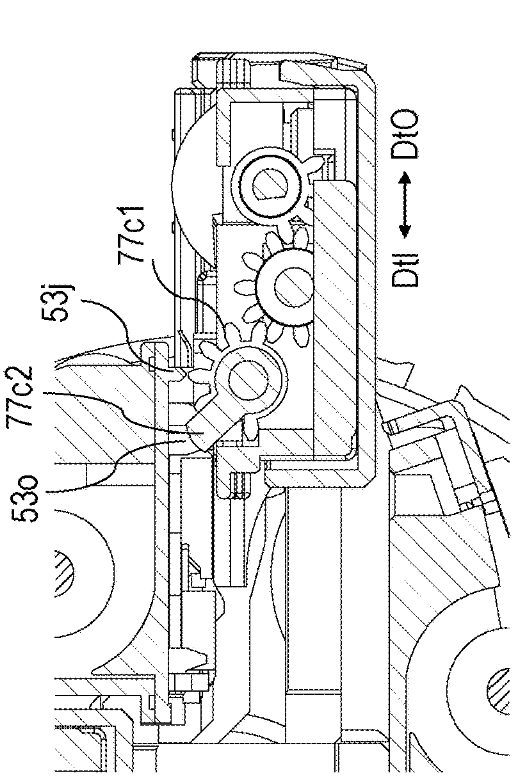
FIGS. 53A to 53D are views that illustrate the developing shutter and the toner shutter in the state where a stopper is released by a release portion according to the first embodiment.
Figure 53B:
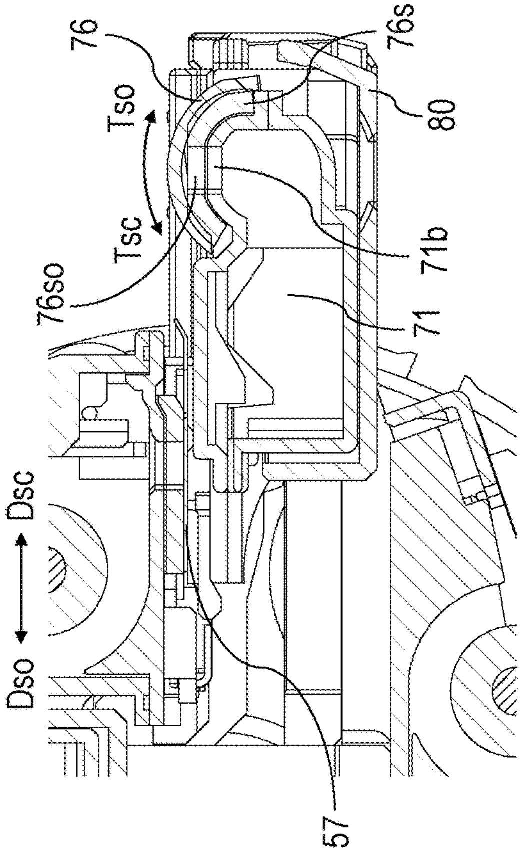
Figure 53C:
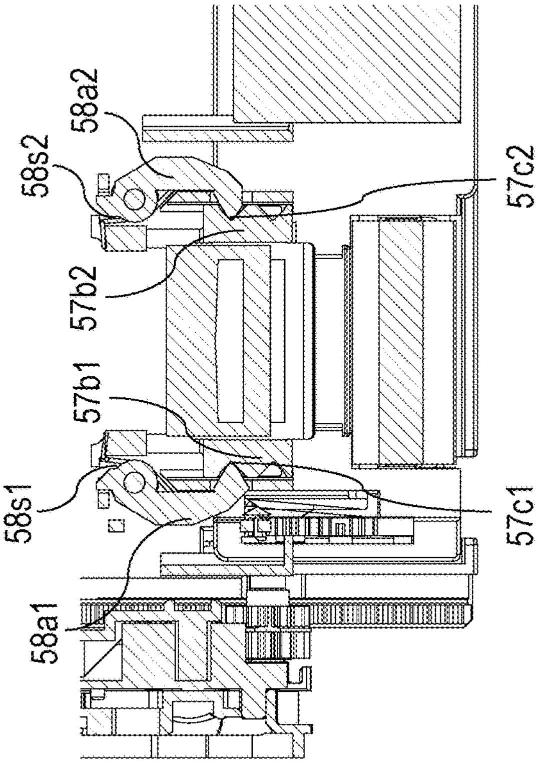
Figure 53D:
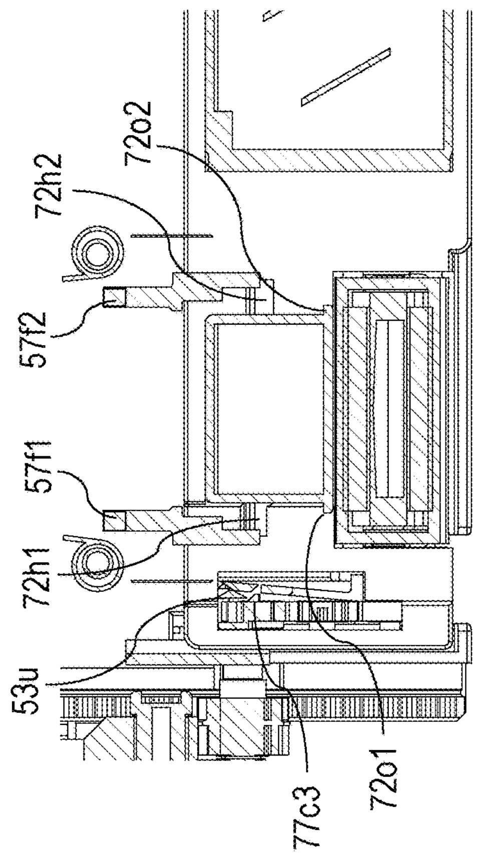

FIGS. 53A, 53B, 53C, and 53D are views that illustrate the developing shutter 57 and the toner shutter 76 in the state where the stopper 73s is released by the release portion 53u. Specifically, FIGS. 53A and 53B are sectional views of the developing unit 50 and the toner cartridge 70 when viewed in the longitudinal direction of the toner cartridge 70. FIGS. 53C and 53D are sectional views of the developing unit 50 and the toner cartridge 70 when viewed in the thickness direction of the toner cartridge 70.

As shown in FIG. 53C, in the state where the stopper 73s is released by the release portion 53u, the stopper 73s is at a position away from the engagement protrusion 77c3 of the engagement gear 77c. In this state, even when the engagement gear 77c rotates in the opening direction Tgo, the engagement protrusion 77c3 does not contact the stopper 73s. Therefore, the engagement gear 77c7 is allowed to rotate in the opening direction Tgo.

In the state where the stopper 73s is released by the release portion 53u, the toner shutter 76 is at the closed position, and the developing shutter 57 is at the closed position. In this state, the openers 72o1, 72o2 are separated from the shutter holders 57b1, 57b2, and the holders 72h1, 72h2 are separated from the protrusions 57f1, 57f2.

In the present embodiment, the opener 53o is a rack that meshes with the gear teeth 77c1 of the engagement gear 77c. The gear teeth 77c1 of the engagement gear 77c can be formed along an involute curve.

The stopper 73s can be released before the gear teeth 77c1 of the engagement gear 77c contact the opener 53o, or at the same time when the gear teeth 77c1 contact the opener 53o. When the toner cartridge 70 moves in the insertion direction DtI in the state where the stopper 73s is released, the gear teeth 77c1 of the engagement gear 77c mesh with the opener 53o, so the engagement gear 77c is rotated in the opening direction Tgo and the toner shutter 76 is moved toward the open position.

FIGS. 54A, 54B, 54C, and 54D are views that illustrate the developing shutter 57 and the toner shutter 76 in the state where the gear teeth 77c1 have passed through the opener 53o and the toner shutter 76 is positioned at the open position. Specifically, FIGS. 54A and 54B are sectional views of the developing unit 50 and the toner cartridge 70 when viewed in the longitudinal direction of the toner cartridge 70. FIGS. 54C and 54D are sectional views of the developing unit 50 and the toner cartridge 70 when viewed in the thickness direction of the toner cartridge 70.

In the present embodiment, when the toner cartridge 70 moves in the insertion direction DtI, the seal member 76s contacts the developing shutter 57. The tip of the shutter body 57a of the developing shutter 57 is bent in the direction away from the seal member 76s. When the toner cartridge 70 moves in the insertion direction DtI after the seal member 76s contacts the developing shutter 57, the seal member 76s passes below the developing shutter 57.

At the timing when the seal member 76s contacts the developing shutter 57, the toner shutter 76 does not need to completely reach the open position. In the present embodiment, when the toner cartridge 70 moves in the insertion direction DtI, the toner shutter 76 rotates in the opening direction Tso while maintaining the gap between the toner shutter 76 and the developing shutter 57.

When the toner cartridge 70 moves in the insertion direction DtI, the toner shutter 76 is positioned at the open position in the state where the developing shutter 57 is at the closed position. As shown in FIGS. 54C and 54D, in the state where the developing shutter 57 has been moved to the closed position, the openers 72o1, 72o2 are separated from the shutter holders 57b1, 57b2, and the holders 72h1, 72h2 are separated from the protrusions 57f1, 57f2.

In the present embodiment, when the toner cartridge 70 is attached to or detached from the developing unit 50, the toner cartridge 70 is positioned below the developing unit 50. In this state, the discharge opening 71b is positioned below the receiving opening 53b. In the present embodiment, the toner shutter 76 reaches the open position before the developing shutter 57 reaches the open position. In the present embodiment, the toner shutter 76 is positioned at the open position before the developing shutter 57 starts moving from the closed position to the open position.

In the present embodiment, in the state where the toner shutter 76 is positioned at the open position, part of the toner shutter 76 is positioned below the toner frame 71. At this time, the toner shutter 76 is accommodated in the opening formed in the tray 80. The opening for accommodating the toner shutter 76 may be a recess or a hole.

When the toner cartridge 70 further moves in the insertion direction DtI, the openers 72o1, 72o2 approach the shutter holders 57b1, 57b2 and contact the shutter holders 57b1, 57b2. While the arms 57e1, 57e2 of the shutter holders 57b1, 57b2 are elastically deformed, the protrusions 57f1, 57f2 approach the holders 72h1, 72h2 and engage with the holders 72h1, 72h2.

Figure 55C:
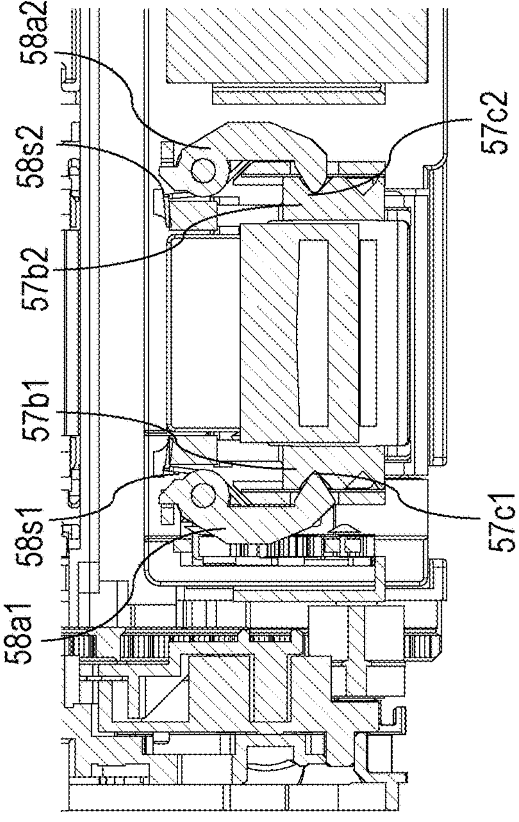
FIGS. 55A to 55D are views that illustrate the developing shutter and the toner shutter in the state where the opener is in contact with a shutter holder according to the first embodiment.
Figure 55D:
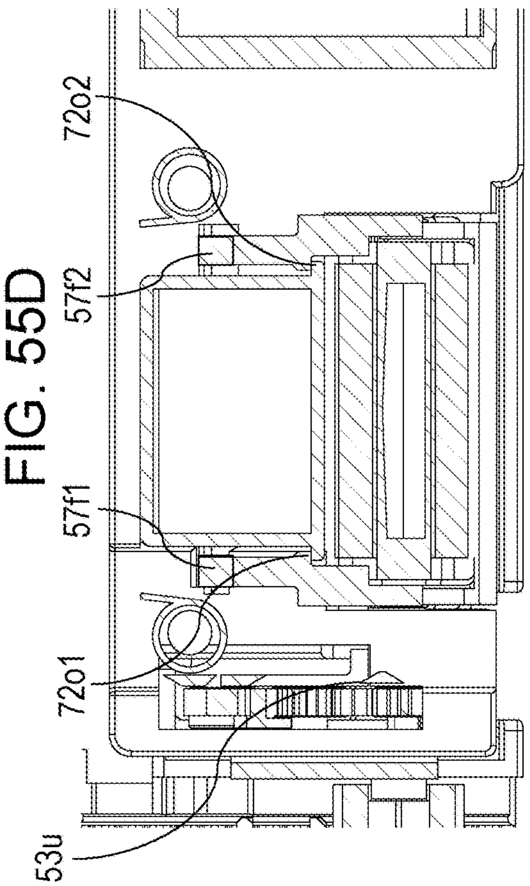
Figure 55A:
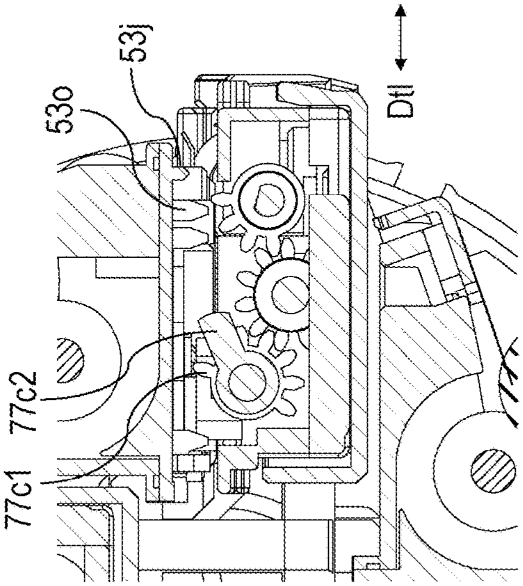
Figure 55B:
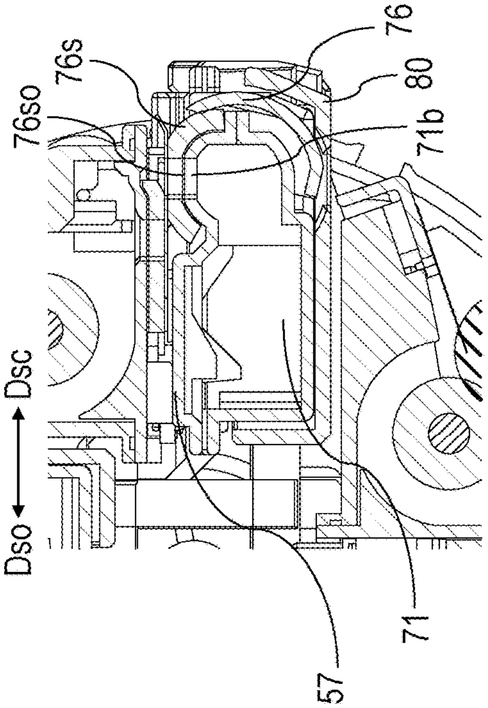

FIGS. 55A, 55B, 55C, and 55D are views that illustrate the developing shutter 57 and the toner shutter 76 in the state where the openers 72o1, 72o2 are in contact with the shutter holders 57b1, 57b2. Specifically, FIGS. 55A and 55B are sectional views of the developing unit 50 and the toner cartridge 70 when viewed in the longitudinal direction of the toner cartridge 70. FIGS. 55C and 55D are sectional views of the developing unit 50 and the toner cartridge 70 when viewed in the thickness direction of the toner cartridge 70.

In the state where the openers 72o1, 72o2 are in contact with the shutter holders 57b1, 57b2, the developing shutter 57 is at the closed position. On the other hand, the toner shutter 76 is already at the open position. As shown in FIG. 55A, in the state where the openers 72o1, 72o2 are in contact with the shutter holders 57b1, 57b2, the shutter opening 57ab of the developing shutter 57 overlaps the seal opening 76so and the discharge opening 71b. In other words, the discharge opening 71b, the seal opening 76so, and the shutter opening 57*ab* communicate with each other. On the other hand, in the state where the openers 72*o*1, 72*o*2 are in contact with the shutter holders 57*b*1, 57*b*2, the holders 72*h*1, 72*h*2 are engaged with the protrusions 57*f*1, 57*f*2.

When the toner cartridge 70 moves in the insertion direction DtI, the shutter holders 57*b*1, 57*b*2 are pushed by the openers 72*o*1, 72*o*2 while the state where the discharge opening 71*b*, the seal opening 76*so*, and the shutter opening 57*ab* communicate with each other and the engagement of the holders 72*h*1, 72*h*2 with the protrusions 57*f*1, 57*f*2 are maintained. Then, the developing shutter 57 moves in the opening direction Dso. In other words, the developing shutter 57 contacts the toner cartridge 70 moving from the retreat position to the mounting position and moves from the closed position toward the open position.

When the developing shutter 57 moves from the closed position in the opening direction Dso, the lock members 58*a*1, 58*a*2 are moved against the urging force of the lock springs 58*s*1, 58*s*2 to disengage the first positioning portions 57*c*1, 57*c*2 of the shutter holders 57*b*1, 57*b*2. When the toner cartridge 70 further moves in the insertion direction DtI, the developing shutter 57 is positioned at the open position.

In this way, while maintaining the state of communication among the discharge opening 71*b*, the seal opening 76*so*, and the shutter opening 57*ab*, the developing shutter 57 is moved from the closed position to the open position. Therefore, even when toner falls from the developing unit 50 in the process in which the developing shutter 57 moves from the closed position to the open position, the toner can fall inside the toner cartridge 70 through the discharge opening 71*b*.

Figure 56C:
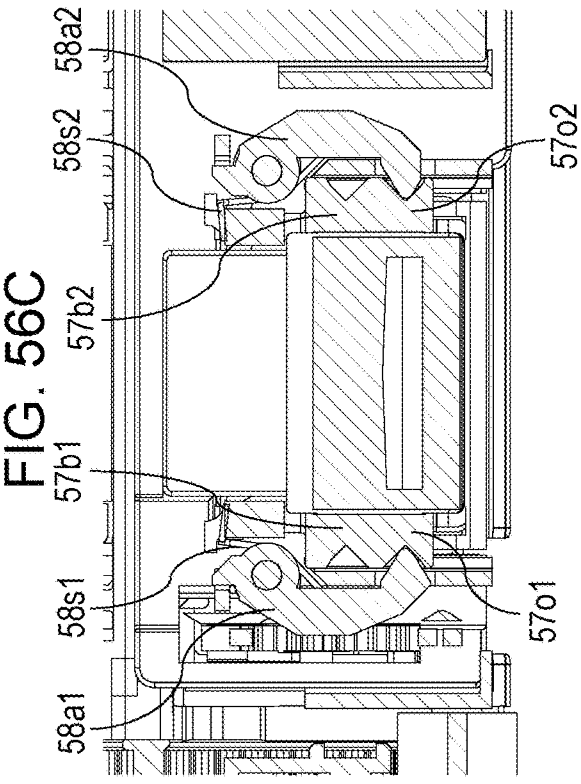
FIGS. 56A to 56D are views that illustrate the developing shutter and the toner shutter in the state where the developing shutter is at the open position according to the first embodiment.
Figure 56D:
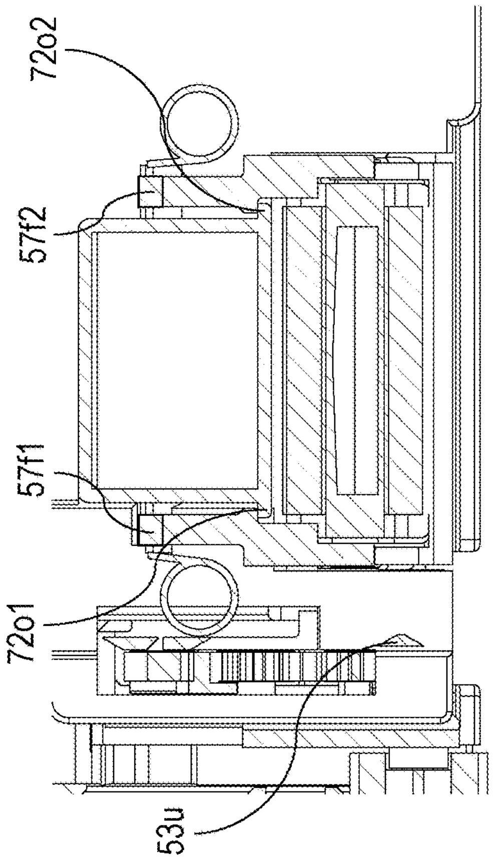
Figure 56A:
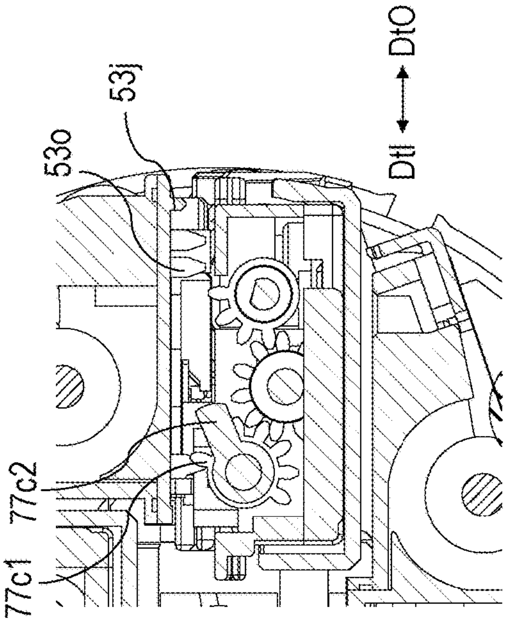
Figure 56B:
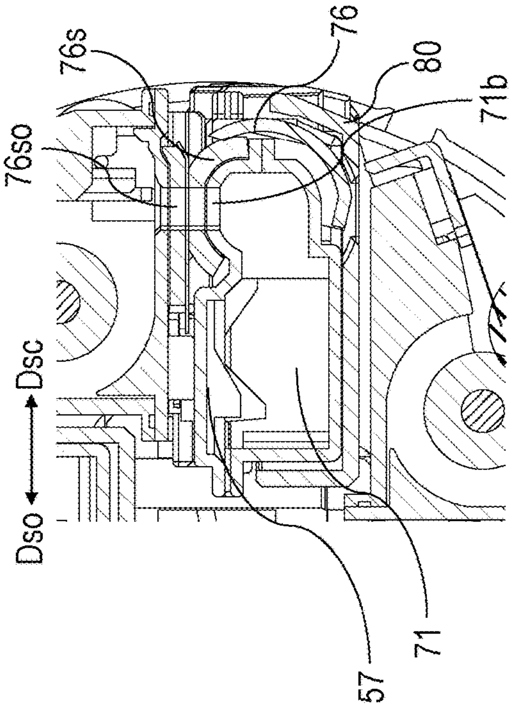

FIGS. 56A, 56B, 56C, and 56D are views that illustrate the developing shutter 57 and the toner shutter 76 in the state where the developing shutter 57 is at the open position. Specifically, FIGS. 56A and 56B are sectional views of the developing unit 50 and the toner cartridge 70 when viewed in the longitudinal direction of the toner cartridge 70. FIGS. 56C and 56D are sectional views of the developing unit 50 and the toner cartridge 70 when viewed in the thickness direction of the toner cartridge 70.

When the toner cartridge 70 is positioned at the mounting position, the developing shutter 57 is positioned at the open position. In the present embodiment, when the toner cartridge 70 moves in the insertion direction DtI, the lock members 58*a*1, 58*a*2 engage with the second positioning portions 57*o*1, 57*o*2 of the shutter holders 57*b*1, 57*b*2. Therefore, the developing shutter 57 is urged in the opening direction Dso by the force of the lock springs 58*s*1, 58*s*2.

The developing shutter 57 may reach the open position under the force of the lock springs 58*s*1, 58*s*2. In this case, in the state where the toner cartridge 70 is positioned at the mounting position, the openers 72*o*1, 72*o*2 may separate from the shutter holders 57*b*1, 57*b*2. The developing shutter 57 may reach the open position by being pressed by the openers 72*o*1, 72*o*2.

Figure 57:
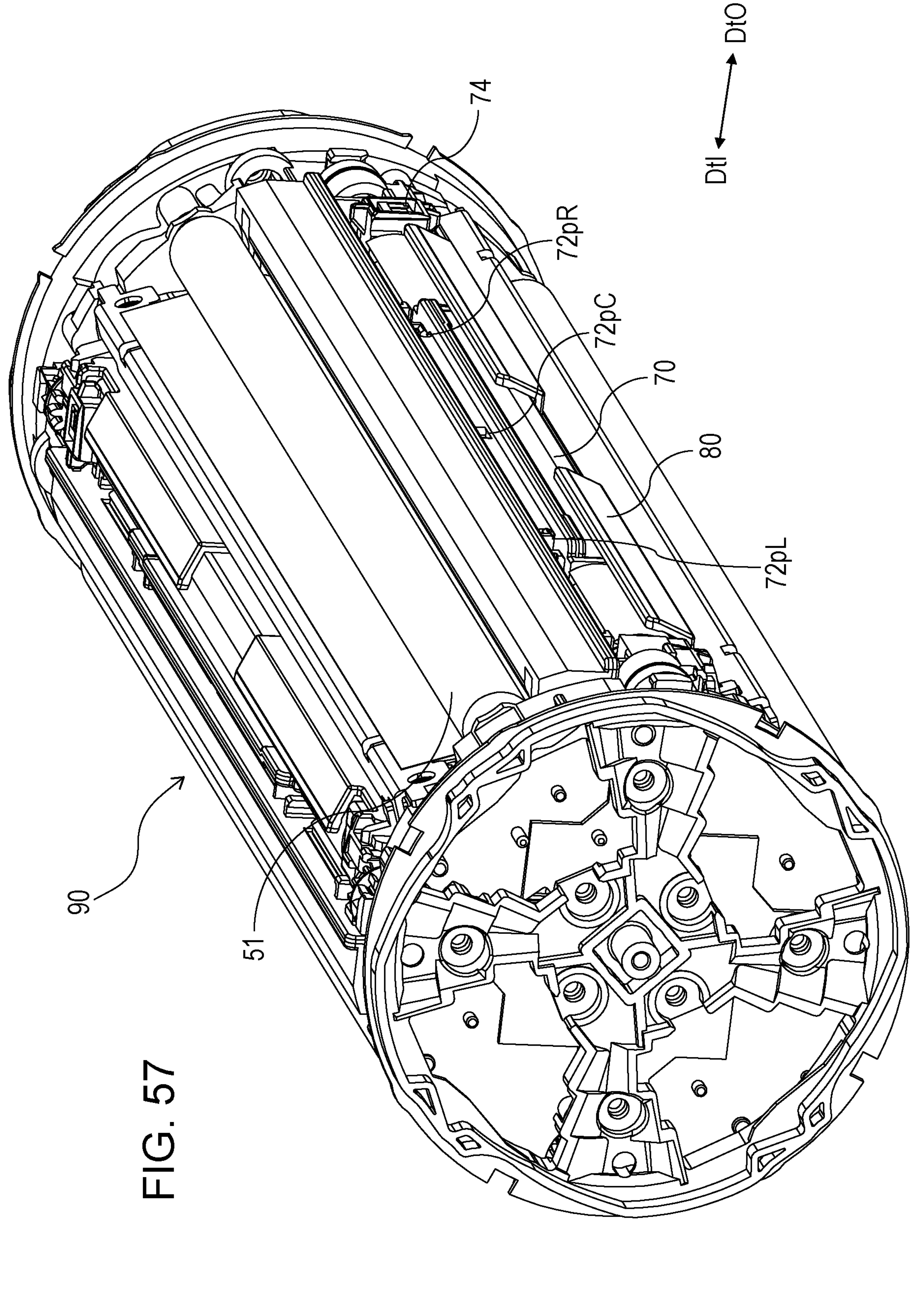
FIG. 57 is a view that shows the rotary assembly in the state where the toner cartridge is at a mounting position according to the first embodiment.

FIG. 57 is a view that shows the rotary assembly 90A in the state where the toner cartridge 70 is positioned at the mounting position.

In the state where the toner cartridge 70 is at the mounting position, the electrodes 74*e* of the memory 74 face outward in the radial direction of the rotary assembly 90A. The tray 80 supports the toner cartridge 70 such that the electrodes 74*e* of the memory 74 are exposed outward in the radial direction of the rotary assembly 90A. As a result, the main electrode 74*e*M can be disposed outside of the rotary assembly 90A.

In this embodiment, the rotary assembly 90A can take four reading postures such that the electrodes 74*e* of the memory 74 of each of the toner cartridges 70*y*, 70*m*, 70*c*, 70*k* face the main body electrode 74*e*M. In other words, the main body electrode 74*e*M is configured to be connectable to the memory 74 of each of the toner cartridges 70*y*, 70*m*, 70*c*, 70*k*. Since the electrodes 74*e* of the memory 74 are exposed outward in the radial direction of the rotary assembly 90A and the main body electrode 74*e*M is disposed outside of the rotary assembly 90A, the memories 74 of the plurality of toner cartridges can be read by a single reading apparatus.

The opening direction Dso of the developing shutter 57 is a direction to approach the rotation axis 90C of the rotary body 90. In the present embodiment, the receiving opening 53*b* of the developing unit 50 is closer to the outer edge in the radial direction than to the rotation axis 90C in the radial direction of the rotary body 90 (the direction orthogonal to the rotation axis 90C). This makes it easier to ensure space for the developing shutter 57 to move in the opening direction Dso.

On the other hand, since the receiving opening 53*b* is closer to the outer edge in the radial direction than to the rotation axis 90C in the radial direction of the rotary body 90, the discharge opening 71*b* is also closer to the outer edge in the radial direction than to the rotation axis 90C in the radial direction of the rotary body 90. When the toner shutter 76 rotates to move from the closed position to the open position, it is possible to suppress significant protrusion of the toner shutter 76 at the open position from the rotary body 90.

Operation to Close Toner Shutter and Developing Shutter

The operation to close the toner shutter 76 and the developing shutter 57 will be described. The operation to close the toner shutter 76 and the developing shutter 57 is performed in the reverse order of the operation to open the toner shutter 76 and the developing shutter 57.

As described earlier, the toner cartridge 70 is moved from the mounting position toward the retreat position by the moving device 85 driven by the motor M2. Specifically, a user is able to move the toner cartridge 70 from the mounting position toward the retreat position by performing operation to move the tray 80 supporting the toner cartridge 70 from the storage position to the eject position. A user is able to perform the operation to move the tray 80 from the storage position to the eject position through the operating unit, such as buttons and a touch panel, provided on the apparatus body 1A, or through a peripheral device connected to the apparatus body 1A.

When the toner cartridge 70 moves from the mounting position toward the retreat position in the eject direction DtO, the openers 72*o*1, 72*o*2 move in the direction away from the shutter holders 57*b*1, 57*b*2.

On the other hand, in the state where the toner cartridge 70 is at the mounting position, the holders 72*h*1, 72*h*2 are engaged with the protrusions 57*f*1, 57*f*2 (see FIG. 56D). As shown in FIGS. 44A and 44B, the developing frame 53 includes backup portions 53*v*1, 53*v*2. In the state where the developing shutter 57 is at the open position, the arm 57*e*1 of the shutter holder 57*b*1 overlaps the backup portion 53*v*1, and, when the arm 57*e*1 deforms in the direction in which the protrusion 57*f*1 disengages from the holder 72*h*1, the arm 57*e*1 contacts the backup portion 53*v*1. Similarly, the arm 57*e*2 of the shutter holder 57*b*2 overlaps the backup portion 53*v*2, and, when the arm 57*e*2 deforms in the direction in which the protrusion 57*f*2 disengages from the holder 72*h*2, the arm 57*e*2 contacts the backup portion 53*v*2.

In other words, in the state where the developing shutter 57 is at the open position, disengagement of the protrusions **57*f*1, 57*f*2 from the holders 72*h*1, 72*h*2 is restricted (see FIG. 44**A).

When the toner cartridge 70 moves in the eject direction DtO in the state where the holders **72*h*1, 72*h*2 are engaged with the protrusions 57*f*1, 57*f*2, the developing shutter 57 is moved in the closing direction Dsc in the state where the discharge opening 71*b*, the seal opening 76*so*, and the shutter opening 57*ab* communicate with each other. On the other hand, the lock members 58*a*1, 58*a*2 are moved against the urging force of the lock springs 58*s*1, 58*s*2 to disengage from the second positioning portions 57*o*1, 57*o*2 of the shutter holders 57*b*1, 57*b*2. At this time, the toner shutter 76** is positioned at the open position.

When the toner cartridge 70 is further moved in the eject direction DtO, the lock members **58*a*1, 58*a*2 start engaging with the first positioning portions 57*c*1, 57*c*2. On the other hand, the arm 57*e*1 of the shutter holder 57*b*1 moves to a position at which the arm 57*e*1 does not overlap the backup portion 53*v*1, and the arm 57*e*2 of the shutter holder 57*b*2 moves to a position at which the arm 57*e*2 does not overlap the backup portion 53*v*2**.

When the lock members **58*a*1, 58*a*2 engage with the first positioning portions 57*c*1, 57*c*2, the position of the developing shutter 57 is maintained at the closed position (see FIG. 55C). In this state, when the toner cartridge 70 is further moved in the eject direction DtO, the arms 57*e*1, 57*e*2 elastically deform to cause the protrusions 57*f*1, 57*f*2 to disengage from the holders 72*h*1, 72*h*2**.

When the toner cartridge 70 is further moved in the eject direction DtO, the gear teeth **77*c*1 of the engagement gear 77*c* contact the opener 53*o* and are rotated in the closing direction Tgc. Then, the toner shutter 76 is positioned at the closed position. While the engagement gear 77*c* is rotating, the stopper 73*s* can be released by the release portion 53*u*. Alternatively, the stopper 73*s* may be released by the inclined portion of the protrusion 77*c*3**.

In this way, when the toner cartridge 70 is moved from the mounting position to the retreat position, the toner cartridge 70 is positioned below the developing unit 50, and the discharge opening **71*b* is positioned below the receiving opening 53*b*. Then, after the developing shutter 57 reaches the closed position, the toner shutter 76 reaches the closed position. In other words, before the developing shutter 57 reaches the closed position, the toner shutter 76 is positioned at the open position, so, even when toner falls from the developing unit 50, the toner can fall into the toner cartridge 70 through the discharge opening 71*b***.

In the present embodiment, the support protrusions **53*p*R, 53*p*L of the developing unit 50 engage with the supported grooves 72*p*R, 72*p*L of the toner cartridge 70, and the end support portions 53*q*R, 53*q*L engage with the supported portions 71*q*R, 71*q*L of the toner cartridge 70. As a result, the toner cartridge 70 is positioned relative to the developing unit 50 in the direction orthogonal to both the Y direction and the insertion direction DtI. More specifically, the movement of the toner cartridge 70 in the direction away from the developing unit 50 in the direction orthogonal to both the Y direction and the insertion direction DtI is restricted. Therefore, it is possible to suppress variation in the amount of meshing between the engagement gear 77*c* and the opener 53*o***.

However, in consideration of the influence of component tolerance, a certain amount of backlash can be present between the opener **53*o* and the gear teeth 77*c*1 of the engagement gear 77*c*. However, due to the presence of backlash between the opener 53*o* and the gear teeth 77*c*1 of the engagement gear 77*c*, when the toner cartridge 70 is moved from the mounting position to the retreat position, the angle by which the opener 53*o* rotates the gear teeth 77*c*1 in the closing direction Tgc reduces. In other words, there can be cases where the engagement gear 77*c* cannot reach the ideal position when the toner cartridge 70** is moved from the mounting position to the retreat position.

In the present embodiment, as described with reference to FIG. 52, in the process in which the toner cartridge 70 moves from the retreat position to the mounting position, the adjustment protrusion **77*c*2 contacts the adjustment portion 53*j* to cause the engagement gear 77*c* to rotate in the closing direction Tgc. As a result, even when the angle by which the opener 53*o* rotates the gear teeth 77*c*1 in the closing direction Tgc reduces, the position of the engagement gear 77*c* is adjusted, so the gear teeth 77*c*1 are further reliably engaged with the opener 53*o***.

When the dimensional accuracy of the opener **53*o* and the gear teeth 77*c*1 of the engagement gear 77*c* are increased, the amount of backlash can be reduced, and the adjustment portion 53*j* and the adjustment protrusion 77*c*2** can be eliminated.

As described above, when the toner cartridge 70 is moved from the retreat position toward the mounting position, the developing shutter 57 moves from the closed position to the open position, and the toner shutter 176 is moved to the open position. A user is able to open the developing shutter 57 and the toner shutter 76 by performing operation to move the toner cartridge 70 from the retreat position toward the mounting position. In other words, a user does not need to perform operation to open the developing shutter 57 and operation to open the toner shutter 76 separately from operation to move the toner cartridge 70 from the retreat position toward the mounting position.

The toner cartridge 70 is moved from the retreat position toward the mounting position by the moving device 85 driven by the motor M2. Through this process, the developing shutter 57 moves from the closed position to the open position, and the toner shutter 76 is moved to the open position. In other words, the developing shutter 57 moves from the closed position to the open position by the moving device 85 driven by the motor M2, and the toner shutter 76 moves from the closed position to the open position by the moving device 85 driven by the motor M2. In other words, the developing shutter 57 moves from the closed position to the open position under the driving force of the motor M2, and the toner shutter 76 moves from the closed position to the open position under the driving force of the motor M2.

As described above, when the toner cartridge 70 is moved from the mounting position toward the retreat position, the developing shutter 57 moves from the open position to the closed position, and the toner shutter 76 is moved to the closed position. A user is able to close the developing shutter 57 and the toner shutter 76 by performing operation to move the toner cartridge 70 from the mounting position to the retreat position. In other words, a user does not need to perform operation to close the developing shutter 57 and operation to close the toner shutter 76 separately from operation to move the toner cartridge 70 from the mounting position toward the retreat position.

The toner cartridge 70 is moved from the mounting position toward the retreat position by the moving device 85 driven by the motor M2. Through this process, the developing shutter 57 moves from the open position to the closed position, and the toner shutter 76 is moved to the closed position. In other words, the developing shutter 57 moves from the open position to the closed position by the moving device 85 driven by the motor M2, and the toner shutter 76 moves from the open position to the closed position by the moving device 85 driven by the motor M2. In other words, the developing shutter 57 moves from the open position to the closed position under the driving force of the motor M2, and the toner shutter 76 moves from the open position to the closed position under the driving force of the motor M2.

In other words, the driving force of the motor M2 is larger than the force used to move the toner shutter 76 from the closed position to the open position, and is larger than the force used to move the developing shutter 57 from the closed position to the open position. The driving force of the motor M2 is larger than the force used to move the toner shutter 76 from the open position to the closed position, and is larger than the force used to move the developing shutter 57 from the open position to the closed position.

The tray 80 may be regarded as a contact member that contacts the toner cartridge 70. While the toner cartridge 70 is moving from the retreat position to the mounting position, the tray 80 is separated from the toner shutter 76. While the toner cartridge 70 is moving from the retreat position to the mounting position, the tray 80 is separated from the developing shutter 57. While the toner cartridge 70 is moving from the mounting position to the retreat position, the tray 80 is separated from the toner shutter 76. While the toner cartridge 70 is moving from the mounting position to the retreat position, the tray 80 is separated from the developing shutter 57. Therefore, the movement of the toner shutter 76 and the developing shutter 57 is not obstructed by the tray 80.

The developing frame 53 of the developing unit 50 of the present embodiment has the receiving openings 53*b*R, 53*b*L as the plurality of receiving openings. The number of the receiving openings 53 formed in the developing frame 53 is not limited thereto and may be one or more than two.

Second Embodiment

The second embodiment will be described. In the second embodiment, differences from the first embodiment will be mainly described. The detailed description of the matters described in the first embodiment can be omitted. For example, like reference signs denote the components having functions or shapes similar to those described in the first embodiment and the directions, and the detailed description thereof can be omitted. In this case, components with the same reference sign do not need to have completely the same shape.

Overall Configuration of Toner Cartridge

The overall configuration of a toner cartridge 170 will be described with reference to FIGS. 58A, 58B, 59, 60A, 60B, 61A, 61B, 61C, 62A, 62B, and 62C.

Figure 58A:
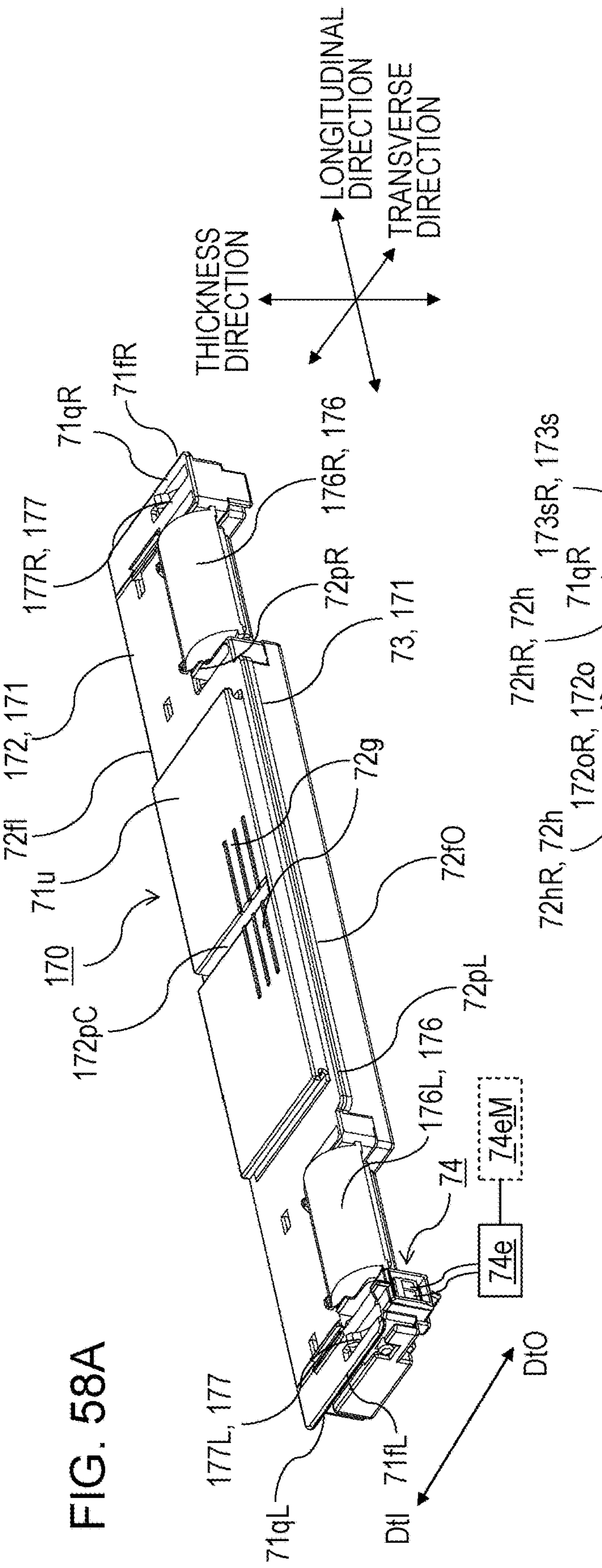
FIGS. 58A and 58B are perspective views of a toner cartridge according to a second embodiment.
Figure 58B:
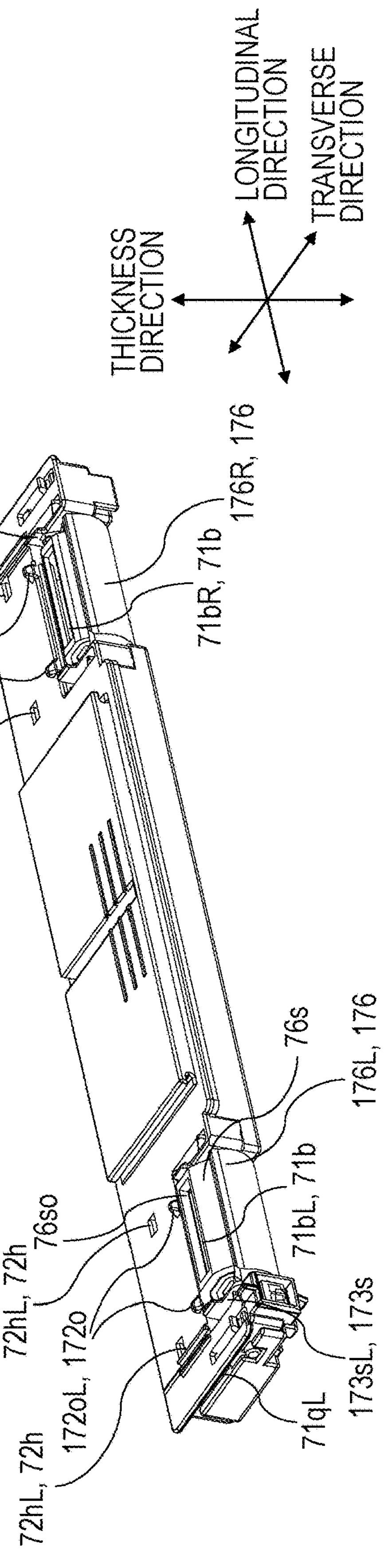

FIGS. 58A and 58B are perspective views of the toner cartridge 170. FIG. 58A shows the toner cartridge 170 of which a toner shutter 176 (described later) is at the closed position. FIG. 58B shows the toner cartridge 170 of which the toner shutter 176 is at the open position.

Figure 59:
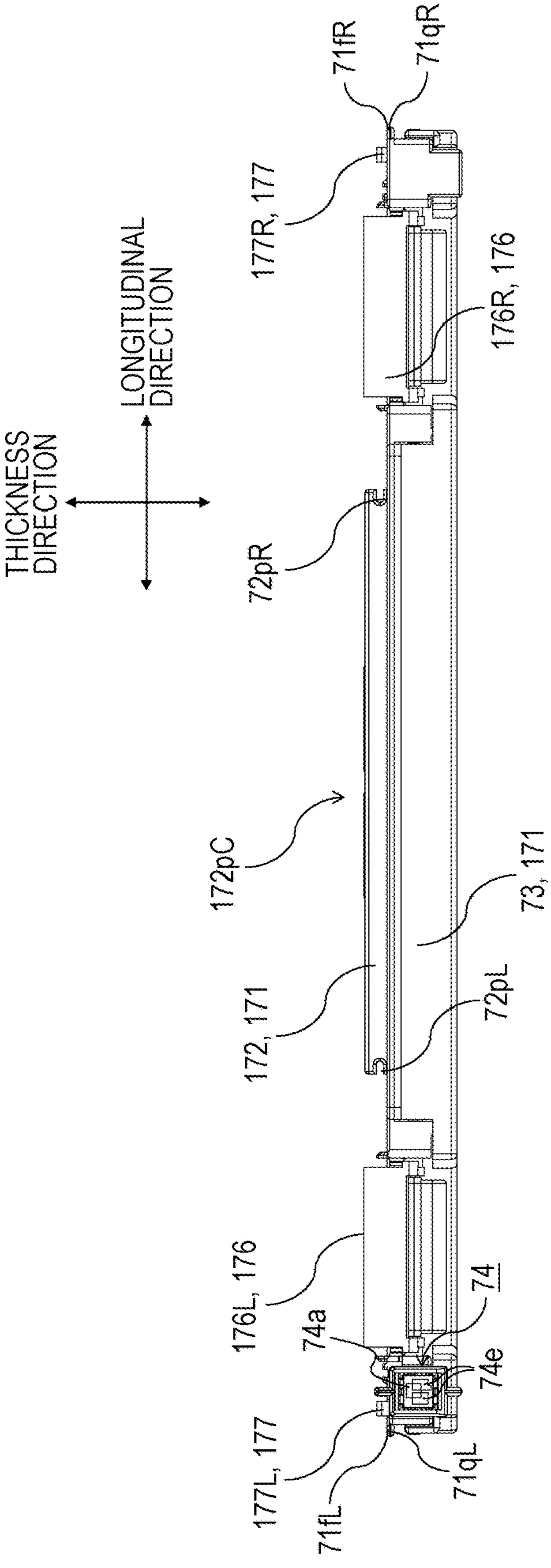
FIG. 59 is a view that shows the toner cartridge when viewed in a transverse direction according to the second embodiment.

FIG. 59 is a view that shows the toner cartridge 170 when viewed in the transverse direction. More specifically, FIG. 59 shows the toner cartridge 170 when viewed in the transverse direction such that the memory 74 (described later) is located at the front. In FIG. 59, the toner shutter 176 is at the closed position. FIG. 59 may also be regarded as a view of the toner cartridge 170 when viewed in the insertion direction DtI.

As shown in FIGS. 58A and 58B, the toner cartridge 170 includes a toner lid 172 and the toner container 73. The toner lid 172 and the toner container 73 are fixed to each other to form a toner frame 171. In other words, the toner lid 172 and the toner container 73 are parts of the toner frame 171. The toner storage chamber 71*a* is defined between the toner lid 172 and the toner container 73.

In the state where the toner cartridge 170 is attached to the tray 80 at the eject position, the toner lid 172 is positioned above the toner container 73, and the toner container 73 faces the tray 80.

In the state where the toner cartridge 170 is at the mounting position relative to the developing frame 53, the toner lid 172 faces the developing frame 53.

The surface facing upward in the vertical direction V in the state where the toner cartridge 170 is attached to the tray 80 at the eject position is referred to as the upper surface 71*u* of the toner frame 171. In the present embodiment, the upper surface 71*u* of the toner frame 171 is the same as the upper surface of the toner lid 172.

The toner lid 172 has the discharge openings 71*b* (71*b*R, 71*b*L). The toner lid 172 is an example of a first toner frame having the discharge openings 71*b* (71*b*R, 71*b*L). The toner lid 172 has a positioning groove 172*p*C and the supported grooves 72*p*R, 72*p*L.

In the longitudinal direction, the positioning groove 172*p*C is located between the supported grooves 72*p*R, 72*p*L, and the supported grooves 72*p*R, 72*p*L are located between the discharge openings 71*b*R, 71*b*L. In the present embodiment, in the longitudinal direction, the positioning groove 172*p*C is located at the center of the toner frame 171.

Similarly to the toner frame 71 of the first embodiment, the toner frame 171 has one end (first end, right end) 71*f*R and the other end (second end, left end) 71*f*L in the longitudinal direction. Furthermore, in the transverse direction, the toner frame 171 has one end (front end, first end, outer end) 71*f*O and the other end (rear end, second end, inner end) 71*f*I opposite to the one end 71*f*O.

In the longitudinal direction, the supported groove 72*p*R is closer to the right end 71*f*R than the positioning groove 172*p*C is to the right end 71*f*R, and the discharge opening 71*b*R is closer to the right end 71*f*R than the supported groove 72*p*R is to the right end 71*f*R. In the longitudinal direction, the supported groove 72*p*L is closer to the left end 71*f*L than the positioning groove 172*p*C is to the left end 71*f*L, and the discharge opening 71*b*L is closer to the left end 71*f*L than the supported groove 72*p*L is to the left end 71*f*L.

As shown in FIG. 59, in the present embodiment, the positioning groove 172*p*C is a groove that is recessed away from the developing frame 53 in the thickness direction. The positioning groove 172*p*C extends in the transverse direction. In the insertion direction DtI, a wall is provided at the upstream end of the positioning groove 172*p*C.

Similarly to the toner frame 71 of the first embodiment, the toner frame 171 includes the supported portion 71*q*R at the right end 71*f*R and the supported portion 71*q*L at the left end 71*f*L.

The toner cartridge 170 includes the memory 74 as a storage medium. In the present embodiment, information related to the toner cartridge 170 can be stored in the storage element 74*a* of the memory 74.

In the transverse direction, the plurality of electrodes 74 of the memory 74 is closer to the outer end 71*f*O than to the inner end 71*f*I. In the transverse direction, the plurality of electrodes 74*e* of the memory 74 is farther from the inner end 71*f*I than the discharge openings 71*b* (71*b*R, 71*b*L) are from the inner end 71*f*I. In other words, in the transverse direction, the plurality of electrodes 74*e* of the memory 74 is closer to the outer end 71*f*O than the discharge openings 71*b* (71*b*R, 71*b*L) are to the outer end 71*f*O. Since the plurality of electrodes 74*e* is disposed near the outer end 71*f*O of the toner cartridge 170, it is possible to reduce the amount of movement of the main body electrode 74*e*M.

In the present embodiment, in the transverse direction, the entirety of the memory 74 is closer to the outer end 71*f*O than to the inner end 71*f*I. In the transverse direction, the entirety of the memory 74 is farther from the inner end 71*f*I than the discharge openings 71*b* (71*b*R, 71*b*L) are from the inner end 71*f*I. In other words, in the transverse direction, the entirety of the memory 74 is closer to the outer end 71*f*O than the discharge openings 71*b* (71*b*R, 71*b*L) are to the outer end 71*f*O.

The plurality of electrodes 74 of the memory 74 is disposed side by side in the longitudinal direction, and faces in a direction from the inner end 71*f*I toward the outer end 71*f*O in the transverse direction. The memory 74 is disposed such that the plurality of electrodes 74*e* faces outward in the radial direction of the rotary body 90.

In the present embodiment, in the longitudinal direction, the plurality of electrodes 74*e* is closer to the left end 71*f*L than to the center of the toner frame 171. Furthermore, in the longitudinal direction, the plurality of electrodes 74*e* is closer to the left end 71*f*L than the discharge opening 71*b*L is to the left end 71*f*L. In other words, in the longitudinal direction, the plurality of electrodes 74*e* is disposed at the outer side of the toner frame 171 relative to the discharge opening 71*b*L. In the present embodiment, in the longitudinal direction, the entirety of the memory 74 is closer to the left end 71*f*L than to the center of the toner frame 171. Furthermore, in the longitudinal direction, the entirety of the memory 74 is closer to the left end 71*f*L than the discharge opening 71*b*L is to the left end 71*f*L. In other words, in the longitudinal direction, the entirety of the memory 74 is disposed at the outer side of the toner frame 171 relative to the discharge opening 71*b*L.

In the longitudinal direction, the plurality of electrodes 74*e* may be closer to the right end 71*f*R than to the center of the toner frame 171. In this case, in the longitudinal direction, the plurality of electrodes 74*e* may be closer to the right end 71*f*R than the discharge opening 71*b*R is to the right end 71*f*R. In other words, in the longitudinal direction, the plurality of electrodes 74*e* may be disposed at the outer side of the toner frame 171 relative to the discharge opening 71*b*R. In the longitudinal direction, the entirety of the memory 74 may be closer to the right end 71*f*R than to the center of the toner frame 171. In this case, in the longitudinal direction, the entirety of the memory 74 may be closer to the right end 71*f*R than the discharge opening 71*b*R is to the right end 71*f*R. In the longitudinal direction, the entirety of the memory 74 may be disposed at the outer side of the toner frame 171 relative to the discharge opening 71*b*R.

The surface (electrode surface) of the substrate 74*b* on which the plurality of electrodes 74*e* is disposed expands in a direction that crosses (which can be orthogonal to) the transverse direction. The electrode surface can expand in the longitudinal direction and the thickness direction. The angle (narrow angle) between the electrode surface and the longitudinal direction is preferably smaller than 30 degrees and more preferably smaller than 10 degrees. In the present embodiment, the electrode surface is parallel to the longitudinal direction. The angle (narrow angle) between the electrode surface and the thickness direction is preferably smaller than 30 degrees and more preferably smaller than 10 degrees. In the present embodiment, the electrode surface is parallel to the thickness direction.

As shown in FIG. 58B, the toner cartridge 170 includes the seal member 76*s*. As in the case of the first embodiment, the seal member 76*s* is disposed for each of the discharge openings 71*b*R, 71*b*L; however, in FIG. 58B, the seal member 76*s* for the discharge opening 71*b*R is not shown.

The toner cartridge 170 of the present embodiment includes the toner shutter 176 covering the discharge opening 71*b*, a shutter drive unit 177 for moving the toner shutter 176 relative to the discharge opening 71*b*, and a stopper 173*s*. Furthermore, the toner cartridge 170 has an opener (developing shutter opener, cartridge-side opener, second opener) 172O and the holder 72*h*. The opener 172O acts on the developing shutter 57. In the transverse direction, the holder 72*h* is closer to the inner end 71*fi* than the opener 172*o* is to the inner end 71*fi*. The function of the opener 172O is the same as that of the opener 72*o* of the first embodiment.

As in the case of the first embodiment, the toner frame 171 of the toner cartridge 170 has the discharge openings 71*b*R, 71*b*L. The toner shutter 176, the shutter drive unit 177, the stopper 173*s*, the opener 172*o*, and the holder 72*h* are provided for each of the discharge openings 71*b*R, 71*b*L. Specifically, the toner cartridge 170 includes the toner shutter 176R, the shutter drive unit 177R, the stopper 173*s*R, the opener 172*o*R, and the holder 72 hR, provided for the discharge opening 71*b*R. The toner cartridge 170 includes the toner shutter 176L, the shutter drive unit 177L, the stopper 173*s*L, the opener 172*o*L, and the holder 72*h*L, provided for the discharge opening 71*b*L.

Each of the discharge opening 71*b*R, the toner shutter 176R, the shutter drive unit 177R, the stopper 173*s*R, the opener 172*o*R, and the holder 72 hR and a corresponding one of the discharge opening 71*b*L, the toner shutter 176L, the shutter drive unit 177L, the stopper 173*s*L, the opener 172*o*L, and the holder 72*h*L are symmetric with respect to a plane orthogonal to the longitudinal direction. The seal member 76*s* provided for the discharge opening 71*b*R and the seal member 76*s* provided for the discharge opening 71*b*L are also symmetric with respect to a plane orthogonal to the longitudinal direction.

The configurations and functions of these members provided for the discharge opening 71*b*R and the configurations and functions of these members provided for the discharge opening 71*b*L are common. Therefore, when there is no need to distinguish between these members, in the following description, the suffixes R and L will be omitted, and the members provided for one of the discharge opening 71*b*R and the discharge opening 71*b*L will be described.

Figure 60B:
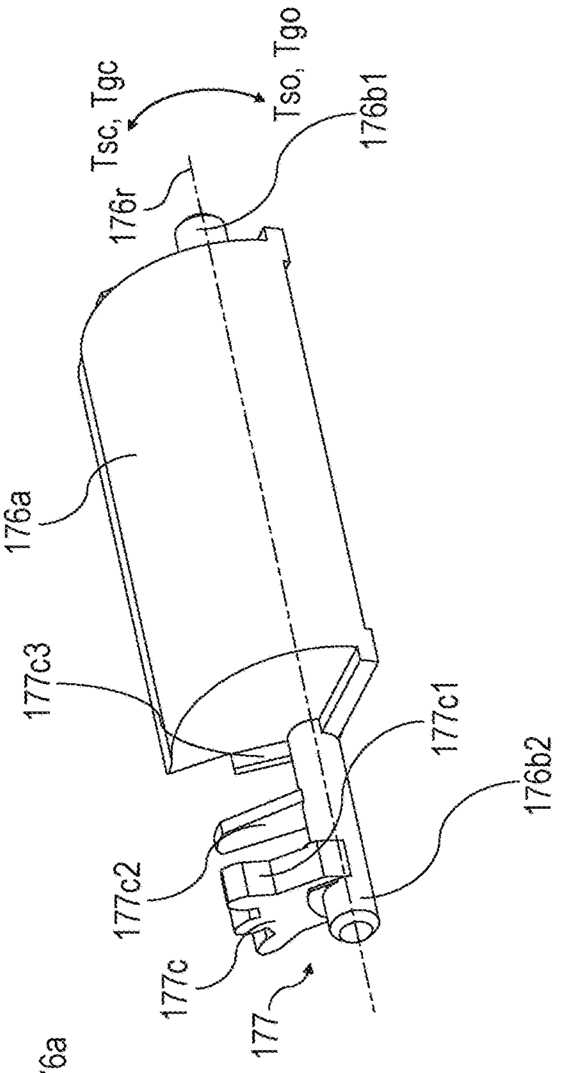
FIGS. 60A and 60B are views that illustrate a toner shutter and a shutter drive unit according to the second embodiment.
Figure 60A:
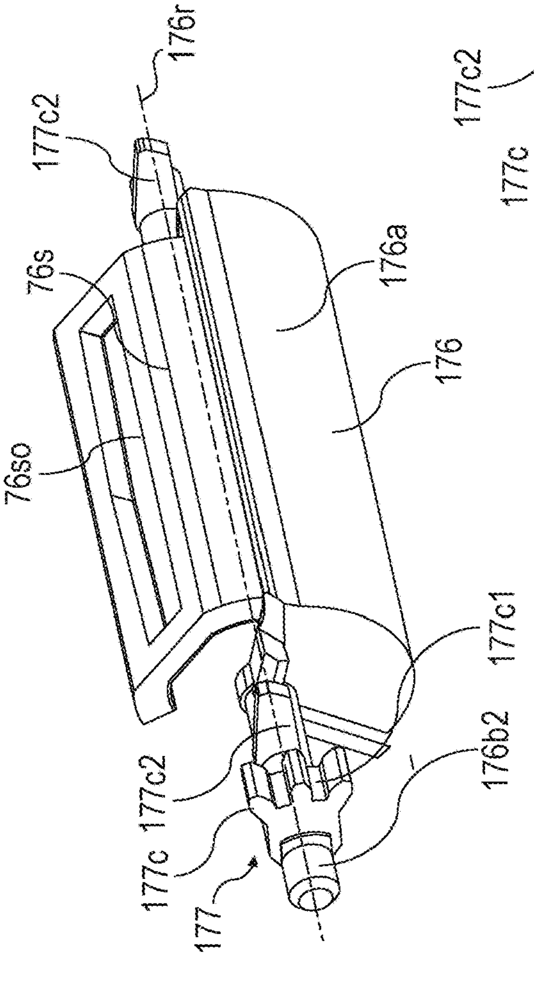

FIGS. 60A and 60B are views that illustrate the toner shutter 176 and the shutter drive unit 177. FIGS. 61A, 61B, 61C, 62A, 62B, 62C, and 62D are views that illustrate the toner shutter 176 and the shutter drive unit 177.

Figure 61C:
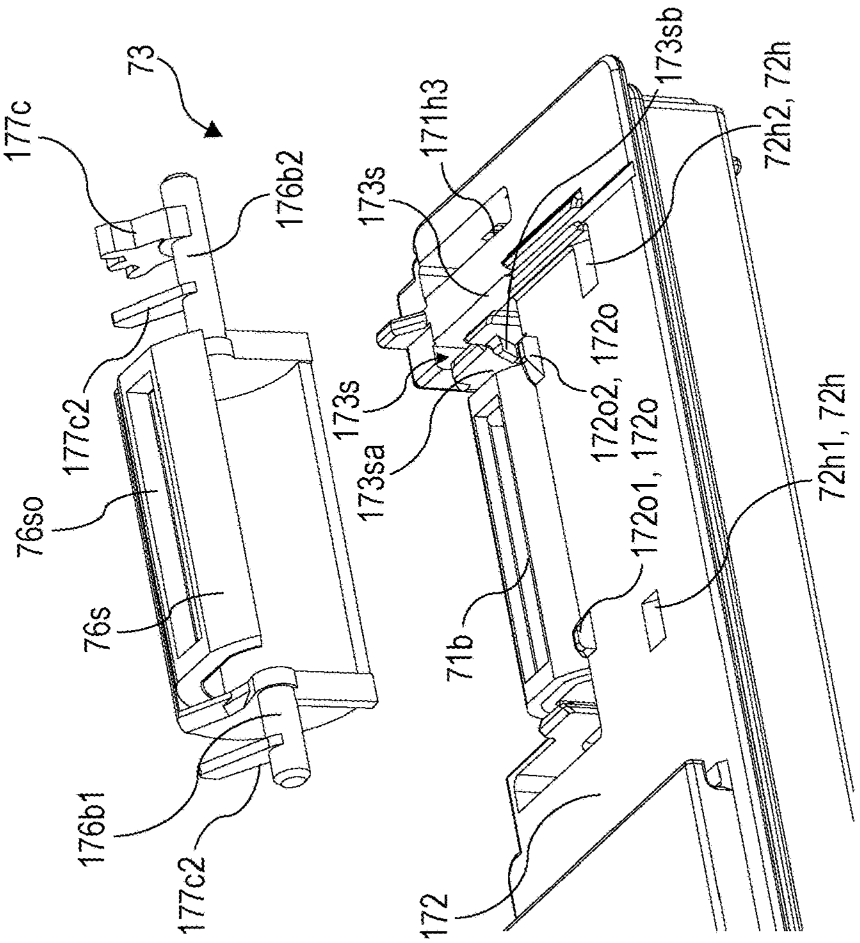
FIGS. 61A to 61C are views that illustrate the toner shutter and the shutter drive unit according to the second embodiment.
Figure 61A:
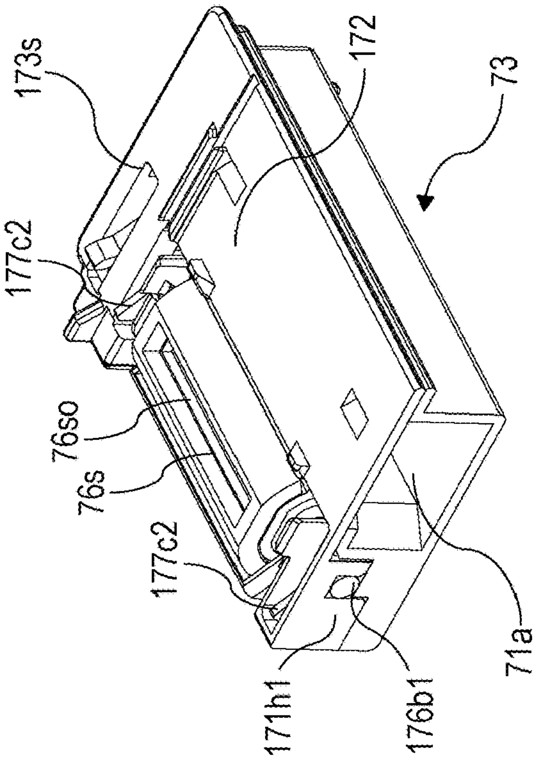
Figure 61B:
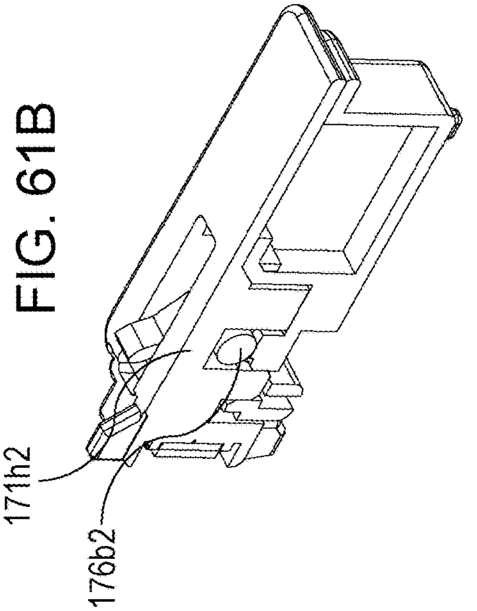

FIG. 61A is an exploded perspective view of the toner cartridge 170. FIG. 61B is a sectional view of the toner cartridge 170 in a shutter support portion 171*h*1 (described later). FIG. 61C is a sectional view of the toner cartridge 170 in a shutter support portion 171*h*2 (described later).

Figure 62A:
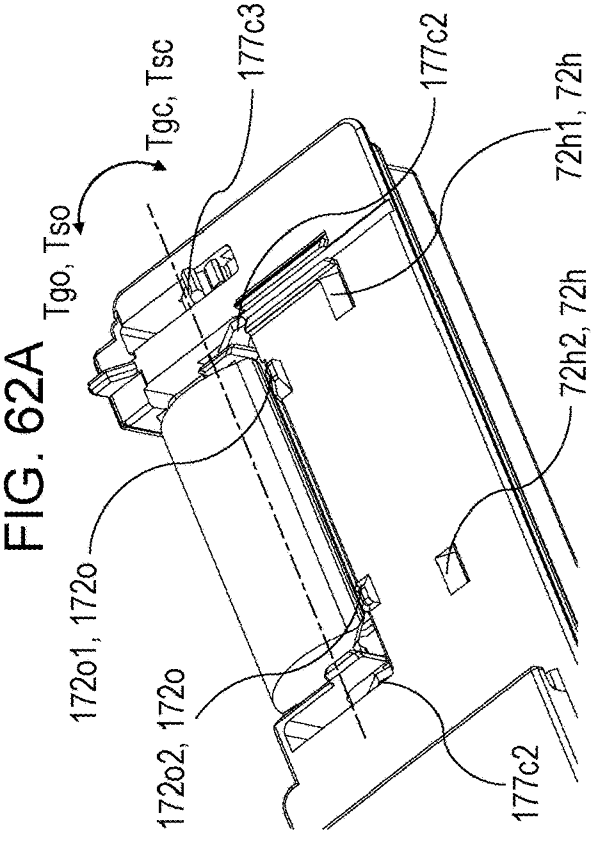
FIGS. 62A to 62D are views that illustrate the toner shutter and the shutter drive unit according to the second embodiment.
Figure 62B:
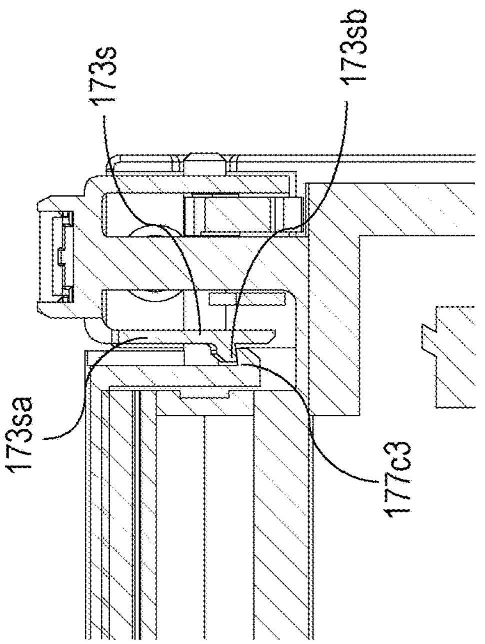
Figure 62C:
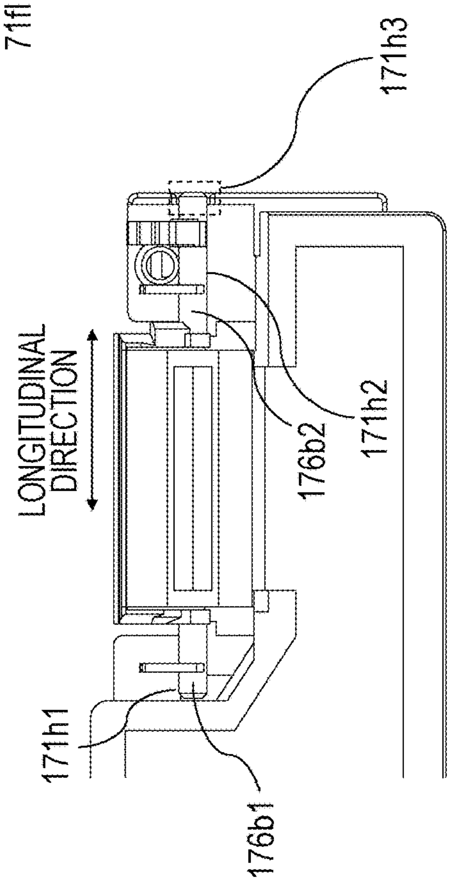
Figure 62D:
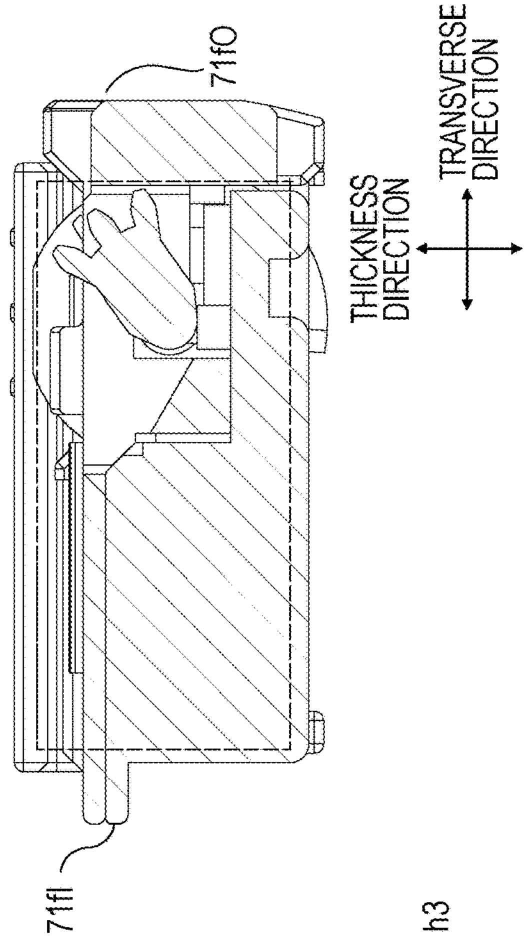

FIG. 62A is a sectional view of the toner cartridge 170 in the state where the toner shutter 176 is at the closed position. FIG. 62B is a sectional view of the engagement portion between an engagement protrusion 177*c*3 and an engagement opening 173*sb* (described later). FIG. 62C is a view that shows the configuration supporting the toner shutter 176. FIGS. 62B and 62C are views of the toner cartridge 170 when viewed in the thickness direction. FIG. 62D is a sectional view of the toner cartridge 170, taken in the transverse direction.

The toner shutter 176 is configured to be rotatable (pivotable) around the rotation axis (pivot axis) 176*r*. The direction of the rotation axis 176*r* of the toner shutter 176 can be a direction in the longitudinal direction and further can be parallel to the longitudinal direction. In other words, the direction of the rotation axis 176*r* of the toner shutter 176 is a direction that crosses (which can be a direction orthogonal to) the transverse direction and the thickness direction.

The toner shutter 176 includes a shutter body 176*a* for covering the discharge opening 71*b*, a support shaft 176*b*1, and a support shaft 176*b*2. The support shaft 176*b*1 is supported by the shutter support portion 171*h*1 of the toner frame 171, and the support shaft 176*b*2 is supported by the shutter support portion 171*h*2 of the toner frame 171. As a result, the toner shutter 176 is supported so as to be rotatable (pivotable) relative to the toner frame 171. As shown in FIGS. 61A and 61B, each of the shutter support portions 171*h*1, 171*h*2 is made up of the toner lid 172 and the toner container 73.

When the toner shutter 176 is at the closed position, the shutter body 176*a* covers the discharge opening 71*b* and the seal opening 76*so*. As a result, the discharge of toner from the discharge opening 71*b* and the seal opening 76*so* is suppressed.

In the direction of the rotation axis 176*r*, the shutter body 176*a*, the discharge opening 71*b*, and the seal member 76*s* are disposed between the support shaft 176*b*1 and the support shaft 176*b*2. With this arrangement, the floating of the shutter body 176*a* relative to the seal member 76*s* due to reaction force received from the seal member 76*s* is suppressed.

As shown in FIGS. 60A and 60B, the shutter drive unit 177 includes at least one gear. In the present embodiment, the shutter drive unit 177 includes an engagement gear 177*c*. In the present embodiment, the direction of the rotation axis of the engagement gear 177*c* is parallel to the direction of the rotation axis 176*r*.

The engagement gear 177*c* has gear teeth 177*cl*. In the present embodiment, the engagement gear 177*c* is an intermittent gear, and, in the rotation direction of the engagement gear 177*c*, the range in which the gear teeth 177*c*1 are provided is smaller than 360 degrees.

The engagement gear 177*c* is integrally formed with the toner shutter 176. However, the engagement gear 177*c* may be formed separately from the toner shutter 176. In this case, the engagement gear 177*c* can be secured to the support shaft 176*b*2 in the state where the rotation relative to the support shaft 176*b*2 is restricted.

When viewed in the direction of the rotation axis 176*r*, the rotation direction of the engagement gear 177*c* and the rotation direction of the toner shutter 176 are the same. When the engagement gear 177*c* rotates in the opening direction Tgo, the toner shutter 176 also rotates in the same direction, and the toner shutter 176 moves from the closed position toward the open position. The direction to open the toner shutter 176 is referred to as the opening direction Tso. When the engagement gear 177*c* rotates in the closing direction Tgc, the toner shutter 176 also rotates in the same direction, and the toner shutter 176 moves from the open position toward the closed position. The direction to close the toner shutter 176 is referred to as the closing direction Tsc.

The shutter drive unit 177 is disposed outside of the toner storage chamber 71*a*. As shown in FIG. 62D, when viewed in the longitudinal direction, the shutter drive unit 177 overlaps the toner storage chamber 71*a*. Therefore, it is difficult to form a toner flow path from the toner storage chamber 71*a* to the discharge opening 71*b*, in the space for disposing the shutter drive unit 177.

In the present embodiment, in the longitudinal direction, the side where the shutter drive unit 177 is disposed with respect to the center of the discharge opening 71*b* is referred to as a drive side. Also, the opposite side is referred to as a nondrive side. The volume of the toner storage chamber communicating with the discharge opening 71*b* is larger on the nondrive side than on the drive side. By doing so, it is easier to ensure the flexibility to dispose a toner flow path from the toner storage chamber 71*a* to the discharge opening 71*b*.

As shown in FIG. 61C, in the present embodiment, the toner frame 171 has a shutter support portion 171*h*3, and the support shaft 176*b*2 is supported by the shutter support portion 171*h*3 in addition to the shutter support portions 171*h*1, 171*h*2. As shown in FIG. 62C, in the direction of the rotation axis 176*r*, the drive gear 77*a* is disposed between the shutter support portion 171*h*2 and the shutter support portion 171*h*3.

On the other hand, as shown in FIG. 62B, the toner frame 171 has the stopper 173*s*. In the present embodiment, the toner container 73 has the stopper 173*s*. The stopper 173*s* has an arm 173*sa*, and the arm 173*sa* has an engagement protrusion 173*sb*. On the other hand, the toner shutter 176 has an engagement protrusion 177*c*3. When the toner shutter 176 is at the closed position, the engagement protrusion 177*c*3 is engaged with the engagement protrusion 173*sb*. In this state, the engagement gear 177*c* is restricted from rotating in the opening direction Tgo. This can suppress the user from accidentally moving the toner shutter 176 to the open position. In other words, the stopper 173*s* restricts the movement of the toner shutter 176 from the closed position toward the open position.

When the engagement gear 177*c* rotates in the closing direction in the state where the engagement protrusion 177*c*3 is engaged with the engagement protrusion 173*sb*, the engagement protrusion 177*c*3 separates from the engagement protrusion 173*sb* to allow the rotation of the engagement gear 177*c*. This operation will be described later.

Furthermore, the toner shutter 176 has an adjustment protrusion 177*c*2. As shown in FIG. 61C, the toner frame 171 has the holder 72*h* and the opener 1720. The holder 72*h* is a recess formed on the upper surface 71*u* of the toner frame 171. The holder 72*h* includes the first holder 72*h*1 and the second holder 72*h*2. The opener 172*o* is a protrusion formed on the upper surface 71*u* of the toner frame 171. The opener 172*o* includes a first opener 172*o*1 and a second opener 172*o*2.

In the direction of the rotation axis 176*r*, the first holder 72*h*1 and the first opener 172*o*1 are provided on one side of the center of the discharge opening 71*b*, and the second holder 72*h*2 and the second opener 172*o*2 are provided on the other side of the center of the discharge opening 71*b*. In other words, in the direction of the rotation axis 176*r*, the center of the discharge opening 71*b* is located between the first holder 72*h*1 and the second holder 72*h*2. In the direction of the rotation axis 176*r*, the center of the discharge opening 71*b* is located between the first opener 172*o*1 and the second opener 172*o*2.

The function of the opener 172*o* is the same as that of the opener 72*o* of the first embodiment. The operation of the adjustment protrusion 177*c*2 will be described later.

Overall Configuration of Developing Unit

Hereinafter, the overall configuration of the developing unit 150 of the rotary body 90 will be described with reference to FIG. 63.

Figure 63:
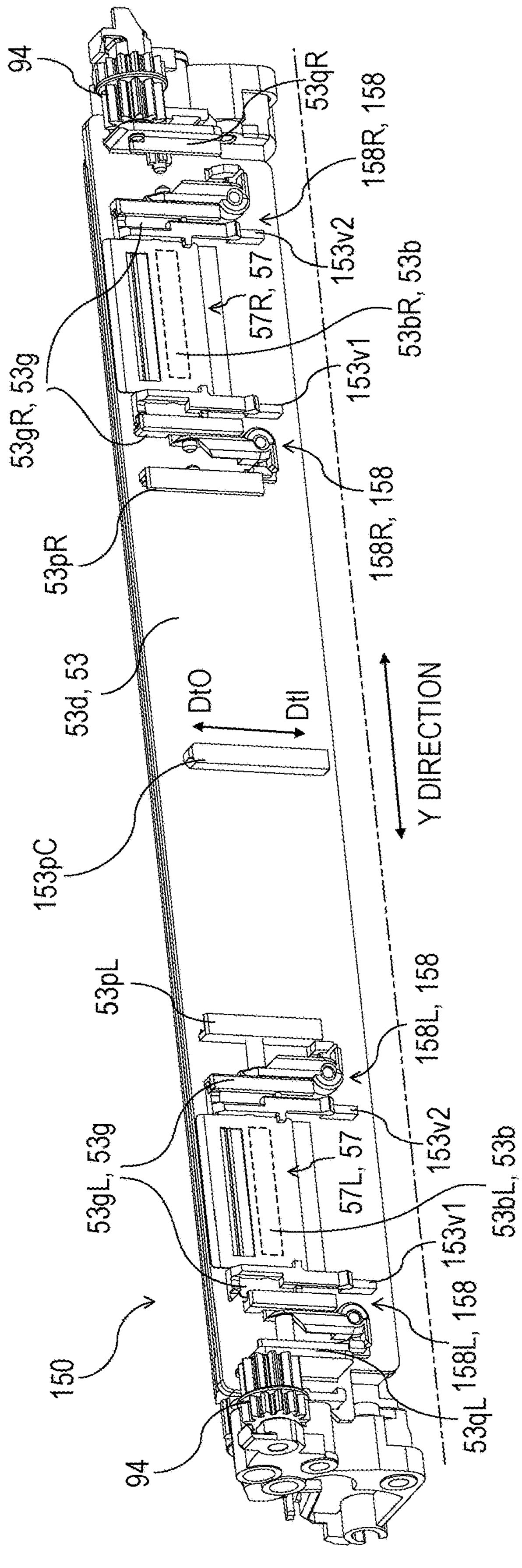
FIG. 63 is a perspective view of a developing unit according to the second embodiment.

FIG. 63 is a perspective view of the developing unit 150. FIG. 63 shows the state where the developing shutter 57 (described later) is at the open position.

As shown in FIG. 63, the developing frame 53 has a lower surface 53*d*. The lower surface 53*d* faces the toner cartridge 170 in the state where the toner cartridge 170 is at the mounting position. In the replacement posture in which the toner cartridge 170 is allowed to be removed relative to the developing unit 150, the lower surface 53*d* faces downward in the vertical direction V, and the lower surface 53*d* is positioned above the upper surface of the toner frame 171.

The developing frame 53 has the receiving openings 53*b* (53*b*R, 53*b*L). In the state where the toner cartridge 170 is at the mounting position, the receiving opening 53*b*R communicates with the discharge opening 71*b*R, and the receiving opening 53*b*L communicates with the discharge opening 71*b*L.

The developing frame 53 has a positioning protrusion 153*p*C, and the support protrusions 53*p*R, 53*p*L. The positioning protrusion 153*p*C has a function similar to the positioning protrusion 53*p*C of the first embodiment. In the Y direction, the positioning protrusion 153*p*C is located between the support protrusions 53*p*R, 53*p*L, and the support protrusions 53*p*R, 53*p*L are located between the receiving openings 53*b*R, 53*b*L. The developing frame 53 has end support portions 53*q*R, 53*q*L. In the Y direction, the receiving openings 53*b*R, 53*b*L are located between the end support portions 53*q*R, 53*q*L. The receiving opening 53*b*R is located between the end support portion 53*q*R and the support protrusion 53*p*R, and the receiving opening 53*b*L is located between the end support portion 53*q*L and the support protrusion 53*p*L.

As shown in FIG. 63, in the present embodiment, the positioning protrusion 153*p*C and the support protrusions 53*p*R, 53*p*L extend in the insertion direction DtI. In the state where the toner cartridge 170 is at the mounting position, the positioning protrusion 153*p*C is engaged with the positioning groove 172*p*C, with the result that the movement of the toner cartridge 170 in the longitudinal direction relative to the developing frame 53 is restricted. In the state where the toner cartridge 170 is at the mounting position, the support protrusion 53*p*R is engaged with the supported groove 72*p*R, and the support protrusion 53*p*L is engaged with the supported groove 72*p*L. As a result, in the direction that crosses (which can be the direction orthogonal to) the insertion direction DtI, the movement of the toner cartridge 170 in the direction away from the lower surface 53*d* of the developing frame 53 is restricted.

The developing unit 150 of the present embodiment includes the developing shutter 57 for covering the receiving opening 53*b*, a shutter lock 158, and the shutter guide 53*g* for guiding the developing shutter 57. The function of the shutter lock 158 is substantially the same as the shutter lock 58 in the first embodiment.

The developing shutter 57, the shutter lock 158, and the shutter guide 53*g* are provided for each of the receiving openings 53*b*R, 53*b*L.

As in the case of the first embodiment, the configurations and functions of these members provided for the receiving opening 53*b*R and the configurations and functions of those members provided for the receiving opening 53*b*L are common. Therefore, when there is no need to distinguish between these members, in the following description, the suffixes R and L will be omitted, and the members provided for one of the receiving opening 53*b*R and the receiving opening 53*b*L will be described.

Main Body Opener

The image forming apparatus 1 according to the present embodiment includes an opener unit 120 that moves the toner shutter 176 from the closed position to the open position. Hereinafter, the configuration of the opener unit 120 will be described with reference to FIGS. 64A, 64B, 65A, and 65B.

Figure 64A:
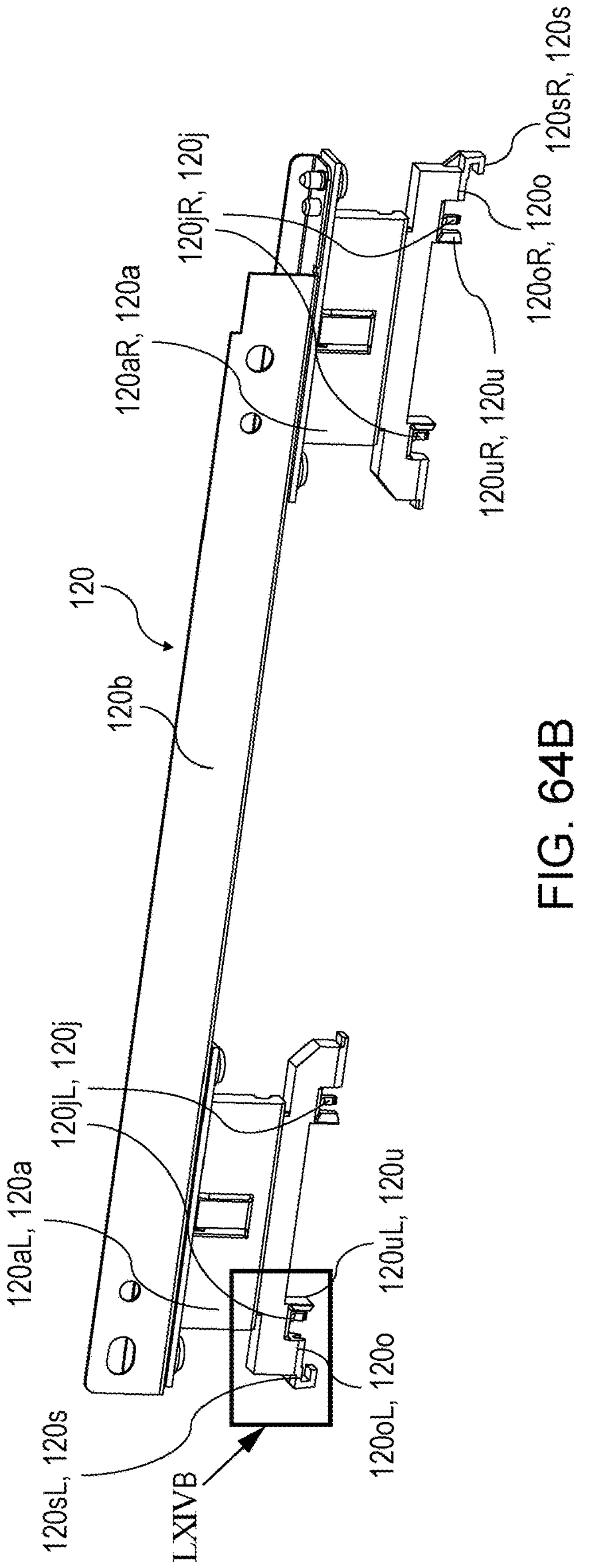
FIGS. 64A and 64B are perspective views that show an opener unit according to the second embodiment.
Figure 64B:
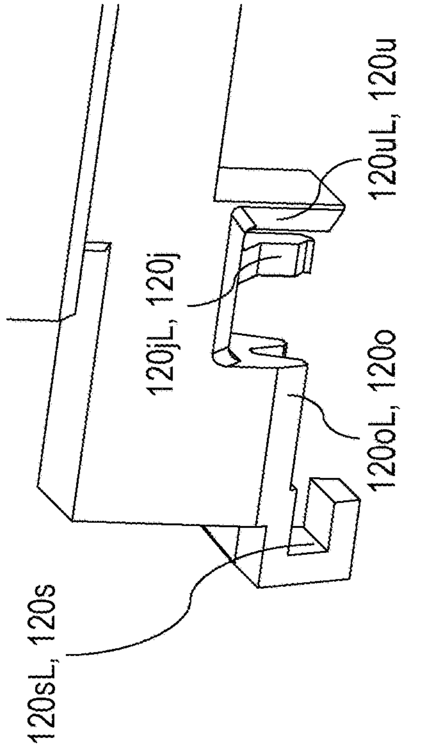

FIGS. 64A and 64B are perspective views that show the opener unit 120. FIG. 64B is a detailed view that shows the area enclosed by the box LXIVB in FIG. 64A.

The opener unit 120 includes an opener (toner shutter opener, main body-side opener, first opener) 120*o*, a release portion 120*u*, an adjustment portion 120*j*, and an opener support portion 120*s*. The opener 120*o*, the release portion 120*u*, the adjustment portion 120*j*, and the opener support portion 120*s* are provided for each of the receiving openings 53*b*R, 53*b*L.

Specifically, the opener unit 120 includes opener bodies 120*a* (120*a*R, 120*a*L). The opener unit 120 includes an opener stay 120*b* that connects the opener bodies 120*a*R, 120*a*L. In the present embodiment, the opener stay 120*b* is formed from sheet metal.

The opener body 120*a*R is provided for the receiving opening 53*b*R. The opener body 120*a*R includes the opener 120*o*R, the release portion 120*u*R, the adjustment portion 120*j*R, and the opener support portion 120*s*R. The opener body 120*a*L is provided for the receiving opening 53*b*L. The opener body 120*a*L includes the opener 120*o*L, the release portion 120*u*L, the adjustment portion 120*j*L, and the opener support portion 120*s*L.

Each of the receiving opening 53*b*R and the opener body 120*a*R and a corresponding one of the receiving opening 53*b*L and the opener body 120*a*L are symmetric with respect to a plane orthogonal to the Y direction. Therefore, each of the opener 120*o*R, the release portion 120*u*R, the adjustment portion 120*j*R, and the opener support portion 120*s*R and a corresponding one of the opener 120*o*L, the release portion 120*u*L, the adjustment portion 120*j*L, and the opener support portion 120*s*L are symmetric with respect to a plane orthogonal to the Y direction.

The configurations and functions of these members provided for the receiving opening 53*b*R and the configurations and functions of those members provided for the receiving opening 53*b*L are common. Therefore, when there is no need to distinguish between these members, in the following description, the suffixes R and L will be omitted, and the members provided for one of the receiving opening 53*b*R and the receiving opening 53*b*L will be described.

Figure 65B:
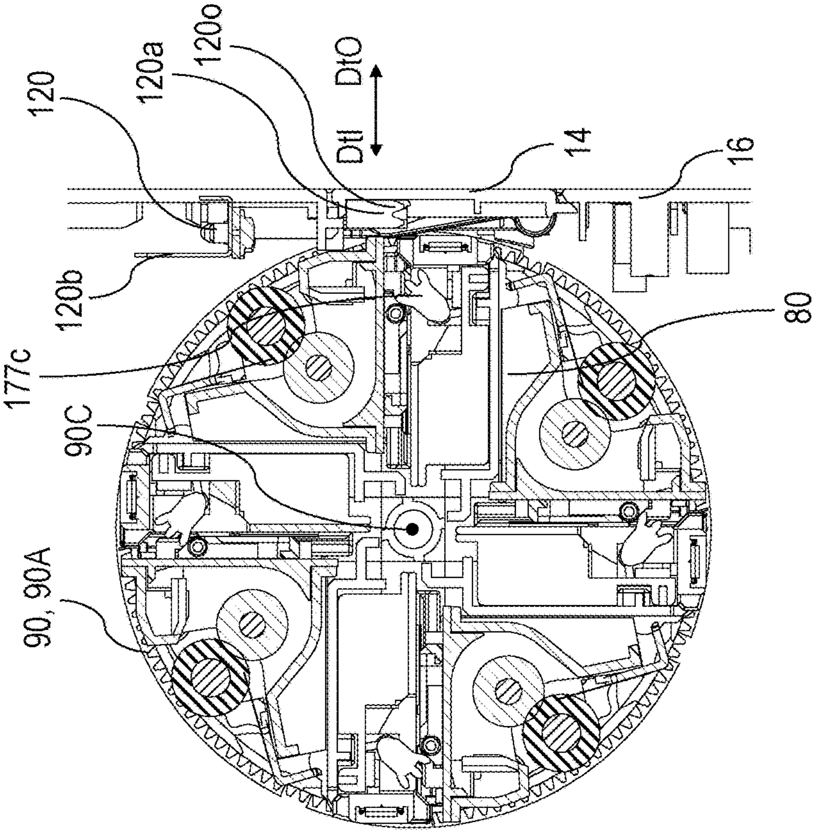
FIGS. 65A and 65B are sectional views that show the arrangement of the opener unit according to the second embodiment.
Figure 65A:
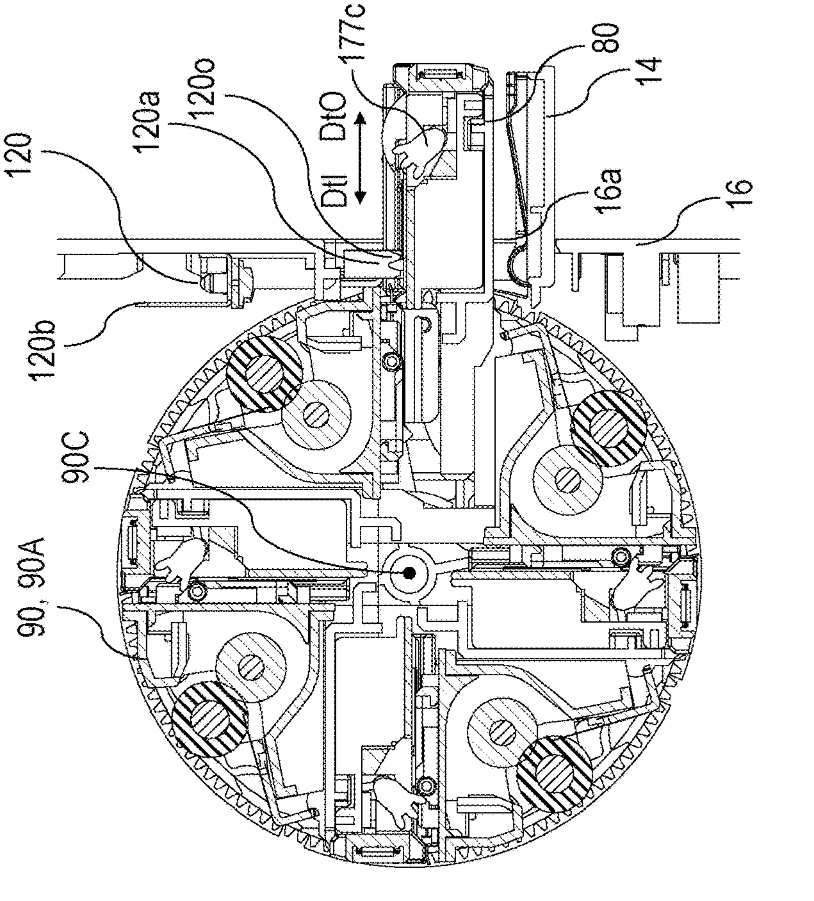

FIGS. 65A and 65B are sectional views of the arrangement of the opener unit 120. In FIG. 65A, the toner cartridge 170 is at the retreat position. In FIG. 65B, the toner cartridge 170 is at the mounting position.

The opener unit 120 is supported by the frame 16 of the apparatus body 1A and is disposed at a position away from the rotary body 90. Each of the rotary body 90 and the rotary assembly 90A is rotatable relative to the opener unit 120 independently of the opener unit 120. In other words, each of the rotary body 90 and the rotary assembly 90A can rotate in the state where the opener unit 120 is stopped.

The opener unit 120 is provided at the opening 16*a* of the frame 16. In the insertion direction DtI of the toner cartridge 170, the opener body 120*a* of the opener unit 120 is located on the upstream side of the rotary body 90. Therefore, in the insertion direction DtI of the toner cartridge 170, the opener

120*o* of the opener unit 120 is located on the upstream side of the rotary body 90. In the insertion direction DtI of the toner cartridge 170, the release portion 120*u*, the adjustment portion 120*j*, and the opener support portion 120*s* are also located on the upstream side of the rotary body 90.

In the present embodiment, the opener body 120*a* is movable in a direction that crosses the insertion direction DtI. In the present embodiment, the opener stay 120*b* is fixed to the frame 16, and the opener body 120*a* is coupled to the opener stay 120*b* so as to be movable in the direction that crosses the insertion direction DtI. As a result, the opener body 120*a* is movable in the direction that crosses the insertion direction DtI relative to the frame 16.

The entire opener unit 120 may be movable in the direction that crosses the insertion direction DtI. For example, at least part of the opener unit 120 (for example, the opener stay 120*b*) may deform to cause the opener body 120*a* to displace.

When the toner cartridge 170 moves between the retreat position and the mounting position through the opening 16*a*, the toner cartridge 170 passes below the opener 120*o*. At this time, the engagement gear 177*c* engages with the opener 120*o*. As a result, when the toner cartridge 170 moves from the retreat position toward the mounting position, the toner shutter 176 moves from the closed position toward the open position. When the toner cartridge 170 moves from the mounting position toward the retreat position, the toner shutter 176 moves from the open position toward the closed position.

Operation to Open Toner Shutter and Developing Shutter

Hereinafter, the operation to open the toner shutter 176 and the developing shutter 57 will be described with reference to FIGS. 66 to 73.

Figure 66:
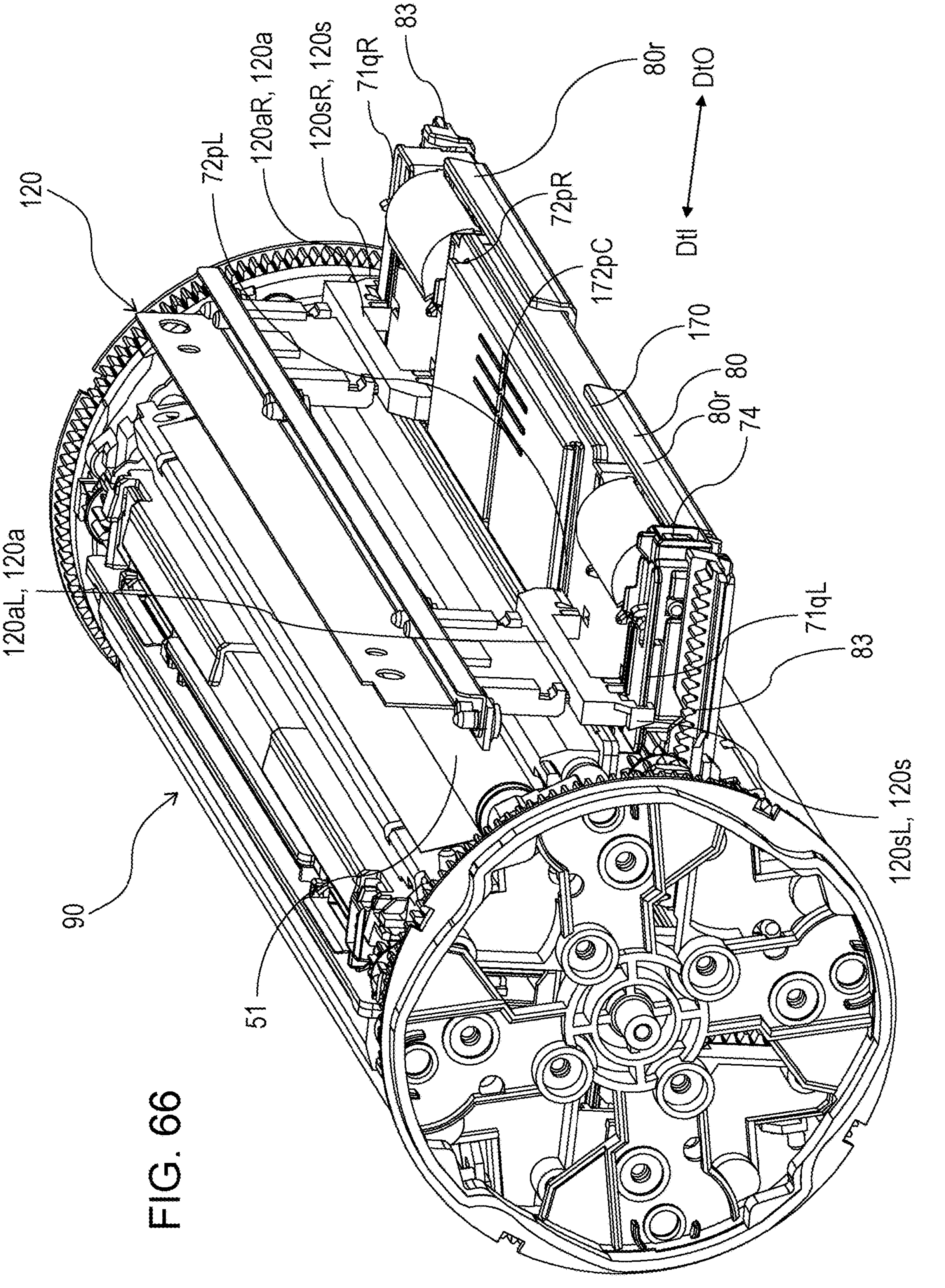
FIG. 66 is a view that illustrates the engagement of a positioned portion of the toner cartridge with a positioning portion of the developing unit according to the second embodiment.

FIG. 66 is a view that illustrates the engagement between the positioned portion of the toner cartridge 170 and the positioning portion of the developing unit 150. FIG. 66 is a perspective view that shows the state where the positioned portion of the toner cartridge 170 starts engaging with the positioning portion of the developing unit 150.

As described earlier, the toner cartridge 170 is moved from the retreat position toward the mounting position by the moving device 85 driven by the motor M2.

The state where the rotary body 90 takes the replacement posture may be regarded as the state where the toner cartridge 170 is movable between the retreat position and the mounting position. In this state, the toner cartridge 170 is positioned below the developing unit 150. In the state where the toner cartridge 170 is at the retreat position, the toner shutter 176 is at the closed position, and the developing shutter 57 is at the closed position.

The toner shutter 176 and the developing shutter 57 are opened and closed in conjunction with the movement of the toner cartridge 170 between the retreat position and the mounting position. In other words, the toner shutter 176 and the developing shutter 57 are opened and closed in conjunction with the operation to attach or detach the toner cartridge 170 to and from the developing unit 150.

As described earlier, in the state where the toner cartridge 170 is positioned below the developing unit 150 and the discharge opening 71*b* is positioned below the receiving opening 53*b*, the toner cartridge 170 moves from the retreat position toward the mounting position and moves from the mounting position toward the retreat position. In other words, the opening and closing of the toner shutter 176 and the developing shutter 57 are performed in the state where the toner cartridge 170 is positioned below the developing unit 150 and the discharge opening 71*b* positioned below the receiving opening 53*b*. In the state where the toner cartridge 170 is positioned below the developing unit 150 and the discharge opening 71*b* is positioned below the receiving opening 53*b*, the cover 54 is at the cover position.

When the toner cartridge 170 moves from the retreat position in the insertion direction DtI, the positioning protrusion 153*p*C of the developing unit 150 engages with the positioning groove 172*p*C of the toner frame 171. As a result, the toner cartridge 170 is positioned relative to the developing unit 150 in the Y direction.

The opener support portions 120*s*R, 120*s*L of the opener unit 120 engage with the supported portions 71*q*R, 71*q*L of the toner cartridge 170. As a result, the movement of the toner cartridge 170 in a direction away from the opener unit 120 in the direction orthogonal to both the Y direction and the insertion direction DtI is restricted.

The support protrusions 53*p*R, 53*p*L of the developing unit 150 engage with the supported grooves 72*p*R, 72*p*L of the toner cartridge 170. The end support portions 53*q*R, 53*q*L of the developing unit 150 engage with the supported portions 71*q*R, 71*q*L of the toner cartridge 170. As a result, the toner cartridge 170 is positioned relative to the developing unit 150 in the direction orthogonal to both the Y direction and the insertion direction DtI. More specifically, the movement of the toner cartridge 170 in a direction in which the toner cartridge 170 moves away from the developing unit 150 in the direction orthogonal to both the Y direction and the insertion direction DtI is restricted.

As described earlier, the opener body 120*a* can move in the direction that crosses the insertion direction DtI. Therefore, when there is a positional deviation between the opener support portions 120*s*R, 120*s*L and the end support portions 53*q*R, 53*q*L of the developing unit 150, the opener body 120*a* can be moved such that the positional deviation is absorbed.

Since the positioning protrusion 153*p*C engages with the positioning groove 172*p*C, a positional deviation between the support protrusions 53*p*R, 53*p*L and the supported grooves 72*p*R, 72*p*L, a positional deviation between the opener support portions 120*s*R, 120*s*L and the supported portions 71*q*R, 71*q*R, and a positional deviation between the end support portions 53*q*R, 53*q*L and the supported portions 71*q*R, 71*q*L are suppressed. However, the order of engagement between the positioning protrusion 153*p*C and the positioning groove 172*p*C, engagement between the support protrusions 53*p*R, 53*p*L and the supported grooves 72*p*R, 72*p*L, engagement between the opener support portions 120*s*R, 120*s*L and the supported portions 72*q*R, 72*q*L, and engagement between the end support portions 53*q*R, 53*q*L and the supported portions 71*q*R, 71*q*L may be different from the above order.

Figure 67A:
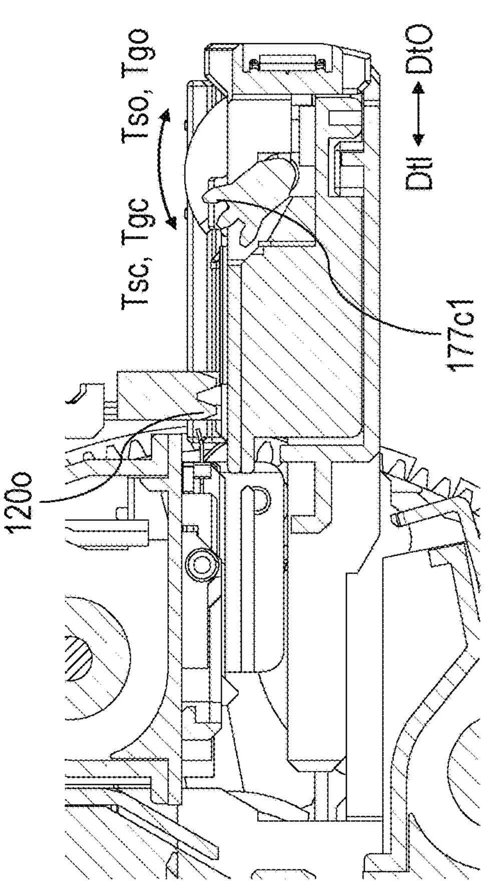
FIGS. 67A to 67D are views that illustrate the developing shutter and the toner shutter in the state where the positioned portion of the toner cartridge and the positioning portion of the developing unit start to engage according to the second embodiment.
Figure 67B:
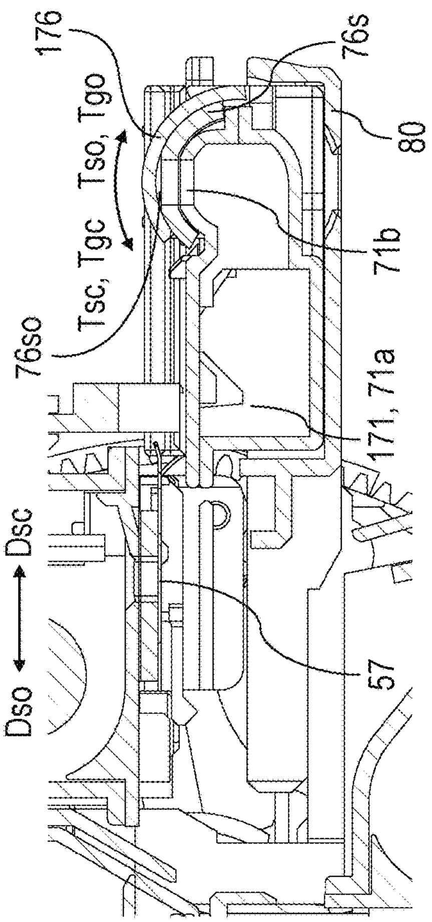
Figure 67C:
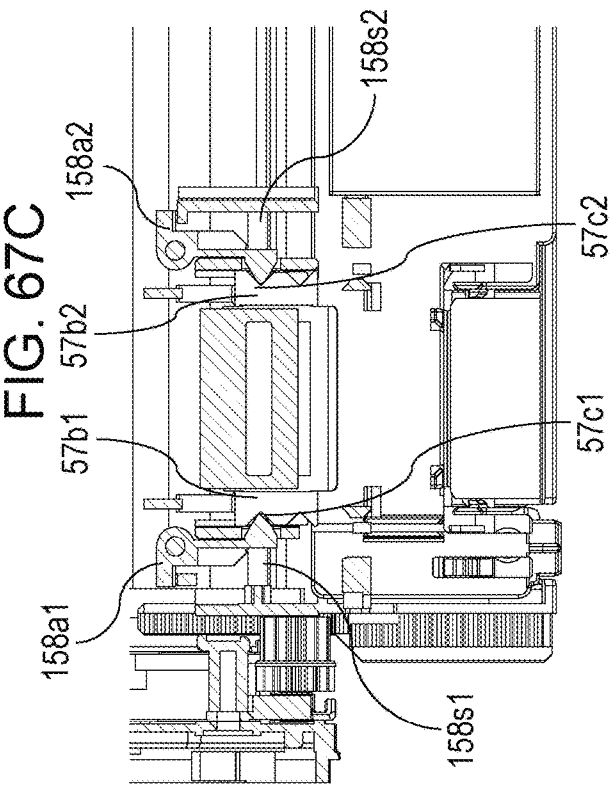
Figure 67D:
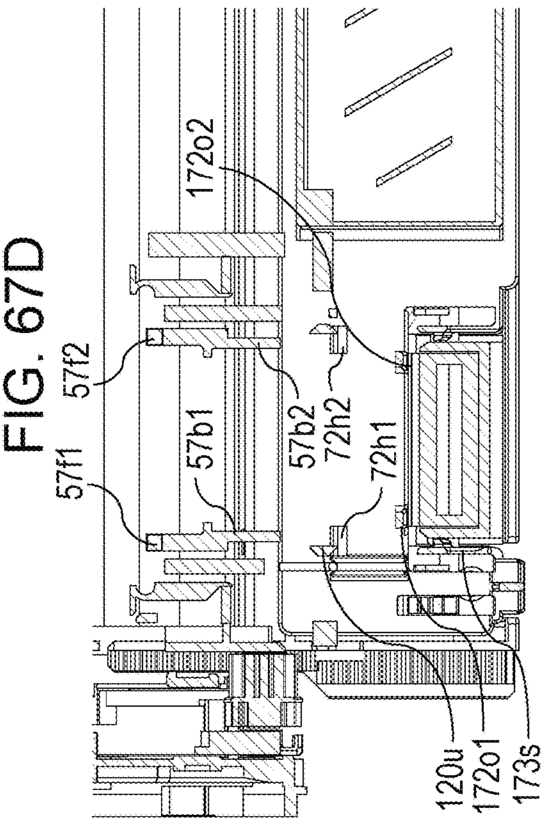

FIGS. 67A, 67B, 67C, and 67D are views that illustrate the developing shutter 57 and the toner shutter 176 in the state where the positioned portion of the toner cartridge 170 and the positioning portion of the developing unit 150 start engaging with each other. Specifically, FIGS. 67A and 67B are sectional views of the developing unit 150 and the toner cartridge 170 when viewed in the longitudinal direction of the toner cartridge 170. FIGS. 67C and 67D are sectional views of the developing unit 150 and the toner cartridge 170 when viewed in the thickness direction of the toner cartridge 170.

The shutter lock 158 includes a first lock body 158*a*1, a first lock spring 158*s*1 that urges the first lock body 158*a*1, a second lock body 158*a*2, and a second lock spring 158*s*2 that urges the second lock body 158*a*2.

The moving direction of the first lock body 158*a*1 is the same as the moving direction of the first lock body 58*a*1 of the first embodiment, and the moving direction of the second lock body 158*a*2 is the same as the moving direction of the second lock body 58*a*2 of the first embodiment.

As in the case of the first lock body 58*a*1 of the first embodiment, the first lock body 158*a*1 engages with the first shutter holder 57*b*1 through an opening provided in the first shutter guide 53*g*1.

As in the case of the second lock body 58*a*2 of the first embodiment, the second lock body 158*a*2 engages with the second shutter holder 57*b*2 through an opening provided in the second shutter guide 53*g*2.

The first lock body 158*a*1 and the first lock spring 158*s*1 and the second lock body 158*a*2 and the second lock spring 158*s*2 are symmetric with respect to a plane. Therefore, the configurations and relationships of the first shutter holder 57*b*1, the first shutter guide 53*g*1, the first lock body 158*a*1, and the first lock spring 158*s*1 and the configurations and relationships of the second shutter holder 57*b*2, the second shutter guide 53*g*2, the second lock body 158*a*2, and the second lock spring 158*s*2 are symmetric with respect to a plane.

The configurations and relationships of the first shutter holder 57*b*1, the first lock body 158*a*1, and the first lock spring 158*s*1 will be described in more details.

The relationship between the first lock body 158*a*1 and the first shutter holder 57*b*1 is substantially the same as the relationship between the first lock body 58*a*1 and the first shutter holder 57*b*1 of the first embodiment. When the first lock body 158*a*1 engages with the first positioning portion 57*cl* of the first shutter holder 57*b*1, the developing shutter 57 is positioned at the closed position. When the first lock body 158*a*1 engages with the second positioning portion 57*o*1 of the first shutter holder 57*b*1, the developing shutter 57 is positioned at the open position.

The first lock spring 158*s*1 is a compression spring. The function of the first lock spring 158*s*1 is the same as that of the first lock spring 58*s*1 of the first embodiment.

When the developing shutter 57 is urged in the opening direction Dso in the state where the first lock body 158*a*1 is engaged with the first positioning portion 57*c*1, the first lock body 158*a*1 moves against the urging force of the first lock spring 158*s*1 and disengages from the first positioning portion 57*c*1. When the developing shutter 57 is urged in the closing direction Dsc in the state where the first lock body 158*a*1 is engaged with the second positioning portion 57*o*1, the first lock body 158*a*1 moves against the urging force of the first lock spring 158*s*1 and disengages from the second positioning portion 57*o*1.

In the state where the toner cartridge 170 is at the retreat position, the toner shutter 176 is at the closed position, and the developing shutter 57 is at the closed position. In this state, the adjustment portion 120*j* is separated from the adjustment protrusion 177*c*2 of the toner shutter 176, and the opener 120*o* is separated from the gear teeth 177*c*1 of the engagement gear 177*c*. The openers 172*o*1, 172*o*2 are separated from the shutter holders 57*b*1, 57*b*2, and the holders 72*h*1, 72*h*2 are separated from the protrusions 57*f*1, 57*f*2. Furthermore, the release portion 120*u* and the stopper 173*s* are separated from each other.

From this state, when the toner cartridge 170 further moves in the insertion direction DtI, the adjustment portion 120*j* contacts the adjustment protrusion 177*c*2.

Figure 68A:
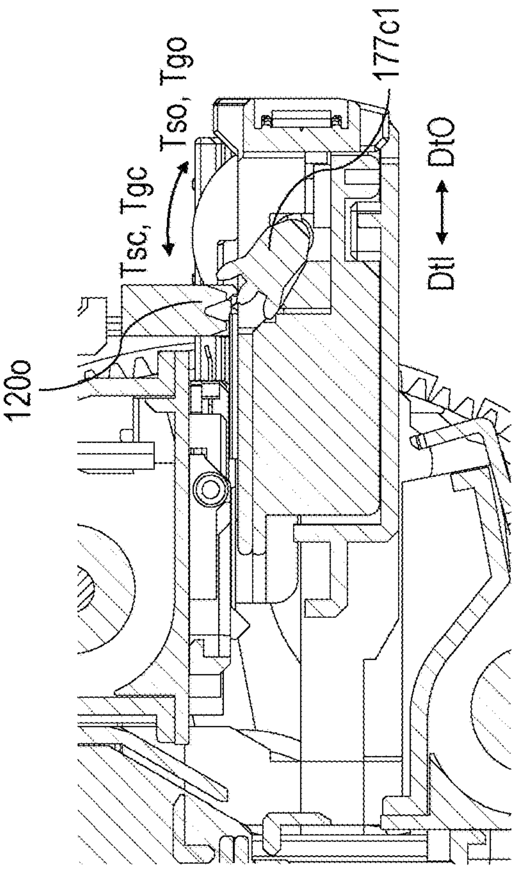
FIGS. 68A to 68D are views that illustrate the developing shutter and the toner shutter in the state where an adjustment protrusion has passed through an adjustment portion according to the second embodiment.
Figure 68B:
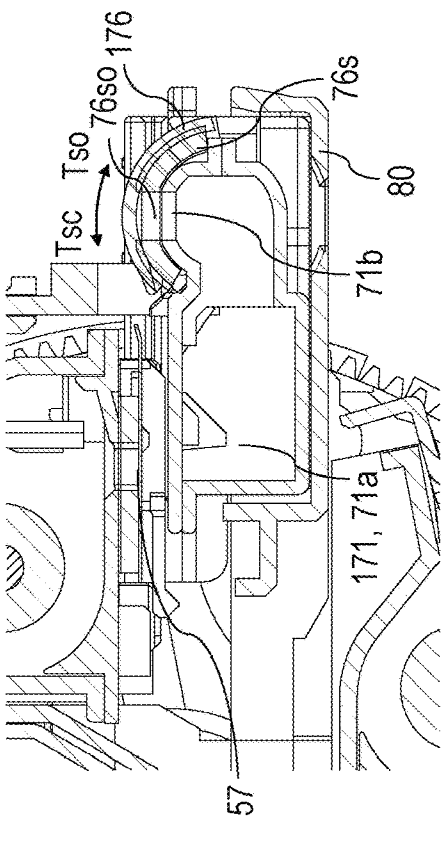
Figure 68C:
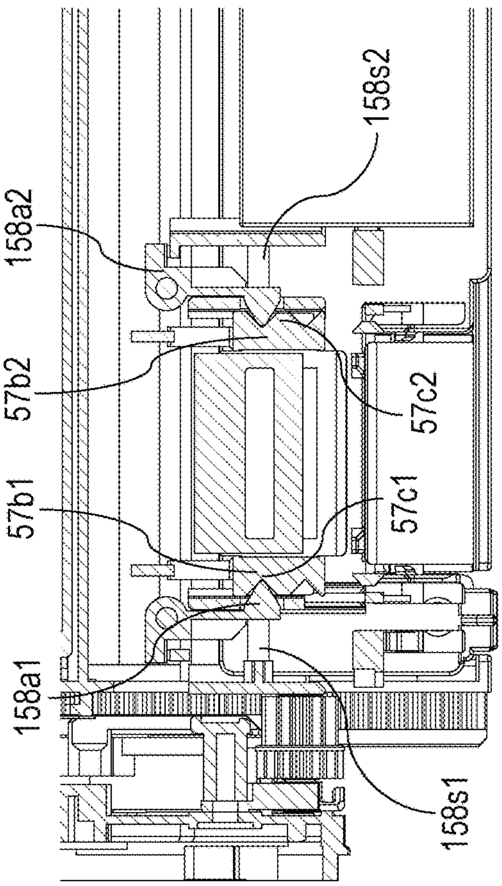
Figure 68D:
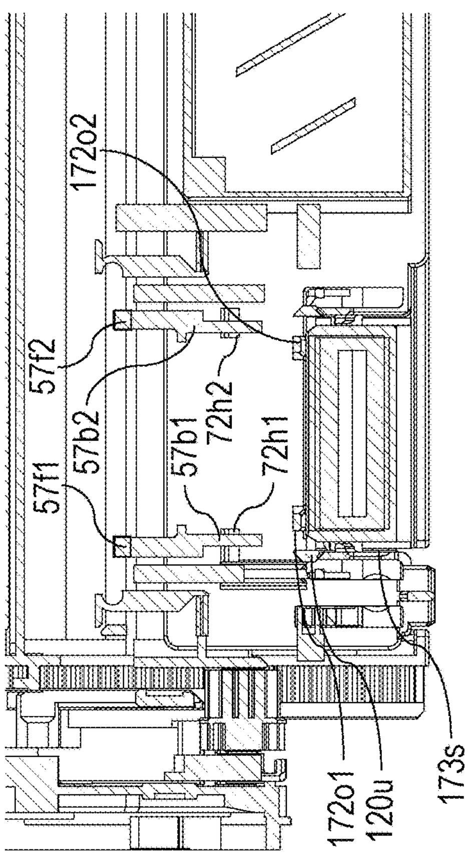

FIGS. 68A, 68B, 68C, and 68D are views that illustrate the developing shutter 57 and the toner shutter 176 in the state where the adjustment protrusion 177*c*2 has passed through the adjustment portion 120*j*. Specifically, FIGS. 68A and 68B are sectional views of the developing unit 150 and the toner cartridge 170 when viewed in the longitudinal direction of the toner cartridge 170. FIGS. 68C and 68D are sectional views of the developing unit 150 and the toner cartridge 170 when viewed in the thickness direction of the toner cartridge 170.

When the adjustment portion 120*j* contacts the adjustment protrusion 177*c*2 and the toner cartridge 170 moves in the insertion direction DtI, the engagement gear 177*c* is rotated in the closing direction Tgc.

In the state where the adjustment protrusion 177*c*2 has passed through the adjustment portion 120*j*, the toner shutter 176 is at the closed position, and the developing shutter 57 is at the closed position. In this state, the opener 120*o* is separated from the gear teeth 177*c*1 of the engagement gear 177*c*. The openers 172*o*1, 172*o*2 are separated from the shutter holders 57*b*1, 57*b*2, and the holders 72*h*1, 72*h*2 are separated from the protrusions 57*f*1, 57*f*2. Furthermore, the release portion 120*u* and the stopper 173*s* are separated from each other.

Strictly speaking, the position of the toner shutter 176 is slightly different before and after the engagement gear 177*c* rotates in the closing direction Tgc. However, even after the engagement gear 177*c* rotates in the closing direction Tgc, the shutter body 176*a* of the toner shutter 176 covers the discharge opening 71*b* and the seal opening 76*so*, so the toner shutter 176 may be regarded as being at the closed position.

From this state, when the toner cartridge 170 further moves in the insertion direction DtI, the release portion 120*u* contacts the stopper 173*s*. Then, when the toner cartridge 170 further moves in the insertion direction DtI, the stopper 173*s* is moved by the release portion 120*u*.

Figure 69A:
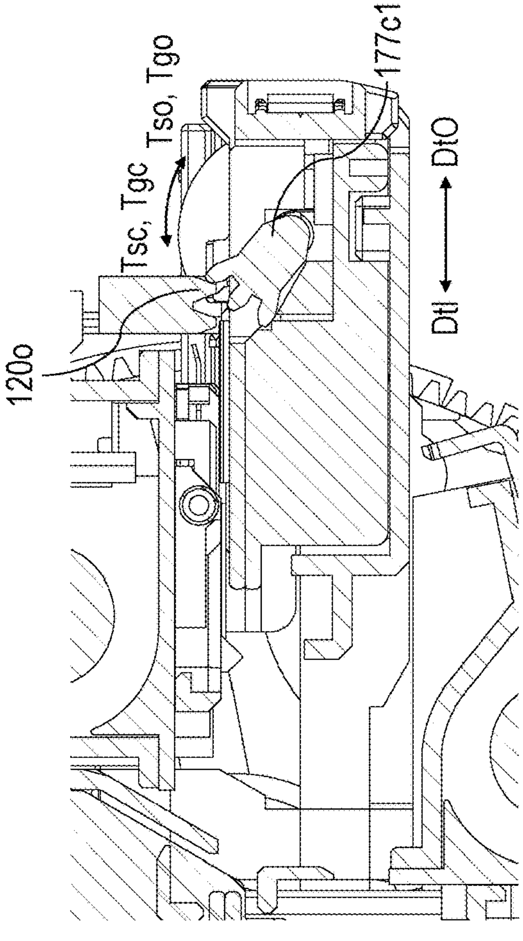
FIGS. 69A to 69D are views that illustrate the developing shutter and the toner shutter in the state where a stopper is released by a release portion according to the second embodiment.
Figure 69B:
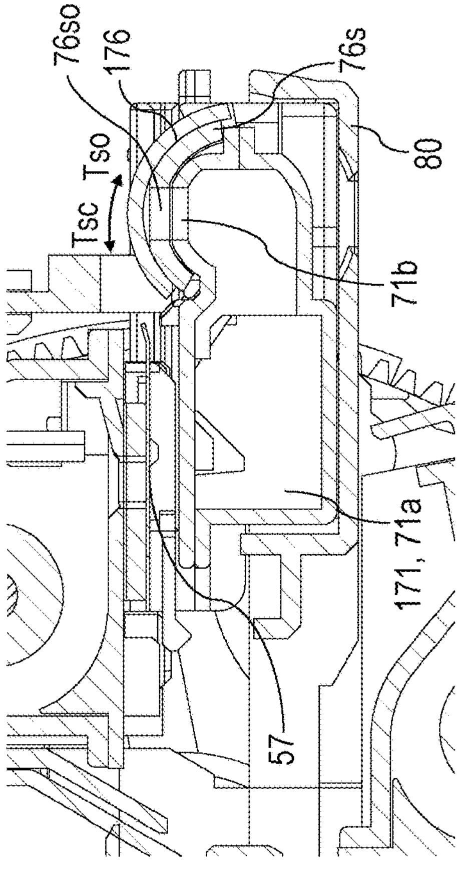
Figure 69C:
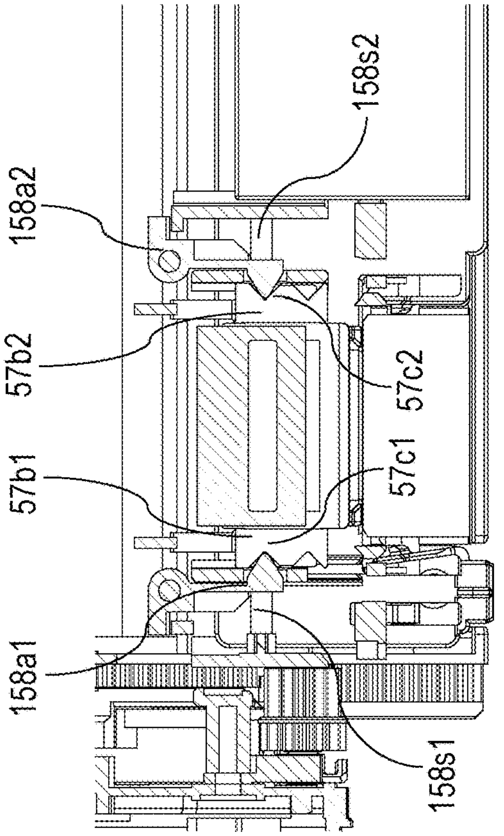
Figure 69D:
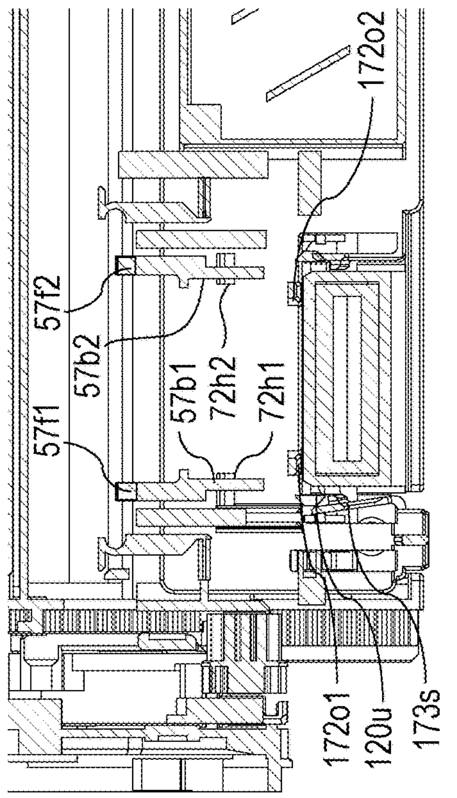

FIGS. 69A, 69B, 69C, and 69D are views that illustrate the developing shutter 57 and the toner shutter 176 in the state where the stopper 173*s* is released by the release portion 120*u*. Specifically, FIGS. 69A and 69B are sectional views of the developing unit 150 and the toner cartridge 170 when viewed in the longitudinal direction of the toner cartridge 170. FIGS. 69C and 69D are sectional views of the developing unit 150 and the toner cartridge 170 when viewed in the thickness direction of the toner cartridge 170.

As shown in FIG. 69C, in the state where the stopper 173*s* is released by the release portion 120*u*, the stopper 173*s* is at a position away from the engagement protrusion 177*c*3 of the engagement gear 177*c*. In this state, even when the engagement gear 177*c* rotates in the opening direction Tgo, the engagement protrusion 177*c*3 does not contact the stopper 173*s*. Therefore, the engagement gear 177*c*7 is allowed to rotate in the opening direction Tgo.

In the state where the stopper 173*s* is released by the release portion 120*u*, the toner shutter 176 is at the closed position, and the developing shutter 57 is at the closed position. In this state, the openers 172*o*1, 172*o*2 are separated from the shutter holders 57*b*1, 57*b*2, and the holders 72*h*1, 72*h*2 are separated from the protrusions 57*f*1, 57*f*2.

In the present embodiment, the opener 120*o* is a rack that meshes with the gear teeth 177*c*1 of the engagement gear 177*c*. The gear teeth 177*c*1 of the engagement gear 177*c* can be formed along an involute curve.

The stopper 173*s* can be released before the gear teeth 177*c*1 of the engagement gear 177*c* contact the opener 120*o*, or at the same time when the gear teeth 177*c*1 contact the opener 120*o*. When the toner cartridge 170 moves in the insertion direction DtI in the state where the stopper 173*s* is released, the gear teeth 177*c*1 of the engagement gear 177*c* mesh with the opener 120*o*, so the engagement gear 177*c* is rotated in the opening direction Tgo and the toner shutter 176 is moved toward the open position.

Figure 70C:
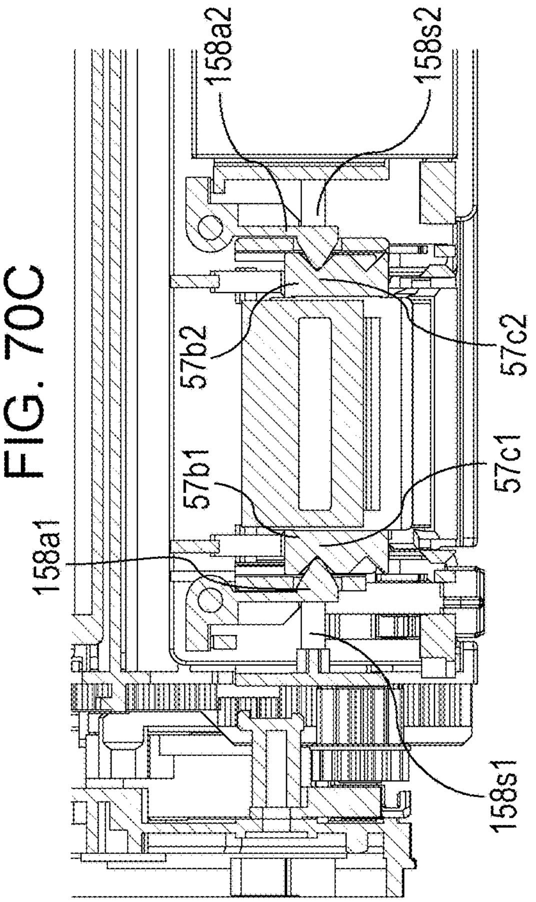
FIGS. 70A to 70D are views that illustrate the developing shutter and the toner shutter in the state where gear teeth have passed through the opener and the toner shutter is at the open position according to the second embodiment.
Figure 70D:
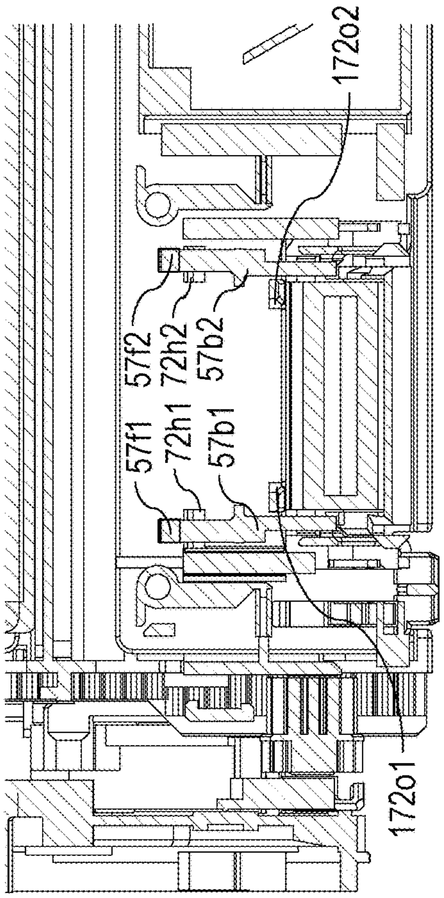
Figure 70A:
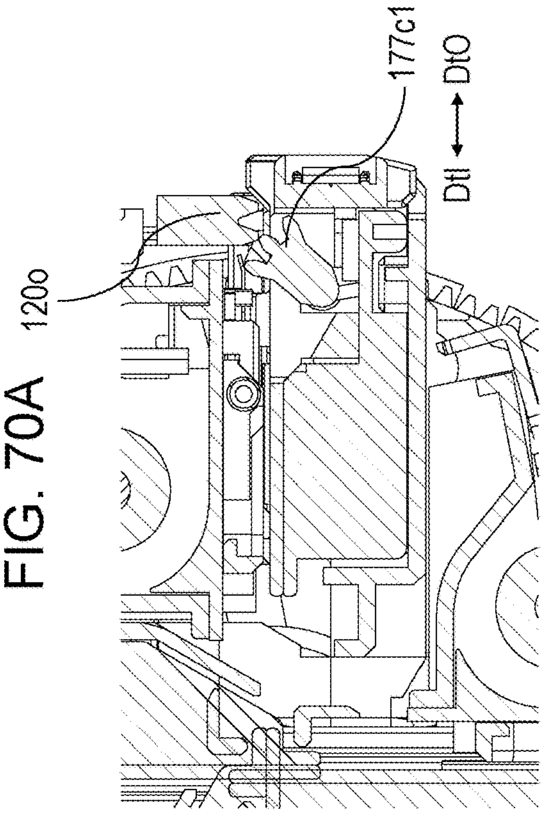
Figure 70B:
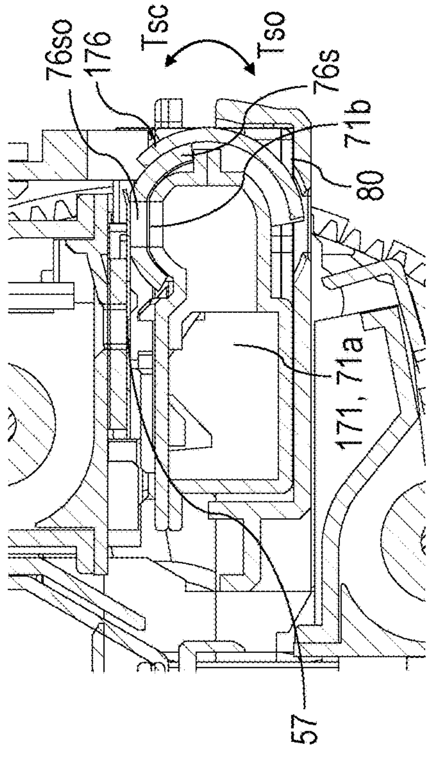

FIGS. 70A, 70B, 70C, and 70D are views that illustrate the developing shutter 57 and the toner shutter 176 in the state where the gear teeth 177*c*1 have passed through the opener 120*o* and the toner shutter 176 is positioned at the open position. Specifically, FIGS. 70A and 70B are sectional views of the developing unit 150 and the toner cartridge 170 when viewed in the longitudinal direction of the toner cartridge 170. FIGS. 70C and 70D are sectional views of the developing unit 150 and the toner cartridge 170 when viewed in the thickness direction of the toner cartridge 170.

In the present embodiment, when the toner cartridge 170 moves in the insertion direction DtI, the seal member 76*s* contacts the developing shutter 57. The tip of the shutter body 57*a* of the developing shutter 57 is bent in the direction away from the seal member 76*s*. When the toner cartridge 170 moves in the insertion direction DtI after the seal member 76*s* contacts the developing shutter 57, the seal member 76*s* passes below the developing shutter 57.

At the timing when the seal member 76*s* contacts the developing shutter 57, the toner shutter 176 does not need to completely reach the open position. In the present embodiment, when the toner cartridge 170 moves in the insertion direction DtI, the toner shutter 176 rotates in the opening direction Tso while maintaining the gap between the toner shutter 176 and the developing shutter 57.

When the toner cartridge 170 moves in the insertion direction DtI, the toner shutter 176 is positioned at the open position in the state where the developing shutter 57 is at the closed position. As shown in FIGS. 70C and 70D, in the state where the developing shutter 57 has been moved to the closed position, the openers 172*o*1, 172*o*2 are separated from the shutter holders 57*b*1, 57*b*2, and the holders 72*h*1, 72*h*2 are separated from the protrusions 57*f*1, 57*f*2.

In the present embodiment, when the toner cartridge 170 is attached to or detached from the developing unit 150, the toner cartridge 170 is positioned below the developing unit 150. In this state, the discharge opening 71*b* is positioned below the receiving opening 53*b*. In the present embodiment, the toner shutter 176 reaches the open position before the developing shutter 57 reaches the open position. In the present embodiment, the toner shutter 176 is positioned at the open position before the developing shutter 57 starts moving from the closed position to the open position.

In the present embodiment, in the state where the toner shutter 176 is positioned at the open position, part of the toner shutter 176 is positioned below the toner frame 171. At this time, the toner shutter 176 is accommodated in the opening formed in the tray 80. The opening for accommodating the toner shutter 176 may be a recess or a hole.

When the toner cartridge 170 further moves in the insertion direction DtI, the openers 172*o*1, 172*o*2 approach the shutter holders 57*b*1, 57*b*2 and contact the shutter holders 57*b*1, 57*b*2. While the arms 57*e*1, 57*e*2 of the shutter holders 57*b*1, 57*b*2 are elastically deformed, the protrusions 57*f*1, 57*f*2 approach the holders 72*h*1, 72*h*2 and engage with the holders 72*h*1, 72*h*2.

Figure 71A:
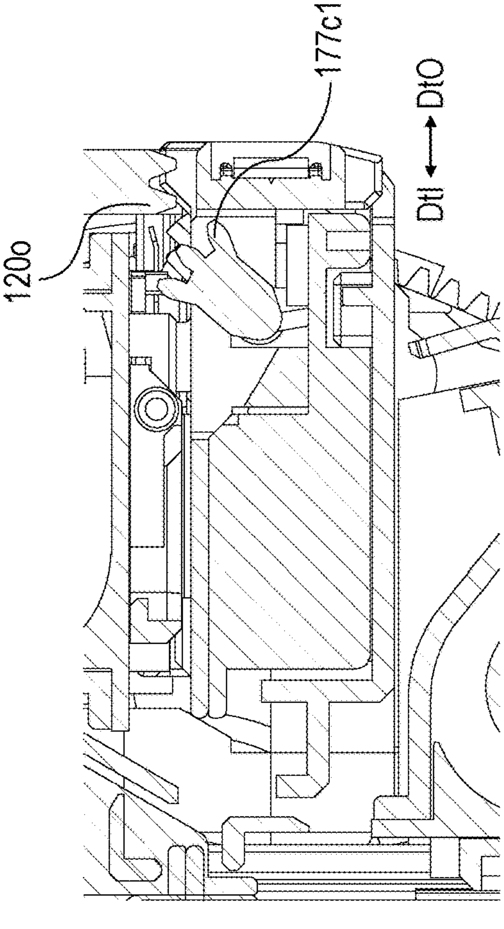
FIGS. 71A to 71D are views that illustrate the developing shutter and the toner shutter in the state where the opener is in contact with a shutter holder according to the second embodiment.
Figure 71C:
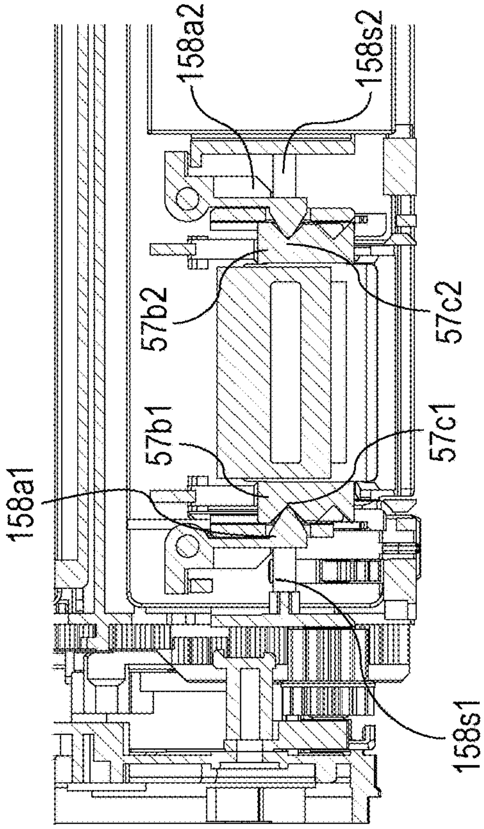
Figure 71B:
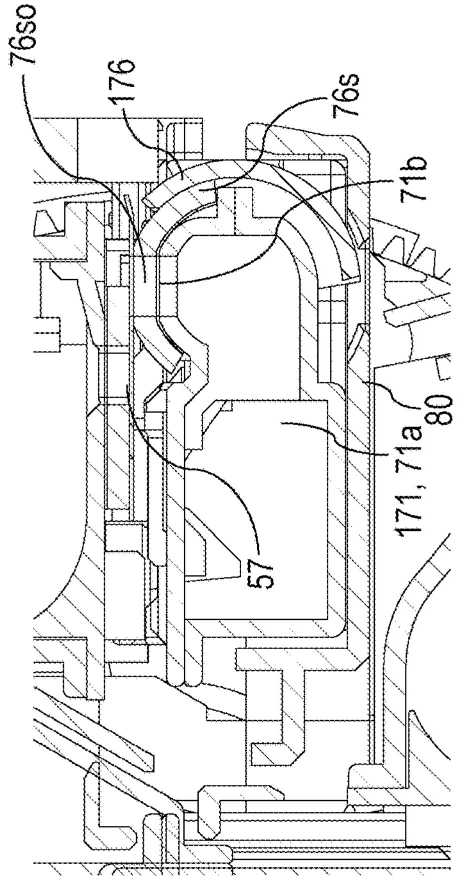
Figure 71D:
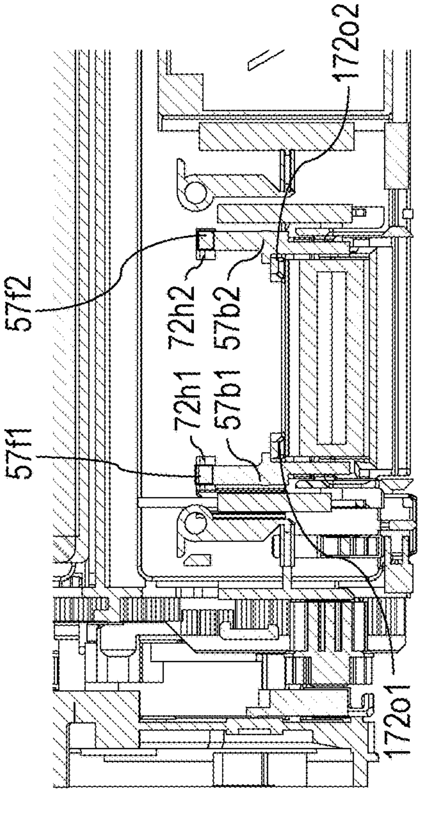

FIGS. 71A, 71B, 71C, and 71D are views that illustrate the developing shutter 57 and the toner shutter 176 in the state where the openers 172*o*1, 172*o*2 are in contact with the shutter holders 57*b*1, 57*b*2. Specifically, FIGS. 71A and 71B are sectional views of the developing unit 150 and the toner cartridge 170 when viewed in the longitudinal direction of the toner cartridge 170. FIGS. 71C and 71D are sectional views of the developing unit 150 and the toner cartridge 170 when viewed in the thickness direction of the toner cartridge 170.

In the state where the openers 172*o*1, 172*o*2 are in contact with the shutter holders 57*b*1, 57*b*2, the developing shutter 57 is at the closed position. On the other hand, the toner shutter 176 is already at the open position. As shown in FIG. 71A, in the state where the openers 172*o*1, 172*o*2 are in contact with the shutter holders 57*b*1, 57*b*2, the shutter opening 57*ab* of the developing shutter 57 overlaps the seal opening 76*so* and the discharge opening 71*b*. In other words, the discharge opening 71*b*, the seal opening 76*so*, and the shutter opening 57*ab* communicate with each other. On the other hand, in the state where the openers 172*o*1, 172*o*2 are in contact with the shutter holders 57*b*1, 57*b*2, the holders 72*h*1, 72*h*2 are engaged with the protrusions 57*f*1, 57*f*2.

When the toner cartridge 170 moves in the insertion direction DtI, the shutter holders 57*b*1, 57*b*2 are pushed by the openers 172*o*1, 172*o*2 while the state where the discharge opening 71*b*, the seal opening 76*so*, and the shutter opening 57*ab* communicate with each other and the engagement of the holders 72*h*1, 72*h*2 with the protrusions 57*f*1, 57*f*2 are maintained. Then, the developing shutter 57 moves in the opening direction Dso. In other words, the developing shutter 57 contacts the toner cartridge 170 moving from the retreat position to the mounting position and moves from the closed position toward the open position.

When the developing shutter 57 moves from the closed position in the opening direction Dso, the lock members 158*a*1, 158*a*2 are moved against the urging force of the lock springs 158*s*1, 158*s*2 to disengage the first positioning portions 57*c*1, 57*c*2 of the shutter holders 57*b*1, 57*b*2. When the toner cartridge 170 further moves in the insertion direction DtI, the developing shutter 57 is positioned at the open position.

In this way, while maintaining the state of communication among the discharge opening 71*b*, the seal opening 76*so*, and the shutter opening 57*ab*, the developing shutter 57 is moved from the closed position to the open position. Therefore, even when toner falls from the developing unit 150 in the process in which the developing shutter 57 moves from the closed position to the open position, the toner can fall inside the toner cartridge 170 through the discharge opening 71*b*.

Figure 72A:
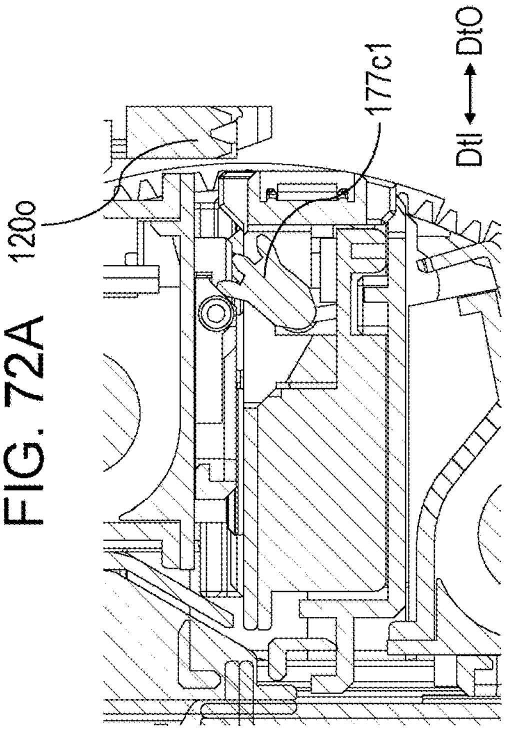
FIGS. 72A to 72D are views that illustrate the developing shutter and the toner shutter in the state where the developing shutter is at the open position according to the second embodiment.
Figure 72B:
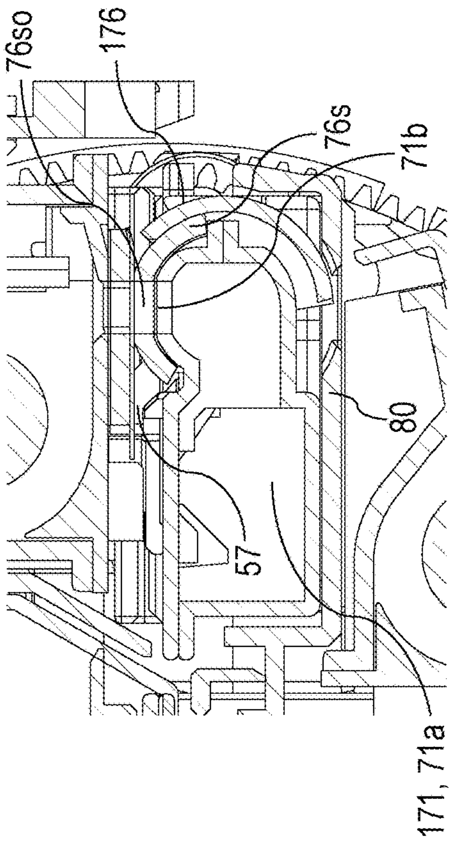
Figure 72C:
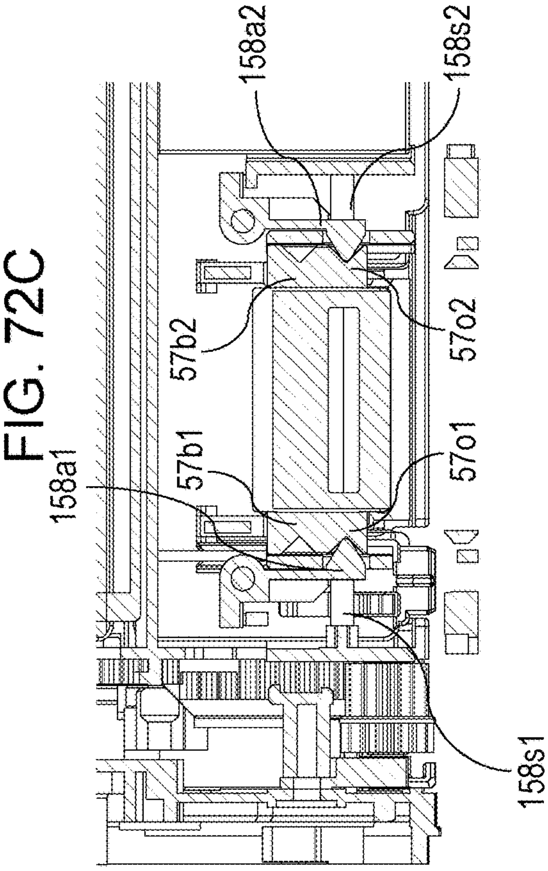
Figure 72D:
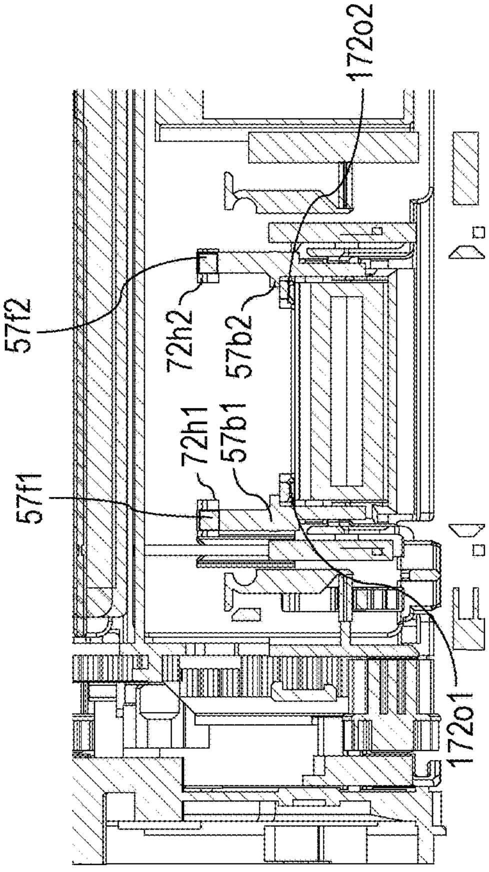

FIGS. 72A, 72B, 72C, and 72D are views that illustrate the developing shutter 57 and the toner shutter 176 in the state where the developing shutter 57 is at the open position. Specifically, FIGS. 72A and 72B are sectional views of the developing unit 150 and the toner cartridge 170 when viewed in the longitudinal direction of the toner cartridge 170. FIGS. 72C and 72D are sectional views of the developing unit 150 and the toner cartridge 170 when viewed in the thickness direction of the toner cartridge 170.

When the toner cartridge 170 is positioned at the mounting position, the developing shutter 57 is positioned at the open position. In the present embodiment, when the toner cartridge 170 moves in the insertion direction DtI, the lock members 158*a*1, 158*a*2 engage with the second positioning portions 57*o*1, 57*o*2 of the shutter holders 57*b*1, 57*b*2. Therefore, the developing shutter 57 is urged in the opening direction Dso by the force of the lock springs 158*s*1, 158*s*2.

The developing shutter 57 may reach the open position under the force of the lock springs 158*s*1, 158*s*2. In this case, in the state where the toner cartridge 170 is positioned at the mounting position, the openers 172*o*1, 172*o*2 may separate from the shutter holders 57*b*1, 57*b*2.

The developing shutter 57 may reach the open position by being pressed by the openers 172o1, 172o2.

Figure 73:
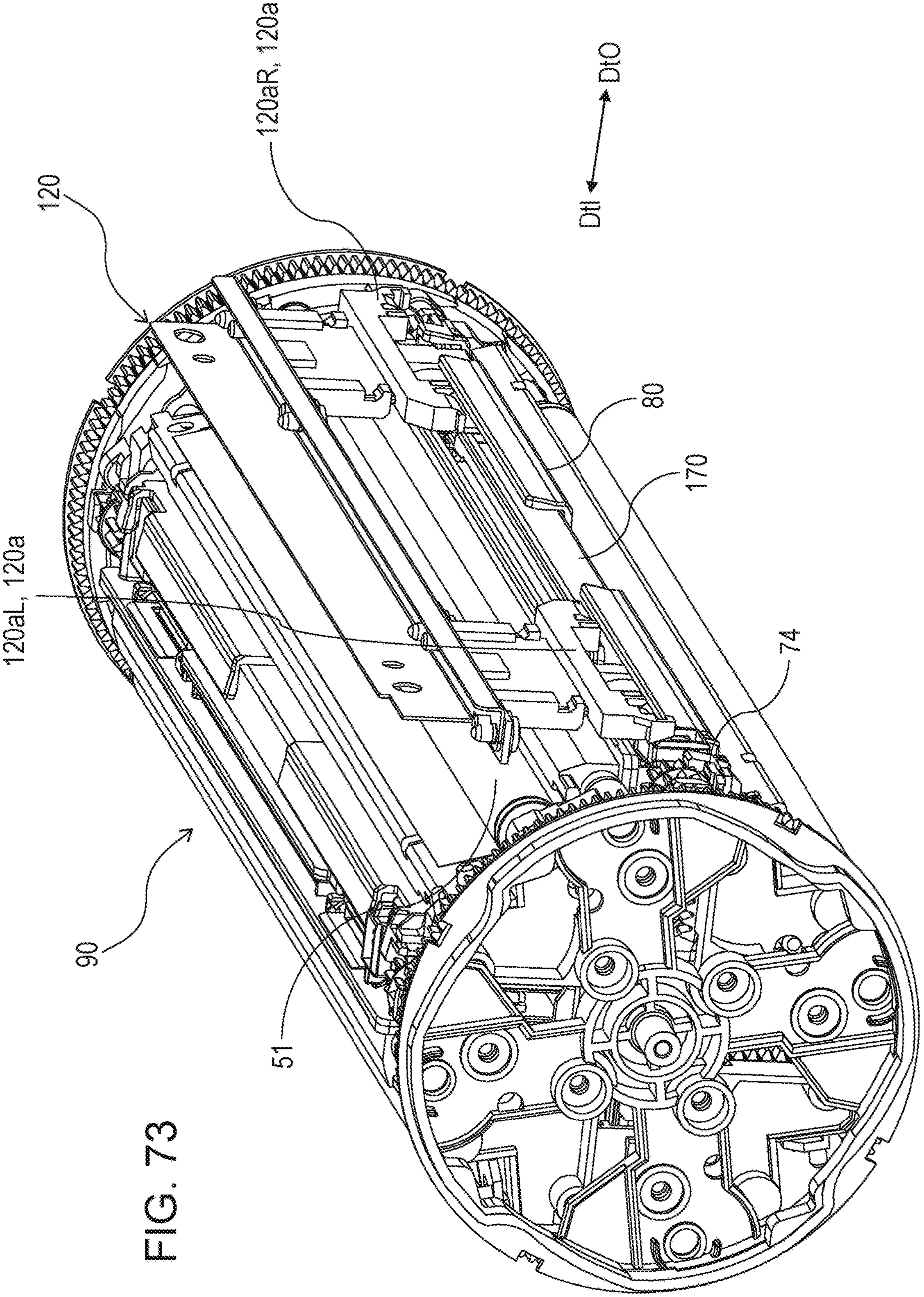
FIG. 73 is a view that shows the rotary assembly in the state where the toner cartridge is at a mounting position according to the second embodiment.

FIG. 73 is a view that shows the rotary assembly 90A in the state where the toner cartridge 170 is positioned at the mounting position.

In the present embodiment as well, in the state where the toner cartridge 170 is at the mounting position, the electrodes 74e of the memory 74 face outward in the radial direction of the rotary assembly 90A. The tray 80 supports the toner cartridge 170 such that the electrodes 74e of the memory 74 are exposed outward in the radial direction of the rotary assembly 90A.

The opening direction Dso of the toner shutter 176 is a direction to approach the rotation axis 90C of the rotary body 90. In the present embodiment, the receiving opening 53b of the developing unit 150 is closer to the outer edge in the radial direction than to the rotation axis 90C in the radial direction of the rotary body 90 (the direction orthogonal to the rotation axis 90C). This makes it easier to ensure space for the toner shutter 176 to move in the opening direction Dso.

On the other hand, since the receiving opening 53b is closer to the outer edge in the radial direction than to the rotation axis 90C in the radial direction of the rotary body 90, the discharge opening 71b is also closer to the outer edge in the radial direction than to the rotation axis 90C in the radial direction of the rotary body 90. When the toner shutter 176 rotates to move from the closed position to the open position, it is possible to suppress significant protrusion of the toner shutter 176 at the open position from the rotary body 90.

Operation to Close Toner Shutter and Developing Shutter

The operation to close the toner shutter 176 and the developing shutter 57 will be described. The operation to close the toner shutter 176 and the developing shutter 57 is performed in the reverse order of the operation to open the toner shutter 176 and the developing shutter 57.

As described earlier, the toner cartridge 170 is moved from the mounting position toward the retreat position by the moving device 85 driven by the motor M2. Specifically, a user is able to move the toner cartridge 170 from the mounting position toward the retreat position by performing operation to move the tray 80 supporting the toner cartridge 170 from the storage position to the eject position. A user is able to perform the operation to move the tray 80 from the storage position to the eject position through the operating unit, such as buttons and a touch panel, provided on the apparatus body 1A, or through a peripheral device connected to the apparatus body 1A.

When the toner cartridge 170 moves from the mounting position toward the retreat position in the eject direction DtO, the openers 172o1, 172o2 move in the direction away from the shutter holders 57b1, 57b2.

On the other hand, in the state where the toner cartridge 170 is at the mounting position, the holders 72h1, 72h2 are engaged with the protrusions 57f1, 57f2 (see FIG. 72D). As shown in FIG. 63, the developing frame 53 includes backup portions 153v1, 153v2.

In the state where the developing shutter 57 is at the open position, the arm 57e1 of the shutter holder 57b1 overlaps the backup portion 153v1, and, when the arm 57e1 deforms in the direction in which the protrusion 57f1 disengages from the holder 72h1, the arm 57e1 contacts the backup portion 153v1. Similarly, the arm 57e2 of the shutter holder 57b2 overlaps the backup portion 153v2, and, when the arm 57e2 deforms in the direction in which the protrusion 57f2 disengages from the holder 72h2, the arm 57e2 contacts the backup portion 153v2. In other words, in the state where the developing shutter 57 is at the open position, disengagement of the protrusions 57f1, 57f2 from the holders 72h1, 72h2 is restricted.

When the toner cartridge 170 moves in the eject direction DtO in the state where the holders 72h1, 72h2 are engaged with the protrusions 57f1, 57f2, the developing shutter 57 is moved in the closing direction Dsc in the state where the discharge opening 71b, the seal opening 76so, and the shutter opening 57ab communicate with each other. On the other hand, the lock members 158a1, 158a2 are moved against the urging force of the lock springs 158s1, 158s2 to disengage from the second positioning portions 57o1, 57o2 of the shutter holders 57b1, 57b2. At this time, the toner shutter 176 is positioned at the open position.

When the toner cartridge 170 is further moved in the eject direction DtO, the lock members 158a1, 158a2 start engaging with the first positioning portions 57c1, 57c2. On the other hand, the arm 57e1 of the shutter holder 57b1 moves to a position at which the arm 57e1 does not overlap the backup portion 153v1, and the arm 57e2 of the shutter holder 57b2 moves to a position at which the arm 57e2 does not overlap the backup portion 153v2.

When the lock members 158a1, 158a2 engage with the first positioning portions 57c1, 57c2, the position of the developing shutter 57 is maintained at the closed position (see FIG. 71C). In this state, when the toner cartridge 170 is further moved in the eject direction DtO, the arms 57e1, 57e2 elastically deform to cause the protrusions 57f1, 57f2 to disengage from the holders 72h1, 72h2.

When the toner cartridge 170 is further moved in the eject direction DtO, the gear teeth 177c1 of the engagement gear 177c contact the opener 120o and are rotated in the closing direction Tgc. Then, the toner shutter 176 is positioned at the closed position.

In this way, when the toner cartridge 170 is moved from the mounting position to the retreat position, the toner cartridge 170 is positioned below the developing unit 150, and the discharge opening 71b is positioned below the receiving opening 53b. Then, after the developing shutter 57 reaches the closed position, the toner shutter 176 reaches the closed position. In other words, before the developing shutter 57 reaches the closed position, the toner shutter 176 is positioned at the open position, so, even when toner falls from the developing unit 150, the toner can fall into the toner cartridge 170 through the discharge opening 71b.

In the present embodiment, the opener support portions 120sR, 120sL of the opener unit 120 engage with the supported portions 71qR, 71qL of the toner cartridge 170. As a result, the opener unit 120 is positioned relative to the toner cartridge 170 in the direction orthogonal to both the Y direction and the insertion direction DtI. More specifically, the movement of the opener unit 120 in a direction away from the toner cartridge 170 in the direction orthogonal to both the Y direction and the insertion direction DtI is restricted. Therefore, it is possible to suppress variation in the amount of meshing between the engagement gear 177c and the opener 120o.

However, in consideration of the influence of component tolerance, a certain amount of backlash can be present between the opener 120o and the gear teeth 177c1 of the engagement gear 177c. However, due to the presence of backlash between the opener 120o and the gear teeth 177c1 of the engagement gear 177c, when the toner cartridge 170 is moved from the mounting position to the retreat position, the angle by which the opener 120o rotates the gear teeth 177c1 in the closing direction Tgc reduces. In other words, there can be cases where the engagement gear 177*c* cannot reach the ideal position when the toner cartridge 170 is moved from the mounting position to the retreat position.

In the present embodiment, in the process in which the toner cartridge 170 moves from the retreat position to the mounting position, the adjustment protrusion 177*c*2 contacts the adjustment portion 120*j* to cause the engagement gear 177*c* to rotate in the closing direction Tgc. As a result, even when the angle by which the opener 120*o* rotates the gear teeth 177*c*1 in the closing direction Tgc reduces, the position of the engagement gear 177*c* is adjusted, so the gear teeth 177*c*1 are further reliably engaged with the opener 120*o*.

When the dimensional accuracy of the opener 120*o* and the gear teeth 177*c*1 of the engagement gear 177*c* are increased, the amount of backlash can be reduced, and the adjustment portion 120*j* and the adjustment protrusion 177*c*2 can be eliminated.

As described above, when the toner cartridge 170 is moved from the retreat position toward the mounting position, the developing shutter 57 moves from the closed position to the open position, and the toner shutter 176 is moved to the open position. A user is able to open the developing shutter 57 and the toner shutter 176 by performing operation to move the toner cartridge 170 from the retreat position toward the mounting position. In other words, a user does not need to perform operation to open the developing shutter 57 and operation to open the toner shutter 176 separately from operation to move the toner cartridge 170 from the retreat position toward the mounting position.

The toner cartridge 170 is moved from the retreat position toward the mounting position by the moving device 85 driven by the motor M2. Through this process, the developing shutter 57 moves from the closed position to the open position, and the toner shutter 176 is moved to the open position. In other words, the developing shutter 57 moves from the closed position to the open position by the moving device 85 driven by the motor M2, and the toner shutter 176 moves from the closed position to the open position by the moving device 85 driven by the motor M2. In other words, the developing shutter 57 moves from the closed position to the open position under the driving force of the motor M2, and the toner shutter 176 moves from the closed position to the open position under the driving force of the motor M2.

As described above, when the toner cartridge 170 is moved from the mounting position toward the retreat position, the developing shutter 57 moves from the open position to the closed position, and the toner shutter 176 is moved to the closed position. A user is able to close the developing shutter 57 and the toner shutter 176 by performing operation to move the toner cartridge 170 from the mounting position to the retreat position. In other words, a user does not need to perform operation to close the developing shutter 57 and operation to close the toner shutter 176 separately from operation to move the toner cartridge 170 from the mounting position toward the retreat position.

The toner cartridge 170 is moved from the mounting position toward the retreat position by the moving device 85 driven by the motor M2. Through this process, the developing shutter 57 moves from the open position to the closed position, and the toner shutter 176 is moved to the closed position. In other words, the developing shutter 57 moves from the open position to the closed position by the moving device 85 driven by the motor M2, and the toner shutter 176 moves from the open position to the closed position by the moving device 85 driven by the motor M2. In other words, the developing shutter 57 moves from the open position to the closed position under the driving force of the motor M2, and the toner shutter 176 moves from the open position to the closed position under the driving force of the motor M2.

In other words, the driving force of the motor M2 is larger than the force used to move the toner shutter 176 from the closed position to the open position, and is larger than the force used to move the developing shutter 57 from the closed position to the open position. The driving force of the motor M2 is larger than the force used to move the toner shutter 176 from the open position to the closed position, and is larger than the force used to move the developing shutter 57 from the open position to the closed position.

The tray 80 may be regarded as a contact member that contacts the toner cartridge 170. While the toner cartridge 170 is moving from the retreat position to the mounting position, the tray 80 is separated from the toner shutter 176. While the toner cartridge 170 is moving from the retreat position to the mounting position, the tray 80 is separated from the developing shutter 57. While the toner cartridge 170 is moving from the mounting position to the retreat position, the tray 80 is separated from the toner shutter 176. While the toner cartridge 170 is moving from the mounting position to the retreat position, the tray 80 is separated from the developing shutter 57. Therefore, the movement of the toner shutter 176 and the developing shutter 57 is not obstructed by the tray 80.

The developing frame 53 of the developing unit 150 of the present embodiment has the receiving openings 53*b*R, 53*b*L as the plurality of receiving openings. The number of the receiving openings 53 formed in the developing frame 53 is not limited thereto and may be one or more than two.

The toner shutter 176 rotates to move between the open position and the closed position. Alternatively, the toner shutter 176 may linearly move between the open position and the closed position. In this case, the rotational motion of the engagement gear 177*c* can be converted into the linear motion of the toner shutter 176 by using a known configuration, such as a slider crank mechanism and a rack and pinion mechanism. The toner shutter 176 may be configured to be linearly moved in contact with part of the apparatus body 1A.

The developing shutter 57 linearly moves between the open position and the closed position. Alternatively, the developing shutter 57 may rotate to move between the open position and the closed position.

Hereinafter, embodiments different from the first embodiment or the second embodiment will be described; however, the components of the following embodiments may be combined with the components of the first embodiment or the second embodiment as needed. Therefore, the toner shutters of the first embodiment and the second embodiment are collectively referred to as toner shutters Tns, and the developing shutters of the first embodiment and the second embodiment are collectively referred to as developing shutters Dvs.

Third Embodiment

The third embodiment will be described with reference to FIGS. 74, 75A, 75B, and 75C.

In the first embodiment, the toner cartridge 70 is moved from the mounting position to the retreat position by the driving force of the motor M2 of the apparatus body 1A; however, the configuration to move the toner cartridge 70 is not limited thereto. In the present embodiment, the configuration to move the toner cartridge 70 with the urging force of the urging member will be described. Hereinafter, unless otherwise specified, elements assigned with reference signs common to those of the first embodiment have substantially the same configurations and operations as those described in the first embodiment, and differences from the first embodiment will be mainly described.

Figure 74:
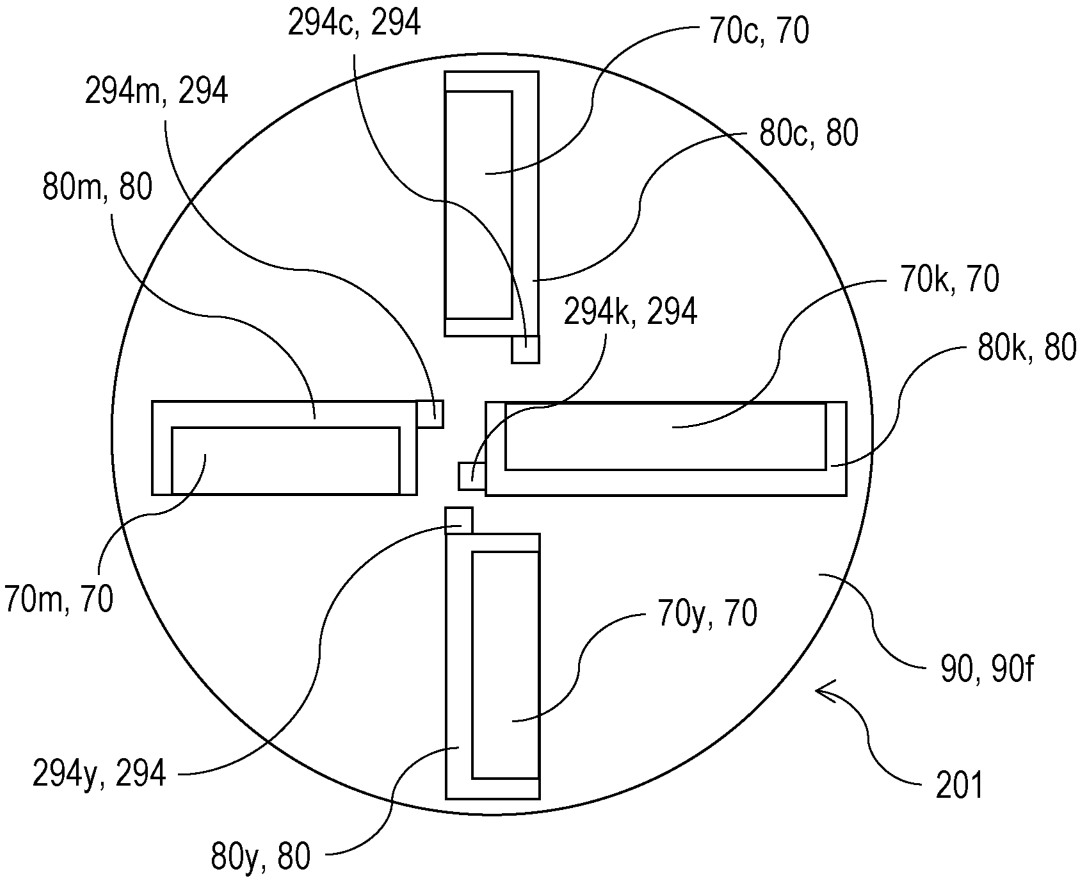
FIG. 74 is a view that illustrates a configuration related to movement of a tray according to a third embodiment.

As shown in FIG. 74, an image forming apparatus according to the present embodiment uses an urging device 294 as an example of the moving device to move the toner cartridge 70 from the mounting position toward the retreat position. More specifically, the rotary body 90 of the image forming apparatus includes an urging device 294*k* for the toner cartridge 70*k* and the tray 80*k*, and urging devices 294*y* to 294*c* for the toner cartridges 70*y* to 70*c* and the trays 80*y* to 80*c*. In other words, the rotary of the present embodiment includes first to fourth urging members corresponding to the first to fourth toner cartridges. Numbering is used for the sake of convenience of description and can generally be interchanged as needed.

In the present embodiment, since the tray 80 is urged by the urging device 294, the tray 80 moves from the storage position toward the eject position, and the toner cartridge 70 moves from the mounting position toward the retreat position.

The urging device 294 may directly urge the toner cartridge 70. In other words, the urging device 294 of the present embodiment is configured to contact the tray 80. Alternatively, the urging device 294 may be configured to contact the toner cartridge 70 or a member supporting the tray 80.

Furthermore, the tray 80 may be omitted, and the urging device 294 may contact the toner cartridge 70. In other words, the toner cartridge 70 may be directly attached to or detached from the rotary body 90. Even in this case, a configuration for guiding the attachment and detachment of the toner cartridge 70 to and from the rotary body 90 can have the same shape as the first embodiment. In other words, a configuration for positioning the toner cartridge 70 relative to the developing unit 50 can be a configuration similar to the first embodiment.

Regardless of the presence or absence of the tray 80 or the type of target that the urging device 294 contacts, the urging device 294 may be regarded as being configured to generate a force urging the toner cartridge 70 in the eject direction.

In the following description, urging the toner cartridge 70 can include the meaning of both the case of directly urging the toner cartridge 70 and the case of urging the toner cartridge 70 through a member other than the toner cartridge 70 (for example, the tray 80).

The toner cartridge 70 can be urged by the urging device 294 until at least part of the toner cartridge 70 protrudes from the rotary body 90. The toner cartridge 70 can also be urged by the urging device 294 until at least part of the toner cartridge 70 protrudes from the opening 16*a*. The urging device 294 does not need to keep urging the toner cartridge 70 until the toner cartridge 70 reaches the retreat position. The urging device 294 may keep urging the toner cartridge 70 until the toner cartridge 70 reaches the retreat position.

The urging device 294 in the present embodiment includes a force generating member 294*a* that generates a force to urge the toner cartridge 70 in the eject direction. The urging device 294 includes a contact member 294*b* that contacts the toner cartridge 70 or the tray 80, and the force of the force generating member 294*a* is transmitted to the toner cartridge 70 or the tray 80 via the contact member 294*b*.

However, the force generating member 294*a* may directly contact the toner cartridge 70 or the tray 80 and push the toner cartridge 70 or the tray 80.

In the present embodiment, the force generating member 294*a* is attached to the rotary body 90 and can include an elastic member. A spring may be used as the elastic member. In the present embodiment, the elastic member is a compression spring. Alternatively, the elastic member may be a torsion coil spring, a leaf spring, a tension spring, or the like, placed in appropriate position.

A magnet may be used as the force generating member 294*a*. The force generating member 294*a* may be configured to use repulsion between at least two magnets. In this case, the urging device 294 may include at least two magnets, or one magnet may be provided in the urging device 294 and the other magnet may be provided on an opposing component (for example, the tray 80 or the toner cartridge 70) urged by the urging device 294.

Figure 75A:
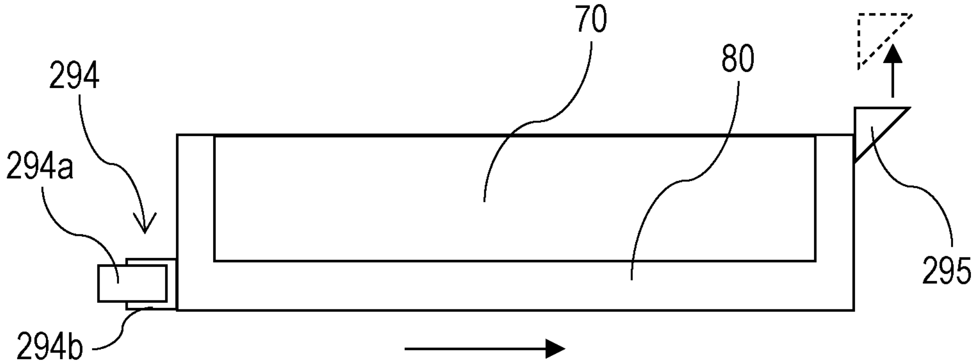
FIGS. 75A to 75C are views that illustrate a configuration related to movement of the tray according to the third embodiment.

In FIG. 75A, the toner cartridge 70 is constantly urged in the eject direction by the force of the urging device 294. On the other hand, when the rotary body 90 rotates, the movement of the toner cartridge 70 to the retreat position and the movement of the tray 80 to the eject position can be restricted. Therefore, as shown in FIG. 75A, the movement of the tray 80 to the eject position and the movement of the toner cartridge 70 to the retreat position may be restricted by a restricting member 295. The restricting member 295 is movable between a restricting position at which the movement of the tray 80 to the eject position and the movement of the toner cartridge 70 to the retreat position are restricted and an unlock position at which the movement of the tray 80 to the eject position and the movement of the toner cartridge 70 to the retreat position are allowed.

In the present embodiment, the restricting member 295 is urged toward the restricting position. When the restricting member 295 is moved to the unlock position in the state where the rotary body 90 is in the replacement posture, the tray 80 is moved to the eject position and the toner cartridge 70 is moved to the retreat position by the urging device 294. The movement of the restricting member 295 to the unlock position may be manually performed by the user, or the apparatus body 1A may include a release device or release mechanism for moving the restricting member 295. A solenoid or a drive source, such as a motor, may be used as the release device (release mechanism). Any of the motors M1, M2, M3 may be used as the drive source.

The urging device 294 may be configured to operate so that the presence or absence of urging force is switched each time of pushing-in action. In other words, the urging state of the urging device 294 may switch each time the toner cartridge 70 is urged from the retreat position toward the mounting position.

In other words, the urging device 294 may be configured to use so-called alternate operation.

In this case, the toner cartridge 70 is moved from the retreat position to the mounting position and positioned at the mounting position. Then, when the toner cartridge 70 is urged in the direction from the retreat position toward the mounting position in the state where the toner cartridge 70 is at the mounting position, the toner cartridge 70 is urged from the mounting position toward the retreat position and moves. An example of the configuration that performs such an operation will be described below.

Figure 75B:
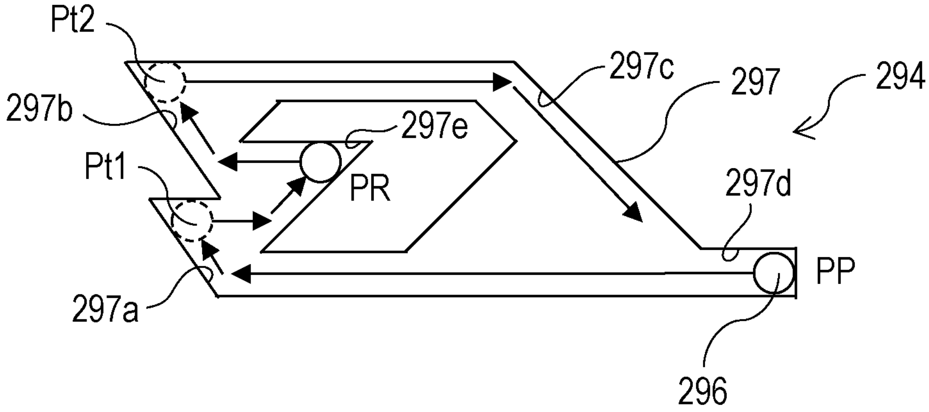

For example, as shown in FIG. 75B, the image forming apparatus may include a received portion 296 and a receiving portion 297 for receiving the received portion 296. For example, the received portion 296 is urged toward the right side in the drawing by the urging force of the force generating member 294*a*. The received portion 296 may be provided on the contact member 294*b* or the tray 80. The receiving portion 297 may be provided on the rotary body 90.

In the state where the received portion 296 is at a position PP, the urging force of the force generating member 294*a* is received by a first recess 297*d* of the receiving portion 297, and the received portion 296 remains at the position PP. At this time, the toner cartridge 70 can be positioned at the retreat position.

In this state, when the toner cartridge 70 is urged in the direction from the retreat position to the mounting position, the received portion 296 moves to a position Pt1 along a first guide surface 297*a* of the receiving portion 297 against the urging force of the force generating member 294*a*. After that, when the force urging the toner cartridge 70 is lost, the received portion 296 moves to a position PR along the receiving portion 297 under the urging force of the force generating member 294*a*. At this time, the urging force of the force generating member 294*a* is received by a second recess 297*e* of the receiving portion 297. At this time, the toner cartridge 70 can be positioned at the mounting position. This state may also be regarded as the state where the urging force of the force generating member 294*a* is charged (the charged state of the urging device 294).

From this state, when the toner cartridge 70 is urged again in the direction from the retreat position toward the mounting position against the urging force of the force generating member 294*a*, the received portion 296 moves to a position Pt2 along a second guide surface 297*b* of the receiving portion 297. After that, when the force urging the toner cartridge 70 is lost, the received portion 296 moves to the position PP along a third guide surface 297*c* of the receiving portion 297 under the urging force of the force generating member 294*a*. During the process in which the received portion 296 moves from the position Pt2 to the position PP, the toner cartridge 70 is urged in the direction from the mounting position toward the retreat position.

In this way, when the toner cartridge 70 at the retreat position is urged from the retreat position toward the mounting position, the urging device 294 is placed in a charged state. When the toner cartridge 70 is at the mounting position, the urging device 294 is maintained in the charged state. When the toner cartridge 70 at the mounting position is urged in the direction from the retreat position toward the mounting position while the urging device 294 is in the charged state, the urging force of the force generating member 294*a* is released, and the toner cartridge 70 is urged from the mounting position toward the retreat position.

In the state where the received portion 296 is positioned at the position PR, the urging force of the force generating member 294*a* is received by the second recess 297*e* of the receiving portion 297 and does not act on the toner cartridge 70.

Figure 75C:
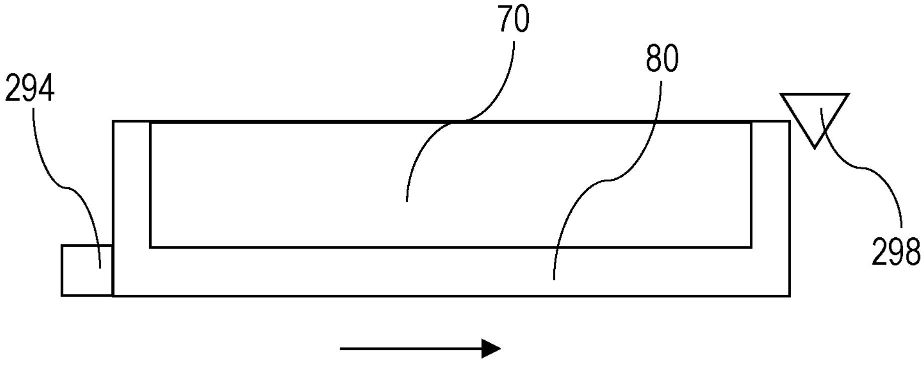

Therefore, the image forming apparatus may have a locking portion 298 (tray holding member) as shown in FIG. 75C. In the present embodiment, the locking portion 298 engages with the tray 80. Alternatively, the locking portion 298 may engage with the toner cartridge 70. The locking portion 298 holds the tray 80 at the storage position or holds the toner cartridge 70 at the mounting position in the state where the urging device 294 is not urging the tray 80 or the toner cartridge 70. For example, even in the state where the direction of gravity acting on the toner cartridge 70 becomes the retrieval direction of the toner cartridge 70 or a direction close to the retrieval direction due to the rotation of the rotary body 90, the toner cartridge 70 is held at the mounting position by the locking portion 298. When the toner cartridge 70 is urged by the urging device 294, the locking portion 298 is also moved by the urging force of the urging device 294. As a result, the toner cartridge 70 is moved toward the retreat position.

The position at which the locking portion 298 engages with a locked portion of the tray 80 or the toner cartridge 70 is not limited to the position in FIG. 75C. For example, the same one as the protrusion 95 (FIGS. 7A and 7B) provided on the rotary body 90 of the first embodiment may be used as the locking portion 298.

In this embodiment, the received portion 296 is provided for the contact member 294*b* or the tray 80, and the receiving portion 297 is provided for the rotary body 90. Alternatively, the receiving portion 297 may be provided for the contact member 294*b* or the tray 80, and the received portion 296 may be provided for the rotary body 90.

In the configuration of the present embodiment, a user manually moves the toner cartridge 70 to the mounting position. Therefore, the door 14 can be kept open until the toner cartridge 70 reaches the mounting position.

In the present embodiment, the urging device 294 urges the toner cartridge 70 from the mounting position toward the retreat position.

When the urging device 294 urges the toner cartridge 70 from the mounting position toward the retreat position, the urging device 294 may move the toner cartridge 70 to the position where the developing shutter Dvs is closed. In other words, the developing shutter Dvs may be at the closed position in the state where the toner cartridge 70 is moved to a predetermined position by the urging device 294.

When the urging device 294 urges the toner cartridge 70 from the mounting position toward the retreat position, the urging device 294 may move the toner cartridge 70 to the position where the developing shutter Dvs and the toner shutter Tns are closed. In other words, the developing shutter Dvs may be at the closed position and the toner shutter Tns may be at the closed position in the state where the toner cartridge 70 is moved to a predetermined position by the urging device 294.

In any case, it is possible to reduce the user's operating force compared to when both the developing shutter Dvs and the toner shutter Tns are closed by using the user's operating force.

When the urging device 294 urges the toner cartridge 70 from the mounting position toward the retreat position, at least one of the developing shutter Dvs and the toner shutter Tns may be open in the state where the movement by the urging device 294 is complete. A user is able to move the toner cartridge 70 to the position where the developing shutter Dvs and the toner shutter Tns are closed, by further moving the toner cartridge 70.

In this case, it is possible to reduce the force of the urging device 294 compared to when both the developing shutter Dvs and the toner shutter Tns are closed by using the force of the urging device 294. Therefore, it is possible to reduce the cost and size of the urging device 294.

Fourth Embodiment

The fourth embodiment will be described with reference to FIGS. 76A and 76B. In the present embodiment, an example of the configuration to move the toner cartridge 70 with a solenoid will be described. Hereinafter, unless otherwise specified, elements assigned with reference signs common to those of the first embodiment have substantially the same configurations and operations as those described in the first embodiment, and differences from the first embodiment will be mainly described.

Figure 76A:
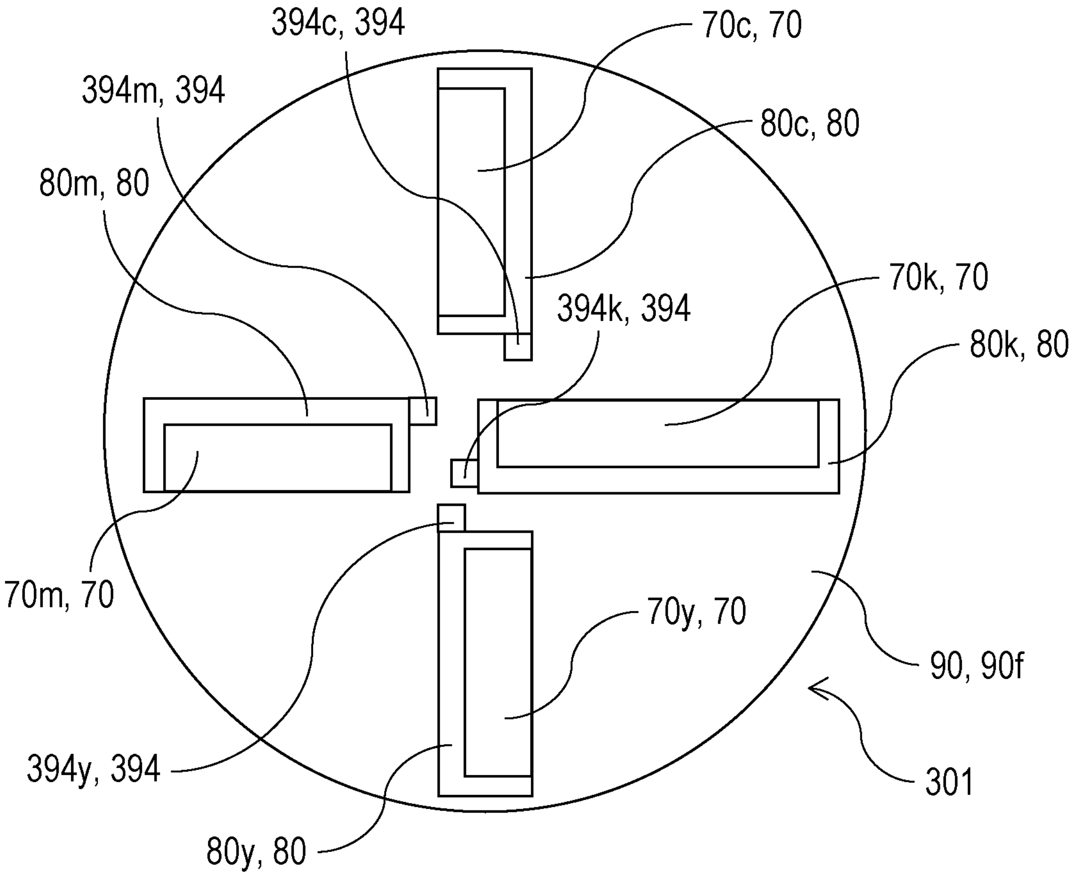
FIGS. 76A and 76B are views that illustrate a configuration related to movement of a tray according to a fourth embodiment.
Figure 76B:
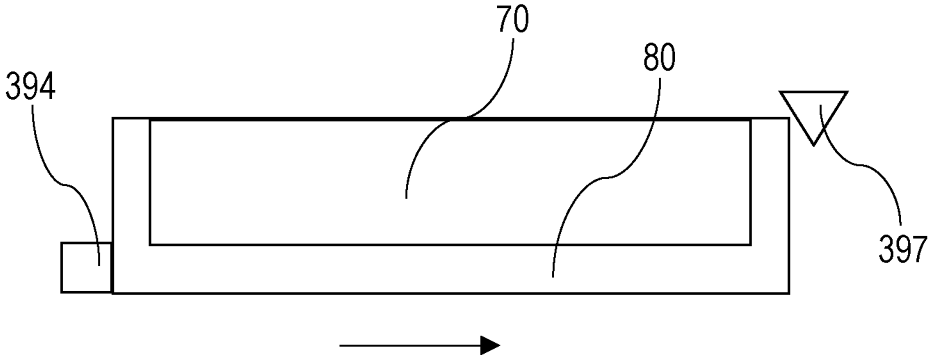

FIGS. 76A and 76B are views that illustrate the configuration to move the tray 80 in the fourth embodiment. An image forming apparatus according to the present embodiment uses a solenoid unit 394 as an example of the moving device to move the toner cartridge 70 from the mounting position toward the retreat position. More specifically, the rotary body 90 of the present embodiment includes a solenoid unit 394*k* for the toner cartridge 70*k* and the tray 80*k*. The rotary body 90 of the present embodiment also includes solenoid units 394*y* to 394*c* for the toner cartridges 70*y* to 70*c* and the trays 80*y* to 80*c*. The solenoid unit 394 is an example of the moving device operated by electric power.

The solenoid unit 394 includes a coil and a movable member, and the movable member moves when the coil is energized. The movable member can move so that the tray 80 moves from the storage position to the eject position or the toner cartridge 70 moves from the mounting position to the retreat position.

The movable member can move so that the tray 80 moves from the eject position to the storage position or the toner cartridge 70 moves from the retreat position to the mounting position.

As shown in FIG. 76B, the image forming apparatus may include a locking portion 397 (tray holding member). In the present embodiment, the locking portion 397 engages with the tray 80. Alternatively, the locking portion 397 may engage with the toner cartridge 70. The locking portion 397 holds the tray 80 at the storage position or holds the toner cartridge 70 at the mounting position in the state where the movable member of the solenoid unit 394 is not urging the tray 80 or the toner cartridge 70. In other words, the locking portion 397 restricts the movement of the tray 80 or the toner cartridge 70 in the state where the movable member of the solenoid unit 394 is not urging the tray 80 or the toner cartridge 70. On the other hand, when the movable member of the solenoid unit 394 acts on the tray 80 or the toner cartridge 70, the locking portion 397 is moved by the tray 80 or the toner cartridge 70. The position at which the locking portion 397 engages with a locked portion of the tray 80 or the toner cartridge 70 is not limited to the position in FIG. 76B.

For example, the same one as the protrusion 95 (FIGS. 7A and 7B) provided on the rotary body 90 of the first embodiment may be used as the locking portion 397.

The solenoid unit 394 of the present embodiment may include a plunger as the movable member. For example, the plunger can urge the toner cartridge 70 from the mounting position toward the retreat position by protruding from a casing.

The solenoid unit 394 may be configured so that the plunger projects from the casing only when the coil is energized, or the solenoid unit 394 may be a so-called self-hold solenoid.

In the present embodiment, the solenoid unit 394 urges the toner cartridge 70 from the mounting position toward the retreat position.

When the solenoid unit 394 urges the toner cartridge 70 from the mounting position toward the retreat position, the solenoid unit 394 may move the toner cartridge 70 to the position where the developing shutter Dvs is closed. In other words, the developing shutter Dvs may be at the closed position in the state where the toner cartridge 70 is moved to a predetermined position by the solenoid unit 394.

When the solenoid unit 394 urges the toner cartridge 70 from the mounting position toward the retreat position, the solenoid unit 394 may move the toner cartridge 70 to the position where the developing shutter Dvs and the toner shutter Tns are closed. In other words, the developing shutter Dvs may be at the closed position and the toner shutter Tns may be at the closed position in the state where the toner cartridge 70 is moved to a predetermined position by the solenoid unit 394.

In any case, it is possible to reduce the user's operating force compared to when both the developing shutter Dvs and the toner shutter Tns are closed by using the user's operating force.

When the solenoid unit 394 urges the toner cartridge 70 from the mounting position toward the retreat position, at least one of the developing shutter Dvs and the toner shutter Tns may be open in the state where the movement by the solenoid unit 394 is complete. A user is able to move the toner cartridge 70 to the position where the developing shutter Dvs and the toner shutter Tns are closed, by further moving the toner cartridge 70.

In this case, it is possible to reduce the force of the solenoid unit 394 compared to when both the developing shutter Dvs and the toner shutter Tns are closed by using the force of the solenoid unit 394. Therefore, it is possible to reduce the cost, size, and power consumption of the solenoid unit 394.

Fifth Embodiment

A moving device 85' of the fifth embodiment will be described with reference to FIGS. 77A, 77B, 78A, 78B, 79A, 79B, and 79C.

Figure 77A:
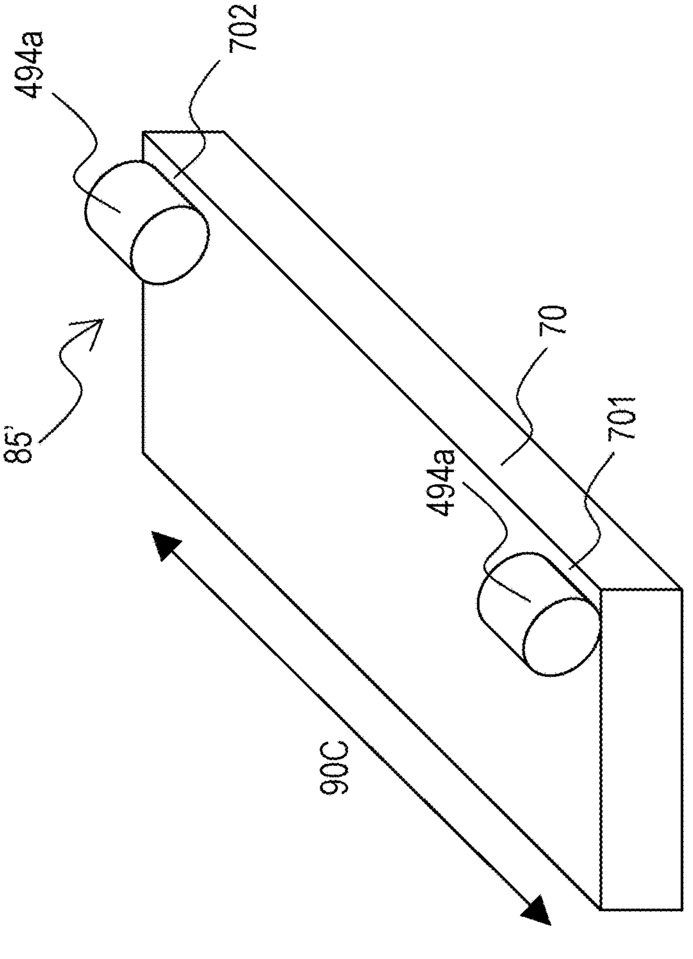
FIGS. 77A and 77B are diagrams that illustrate a configuration related to a moving device according to a fifth embodiment.
Figure 77B:
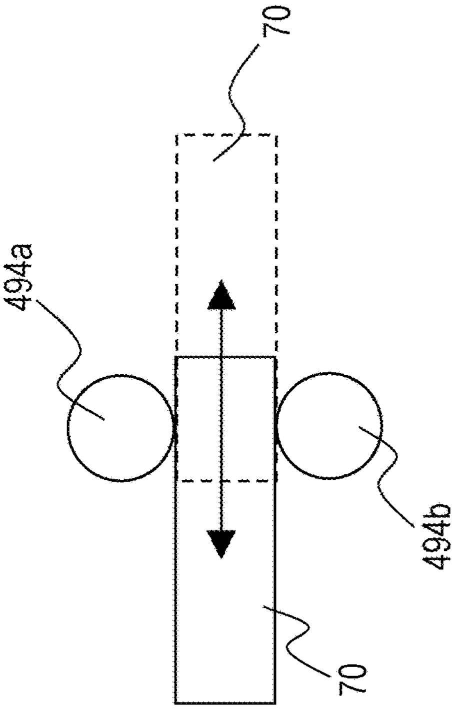

FIGS. 77A and 77B are views that show the moving device 85' according to the present embodiment. The moving device 85' includes a rotating member (contact member) 494*a* that rotates under the driving force of the motor M2.

In the present embodiment, the direction of the rotation axis of the rotating member 494*a* is parallel to the direction of the rotation axis 90C of the rotary body 90. When the rotating member 494*a* rotates in contact with the toner cartridge 70, the toner cartridge 70 can reciprocate between the mounting position (continuous line in FIG. 77B) and the retreat position (dashed line in FIG. 77B).

In the present embodiment, the toner cartridge 70 moves between the mounting position and the retreat position by receiving the driving force of the motor M2 through two rotating members 494*a*. In other words, the toner cartridge 70 is another example of a moving member that is moved in a moving direction D by the driving force of the motor M2 serving as a drive source.

A first contact portion 701 at which the toner cartridge 70 contacts one of the rotating members 494*a* is an example of a first force receiving portion that receives driving force from a drive transmission mechanism. A second contact portion 702 at which the toner cartridge 70 contacts the other one of the rotating members 494*a* is an example of a second force receiving portion that receives driving force from the drive transmission mechanism. The configuration of the drive transmission mechanism that transmits driving force from the motor M2 to the toner cartridge 70 may be, for example, the one that the pinions 94*k*R, 94*k*L of the drive transmission mechanism 101 in the first embodiment are replaced with two rotating members 494*a*. In this case, the drive transmission mechanism transmits the force received by one of the rotating members 494*a* from the first contact portion 701 of the toner cartridge 70 to the second contact portion 702. The drive transmission mechanism transmits the force received by the other one of the rotating members 494*a* from the second contact portion 702 of the toner cartridge 70 to the first contact portion 701. Thus, similar benefits to those of the drive transmission mechanism of the first embodiment are obtained.

The rotating member 494*a* may be a roller that rotates in contact with the toner cartridge 70 to move the toner cartridge 70 by friction. The rotating member 494*a* may be a gear, and the rotating member 494*a* may move the toner cartridge 70 by meshing with a gear shape (rack shape) formed on the toner cartridge 70.

The moving device 85' may include a plurality of rotating members 494*a*. The arrangement of the plurality of rotating members 494*a* is optional. For example, as shown in FIG. 77A, the moving device 85' may include a rotating member 494*a* that contacts one end of the toner cartridge 70 and a rotating member 494*a* that contacts the other end of the toner cartridge 70 in the longitudinal direction of the toner cartridge 70 (parallel to the rotation axis 90C). The moving device 85 may include a rotating member 494*a* that contacts the center of the toner cartridge 70.

The moving device 85' may include only one rotating member 494*a*. In this case, the arrangement of the moving device 85' is optional. For example, the moving device 85' may include a rotating member 494*a* that contacts the center of the toner cartridge 70.

Furthermore, the rotating member 494*a* may be urged toward the toner cartridge 70. As shown in FIG. 77B, the moving device 85' may include a driven roller 494*b*. The toner cartridge 70 is sandwiched between the rotating member 494*a* and the driven roller 494*b*. In the longitudinal direction of the toner cartridge 70, the position of the rotating member 494*a* and the position of the driven roller 494*b* may overlap or may be different. At least one of the rotating member 494*a* and the driven roller 494*b* may be urged toward the toner cartridge 70.

The rotating member 494*a* and the driven roller 494*b* may be provided in the rotary body 90.

The rotating member 494*a* may start rotating when the toner cartridge 70 is inserted to a predetermined position, and may stop when the toner cartridge 70 reaches the mounting position.

Figure 78A:
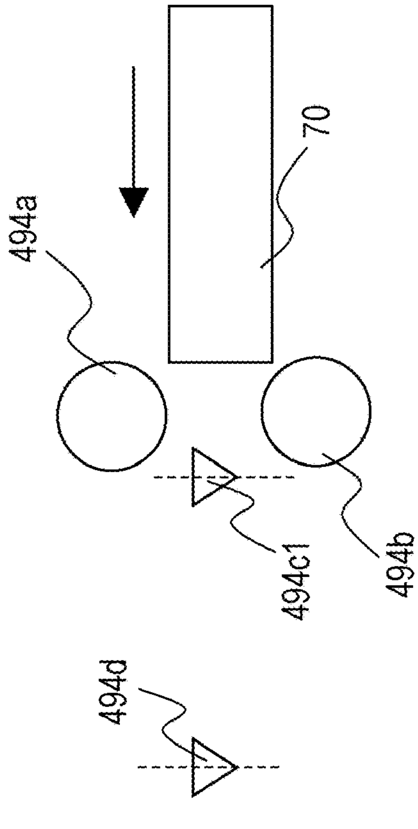
FIGS. 78A and 78B are views that illustrate the configuration related to the moving device according to the fifth embodiment.
Figure 78B:
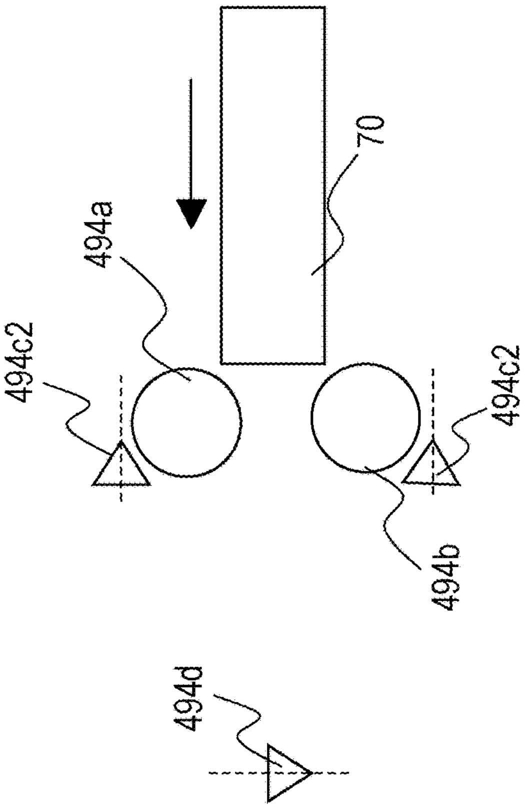

FIGS. 78A and 78B are views that illustrate the operation of the rotating member 494*a*. The moving device 85' may include a detection sensor that detects the insertion of the toner cartridge 70 to a predetermined position.

A detection sensor 494*cl* in FIG. 78A is an example of the detection sensor that detects the insertion of the toner cartridge 70 to a predetermined position. When the toner cartridge 70 is inserted in the direction of the arrow in the drawing toward the mounting position and then the toner cartridge 70 reaches a detection position (dashed line in the drawing) of the detection sensor 494*c*1, the signal output from the detection sensor 494*cl* changes.

Depending on the change in the signal, the rotation of the motor M2 may be started to start the rotation of the rotating member 494*a*.

A detection sensor 494*c*2 in FIG. 78B is an example of the detection sensor that detects the insertion of the toner cartridge 70 to a predetermined position. The toner cartridge 70 is inserted in the direction of the arrow in the drawing toward the mounting position, and the toner cartridge 70 displaces at least one of the rotating member 494*a* and the driven roller 494*b*. When at least one of the rotating member 494*a* and the driven roller 494*b* reaches the detection position (dashed line in the drawing) of the detection sensor 494*c*2, the signal output from the detection sensor 494*c*2 changes. Depending on the change in the signal, the rotation of the motor M2 may be started to start the rotation of the rotating member 494*a*. The detection sensor 494*c*2 may detect the movement of one of the rotating member 494*a* and the driven roller 494*b*.

The detection sensor 494*c*2 may directly detect at least one of the rotating member 494*a* and the driven roller 494*b*. The detection sensor 494*c*2 may detect the movement of a support member that supports at least one of the rotating member 494*a* and the driven roller 494*b*.

The rotating member 494*a* may start rotating in response to the opening of the door 14. When the toner cartridge 70 is inserted and contacts the rotating member 494*a* in the state where the rotating member 494*a* is rotating, the toner cartridge 70 is pulled toward the mounting position.

In this configuration, when the door 14 is closed, the rotation of the rotating member 494*a* may be stopped. When the rotation time of the rotating member 494*a* exceeds a predetermined time, the rotation of the rotating member 494*a* may be stopped. In this case, the rotation of the rotating member 494*a* may be resumed by closing the door 14 and opening the door 14 again.

In any configuration, the moving device 85' may include an arrival sensor 494*d* that detects the arrival of the toner cartridge 70 at the mounting position. When the toner cartridge 70 reaches the mounting position (dashed line in the drawing), the signal output from the arrival sensor 494*d* changes. Depending on the change in the signal, the rotation of the motor M2 is stopped to stop the rotation of the rotating member 494*a*.

The detection sensors 494*c*1, 494*c*2 each may be configured to change its signal when contacting a target to be detected. The detection sensors 494*c*1, 494*c*2 each do not need to contact a target to be detected. For example, the detection sensors 494*c*1, 494*c*2 each may optically detect a target.

The arrival sensor 494*d* may change its signal when contacting a target to be detected. The arrival sensor 494*d* does not need to contact a target to be detected. For example, the arrival sensor 494*d* may optically detect a target.

In the configuration of the present embodiment, a user manually moves the toner cartridge 70 to the mounting position. Therefore, the door 14 can be kept open until the toner cartridge 70 reaches the mounting position.

The rotating member 494*a* of the present embodiment is configured to contact the toner cartridge 70. The arrangement of the rotating member 494*a* will be described in further details.

Figure 79A:
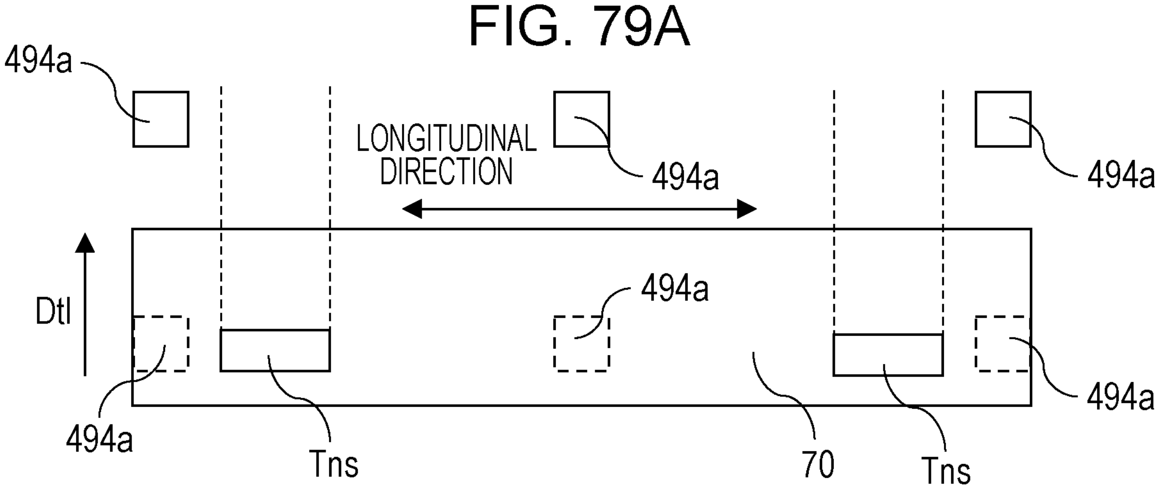
FIGS. 79A to 79C are views that illustrate the configuration related to the moving device according to the fifth embodiment.
Figure 79B:
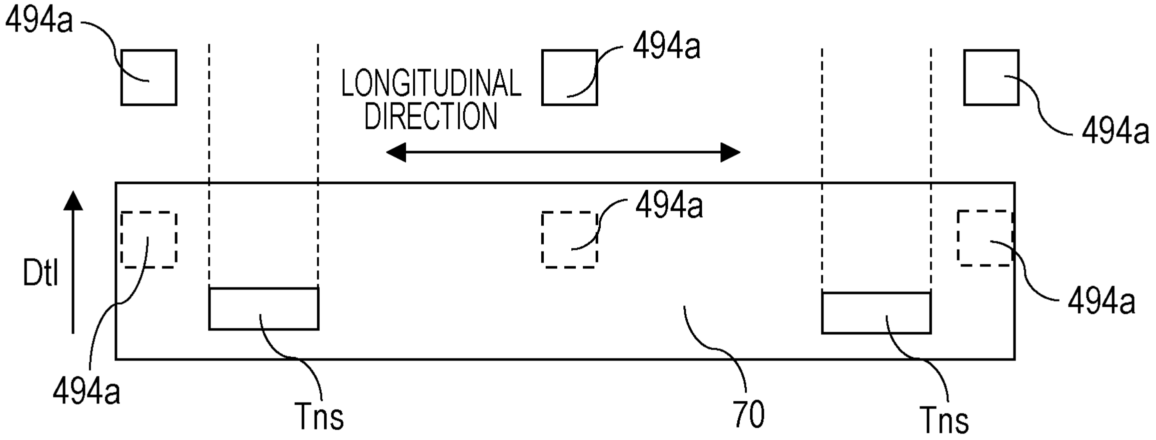
Figure 79C:
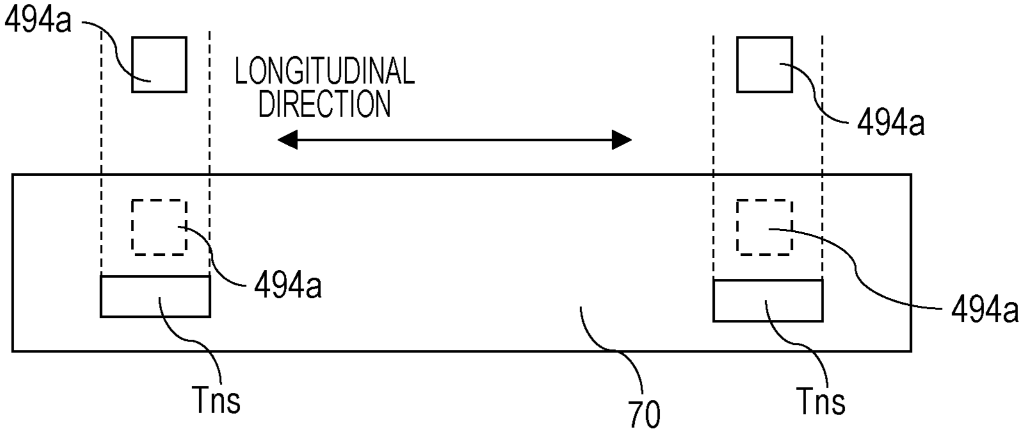

FIGS. 79A, 79B, and 79C are schematic diagrams that illustrate the arrangement of the rotating members 494*a* and the toner shutters Tns. In these drawings, the rotating members 494*a* indicated by the dashed lines show the positions of the rotating members 494*a* relative to the toner cartridge 70 when the toner cartridge 70 is at the mounting position.

In the longitudinal direction of the toner cartridge, at least one toner shutter Tns may be positioned between one rotating member 494*a* and another rotating member 494*a*. At least one rotating member 494*a* may be positioned between one toner shutter Tns and another toner shutter Tns.

The rotating member 494*a* contacts the toner cartridge 70 on the downstream side of the toner shutter Tns in the insertion direction DtI. While the toner cartridge 70 is being moved from the retreat position to the mounting position, the rotating member 494*a* can be spaced apart from the toner shutter Tns. In other words, the rotating member 494*a* can be positioned outside of the space (the trajectory of the toner shutter Tns) through which the toner shutter Tns passes when the toner cartridge 70 is moved from the retreat position to the mounting position.

In the example shown in FIGS. 79A and 79B, the position of the toner shutter Tns is misaligned from the position of the rotating member 494*a*. In other words, the flexibility of arrangement of the rotating member 494*a* in the insertion direction DtI can be improved.

For example, when the toner cartridge 70 is moved in the insertion direction DtI, the distance by which the toner cartridge 70 is automatically moved by the rotating member 494*a* can be increased as the timing at which the toner cartridge 70 contacts the rotating member 494*a* becomes earlier. However, when the timing at which the toner cartridge 70 contacts the rotating member 494*a* is early, the rotating member 494*a* reaches near the upstream end of the toner cartridge 70 in the insertion direction DtI in the state where the toner cartridge 70 is at the mounting position. In the example shown in FIG. 79A, the rotating member 494*a* is closer to the upstream end of the toner cartridge 70 in the insertion direction DtI than to the downstream end in the state where the toner cartridge 70 is at the mounting position.

Even in this case, when the position of the toner shutter Tns is misaligned from the position of the rotating member 494*a* in the longitudinal direction of the toner cartridge 70, interference between the toner shutter Tns and the rotating member 494*a* can be avoided.

The rotating member 494*a* may be positioned near the downstream end of the toner cartridge 70 in the insertion direction DtI in the state where the toner cartridge 70 is positioned at the mounting position.

In the examples shown in FIGS. 79B and 79C, the rotating member 494*a* is closer to the downstream end of the toner cartridge 70 in the insertion direction DtI than to the upstream end in the state where the toner cartridge 70 is at the mounting position.

In this case, as shown in FIG. 79C, the position of the toner shutter Tns may overlap the position of the rotating member 494*a* in the longitudinal direction of the toner cartridge 70.

In the above-described embodiments, the configuration that the rotary body 90 includes four developing units 50*y* to 50*k* and allow the formation of color images by using four colors of toner has been described. Alternatively, the rotary body 90 may include three or fewer developing units, or may include five or more developing units. In these cases, the number and arrangement of trays and toner cartridges can be changed as needed according to the number of developing units. For example, in the above-described other embodiments, the configuration that four toner cartridges 70*y* to 70*k* are detachably attachable to the rotary body 90 has been described. However, the rotary body 90 may include only one developing unit 50*k*, and may be configured to mount only one toner cartridge 70*k* to the rotary body 90. In this case, the rotary body 90 can rotate clockwise around the rotation axis 90C in FIG. 1 and can alternately take the black replacement posture and the black development posture.

In the above-described embodiments, the configuration that the rotary body 90 includes four developing units 50*y* to 50*k* and allow the formation of color images by using four colors of toner has been described. Alternatively, the rotary body 90 may include a plurality of developing units capable of performing image formation using toner of the same color. For example, the rotary body 90 may be configured to include four black developing units 50*k* and mount four toner cartridges 70*k* to the rotary body 90.

Sixth Embodiment

The sixth embodiment will be described with reference to FIG. 80. In the other embodiments, the configuration that the rotary body 90 includes four developing units 50*y* to 50*k* and allows the formation of color images using four colors of toner has been described. In the present embodiment, the configuration to move a toner cartridge to a developing device capable of forming monochrome images will be described. Hereinafter, unless otherwise specified, elements assigned with reference signs common to those of the other embodiments have substantially the same configurations and operations as those described in the other embodiments, and differences from the other embodiments will be mainly described.

Figure 80:
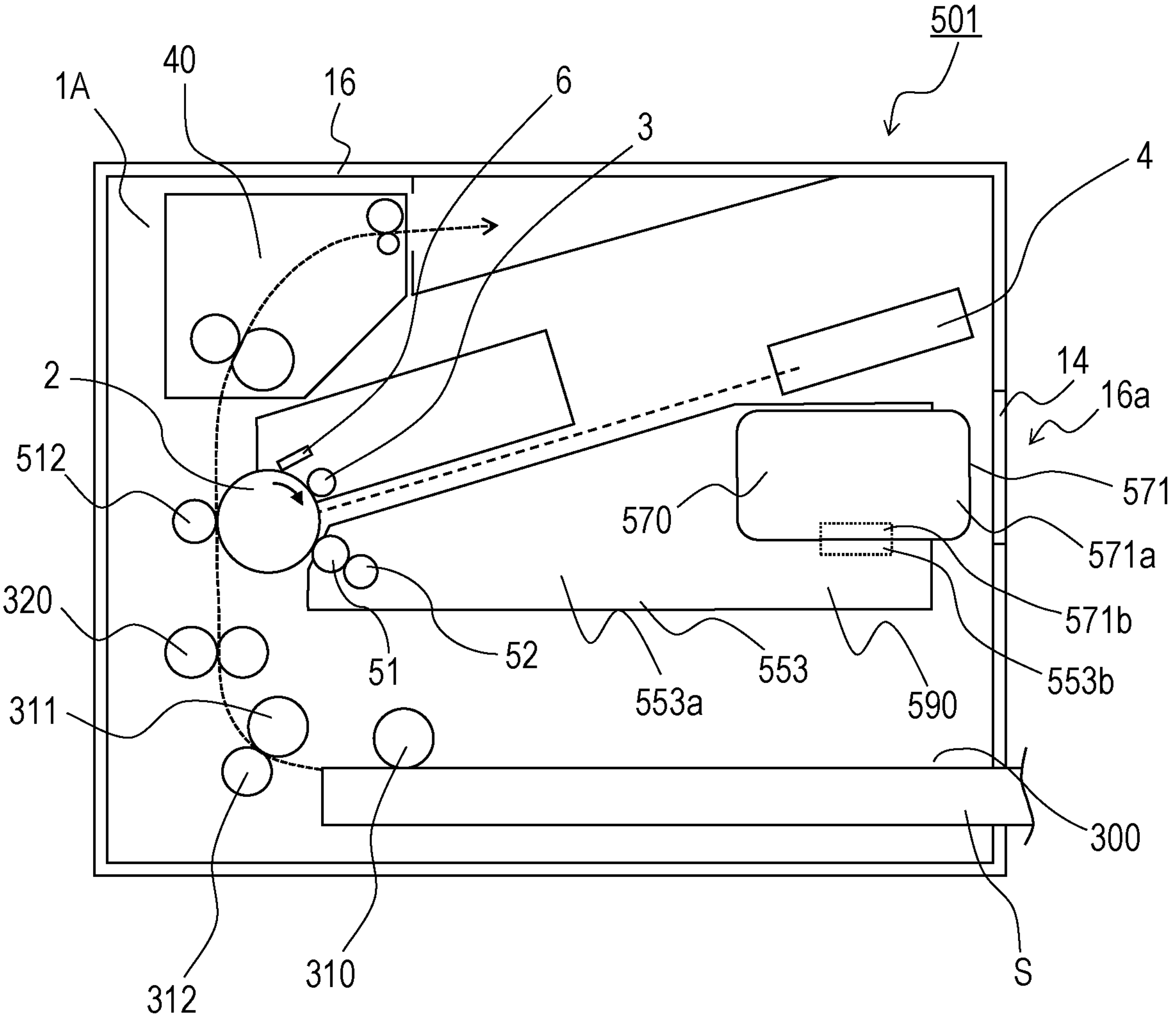
FIG. 80 is a schematic diagram of an image forming apparatus according to a sixth embodiment.

As shown in FIG. 80, an image forming apparatus 501 includes a toner cartridge 570 that is detachably attached to an apparatus body 1A. The apparatus body 1A includes a developing device (developing unit) 590.

The developing device 590 is an example of a developing device or developing portion that develops (visualizes) an electrostatic latent image formed on the photoconductor drum 2 into a toner image using toner. The developing device 590 of the present embodiment develops the electrostatic latent image formed on the photoconductor drum 2 using black toner.

The developing device 590 includes a developing roller 51, a supply roller 52, and a developing blade. The toner cartridge 570 is mounted to the developing device 590. Black toner to be supplied to the developing device 590 is contained inside the toner cartridge 570.

The toner cartridge 570 has a toner frame 571. The toner frame 571 has a toner storage chamber 571*a* that contains toner, and a discharge opening 571*b* that communicates with the toner storage chamber 571*a*.

The developing device 590 has a developing frame (storage frame) 553 with a developing-side storage chamber 553*a* for containing toner. The developing frame 553 has a receiving opening 553*b* communicating with the developing-side storage chamber (toner supply chamber) 553*a*.

The toner cartridge 570 detachably attached to the developing device 590 via the opening 16*a* provided in the frame 16 of the apparatus body 1A. More specifically, the toner cartridge 570 is movable between a mounting position and a retreat position moved from the mounting position through the opening 16*a* relative to the developing frame 553. The discharge opening 571*b* faces the receiving opening 553*b* in the state where the toner cartridge 570 is at the mounting position relative to the developing frame 553. In other words, the toner storage chamber 571*a* of the toner cartridge 570 and the developing-side storage chamber 553*a* of the developing device 590 communicate with each other via the discharge opening 571*b* and the receiving opening 553*b*. When toner is supplied from the toner cartridge 570 to the developing device 590, at least part of the receiving opening 553*b* is positioned below at least part of the discharge opening 571*b*.

Then, toner contained in the toner storage chamber 571*a* is discharged from the discharge opening 571*b*, and the toner discharged from the discharge opening 571*b* is put into the developing-side storage chamber 553*a* through the receiving opening 553*b*. The toner contained in the developing-side storage chamber 553*a* is supplied to the developing roller 51 by the supply roller 52. A toner conveying member for conveying toner to the supply roller 52 may be provided in the developing-side storage chamber 553*a*.

The function of the toner cartridge 570 is substantially the same as the function of the toner cartridge 70 of the other embodiments. The function of the developing device 590 is substantially the same as the function of one of the developing units 50*y*, 50*m*, 50*c*, 50*k* of the other embodiments.

On the other hand, the apparatus body 1A include a transfer roller 512. The transfer roller 512 is an example of a transfer device or transfer unit that transfers an image from the photoconductor drum 2 to a sheet S. The conveyance roller pair 320 conveys a sheet S to the transfer portion that is the nip portion between the photoconductor drum 2 and the transfer roller 512. The image on the photoconductor drum 2 is transferred to the surface of the conveyed sheet S.

The apparatus body 1A includes the moving device configured to move the toner cartridge 570 from the mounting position to the retreat position relative to the developing device 590 (more specifically, relative to the developing frame 553 of the developing device 590). The moving devices shown in the other embodiments and their modifications may be used as the moving device.

In this case, the portions of the moving devices of the other embodiments, provided in the rotary body 90, just need to be provided in the developing device 590. The replacement posture and development posture of the developing device 590 may be the same or may be different. For example, the developing device 590 is movable between a contact position at which the developing roller 51 contacts the photoconductor drum 2 and a separated position at which the developing roller 51 is separated from the photoconductor drum 2, and the developing device 590 may be at the separated position in the state where the developing device 590 is in the replacement posture.

For example, the developing device 590 may include the tray 80 and a configuration for moving the tray 80. The configuration for moving the tray 80 can be the same as those shown in the other embodiments and their modifications. The developing device 590 may include the rotating members 494*a* and the driven rollers 494*b*, described in the modifications of the fifth embodiment.

In the present embodiment as well, at least part of the toner cartridge 570 can be positioned outside of the image forming apparatus 501 (outside of the apparatus body 1A) when the toner cartridge 570 is at the retreat position. In other words, when the toner cartridge 570 is at the retreat position, at least part of the toner cartridge 570 is positioned outside of the apparatus body 1A beyond the outer appearance position. In other words, if the door 14 is at the closed position, at least part of the toner cartridge 570 is positioned in a space outside of the apparatus body 1A. In the retrieval direction of the toner cartridge 570, at least part of the toner cartridge 570 is positioned downstream of the outer appearance position.

Where the side surface 16*b* having the opening 16*a* is the front of the apparatus body 1A, when the toner cartridge 570 is at the retreat position, at least part of the toner cartridge 570 may be regarded as protruding on the front side beyond the front-side outer appearance surface of the apparatus body 1A.

In the present embodiment as well, when the toner cartridge 570 is at the retreat position, a half or more of the length of the toner cartridge 570 in the retrieval direction can be placed outside of the machine.

In this way, in the other embodiments and their modifications, the toner cartridge 70 is removably mounted to the rotary body 90. In the present embodiment, the toner cartridge 570 is detachably mounted to the developing device 590.

The discharge opening 571*b* faces the receiving opening 553*b* in the state where the toner cartridge 570 is at the mounting position relative to the developing frame 553. When toner is supplied from the toner cartridge 570 to the developing device 590, at least part of the receiving opening 553*b* is positioned below at least part of the discharge opening 571*b*.

In the present embodiment, the developing device 590 may include a shutter corresponding to the above-described toner shutter Tns, and the toner cartridge 570 may have a configuration for opening the shutter. The toner cartridge 570 may include a shutter corresponding to the developing shutter Dvs, and the developing device 590 may have a configuration for opening the shutter.

In this configuration, when the toner cartridge 570 moves from the retreat position to the mounting position, the shutter provided in the toner cartridge 570 is opened before the shutter provided in the developing device 590 is opened. When the toner cartridge 570 moves from the mounting position to the retreat position, the shutter provided in the developing device 590 is closed before the shutter provided in the toner cartridge 570 is closed.

OTHER EMBODIMENTS

In the above-described embodiments, the configuration in which the tray 80 moves from the storage position to the eject position with the drive device, urging member, or the like, of the apparatus body 1A without operation of the user to the tray 80 has been described. Instead, the configuration that the user holds the tray 80 to eject the tray 80 from the storage position to the eject position (that is, the configuration to manually move the support member) in the state where the rotary body 90 is in the replacement posture may be provided. Even in this case, the user just needs to attach and detach the toner cartridge 70 to or from the tray 80 ejected from the apparatus body compared to the case where the toner cartridge is directly inserted into and removed from the apparatus body, so the operability improves.

Modifications

In the embodiments, the toner cartridge has the toner shutter configured to move between the open position and the closed position. However, in the configurations described in the first to fifth embodiments, when the toner cartridge is attached to or detached from the developing unit, the discharge opening of the toner cartridge faces upward in the vertical direction V. Therefore, the toner cartridge in the state where the discharge opening is exposed may be attached to or detached from the developing unit.

Figure 81A:
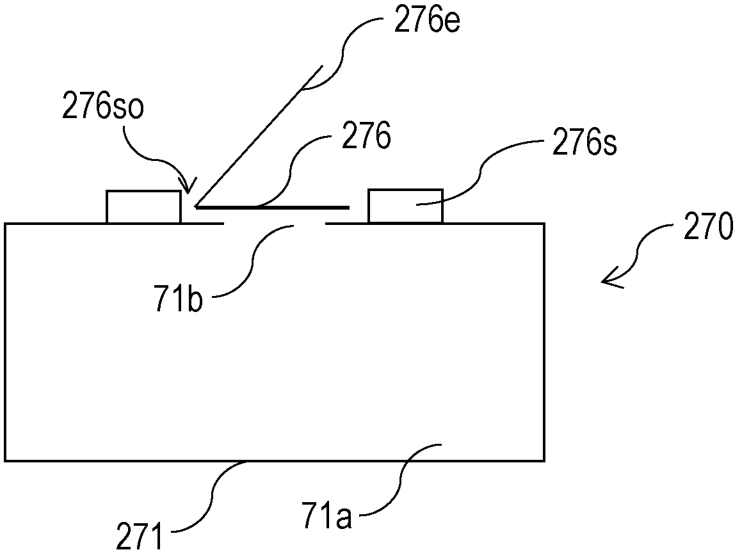
FIGS. 81A to 81C are views that illustrate a configuration to seal a discharge opening of a toner cartridge according to a modification.
Figure 81B:
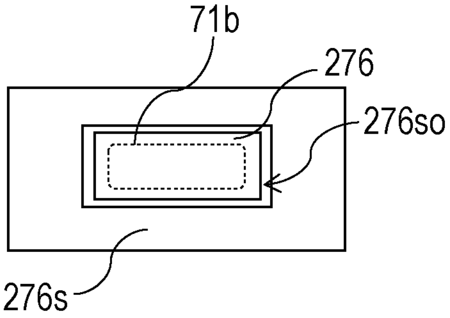
Figure 81C:
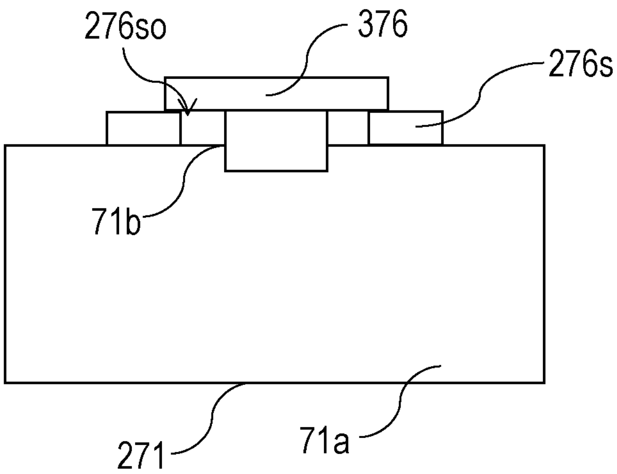

FIGS. 81A to 81C illustrate a configuration for sealing the discharge opening 71*b* of a toner cartridge 270 according to a modification.

FIG. 81A is a sectional view of the toner cartridge 270 according to the modification. FIG. 81B is a view of the toner cartridge 270 when viewed from above in FIG. 81A. FIG. 81C is a sectional view of the toner cartridge 270 in the state where a cap (described later) is attached.

As shown in FIGS. 81A and 81B, the toner cartridge 270 of the modification includes an opening seal 276 attached to a toner frame 271 so as to cover the discharge opening 71*b*. At least part of the opening seal 276 is removable from the toner frame 271.

When the entirety or part of the opening seal 276 is removed from the toner frame 271, the discharge opening 71*b* is exposed. The toner cartridge 270 is attached to the developing unit 50 after the entirety or part of the opening seal 276 is removed.

The toner cartridge 270 may have a seal member 276*s* having substantially the same function as the seal member 76*s* described in the first and second embodiments. When the toner cartridge 270 includes the seal member 276*s*, the opening seal 276 can be attached between the edge of the discharge opening 71*b* and the edge of the seal opening 276*so* of the seal member 276*s* as shown in FIG. 81B, The opening seal 276 may have an extended portion 276*e*. In this case, a user is able to hold the extended portion 276*e* and remove at least part of the opening seal 276 from the toner frame 271.

As shown in FIG. 81C, when the toner cartridge 270 from which the opening seal 276 is removed is detached from the apparatus body 1A, a cap 376 inserted into the discharge opening 71*b* can seal the discharge opening 71*b*.

The cap 376 can be press-fitted into the discharge opening 71*b*. When the toner cartridge 270 includes the seal member 276*s*, the seal member 276*s* may be compressed between the cap 376 and the toner frame 271. When at least part of the edge of the discharge opening 71*b* has a curved shape (rounded surface) as shown in FIG. 81B, the cap 376 and the edge of the discharge opening 71*b* can be more easily brought into close contact with each other.

A new toner cartridge 270 may include the cap 376. In other words, the new toner cartridge 270 may include the cap 376 covering the discharge opening 71*b* instead of the opening seal 276. In this case, the discharge opening 71*b* is exposed when the cap 376 is removed from the toner frame 271. The toner cartridge 270 is attached to the developing unit 50 after the cap 376 is removed. In other words, the discharge opening 71*b* is exposed before the developing shutter 57 reaches the open position.

According to the embodiments of the present invention, it is possible to provide a new image forming apparatus that has advanced the existing technology.

While the present invention has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2024-075083, filed May 7, 2024 and Japanese Patent Application No. 2025-064130, filed Apr. 9, 2025, which are hereby incorporated by reference herein in their entirety.

What is claimed is:

1. An image forming apparatus comprising:

a developing unit including a developing roller, and a storage frame that includes a receiving opening and a storage chamber configured to contain toner to be supplied to the developing roller;

an apparatus body accommodating the developing unit;

a toner cartridge detachably attached to the developing unit, the toner cartridge including a toner frame that contains toner to be supplied to the developing unit and that has a discharge opening, and a toner shutter movable between a closed position at which the discharge opening is covered and an open position at which the discharge opening is exposed, wherein the toner cartridge is movable relative to the storage frame between a mounting position at which the discharge opening faces the receiving opening and a retreat position at which the toner cartridge is moved from the mounting position, and at least part of the toner cartridge is positioned outside of the apparatus body when the toner cartridge is at the retreat position;

a moving device including a contact member configured to contact the toner cartridge, the moving device being configured to move the toner cartridge from the mounting position toward the retreat position; and a drive device including a drive source configured to drive the contact member, wherein the toner shutter is configured to move from the open position to the closed position as a result of movement of the toner cartridge from the mounting position toward the retreat position, and while the toner cartridge is moving from the retreat position to the mounting position, the contact member is separated from the toner shutter.

2. The image forming apparatus according to claim 1, wherein the contact member is a tray to which the toner cartridge is removably mounted, and the tray is movable between a storage position at which the toner cartridge is positioned at the mounting position and an eject position at which the toner cartridge is positioned at the retreat position.

3. The image forming apparatus according to claim 2, wherein the toner frame includes a grip portion, and the grip portion is exposed from the tray in a state where the toner cartridge is mounted on the tray.

4. The image forming apparatus according to claim 1, wherein the contact member is a rotating member configured to contact the toner cartridge, and the rotating member is disposed outside of a trajectory along which the toner shutter passes when the toner cartridge moves from the retreat position to the mounting position.

5. The image forming apparatus according to claim 4, wherein a position of the rotating member does not overlap a position of the toner shutter in a longitudinal direction of the toner cartridge.

6. The image forming apparatus according to claim 1, further comprising an opener configured to move the toner shutter from the closed position toward the open position.

7. The image forming apparatus according to claim 6, wherein the developing unit includes the opener.

8. The image forming apparatus according to claim 1, wherein the developing unit includes a developing shutter configured to cover the receiving opening, and the toner cartridge is configured to contact the developing shutter to move the developing shutter such that the receiving opening is exposed.

9. The image forming apparatus according to claim 1, further comprising a rotary supporting the developing unit and capable of rotating.

10. The image forming apparatus according to claim 9, wherein, in a direction orthogonal to a rotation axis of the rotary, the receiving opening is closer to an outer edge of the rotary than the rotation axis of the rotary, and the discharge opening is closer to the outer edge of the rotary than the rotation axis of the rotary.

11. The image forming apparatus according to claim 1, wherein the moving device is configured to move the toner cartridge from the retreat position toward the mounting position.

12. The image forming apparatus according to claim 1, wherein a moving direction of the toner cartridge when the toner cartridge moves from the mounting position to the retreat position crosses a longitudinal direction of the toner cartridge.

* * * * *